US011010787B1

(12) United States Patent
Tietzen et al.

(10) Patent No.: US 11,010,787 B1
(45) Date of Patent: May 18, 2021

(54) LINKING A TRANSACTION BETWEEN A MERCHANT AND A RESIDENT OF THE SAME VICINITY TO THE RESIDENT VIEWING THE MERCHANT BROADCAST ADVERTISEMENT

(71) Applicant: EDATANETWORKS INC., Calgary (CA)

(72) Inventors: Terrance Patrick Tietzen, Edmonton (CA); Matthew Arnold Macpherson Bates, Beaumont (CA)

(73) Assignee: EDATANETWORKS INC., Calgary (CA)

( * ) Notice: Subject to any disclaimer, the term of this patent is extended or adjusted under 35 U.S.C. 154(b) by 0 days.

(21) Appl. No.: 16/051,797

(22) Filed: Aug. 1, 2018

Related U.S. Application Data

(60) Provisional application No. 62/541,424, filed on Aug. 4, 2017, provisional application No. 62/644,569, filed
(Continued)

(51) Int. Cl.
*G06Q 30/02* (2012.01)

(52) U.S. Cl.
CPC ..... *G06Q 30/0246* (2013.01); *G06Q 30/0205* (2013.01); *G06Q 30/0211* (2013.01)

(58) Field of Classification Search
CPC .................................................. G06Q 30/02
See application file for complete search history.

(56) References Cited

U.S. PATENT DOCUMENTS

| 9,071,886 B2* | 6/2015 | Shkedi | ............ H04N 21/23424 |
| 9,131,282 B2* | 9/2015 | Shkedi | ............ H04N 21/44222 |

(Continued)

FOREIGN PATENT DOCUMENTS

WO    WO 2010/125052 A3 *  11/2010 ............. H04L 29/06

OTHER PUBLICATIONS

Al-hadrusi, Musab S; Sarhan, Nabil J, A scalable delivery solution and a pricing model for commercial video-on-demand systems with video advertisements, Multimedia Tools and Applications 73.3: 1417-1443. Springer Nature B.V. (Dec. 214), vol. 73, Issue: 3, (Year: 2014).*

*Primary Examiner* — Marilyn G Macasiano
(74) *Attorney, Agent, or Firm* — Bradley K. DeSandro; DeSandro Law Group PLLC

(57) ABSTRACT

Implementations generate links between local merchants and community programs. Merchants provide incentives to customers in relation to community programs. Implementations also include online and offline customer transactions with merchants that make use of incentives. Implementation pertain to customers that view a broadcast of content that is interleaved with a merchant's advertisement and analytic reporting. Matches between transactions with a merchant and a customer that view a broadcast of content that is interleaved with the merchant's advertisement may be identified by the system, and a level of certainty that the match is accurate may be determined. These implementations can be operated by an alliance of entities that cooperate in order to facilitate, and benefit from, transactions between customers and merchants, where the customer is incented to conduct the transaction with the merchant by the merchant's agreement to make a donation to an entity of the customer's choice.

18 Claims, 25 Drawing Sheets

Related U.S. Application Data on Mar. 18, 2018, provisional application No. 62/688,799, filed on Jun. 22, 2018, provisional application No. 62/688,814, filed on Jun. 22, 2018.

(56) References Cited

U.S. PATENT DOCUMENTS

| | | | | |
|---|---|---|---|---|
| 9,832,528 | B2* | 11/2017 | Lejeune | H04N 21/26275 |
| 2009/0172723 | A1* | 7/2009 | Shkedi | H04N 5/76 |
| | | | | 725/32 |
| 2010/0037253 | A1* | 2/2010 | Sheehan | H04N 21/2668 |
| | | | | 725/31 |
| 2010/0274664 | A1* | 10/2010 | Fernandez Gutierrez | G06Q 30/0241 |
| | | | | 705/14.45 |
| 2012/0096489 | A1* | 4/2012 | Shkedi | H04N 21/44222 |
| | | | | 725/34 |

* cited by examiner

Fig. 4: Dataflow

Fig. 5: Ecosystem

LINKING A TRANSACTION BETWEEN A MERCHANT AND A RESIDENT OF THE SAME VICINITY TO THE RESIDENT VIEWING THE MERCHANT BROADCAST ADVERTISEMENT

CROSS REFERENCE

This patent application claims priority to: (i) U.S. Provisional Application Ser. No. 62/541,424, titled "Alliance For Acquired Transactions Incented By Customer Directed Merchant Donations", filed on Aug. 4, 2017; (ii) U.S. Provisional Application Ser. No. 62/644,569, titled "Linking a Transaction Between a Merchant and a Resident of the Same Vicinity to the Resident Viewing the Merchant Broadcast Advertisement", filed on Mar. 18, 2018; (iii) U.S. Provisional Application Ser. No. 62/688,799, titled "Incenting A Consumer To View An Online Advertisement of A Merchant With Whom The Consumer Was Unlikely To Have Multiple Prior Transactions", filed on Jun. 22, 2018; and (iv) U.S. Provisional Application Ser. No. 62/688,814, titled "Blockchain Tracking and Managing of A Transaction Incented By A Merchant Donation To A Consumer Affinity", filed on Jun. 22, 2018. Each of (i) through (iv) are hereby incorporated herein by reference.

FIELD

Implementations generally relate to (i) linking customer transactions to broadcast merchant advertisements; and (ii) an alliance of entities that cooperate to facilitate incentives offered, by way of broadcast advertisements, by merchants and their allies to encourage purchases by consumers who are most likely to make purchases, more particularly to relate to merchants sending messages to consumers who are most likely to conduct transactions for which the merchants will make donations, and most particularly relate to automatically populating systems with data sufficient to allow merchants to encourage consumers that are most likely to make purchases to conduct transactions on accounts issued to them by issuers in exchange for the merchants making donations to entities with whom the merchants and/or the consumers have an affinity.

BACKGROUND

Merchants often use techniques to prompt consumers into making a particular purchase. These techniques are commonly in the form of monetary incentives, relying on the principle that a lower price will result in increased sales. Merchants may employ these techniques, for example, to help clear inventory before a new season's merchandise is released, to ease the release of a new product, to increase sales near the end of the fiscal year, to compete with a competitor over particular products, or to generally spur sales. Monetary incentives may come in the form of a "sale" (i.e., temporary reduction in price at the register), a discount coupon, a mail-in rebate (i.e., a refund of part or the entire purchase price by mail), or a store credit (i.e., credit that can be applied to another store purchase). These incentives usually only apply to a particular product and have a time component. For example, a sale may only apply to a particular brand of dishwasher purchased on a particular holiday weekend and a rebate may only be valid for computers purchased within two weeks before the start of classes at a university.

For some credit transactions, a merchant may also use a statement credit as a monetary incentive. A statement credit is an amount refunded back to a credit account and appears on the account holder's account statement. Using a statement credit as a monetary incentive involves two distinct transactions. In the first transaction, the merchant charges the full amount to a customer's credit account. In the second transaction, the amount of the monetary incentive is then refunded back to the customer's credit account as a statement credit.

Statement credit campaigns offer an advantage for merchants over other types of monetary incentive programs because a transaction handler, such as Visa Inc. or MasterCard Inc., largely handles the administration of the campaign. Once a statement credit campaign is arranged and initiated between a merchant and a transaction handler, the transaction handler tracks the statement credit, matches the statement credit to qualifying purchases, and credits the amount of the statement credit to the purchaser's account. The transaction handler then collects the aggregate amount of the statement credits made to multiple purchasers from the merchant.

Although consumers are typically incented to make purchases by a form of price reduction, non-monetary reasons also motivate consumers to make purchases with a merchant, for instance where the consumers believes that the merchant is a force for good and thus the consumers are non-monetarily incented to do business with the merchant who they deem worthy of such support. As such, it would be an advance in the art to provide a non-monetary incentive motivate a consumer to conduct a transaction with a merchant.

Referring now to FIGS. 1-2, there are depicted exemplary prior art environments for the use of technologies by which "Acquired Transactions Are Incented By Customer Directed Merchant Donations" hereinafter, the "Merchant Donor Technologies". The Merchant Donor Technologies are more particularly described in U.S. patent application Ser. No. 13/834,984, filed on Jan. 15, 2013, titled Proximal customer transaction incented by donation of auto-boarded merchant, and in U.S. patent application Ser. No. 13/748,459 filed on Jan. 23, 2013, titled Authorized transaction incented by merchant donation, both of which are hereby incorporated by reference, a prior art environment is depicted for a global Acquired Account Payment Processing System 105 as shown in FIG. 1. FIG. 1 shows a community resident who is incentivized to transact by way of a merchant's offer 102 to a make a donation in exchange for the community resident purchasing goods and services 110 by the community resident's payment on an account 104 that was issued by an issuer 114 to the community resident. Note that, in some implementations, the merchant sets terms and conditions under which the merchant's donation will be made, while the community resident selects those affinities entities to which the merchant's donations are to be made.

The merchant, who may be operating a brick and mortar store in the community where the community resident resides, inputs data about the transaction on the community resident's account into a Point of Service terminal (POS) 106. The POS, for example, can be a cash register, a web-enabled mobile device (e.g., a tablet computing device), etc. The POS 106 transmits the input data, as part of an authorization request in an authorization cycle for the transaction, to an acquirer 110 for the merchant. Acquirer 110, who can be just one of many entities in the global Acquired Account Payment Processing System 105, sends the authorization request through a payment-processing network 112, as facilitated by one or more transaction handlers, for example Visa Net, to the issuer 112 who issued the account to the community resident. In response to the authorization request, the issuer 112 sends an authorization response at least of portion of which is ultimately sent for delivery back to the merchant's POS 106 by transmissions made in backward directions through the payment-processing network 112 via the merchant's acquirer 110.

If the transaction is authorized by issuer 114, an entity in the global Acquired Account Payment Processing System 105, such as the issuer 114, sends a message 116 containing particulars of the transaction to a Web Service 100 indicating that a transaction on the community resident's account was approved for being conducted by the community resident with the merchant whose offer to donate may have been previously selected by the community resident.

Optionally, the data input into POS 106 can include additional monies received from the customer by the merchant that are also to be donated, via the merchant, to a designated affinity entity 122 (e.g., a charity). In that case, message 116 would also contain these particulars.

Upon receipt of message 116, a donation to the affinity entity 122 by the user's selected merchant is calculated according terms and conditions specified by the merchant. Web Service 100 retains the derived donation for subsequent audit purposes to insure compliance by each community merchant in its donation commitments to each of the one or more affinity entities or charities. The Web Service 100 may transmit a message containing notice of a donation, or the particularly derived donation, as shown at reference numerals 118-120 to respective logical addresses of the obligated merchant 106, one of more community resident/account holder designed affinity entities 122, and the community resident/account holder—and/or to respective agents thereof. The terms and conditions that obligate the merchant-offer or to make a donation may, but need not, include discounts, rebates, or other monetary or non-monetary incentives. As such, the community resident/account holder is incentivized to purchase from the merchant's store, inter alia, by the merchant's agreement to donate to one of more community resident/account holder designed affinity entities 122.

The affinity entity or charity, which may be selected at the discretion of the community resident/account holder, may be any entity to which the community resident has an affinity, regardless of where it is located or whom it serves. Alternatively, the affinity entity or charity may be limited to those organizations that provide a good and/or service to a community in which both community residences and merchants have an affinity—such as by their common geographic location, as by its geographic location being within a computed commuting time, by one more modes of transportation, that is below a predetermined time threshold. This affinity entity may provide food and clothing to underprivileged families in their common community. This affinity entity, for example, may provide teaching and demonstrations of entrepreneurial skills to community's unemployed or under employed. Another affinity entity may provide venues where sports education can be provided to local competing youth. Yet another affinity entity may provide care and feeding to abandoned domesticated animals, such as pets. The affinity entity may also cultivate desirable citizenship and public policy through offerings of education and entertainment services—whether in person, on-line, or both. Given the foregoing, the reader will understand that the affinity entity can be either a for-profit or a non-profit organization, and may optionally be required to provide a good or a service to a local community to which both merchants and customers in the same community have an affinity, by their common location, to advance and/or promote the community.

In some implementations, as disclosed in the Merchant Donor Technologies, each merchant will identify the affinity entity to whom the merchant-offer will make a donation. To identify the affinity entity, a customer identifier, as received by Web Service 100 in message 116, can be used to look up or access information from which can be derived a geographic address in a community where the customer resides. Alternatively, the customer's geographic address can be an address that is associated with an account issued by an issuer to the customer upon which the transaction with the merchant is being conducted. As a still further alternative, the customer's geographic address can be an address specified by the customer as being the address that is to be used for the purpose of determining the customer's community, whereby the customer can self-select their own community by specifying a geographic address in the customer's self-selected community. Similarly, a merchant identifier, also received by Web Service 100 in message 116, can be used to look up or access information from which can be derived a geographic address in a community where the merchant-offer has a brick and mortar store. Alternatively, the merchant's geographic address can be an address that is associated with a merchant acquirer account issued by the merchant's acquirer to the merchant that will receive proceeds from the transaction with the customer that is being conducted. As a still further alternative, the merchant's geographic address can be an address specified by the merchant as being the address that is to be used for the purpose of determining the merchant's community, whereby the merchant can self-select its own community by specifying a geographic address in the merchant's self-selected community. These respective geographic addresses of customer and merchant, whether self-selected or otherwise, when retrieved from one or more network accessible databases, can be compared, using processes, procedures, and methodologies enabled herein, by Web Service 100, from information in or derived from message 116, to determine whether the merchant and its customer have the same local community. By way of example, data in message 116 can include an identifier for the customer, and a database of merchants and their respective merchant-offers can include geographic location information. This geographic location information is matched against the geographic location information for the residence of the customer. Merchant and customer identifiers can be assigned to the merchant and its customer during or prior to any transaction, such as when each are registered with or otherwise sign up for participation with Web Service 100. This registration process can include the collection of physical and logical addresses for each or for their respective agents.

Once physical address information for the merchant-offer or and its customer are known, the local community of each of the merchant and its customer can be determined—in some implementations. Studies show that a significant portion of spending by a consumer is restricted to a region that is proximal to where the consumer resides. Accordingly, it is desirable for a merchant to attract those consumers who reside within the restricted region corresponding to the merchant's geographic location so that the customer can use a mode of transportation to travel from a geographic address of the customer's residence to the merchant's geographic location within a travel time that less than a threshold. As such, any such travel time that is less than the threshold might be understood to mean that the merchant-offer or and the customer who is traveling to the merchant-offer or are in the considered to be within the same community or the 'Merchant-Community'.

Alternatively, the local community determination can be made on any of other different methods, or combinations thereof. Once such method is a political or legal division, that is, the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same, or within a predetermined proximity, as that of its customer's residence.

Yet another such comparison can be whether the merchant's place of business and its customer's residence are physically proximate within a predetermined factor by any of a variety of measures or combinations thereof. For example, latitude and longitude coordinates might be known for both the merchant's place of business and the residence of its customer. These coordinates can be used to determine whether the linear distance there between is within a predetermined distance to ascertain whether or not the merchant and its customer share the same local community.

A calculated navigation time algorithm, using any of various different travel methods (e.g., walking, automobile, bicycle, mass transit, etc.), can be used to determine whether the time, using any of one or more modes of transportation, is within a predetermined time limit to ascertain whether or not the merchant and its customer share the same local community, 'neighborhood', or Merchant-Community. By way of example, the merchant and its customer might be determined to be within the same local community if the automobile drive time, as determined from one or more databases of contemporary cartographic road system information, to navigate from a geographic address attributed to the attributed to the customer and a geographic address attributed to the merchant is less than a predetermined time threshold (e.g., 17 minutes), with yet another threshold that may be used to weight the navigation time calculations with real time traffic conditions data.

A further alternative implementation will identify the population density of both the merchant's brick and mortar store and the customer's residence. If the population density exceeds a predetermined density, then the merchant and its customer might be determined to be within the same local community if the time to walk, bicycle or take public transportation between the merchant's brick and mortar store and the customer's residence, as determined from one or more databases of contemporary topographic, mass transit, and/or pedestrian cartographic system information, is less than a predetermined time threshold (e.g., 55 minutes). Such implementations may also access databases to consider real time traffic conditions. Rural, industrial, city, and suburban environments will have different population densities, and likely modes of transportation, that correspondingly may have an effect on a travel time from a customer's resident to a merchant's geographic location. A merchant may provide an incentive to customers living close by in exchange for traveling to, and transacting at, a merchant's store.

Still another such comparison can be whether the merchant's place of business and its customer's residence are proximate or are the same according to voting, electoral, or political districts. The district can be determined by an official method, an unofficial method, or a combination of methods. By way of example, measurements known within the political gerrymander sciences can be used, including but not limited to a minimum district to convex polygon ratio, shortest split line algorithm, minimum isoperimetric quotient, etc.

The local community corresponding to that of the merchant and its customer, and separations there between (if any), can be determined from any combination of linear distance, mode-specific navigational transportation travel time, political separation, postal designation, and/or hybrid algorithm that takes into considers geographic barrier features such as rivers, cliffs, and highways, cultural features such as boundaries of identified people groups (e.g., tribes, first nation people, etc.), land ownership such as subdivisions, housing projects, cooperatives, planned communities, military installations, governmental owned and leased properties, etc. Given the foregoing, an algorithm might find that the merchant and its customer are members of the same community, not members of the same community, or are both members of more than one of the same communities as determined by the algorithm.

Similar or different algorithms that are used to determine the respective local community of the merchant and its customer can also be used to determine the local community of an affinity entity such as that shown on FIG. 1 at reference numeral 122, or as that shown as an Affinity Entity (k) 398 in FIG. 2, and an Affinity Entity (f) 484 in FIG. 4, as discussed herein below.

In some implementations, if the local community of the merchant, its customer, and an affinity entity that has been selected by the customer or by other methods are the same, then the business rule selected by the merchant will determine the amount of the donation that the merchant will make to the selected affinity entity. In some implementations, the affinity entity to whom a merchant is to make a donation can only be selected by the customer, and not the merchant. In such implementations, the goals or purposes of an affinity entity will not cause tension between the goals or purposes of the merchant or the goals or purposes of customer in that the identity of the affinity entity is unknown to the merchant through its being selected anonymously by the customer. As such, the merchant need not be told or be given any notice, directly or indirectly, as to the identity of the affinity, entity or charity selected the customer with whom the merchant is conducting a transaction. Rather, the merchant might only be told or be given notice to make a single payment of, or period payments to, a single affinity entity who, as trustee or agent, will thereafter make respective disbursements for all registered merchants accordingly to those affinity entities that had been selected by those customers with whom those merchants had conducted transactions.

Various implementations can ensure that a merchant who, by force of reason or conscience, does not want to make a donation to a particular affinity entity or charity, need not do so directly, as any and all merchant donations are made blindly through other avenues or collection points that make all merchant donation disbursements to all affinity entities or charities. Accordingly, each merchant will have notice of its total periodic donations without knowing the identity of the intended recipients, thereby leaving the direction of donations fully within the discretion of the merchants' customers. Note that a limitation can optionally be placed upon the customer's choice of affinity entity or charity such that the choice must be made only among those affinity entities or charities that serve the local community of the merchant, its customer, or both. Such implementations may leave the currency amount of the merchant's donation fully within the discretion of the merchant. Yet another limitation can optionally be placed upon the customer's choice of affinity entity or charity such that the choice must be made only among those affinity entities or charities that are on a pre-designated list of those organizations that are pre-approved by a third party as being available for such selection according to an approval process.

Web Service 100 can use respective identifiers for the merchant and its customer (e.g., account holder) to access and retrieve geographic information for each, and then apply an algorithm to the retrieved geographic information to determine the respective local communities of the merchant and its customer, as discussed above. By way of example, the local community can be progressively granular in nature, such as: $1^{st}$ the United States of America; $2^{nd}$ the state of New York; $3^{rd}$ the portion of New York called "Long Island"; $4^{th}$ the county of Nassau within the state of New York; $5^{th}$ a portion of the Nassau County called North Hempstead; and then $6^{th}$ the specific geographic location of "Port Washington". This final level of geographic granularity indicates a community in which both merchant and customer are members, neighbors, residents, and/or the like.

The final level of geographic granularity can be used to perform a look-up against one or more databases to which Web Service 100 has access. This access and lookup is used by Web Service 100 to identify: (i) the affinity entity or charity for that community which, in this example, might be the Port Washington Food Bank located in Port Washington, N.Y., which charity might have been specified by the customer; and (ii) the respective identifier of the merchant's business rule (and/or the customer's business rule) that is to be used to make a calculation of the currency amount of the donation that the merchant is to make to the affinity entity or charity for that community. Business rule(s) is/are used with the currency amount of the customer's payment in order to calculate the currency amount of the donation that is to be made by the merchant to the affinity entity or charity for that community. Note that the donation can be directed to a plurality of affinity entities for the local community according to directions that had been previously specified by the customer. For example, the customer may have specified that each merchant donation is to be split evenly, or in specified portions totaling one hundred percent (100%), between five (5) local community affinity entities, for example: (i) a local youth sports team cooperative; (ii) a local charter junior high school; (iii) a local house of worship; (iv) a local political party; and (v) a local for-profit college specializing business entrepreneurialism.

Referring now to FIG. 1, the community resident can take the merchant's conditional offer 102 to the local merchant's brick and mortar store POS 106. After showing the offer 102 to the merchant at the POS 106, the community resident conducts a transaction on an account 104 issued by an issuer to the community resident to pay of the transaction and buy goods and/services 110 received by the community resident.

Note that terms and conditions of the transaction may differ from that of the offer presented by the community resident at the local merchant's brick and mortar store. As such, the merchant's offer to donate might not be specific to a particular good or service, but can be specific as to the entire transaction between the merchant and its customer. By way of example as to this type of offer specificity, the offer may obligate the merchant to make a donation of a certain percentage of the entire currency amount of transaction, or the offer may obligate the merchant to make a donation only if the transaction is conducted at a certain time of day or on a particular day of the week, or only if the currency amount of the transaction exceeds a predetermined amount, or a combination of the foregoing. Other conditions are also permissible.

Although some terms of the offer may differ from some terms of subsequent transactions between the merchant and its customer, nevertheless, the merchant's offer to make a donation to an affinity entity (e.g., a local charity) fundamentally provides an incentive that causes, at least in part, the local community resident to navigate to the local merchant's brick and mortar store, come into the store, shop, and ultimately conduct a transaction that will bring revenue to the local merchant and its community. Advantageously, the absence of specificity in the offer as to a particular good or service allows many implementations to operate without modification to the merchant's input of data about the transaction at the POS 106, without modifications to the POS 106 itself or procedures for its operation, and without modifications to software executing on POS 106.

Optionally, a community resident (e.g., customer) may accept the merchant's offer 102 in advance of going to the POS 106. Such advance acceptance may take place electronically, such as in response to the community resident's electronic receipt of offer 102. Such an electronic acceptance to offer 102 can be by way of a transmission of information from the community resident to the merchant. The transmitted information can include: (i) an identifier for the registered customer who intends to accept the merchant's offer 102; (ii) the calculated distance and/or time for the customer to navigate, using a known mode of transportation, from a geographic location associated with the customer (e.g., home location, work location, vacation location, etc.) to the merchant's brick and mortar store of the POS 106, for instance, by walking, bicycling, automobile and/or mass transit; (iii) the terms and conditions of the offer including any expiration thereof; (iv) optionally any other information already conveyed to the customer, such as a statement about the donation that the merchant will make to the Affinity Entity(ies) 122 when the customer conducts a timely transaction with merchant; and (v) other unexpired offers or advertisements that may or may not have been conveyed to the customer, terms and conditions of such other offer(s), etc.

Referring now to FIG. 2, an exemplary prior art process 200 is depicted of a particular financial transaction system, such as may be described as an open loop system, in which an account holder (p) 208 conducts a financial transaction with a Merchant (m) 210. By way of example, the Account Holder (p) 208's financial transaction with the Merchant (m) 210 may have been incentivized by the Merchant (m) 210's agreement to make a donation to an Affinity Entity (k) 295 in the local community as defined by the Merchant (m) 210 through an ad incentive which, optionally, can be communicated to Account Holder (p) 208, whether requested or not.

In FIG. 2, by way of explanation for the nomenclature of reference numerals used and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 204-210 and 278-294, and 298 in FIG. 2 are illustrated with a block, but indicate one or more elements can be present. For example, Issuer (j) 204 is one of a possible plurality of issuers, where j may range from 1 to a large integer 'J'.

Account Holder (p) 208 presents an account bearing payment device to a Merchant (m) 210 as tender for a financial transaction such as a purchase of goods and services. As part of the transaction, the Account Holder (p)'s 208 payment device can be a credit card, debit card, prepaid card, cellular telephone, Personal Digital Assistant (PDA), etc. Those of skill in the art will recognize that other financial transactions and instruments other than credit cards may also be used, including, but not limited to, a prepaid card, a gift card, a debit card, a token equivalent of an account as communicated via cellular telephony, near field communications, and the like. For purposes of illustration and explanation, however, reference will be made to a credit card.

The payment device can be manually keyed into a POS or can be read by a reader operated by the Merchant (m) 210, whereupon account information is read from the payment device and a request for authorization is transmitted to the Merchant (m) 210's Acquirer (i) 206. Each Acquirer (i) 206 is a financial organization that processes credit card transactions for businesses, for example merchants, and is licensed as a member of a Transaction Handler 202 such as a credit card association (i.e., Visa Inc., MasterCard, etc.) As such, each Acquirer (i) 206 establishes a financial relationship with one or more Merchants (n) 210.

The Acquirer (i) 206 transmits the account information to the Transaction Handler 202, who in turn routes the authorization request to the account holder's issuing bank, or Issuer (j) 204. The Issuer (j) 204 returns information via an authorization response to the Transaction Handler 202 who returns the information to the Merchant (m) 210 through the Acquirer (i) 206. The Merchant (m) 210, now knowing whether the Account Holder (p) 208's credit card account is valid and supports a sufficient credit balance, may complete the transaction and the Account holder (p) 208 in turn receives goods and/or services in exchange. Most credit card associations instruct merchants that, after receiving an affirmative authorization response, the detailed credit card account information obtained by a point of service terminal (e.g., such as via a magnetic stripe scanner) must be deleted.

To reconcile the financial transactions and provide for remuneration, information about the transaction is provided by the Merchant (m) 210 to Acquirer (i) 206, who in turn routes the transaction data to the Transaction Handler 202 who then provides the transaction data to the appropriate Issuer (j) 204. The Issuer (j) 204 then provides funding for the transaction to the Transaction Handler 202 through a settlement bank. The funds are then forwarded to the Merchant's (n) 210 Acquirer (i) 206 who in turn pays the Merchant (m) 210 for the transaction less a merchant discount, if applicable. The Issuer (j) 204 then bills the Account holder (p) 208, and the Account holder (p) 208 pays the Issuer 204 with possible interest or fees.

Also shown in FIG. 2 are one or more Affinity Entities (k) 298 and a Donation Audit Web Service 214 that implement processes by which donations to the one or more Affinity Entities (k) 298 from various donors, for instance, any Issuer (j) 204, an Merchant (m) 210, any Acquirer (i) 206, and the Transaction Handler 202. Donation Audit Web Service 214 implements processes for the auditing of donations to the one or more Affinity Entities (k) 298. The Donation Audit Web Service 214 has access to information resources within the following databases: Account Holder databases 278; Merchant databases 280; Transaction databases 282; Affinity Entity Donations Payable databases 286; Affinity Entity Donations Paid databases 288; Affinity Entity databases 290, Issuer Bank databases 292, and Acquirer Bank databases 294.

As shown in FIG. 2, Databases 278-294 can be connected by one or more private or public networks, virtual private networks, the Internet, or by other means known to those skilled in the art. Moreover, not every entity seen in FIG. 2 at reference numerals 208, 210, 214 and 298 must necessarily have real time, uninterrupted access to any or all of the Databases 278-294. Each such Database 278-294 can assign, read, write, and query permissions as appropriate to the various entities. For example, a Merchant (m) 210 may have read access to the one or more Transactions Databases 282.

Each Transactions Database (a) 282 can be designed to store some or all of the transaction data originating at the Merchants (n) 210 that use a payment device for each transaction conducted between an Account holder (p) 208 and the Merchant (m) 210. The transaction data can include information associated with the account of an Account holder (p) 208, date, time, and an identifier sufficient to determine a physical geographic location where the transaction took place, among other more specific information including the amount of the transaction. The database can be searched using account information, date and time (or within proximity thereof), or by any other field stored in the database.

The Transactions Database (a) 282 is also designed to store information about each Merchant (m) 210, where the information can include a unique identification of each Merchant (m) 210, an identifier for each point of sale device in use by the Merchant (m) 210, and a physical geographic location of each store of the Merchant (m) 210.

Also included in the Transactions Database (a) 282 is account information for payment devices associated with Account holder (p) 208, such as part or all of an account number, unique encryption key, account information, and account name of an account holder who is registered to participate in a system in which donations can be made to each Affinity Entity (k) 298 as per rules stored in Merchant Database (b) 280. After registering to participate in the donation system, an Account holder (p) 208 initiates a qualifying purchase transaction with a Merchant (m) 210 by presenting a payment device (not shown) to the Merchant (m) 210. The payment device is typically presented at the Point Of Service terminal (POS) at which data thereon is read. Certain transaction information is transmitted from the POS (e.g., card track data) in route to the Merchant's (n) 210 Acquirer (i) 206. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (m) 210, and the ultimate destination, such as the Acquirer (i) 206. These points can include, without limitation, from the reader at the POS, the POS at the Merchant (m) 210 and a network router or computer that is connected to a network but is housed and maintained by the Merchant (m) 210 and between the Merchant (m) 210 and the Acquirer (i) 206. The communication channel could be Ethernet, wireless internet, satellite, infrared transmission, or other known communication protocols. Some or all of the transmission may also be stored for record keeping, archival or data mining purposes with little or no encryption. For example, the Merchant (m) 210 may store transaction data, including certain account information in the Merchant's (n) 210 accounts on file database for reuse later.

During a transaction conducted by Merchant (m) 206 on an account issued by Issuer (j) 204 to Account Holder (p) 208, information relating to the qualifying purchase is retrieved from the POS at Merchant (m) 206. The transaction information is comprised of account information together with other information about the transaction itself: time, date, location, value, etc. Certain parts of the transaction information are considered sensitive information including, without limitation, account number, credit card verification number, and account name.

For the Account Holder (p) 208 to donate to each Affinity Entity (k) 298 as may have been previously specified, the Account Holder (p) 208's Issuer (j) 204 can pay the Affinity Entity (k) 286 and apply a debit in that currency amount on the Account Holder (p) 208's periodic revolving credit statement. The Account Holder (p) 208, upon receipt of the statement, can thereafter make a total payment to the Issuer (j) 204 of the currency amount of the donation that appears as a debit on the statement along with the other credit charges that also appear on the Account Holder (p) 208's statement.

Both the Account Holder (p) 208 and the Merchant (m) 210 can change or disable a donation commitment at any time by accessing a server that serves web pages where respective user interfaces are provided. Thus, charitable donation commitments can be enabled or disabled using near real-time user interfaces. By way of example, and not by way of limitation, such servers can be hosted by the Donation Audit Web Service 214 seen in FIG. 2.

In various implementations, Donation Audit Web Service 214 seen in FIG. 2 receives information that confirms such a timely transaction between the customer and the merchant by way of receiving information derived from an authorization response for the transaction. As more fully described elsewhere herein with respect to FIG. 2, the information in the authorization response is typically generated by an Issuer (j) 204 who issued an account to the Account Holder (p) 208 (e.g., the customer or mobile device user) on which the timely transaction with the Merchant (m) 210 was conducted. A positive authorization response reflects the Issuer (j) 204's approval of the transaction on the account issued to Account Holder (p) 208. Stated otherwise, and as shown in FIG. 2 and discussion herein below, Donation Audit Web Service 214 receives the information derived from an authorization response from an acquired account payment processing system (i.e., see Ref. Num. 105 in FIG. 1), where each of the Issuer (j) 204, the Account Holder (p) 208, and the Merchant (m) 210 operate in the acquired account payment processing system.

Once confirmation has been received by Donation Audit Web Service 214 that a timely transaction has taken place been the merchant who made the offer and the customer who selected and confirmed that offer, a calculation is made of an amount of a donation that is to be made by the merchant-offer or according to terms of the offer.

In summary, prior art process 200 permits the Account Holder (p) 208 to transact with community Merchants 210 by way of incentives from the community Merchants 210 that they will donate to the Account Holder (p) 208's favorite charity (e.g., Affinity Entity 298), though the charity may not be the Merchant (m) 210's favorite charity, or even a desirable charity, in that community. Nevertheless, the Merchant (m) 210 has received the benefit of customers' foot traffic inside the merchant's local brick and mortar store, as well as the benefit of transactions with some of those customer who enter the merchant's brick and mortar store, where each such benefit is realized by the merchant's offer to make a donation to the customer's favorite charity (ies) if a timely transaction occurs subsequent to the merchant's offer.

In the context of the foregoing, broadcasters want to increase advertising revenue by broadcasting content that is interleaved with merchant advertisements. The advertising revenue from merchants would be likely to increase if the merchants were assured that their advertising content was broadcast so as to be viewed by potential customers who would be most likely to respond to the viewing of the advertisements by conducting transactions with the merchants. However, establishing the link between the merchant's advertising spend and resulting transactions with customers has been difficult to determine with a high degree of certainty.

To enable broadcasters to broadcast hyperlocal targeted advertisements over specific geographic areas, broadcasters use broadcast modes and duplex schemes through dynamic network topologies exploiting programmable (NFV/SDN) radio functions that can be activated, deactivated, and modified on demand depending on the specific needs of the service, and in response to consumer demand, using both licensed and unlicensed spectrum inside and outside the broadcast band. To so, technical contributions have been made to the emerging Advanced Television Systems Committee (ATSC) 3.0 standard. The ATSC 3.0 standard is based on a new Orthogonal frequency division multiplexing (OFDM) physical layer and IP as transport and an extensible OFDM framework. However, this emerging ATSC 3.0 standard is constrained to target traditional services. such as 4K UHDTV. as efficient use of spectrum.

While personalization of communication, including hyperlocal targeted advertisements, will lead to a reduced demand for legacy broadcast as is conventionally deployed, e.g. linear TV, there is a need for efficient distribution of information from one source to many destinations. There is also a need for these services to distribute content as is conventional (typically only downlink), but also to provide a feedback channel (uplink) for interactive services or acknowledgement information. Several broadcast-like use cases may be proposed for future 5G networks.

There is a need for a broadcast-like use case for TV Everywhere implementations, also known as authenticated streaming or authenticated video on-demand. In such TV Everywhere implementations, access to streaming video content from a television channel requires users to authenticate themselves as current subscribers to the channel, via an account provided by their participating pay television provider, in order to access the content. Under the TV Everywhere business model, broadcasters offer their customers the ability to access content broadcast on their channels through internet-based services and mobile apps executed by web-enabled mobile computing devices that function as a television receiver (e.g., smart phone, tablet, phablet, lap top, etc.)—either live or on-demand, as part of their subscription to the service. TV Everywhere provides the broadcast media consumer with the ability to receive a television broadcast everywhere in real time as an event occurs (e.g., live, near real time action in a football game or a soccer match). The broadcast media consumers that are located in a specific vicinity should simultaneously receive appropriate news and information regardless of the device they are using or their network connection. Also, local services are desirable that will be active at a cell level with a reach of, for example, 1 to 20 KM. Typical scenarios include services to broadcast advertisements that can be viewed only in a specific geographic area. There is also a need for broadcast-like services with a regional reach, for example, such as broadcast advertisements that can be viewed only within 1 to 100 KM. Unlike legacy broadcast services, there is a need for such broadcast-like services to provide of a feedback channel that can be used to track the delivery of the broadcast advertisements that were viewed to all or selected broadcast media consumers located in a specific vicinity (e.g., within 1 to 100 km), or to receive a survey result from a broadcast viewer who transacted with a merchant after viewing the merchant's broadcast advertisement. Thus, there is a need for improvements to existing television broadcast networks so that they are enabled for hyperlocal geo-targeting of advertisements to viewers located in a vicinity.

There is a need for systems and methods that enable a merchant having a brick and mortar store in a vicinity to measure the likelihood that a transaction with a resident of the vicinity was the result of the merchant's advertisement having been broadcast over a broadcast medium such as cable and/or satellite TV. There is a need for systems and methods that enable a merchant having a brick and mortar store in a vicinity to measure the likelihood that a transaction with a resident of the vicinity was the result of the merchant's advertisement having been broadcast over a broadcast medium such as cable and/or satellite TV, where the merchant's advertisement was broadcast over a television broadcast network enabled for hyperlocal geo-targeting of merchant's advertisements to viewers located in a vicinity.

Given the above and other numerous problems imposed upon available sales and marketing resources available to small and medium sized business merchants in designing, implementing, and maintaining consumer incentive programs, it would be an advance in the relevant arts to provide an alliance of entities that cooperate to facilitate incentives offered, by way of broadcast advertisements, by merchants and their allies to encourage purchases by consumers who are most likely to make purchases, where the merchants and their allies send messages to consumers who are most likely to conduct transactions for which the merchants will make donations, and where systems are automatically populated with data sufficient to allow merchants and their allies to encourage consumers that are most likely to make purchases to conduct transactions on accounts issued to them by issuers in exchange for the merchants making donations to entities with whom the merchants and/or the consumers have an affinity.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

Figure 1:
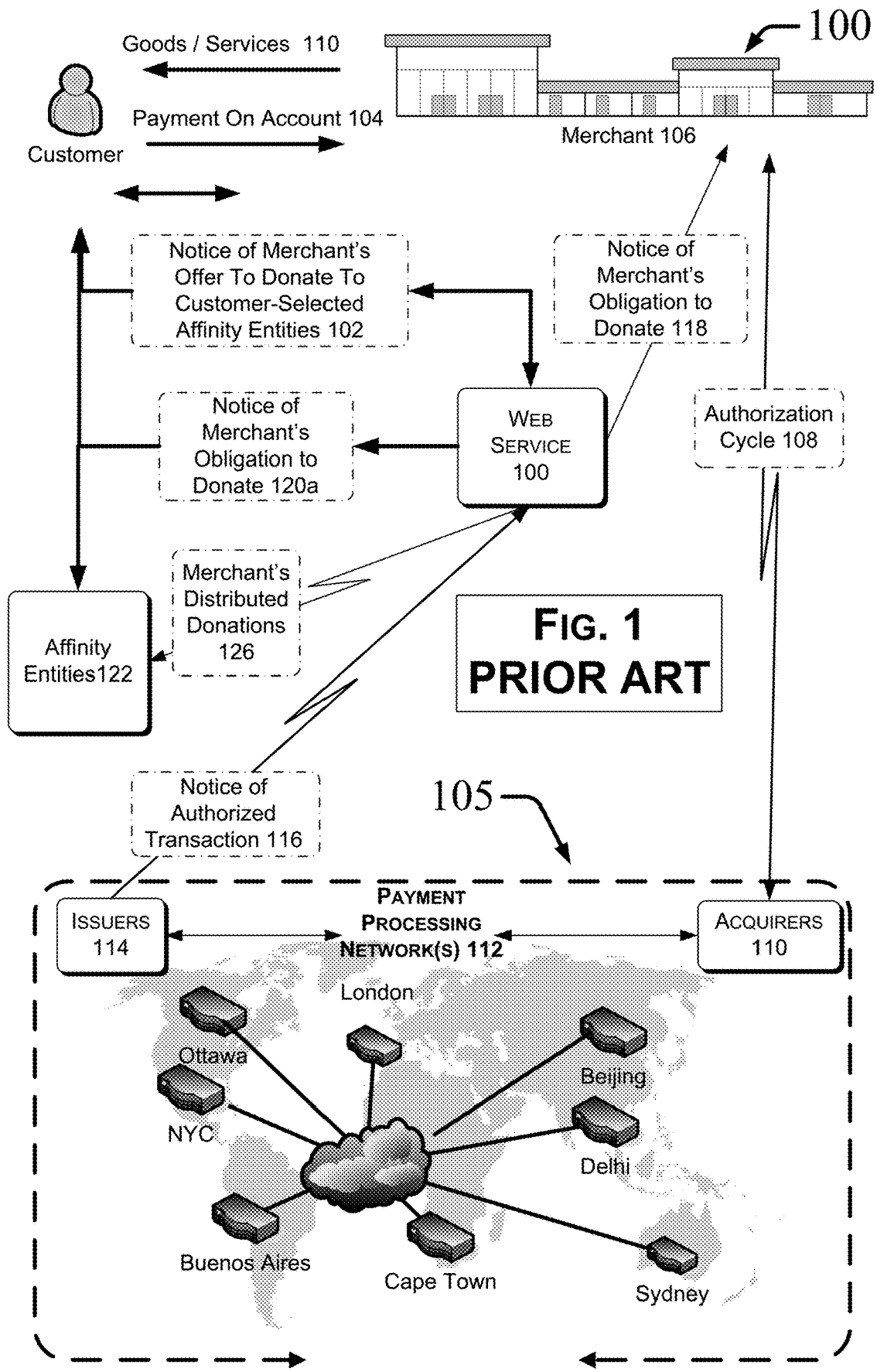
FIGS. 1-2 are flowcharts illustrating respective exemplary prior art processes that allow an account holder to make a purchase of goods and/or services from a merchant, where the account holder's transaction obligates the merchant to make a donation to an affinity entity that make also be a charitable organization (e.g., a charity)
Figure 2:
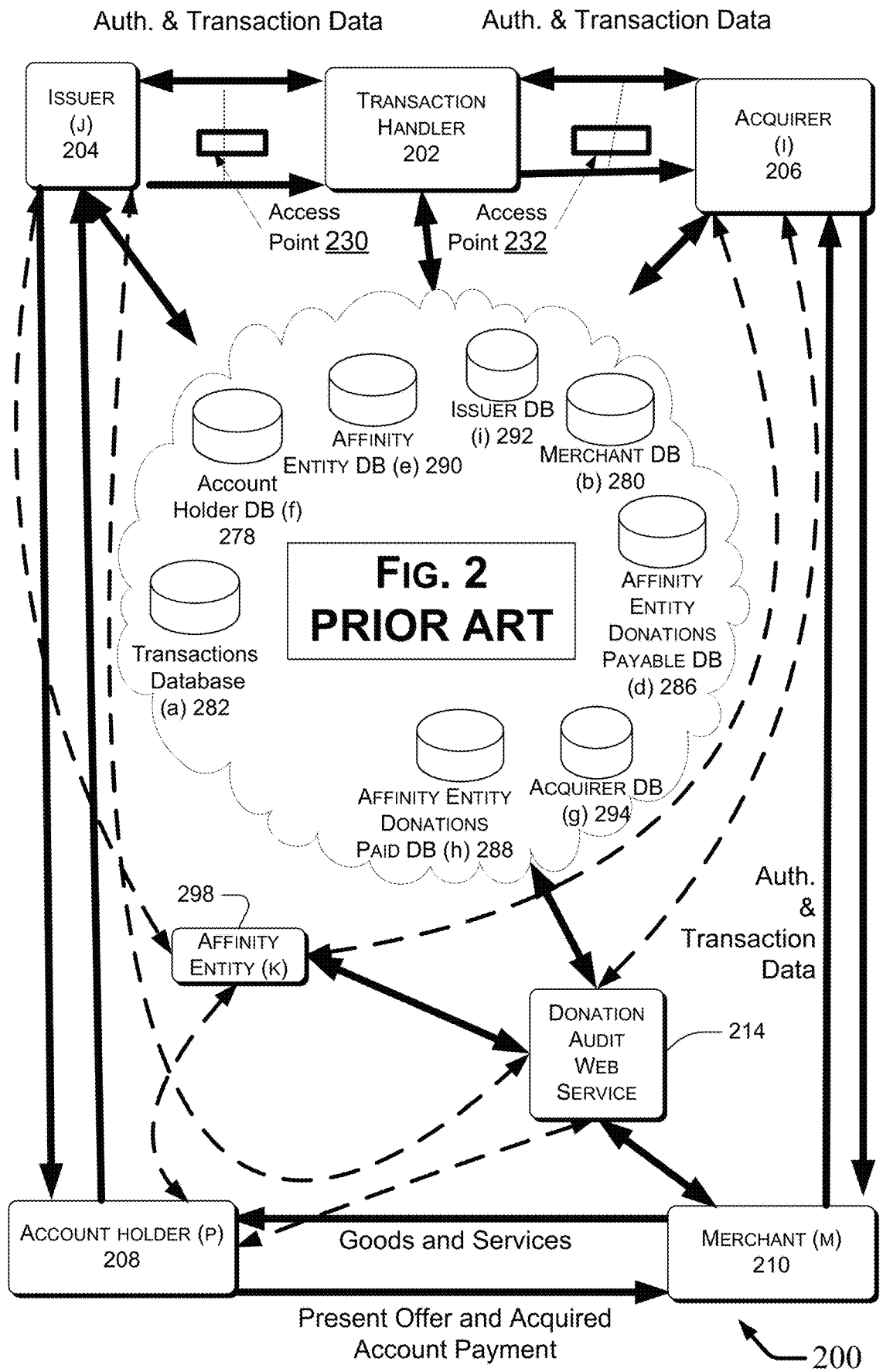

Implementations are presented in which an alliance of entities (hereinafter, the "ALLIANCE") cooperate in order to facilitate, and benefit from, transactions between customers and merchants as depicted by the prior art processes seen in FIGS. 1-2, where each transaction is conducted upon an account issued to the customer by an issuer bank, the merchant is paid for the transaction by an acquirer bank, where payment from the issuer bank to the acquirer bank is processed by a transaction handler, and where the customer is incented to conduct the transaction with the merchant by the merchant's agreement to make a donation to an entity of the customer's choice.

FIGS. 3 through 6 illustrate implementations of the ALLIANCE, which includes ALLIANCE Program Facilitators, ALLIANCE Market Facilitators, and ALLIANCE Market Participants. Before explaining various implementations of the invention in detail, it is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As shown FIGS. 3 through 6, an ALLIANCE, seen at reference numerals 300, 400, 500, and 600, respectively, includes various ALLIANCE Program Facilitators and an ALLIANCE Networking Entity 304 as are shown. The ALLIANCE Networking Entity 304 include an ALLIANCE Operator Entity 304c who is responsible for management oversight, philanthropy strategy, and legal, regulatory, audit and intellectual property. The ALLIANCE Program Facilitators also include a Product Stewart Entity 314 who is responsible for innovation, product strategy, software development, and User Interface (UI), User Experience (UX), and branding.

The ALLIANCE Program Facilitators also include Support Owner & Digital Marketing Assistant 316 who is responsible for sales and marketing, deployment, and support. By way of example, Support Owner & Digital Marketing Assistant 316 could provide customer support and consumer-facing technology support such as by way of chat lines to support various ALLIANCE usages by merchants and consumers. The ALLIANCE Program Facilitators also include an ALLIANCE Technology Host Entity 312 who is responsible for network hosting. The ALLIANCE Program Facilitators also include an ALLIANCE Data Facilitator Entity 310 who is responsible for data and analytics.

As shown FIGS. 3 through 6, the ALLIANCE includes Merchant Acquirer Banks 326 (e.g., the banks for the merchants), Merchants 326, Issuer Banks 326, Consumers/ Account Holders/Cardholders 326, Search Engine Provider Entities 320a, and Social Network Provider Entities 320b (e.g., Google, Microsoft Bing, etc.), Payment Network Entities 322 (e.g., Visa, MasterCard, American Express), providers of social networks 320b, and Additional Alliance Member/Beneficiary Entities 318 beneficiaries of the ALLIANCE 300, 400, 500, and 600.

The ALLIANCE Market Participants include cardholders, which are shown in FIGS. 3 through 6 as consumers at reference numeral 326, to whom an issuer bank, which are shown in FIGS. 3 through 6 as "Issuer Banks" at reference numeral 326, has issued an account upon which transactions with merchants, which are shown in FIGS. 3 through 6 as merchant at reference numeral 326, are conducted, and the merchants with whom the cardholders conduct the transactions, and causes or entities to which the merchants makes a donation to a beneficiary, which are shown in FIGS. 3 through 6 as Beneficiaries at reference numeral 318, according to the cardholder's choice.

As shown FIGS. 3 through 6, participant entities that facilitate the ALLIANCE include Members 326, Beneficiaries 318, Providers of Search Engines 320a, Providers of Social Networks 320b, an ALLIANCE Operator 304c, An ALLIANCE Advisory Committee 324, an ALLIANCE Market Delivery Support Owner 316, an ALLIANCE Product Steward 314, An ALLIANCE Technology Host 312, a facilitator of Data and Analytics 308 for the ALLIANCE, a Data Facilitator 310 for the ALLIANCE, An ALLIANCE Auditor 304c, and an IP Owner Entity 306 for Intellectual Property and Technology for the ALLIANCE. The ALLIANCE 300, 400, 500 and 600, respectively seen in FIGS. 3-6, comprises a core group of stakeholders each playing a unique role in an ecosystem to add and focus to activities already being performed by each stakeholder. A given stakeholder could fill one or more roles within the ALLIANCE, some roles may be omitted from the Alliance (i.e. the omission of an Alliance Advisory Committee), and some roles may be split among various organizations. Each of the foregoing participant entities that facilitate the ALLIANCE are defined by the following descriptions and roles.

Data generated through the ALLIANCE, in some implementations, can be controlled by Data Facilitator Entity 310 while being owned by and/or licensed to Data & Analytics Entity 308. As such, the types of data generated through the ALLIANCE could be summaries of transaction data between ALLIANCE merchants 326 and ALLIANCE cardholders 326, and summaries of ALLIANCE community data reflecting donations made by ALLIANCE merchants 326 to ALLIANCE beneficiaries 318 as directed by cardholders 326. Data Facilitator Entity 310 uses software developed by and/or licensed to Product Stewart Entity 314 to cross sell via an incentive to a consumer to do future business with a second merchant 326 because a consumer 326 had conducted a past transaction with a first merchant 326;

By way of example, Product Stewart Entity 314 can provide various Application Program Interfaces (APIs) which can be stored and made to be network assessable via an ALLIANCE Data Facilitator Entity 310 so as to be provided via an ALLIANCE Technology Host Entity 312 in order to deliver various functionalities and capabilities of the ALLIANCE to Search Engine Provider Entities 320a and Social Network Provider Entities 320b. By way of example of such functionality and capability of the ALLIANCE, a merchant's membership within the ALLIANCE can be visibly associated with the ALLIANCE by software API capable of populating a map that is rendered, upon demand, on a display screen of smartphone of a cardholder, where the map is enhanced so as to display a brand or trademark of the ALLIANCE (e.g., a beating heart logo) proximal to the merchant's location of the map.

As shown in FIGS. 3 through 6, the cardholders, which are shown as consumers at reference numeral 326, have the following roles: their payment cards are auto-enrolled (debit, credit; plastic, mobile wallet) at banks who are participating in their local market (opt-out); Select local causes they want to support in their local market, at no cost to them; Shop at participating merchants in their local market; generate merchant-defined donations to local causes of their choice, at no cost to them; Provides feedback to merchants about their in-store experiences; Win prizes and earn rewards through gamification. Alternatively, a consumer 326 may initiate a merchant donation by way of conducting a transaction with the donating merchant, where although the merchant has a physical location that is outside of the consumer 326's local market, the merchant's donation can still be directed to an alternate charity 318 or destination (other than the consumer's selected causes). For example, the redirected merchant donation can be deposited into a holding fund intended for local or global disaster relief cause, or to the consumer's issuer bank's default causes within the region where the consumer had transacted with the merchant.

The cardholders 326, in order to participate in the ALLIANCE, give their support to the ALLIANCE by using the ALLIANCE enabled form of payment card (debit or credit) that they already have via a wallet or a mobile device, or otherwise by using a new payment device that is enabled for participation within the ALLIANCE; doing business at ALLIANCE participating merchants 326; selecting the charitable or community organizations 318 that are to receive the donations generated from the cardholder's purchases, at no cost to the cardholder; sharing the cardholder's experiences with other potential cardholder participants in the ALLIANCE. By participating in the ALLIANCE the cardholder 326 receives savings and prizes by way of new ways to save money through valuable merchant offers, chances to earn rewards at favorite local merchants, prize opportunities for making purchases and completing post-transaction surveys. Alternatively, in some implementations, the only incentive received by the cardholder 326 to transact with a merchant 326 in the ALLIANCE is the merchant 326's commitment to make a donation to the affinity entity 318 of the cardholder 326's choice. By participating in the ALLIANCE the cardholder receives community awareness and support via new ways to contribute and make a positive social impact with no added cost or change of behavior, direct merchant donations to causes that the cardholder cares about at no cost to the cardholder, simply by shopping at participating merchants 326; Discover and support banks 326 and merchants 326 who care about the cardholder's community 318 and its needs; Gain emotional gratification of helping good causes. By participating in the ALLIANCE the cardholder receives additional outcomes, including Saving, winning, and benefiting the community simply by joining the ALLIANCE, shopping at participating local merchants who will donate to cardholder-designated entities, and using an ALLIANCE enabled form of payment the cardholder is already using; Retain existing points, cashback, or bank rewards programs; Easy to understand and use program, on the cardholder's desktop or mobile device; No overt change to the cardholder's purchasing preferences, habits or behaviors.

Automated Merchant Boarding Implementations

As shown in FIGS. 3 through 6, the merchants seen at reference numeral 326 have the following roles: (i) Join then ALLIANCE through an automatic boarding process known as the Merchant Auto-boarding system as is disclosed in U.S. patent application Ser. No. 13/168,488, filed on Jun. 24, 2011, titled Program, system and method for linking community programs and merchants in a marketing program, now U.S. Pat. No. 9,105,050 [13US—Automated Merchant Boarding (AMB) published as US 2011-0320246 A1], and as disclosed in U.S. patent application Ser. No. 13/834,984, filed on Jan. 15, 2013, titled Proximal customer transaction incented by donation of auto-boarded merchant, both of which are incorporated herein by reference; (ii) Select the merchant-defined donation rate they wish to contribute on all transactions from consumers 326 who are participating in the ALLIANCE; and (iii) Provide customers 326 with valuable objective-based offers; Promote/refer consumers 326 and other merchants 326 to join the ALLIANCE to whom an issuer has issued an account upon which transactions with merchants are conducted, merchants with whom the cardholders conduct the transactions, and causes or entities to which the merchants makes a donation according to the customer's choice. The merchants 326, to participate in the ALLIANCE, give their support to the ALLIANCE through providing merchant defined donations for community 318 (a small percentage of sales to community organizations of the consumer's choice); Providing customers with offers, incentives, and/or commitments to donate to the affinity entity of the customers' choices; Providing ALLIANCE marketing and promotion in conjunction with existing channels. By participating in the ALLIANCE, the merchant 326 receives revenue: incremental revenue by acquiring, retaining and rescuing consumers 326 who are looking to raise funds for their causes 318, receive valuable offers, and win prizes; Off-peak revenue through offer recommendations generated automatically by the ALLIANCE. By participating in the ALLIANCE, the merchant 326 receives enhanced brand image and increased awareness: Viewed as a strong community supporter by raising funds for what 318 the merchant's 326 customers 316 care about; fosters an emotional connection with consumers 326. By participating in the ALLIANCE, the merchant 326 receives additional outcomes: the merchant 326 gains access to the valuable financial performance data, customer demographics and summary customer feedback which is typically reserved for large enterprises; the merchant 326 can utilize the ALLIANCE data to create targeted objective-based offers which help grow the merchant's business; the merchant can monitor customer satisfaction, use automatic rewards to "rescue" those who had a negative experience and appreciate those the merchant considers the best customers 326; the merchant 326 can offer ALLIANCE benefits to customers 326 without new or added point of sale integration or other software/hardware requirements; the merchant 326 can re-allocate marketing dollars from unproductive campaigns.

As shown in FIGS. 3 through 6, the issuer banks seen at reference numeral 326 have the following roles: Offer participation opportunities in the ALLIANCE to their existing and prospective cardholders 326 in local markets; Brand the ALLIANCE consumer portal as their own program as part of the ALLIANCE; Select their aligned causes 318 to be available to their cardholders 326 in each local market; actively or passively promote/refer the ALLIANCE cardholders to merchants 326 through all bank channels depending on the bank's 326 desired level of involvement—using the ALLIANCE Market Delivery Support Owner as appropriate; Optionally brand an ALLIANCE merchant portal as their own merchant program or direct merchants to an overall ALLIANCE program level merchant portal; include the branding of the ALLIANCE in advertising and promotion; Participate in the ALLIANCE Advisory Committee 324; Include the ALLIANCE branding in advertising and promotion when referring to ALLIANCE participation;

As shown in FIGS. 3 through 6, the merchant acquirer banks and the merchants seen at reference numeral 326 have the following roles: Actively or passively promote/refer the ALLIANCE to merchants 326 through all channels depending on the acquirer's 326 desired level of involvement— using the ALLIANCE Market Delivery Support Owner as appropriate; optionally brand an ALLIANCE merchant portal as their own merchant program or direct merchants to an overall ALLIANCE program level merchant portal; include ALLIANCE branding in marketing and advertising; Participate in the ALLIANCE Advisory Committee 324; Include ALLIANCE branding on all material when referring to ALLIANCE participation.

The banks 326, to participate in the ALLIANCE, give their support to the ALLIANCE through introducing the ALLIANCE to existing and potential consumer and merchant customers 326; providing ALLIANCE marketing and promotion in conjunction with existing channels; incorporating the ALLIANCE into existing bank corporate social responsibility (CSR) programs. By participating in the ALLIANCE the banks 326 receive revenue: New bank payment card originations, as consumers 326 are attracted to the ALLIANCE benefits; More use of the bank's payment cards, as users select ALLIANCE payment methods more often (debit/credit, plastic/mobile); Non-traditional fees from merchant 326 for using the ALLIANCE; New merchant customers 326 attracted to the bank 326 because of the value ALLIANCE provides their business; Cross-sell opportunities to other value-added bank products; Reduction in cash and checks; increased adoption of plastic and mobile wallets; increased digital enablement fees. By participating in the ALLIANCE, the banks 326 receive enhanced brand image and increased awareness: Gain local community recognition; Foster an emotional connection with consumers 326 and merchants 326; Align selected community organizations 318 with CSR mission; Benefit the community while enhancing the banking industry's reputation; enhance brand image by using financial data in a highly effective and positive way. By participating in the ALLIANCE, the banks 326 receive additional outcomes: Offer a unique, meaningful, and philanthropic loyalty program that compliments but does not interfere with existing products and services for consumers 326 and merchants 326.

As shown in FIGS. 3 through 6, the payment networks seen at reference numeral 322 have the following roles: Sponsor, market and promote the ALLIANCE program with their issuing bank 326; Create new ALLIANCE card and payment products that aligns with their Bank's CSR initiatives 318; Participate in the ALLIANCE Advisory Committee 324; Include ALLIANCE branding on all material when referring to ALLIANCE participation. The payment networks 322, to participate in the ALLIANCE, gives their support to the ALLIANCE through contributing global brand recognition; providing ALLIANCE marketing and promotion in conjunction with existing channels; Providing access to the payment network's digital enablement services. By participating in the ALLIANCE the payment networks 322 receive revenue: New bank payment card originations with the payment network brand, as consumers 326 are attracted to the ALLIANCE benefits; More use of bank payment cards with the payment network 322 brand, as users select ALLIANCE payment methods more often (debit/credit, plastic/mobile); reduction in cash and checks; increased adoption of the payment network 322 brand plastic and mobile wallets; increased digital enablement fees; By participating in the ALLIANCE the payment network 322 receives enhanced brand image and increased awareness: Gains local community recognition; Fosters an emotional connection with consumers 326 and merchants 326; Align selected community organizations 318 with community service CSR mission; Benefit the community while enhancing the payment network 322 industry's reputation; Enhance brand image by using financial data in a highly effective and positive Way; help support the payment network's 322 charitable foundations 318 that align with issuing bank's 326 CRS initiatives. By participating in the ALLIANCE, the payment network 322 receives additional outcomes: with the payment network's 322 issuing banks 326, offer a unique, meaningful, and philanthropic loyalty program that compliments but does not interfere with existing products and services for consumers 326 and merchants 326.

As shown in FIGS. 3 through 6, the ALLIANCE Additional Alliance members/Beneficiaries seen at reference numeral 318, which may be the recipient of donations from merchants 326 with whom cardholders 326 transact, have the following roles: Actively or passively promote/refer the ALLIANCE through all channels depending on the organization's desired level of involvement—using the ALLIANCE Market Delivery Support Owner as appropriate; This includes sport organizations 318, community causes 318, as approved by the advisory committee 324, and the banks' community causes 318, as approved by the advisory committee 325 and the banks 326; Key members may be invited to participate in the ALLIANCE Advisory Committee 324; Include ALLIANCE branding on all material when referring to ALLIANCE participation.

Within the ALLIANCE Market Participants, the donee entities, seen at reference numeral 318 as Additional Alliance members/Beneficiaries, have the following roles: Selection as a donee entity 318 through an issuer bank's 326 and/or acquirer bank's 326 community service initiatives from existing bank supported causes and the ALLIANCE's approved causes; Promote/encourage enrollment and participation of their consumers 326 and merchants 326; Ensure all donations deliver positive social impact in local communities and publish the donation impact to their donors 318 in the local community. The donee entities 318, to participate in the ALLIANCE, give their support to the ALLIANCE through encouraging individual and business donor participation in the ALLIANCE; and by providing ALLIANCE marketing and promotion in conjunction with existing channels. By participating in the ALLIANCE, the donee entities 318 receive revenue: non-traditional method for raising funds 24/7, 365 days a year; exposure to new donors and retention of existing donors; a new way to give for those that care but cannot afford to give. By participating in the ALLIANCE the donee entities 318 receive enhanced brand image and increased awareness: increased awareness of the donee's organization 318 through involvement with the ALLIANCE and social media 320b; heightened emotional involvement from consumers 326 to the donee's 318 cause through everyday purchase transactions. By participating in the ALLIANCE the donee entities 318 receive additional outcomes: donations generated are 100% pass-through and audited by a global accounting firm; no change to status quo operations; quickly redirect donations when disaster or emergencies strike, providing national and global support where and when the need is critical, The members 326 and beneficiaries 318, to participate in the ALLIANCE, give their support to the ALLIANCE through promoting the ALLIANCE to their related causes; Promoting the ALLIANCE to associated merchants 326 to participate and give back to local community; Cross-promoting the ALLIANCE with corporate friends. By participating in the ALLIANCE, the members 326 and beneficiaries 318 receive brand equity: thought leadership; enhance brand reputation. By participating in the ALLIANCE, the members 326 and beneficiaries 318 receive data: anonymized rich, transactional data and analytics on consumer behavior, valuable financial performance data, customer demographics and summary customer feedback; access to a state-of-the-art, sophisticated, digital engagement tool. By participating in the ALLIANCE, the members 326 and beneficiaries 318 receive revenue: increased exposure and incremental revenue for associated organizations as the ALLIANCE market penetration grows; potential revenue streams and value from cooperative collaborating with other ALLIANCE members. By participating in the ALLIANCE, the members 326 and beneficiaries 318 receive: new channel (s) to extend reach in promoting related causes; drive incremental contributions through a 24:7 donation engine from merchants 326 of non-related products and services in a non-traditional, transformative way.

Referring to FIGS. 3-6, and particularly reference numerals 320a-320b, the search and social functions are enabled by the "Click-2-Sale functionality" as disclosed in U.S. patent application Ser. No. 12/944,474, filed on Nov. 11, 2010, titled Program, system and method for linking community programs and merchants in a marketing program, now U.S. Pat. No. 9,111,295, in U.S. patent application Ser. No. 14/480,721, filed on Sep. 9, 2014, titled Program, system and method for linking community programs and merchants in a marketing program, and in in U.S. patent application Ser. No. 14/755,444, filed on Jun. 30, 2015, titled Program, system and method for linking community programs and merchants in a marketing program, now U.S. Pat. No. 9,230,263, each of which are hereby incorporated by reference.

As shown in FIGS. 3 through 6, the search engine providers seen at reference numeral 320a have the following roles: Enable the discovery of local ALLIANCE merchants 326 and their rewards/donation; Receives new advertising revenue from the Click-2-Sale functionality, which includes connecting online interactions to an offline transaction for community; may be invited to participate in the ALLIANCE Advisory Committee 324; Include ALLIANCE branding on all material when referring to ALLIANCE participation.

As shown in FIGS. 3 through 6, the social network providers seen at reference numeral 320b have the following roles: Enable the discovery of local ALLIANCE merchants 326 and their rewards/donation; Enable ALLIANCE local community care mobs; Receives new advertising revenue from the Click-2-Sale functionality, which includes connecting online interactions to an offline transaction for community; may be invited to participate in the ALLIANCE Advisory Committee 324; Include ALLIANCE branding on all material when referring to ALLIANCE participation.

As shown in FIGS. 3 through 6, an ALLIANCE Operator 304b seen at reference numeral 304b has the following roles: Enables the ALLIANCE on a local, national, global basis; Manages the other Program Facilitator organizations; Provides the ALLIANCE to banks 326 to use as new white-label value add for consumers 326; Provides the ALLIANCE to merchant acquirer banks 326 as a new white-label value add for merchants 326; Offers the global the ALLIANCE program through financial services; Provides the ALLIANCE program governance and audit through the ALLIANCE Advisory Committee 324; Includes the ALLIANCE branding on all material when referring to participation in the ALLIANCE.

As shown in FIGS. 3 through 6, an ALLIANCE Advisory Committee 324 has the following roles: Facilitates the ALLIANCE oversight on a local, national, global basis; Ensures the transparency and accountability of the ALLIANCE beneficiaries 318; Ensures all ALLIANCE members 326 and participants 318 are adhering to the ALLIANCE core principles; Approves the usage of the "Rescue, Relieve, Recover donation redirection", hereinafter "RRR", as described in U.S. patent application Ser. No. 14/879,328, filed on Oct. 9, 2015, titled Systems and methods for changing operation modes in a loyalty program, which is hereby incorporated by reference, and includes the ALLIANCE branding on all material when referring to participation in the ALLIANCE;

As shown in FIGS. 3 through 6, within the ALLIANCE Program Facilitators, the ALLIANCE Support Owner & Digital Marketing Assistant seen at reference numeral 316 has the following roles: Delivers the ALLIANCE to the Market Facilitators; Provides integrated marketing services and support to the Market Facilitators; Offers the ALLIANCE to extended ecosystem merchant sales channel organizations as a new value add for merchants 326 (e.g. business associations, chambers of commerce, and other community organizations); Provides sales and support services (e.g. sales engagement, enrollment, training, ongoing adoption, revenue collection); Provides cause support services (e.g. cause engagement, distribution of donations); Provides Tier 1 and Tier 2 product and technical support for Market Facilitators and Market Participants; Includes the ALLIANCE branding on all material when referring to participation in the ALLIANCE.

As shown in FIGS. 3 through 6, within the ALLIANCE Program Facilitators, the ALLIANCE Product Steward seen at reference numeral 314 has the following roles: Provides ongoing product innovation, strategy and software development services; delivers the ALLIANCE technology to the Technology Host 312 and the Market Delivery Support Owner 316; Provides UI/UX/Branding support to the Market Delivery Support Owner 316 during deployment to the ALLIANCE Market Facilitators; Provides Tier 3 product support; Includes the ALLIANCE branding on all material when referring to participation in the ALLIANCE.

As shown in FIGS. 3 through 6, within the ALLIANCE Program Facilitators, the ALLIANCE Technology Host seen at reference numeral 312 has the following roles: Provides the ALLIANCE hosting and system maintenance; Provides Tier 3 product support such as customer-facing chat and telephone support and customer service; Includes the ALLIANCE branding on all material when referring to participation in the ALLIANCE;

As shown in FIGS. 3 through 6, an ALLIANCE Data & Analytics facilitator seen at reference numeral 308 has the following roles: Harnesses community, emotional, social, search and rich transactional data in unique ways to affect positive change in behavior; Analyzes the variety of data sources to support the growth of the ALLIANCE with a measured result and to leverage the data into additional verticals; Includes the ALLIANCE branding on all material when referring to participation in the ALLIANCE;

As shown in FIGS. 3 through 6, an ALLIANCE Data Facilitator 310 has the following roles: Consolidates data sources such as: community, search, social, mobile, support and rich transaction data as provided by, or sourced with respect to Search Engine Provider Entity 320a and Social Network Provider Entity 320b so as to provide the Click-2-Sale functionality; Provides an ALLIANCE data warehouse; Provides data analysis to benefit the ALLIANCE participants; Leverages opportunities to monetize anonymized ALLIANCE data; Includes the ALLIANCE branding on all material when referring to participation in the ALLIANCE;

As shown FIGS. 3 through 6, ALLIANCE Networking Entity 304 includes an ALLIANCE Auditor seen at reference numeral 304c which has the following roles: Provides audit services to ensure all ALLIANCE integrity is maintained and all donation processing is correct and conducted as per the ALLIANCE core principles; Reports to the ALLIANCE Operator 304b and the ALLIANCE Advisory Committee 324; Includes the ALLIANCE branding on all material when referring to participation in the ALLIANCE.

As shown in FIGS. 3 through 6, an ALLIANCE IP Owner Entity, which may include Technology Escrow facilitation, as seen at reference numeral 306, has the following role: Ensures the protection of all ALLIANCE members 326 by having the ALLIANCE technology and intellectual property ("IP") in a joint escrow with the ALLIANCE Operator 304b.

Figure 3:
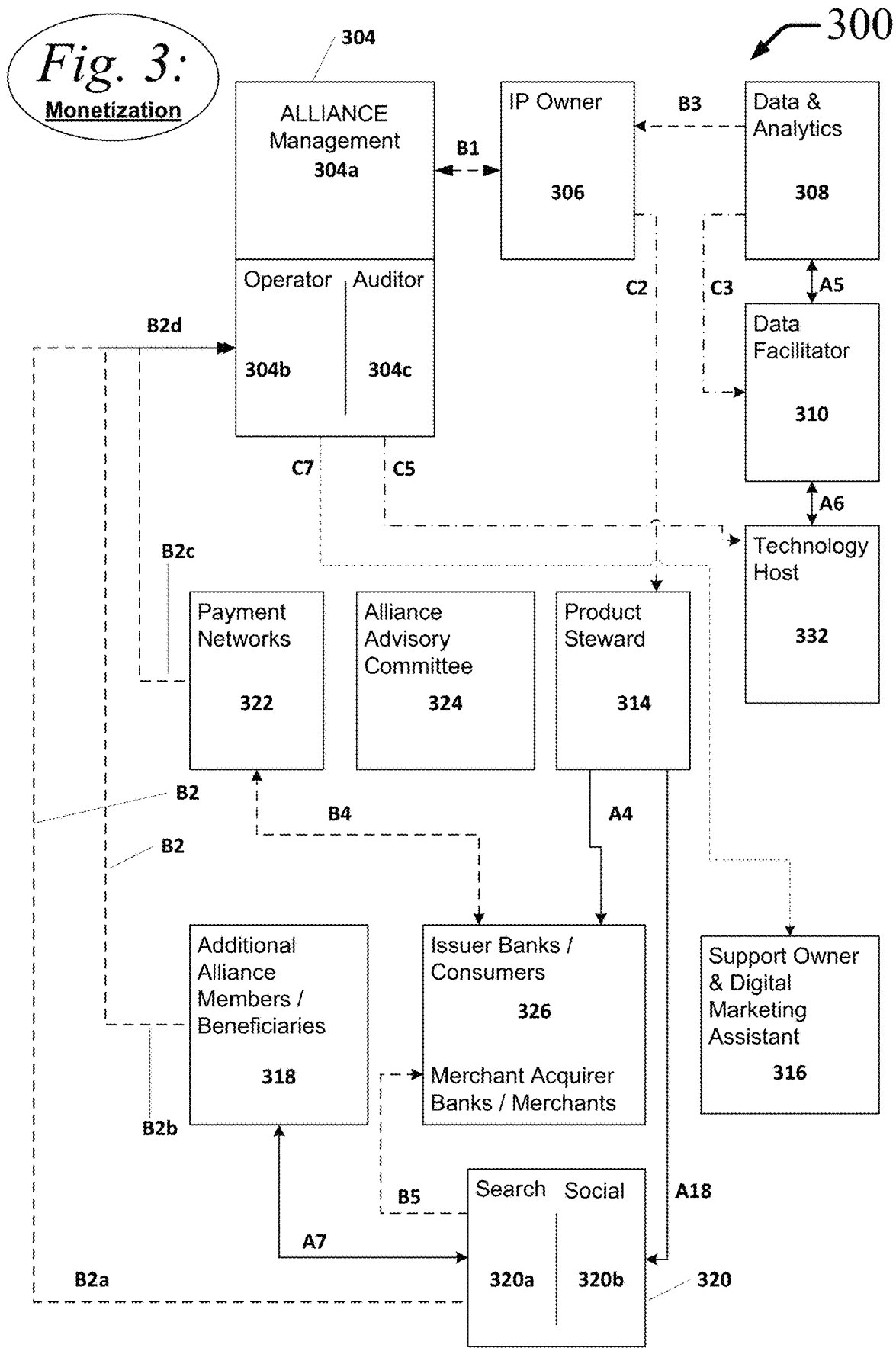
FIGS. 3-6 respectively illustrate exemplary implementations of an alliance of entities performing operations and executing functions to facilitate acquired transactions within the prior art processes seen in FIGS. 1-2, where each transaction is incented by customer directed merchant donation.
Figure 4:
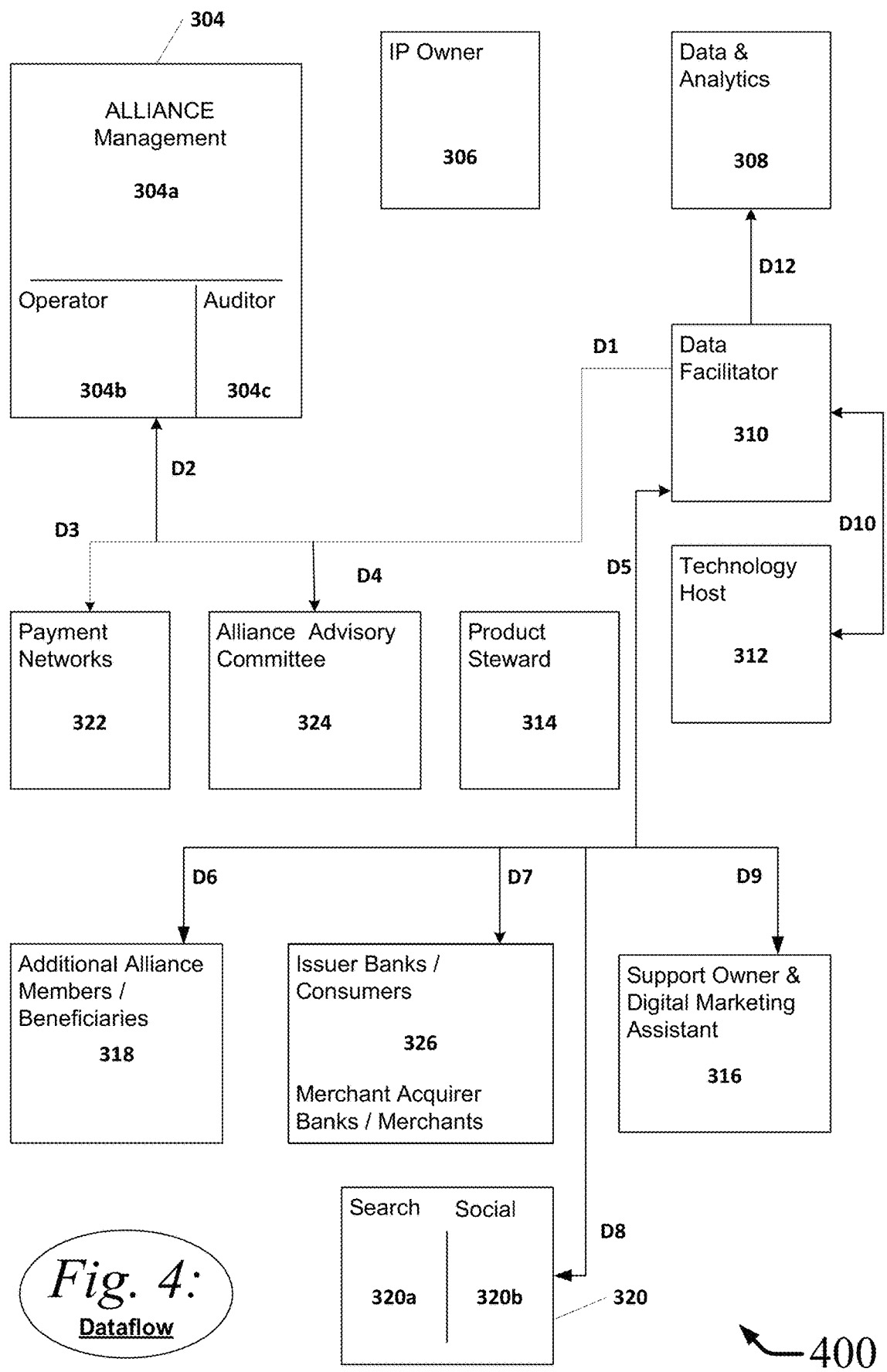
Figure 5:
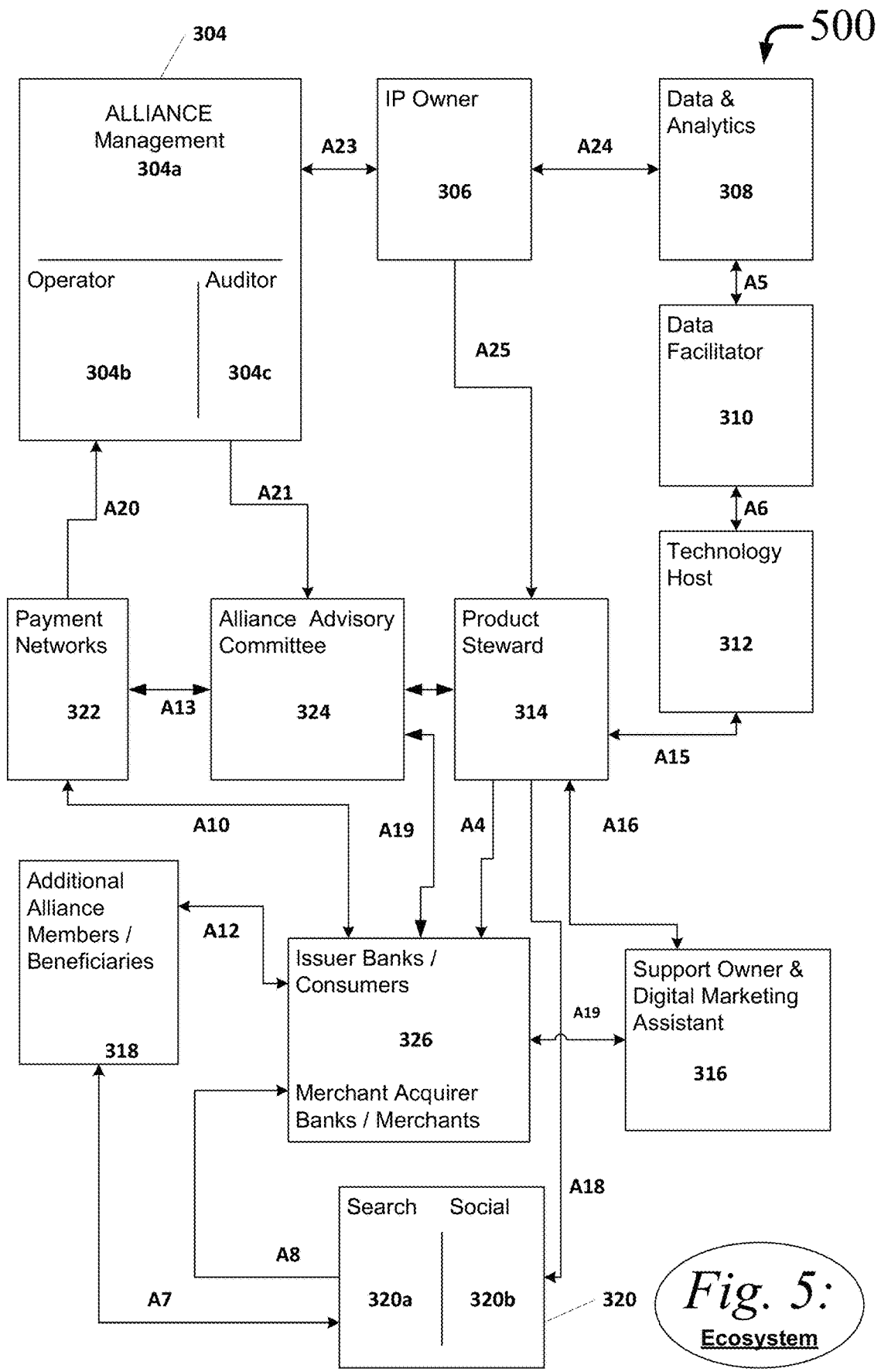
Figure 6:
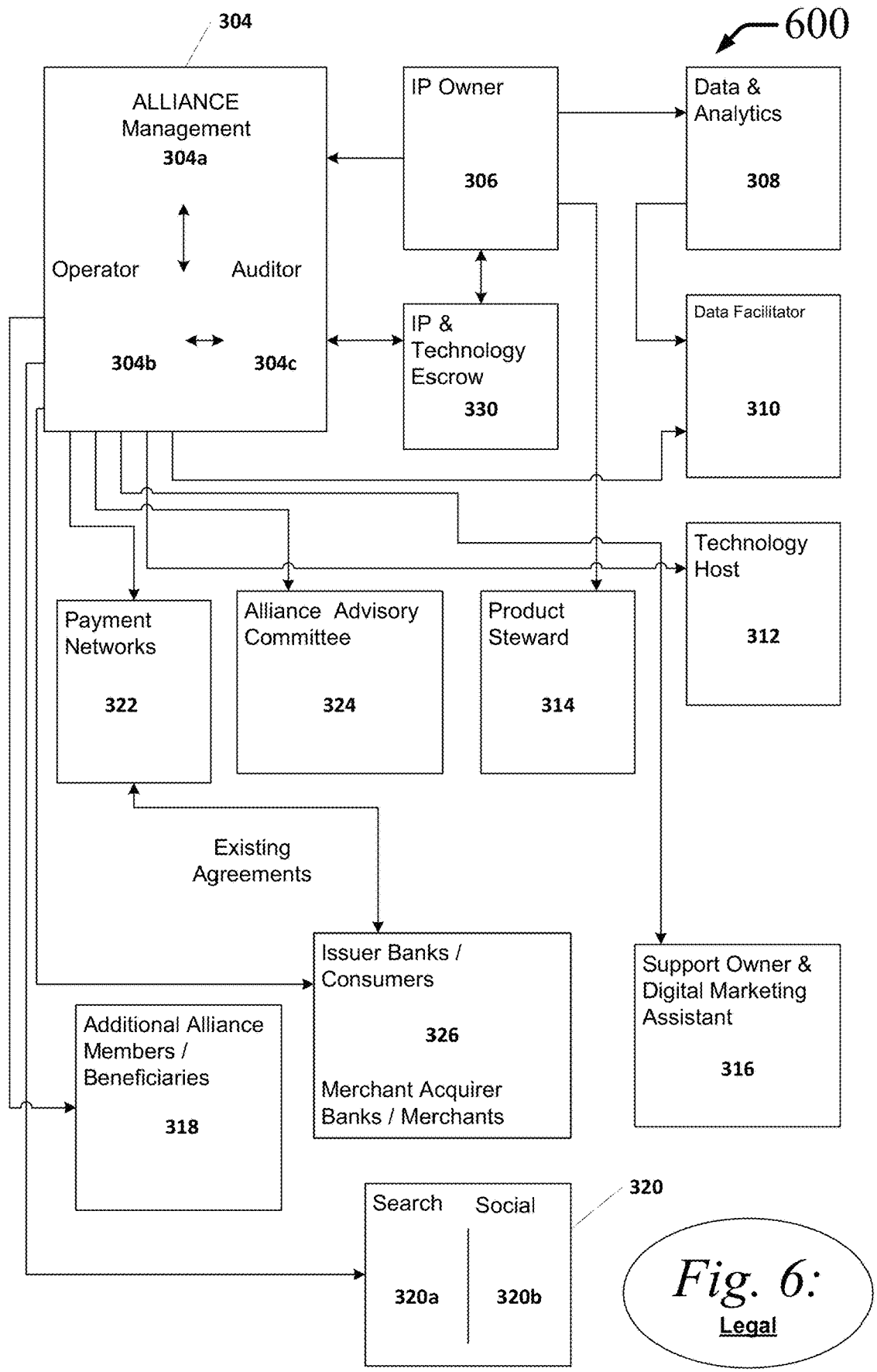

Implementations of the ALLIANCE for monetization of intellectual property assets are illustrated in FIG. 3. The arrows labeled with the letter "A" show relationships by which ALLIANCE functionality is delivered to the indicated ALLIANCE entities in exchange for revenues. The arrows labeled with the letter "B" show revenues paid and received, such as for licensing of patents, copyrights, know-how, how-to, show-how, and trade secrets relationships by which ALLIANCE functionality is delivered to the indicated ALLIANCE entities via the exchange of revenues. By way of example, arrow B4 can be the exchange of interchange fees for credit/debit transactions for banks 326, where the bank 326 and/or the payment network 322 retains a percentage of a transaction amount for a transaction conducted by an ALLIANCE cardholder 326 with an ALLIANCE merchant 326. Arrow B5 shows revenue generated to banks 326 for increased exposure through ALLIANCE entities of search/social 320, such as by the Click-2-Sale functionalities, for merchants 326 by way of transactions with cardholders 326. Arrow B2a, B2b, B2c, and B2d show ALLIANCE revenue opportunities for Operator 304b. Arrow B2b is one-way arrow away from beneficiaries 318 who pay no fee for ALLIANCE participation though they receive donations from merchants 326. Arrow B3 runs from Data and Analytics entity 308 to IP owner entity 306 to reflect revenue from data generated that is provided to the IP Owner entity 306. Arrow B1 reflects royalties paid to ALLIANCE Networking Entity 304 from the IP owner 306. In some implementations, IP Owner Entity 306 owns brands that are licensed to show an affiliation with the ALLIANCE. Implementations of the ALLIANCE for revenue implementations shown in FIG. 3 are further depicted by arrows between ALLIANCE entities seen in FIG. 6 to show the existence of exemplary agreements, licenses, permits, data access arrangements, legal understandings, and contractual relationships.

Figure 7:
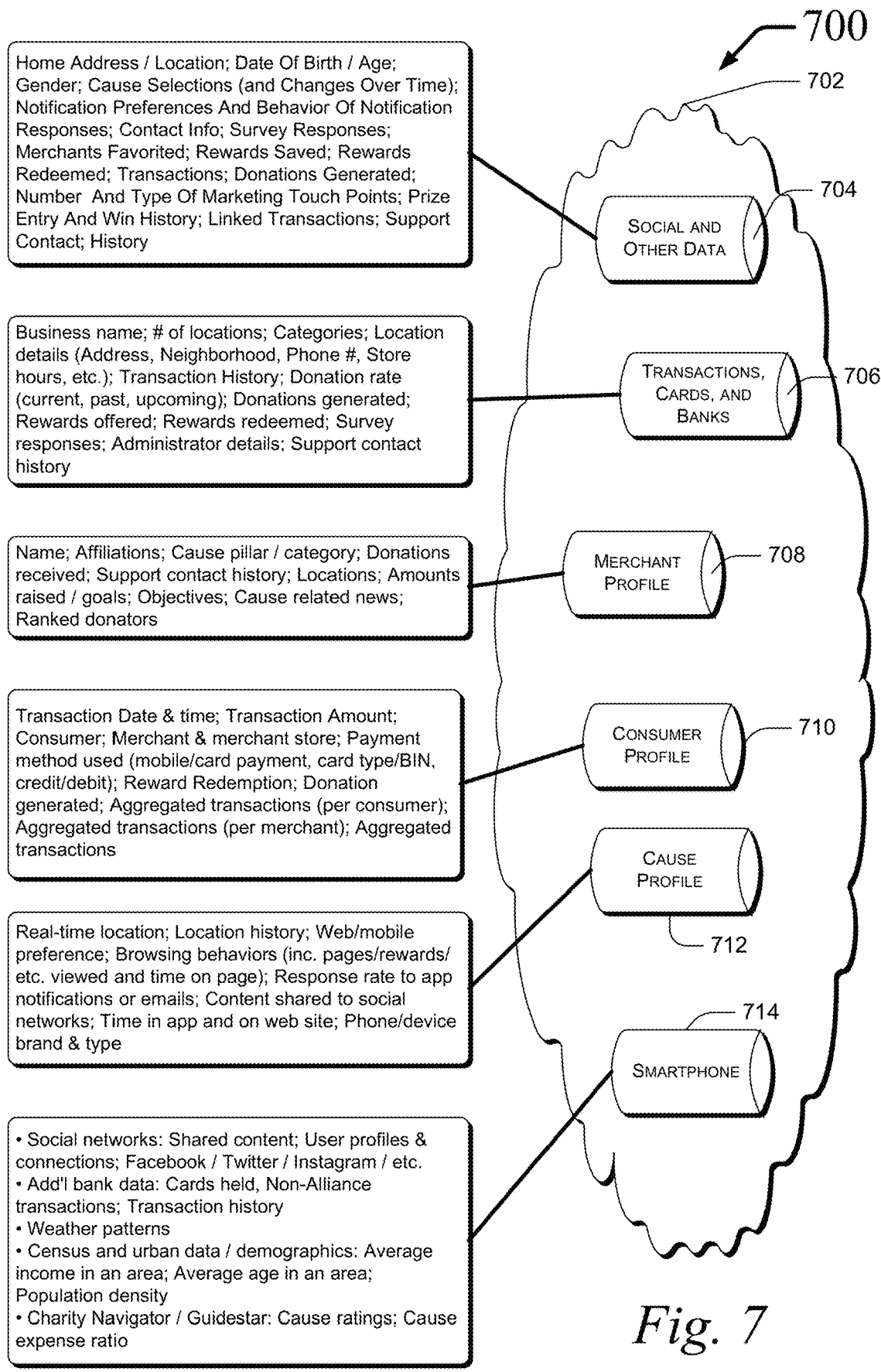
FIGS. 7-8 respectively illustrate exemplary implementations of a network of databases made available to the alliance of entities seen in FIGS. 3-6 to facilitate acquired transactions within the prior art processes seen in FIGS. 1-2.
Figure 8:
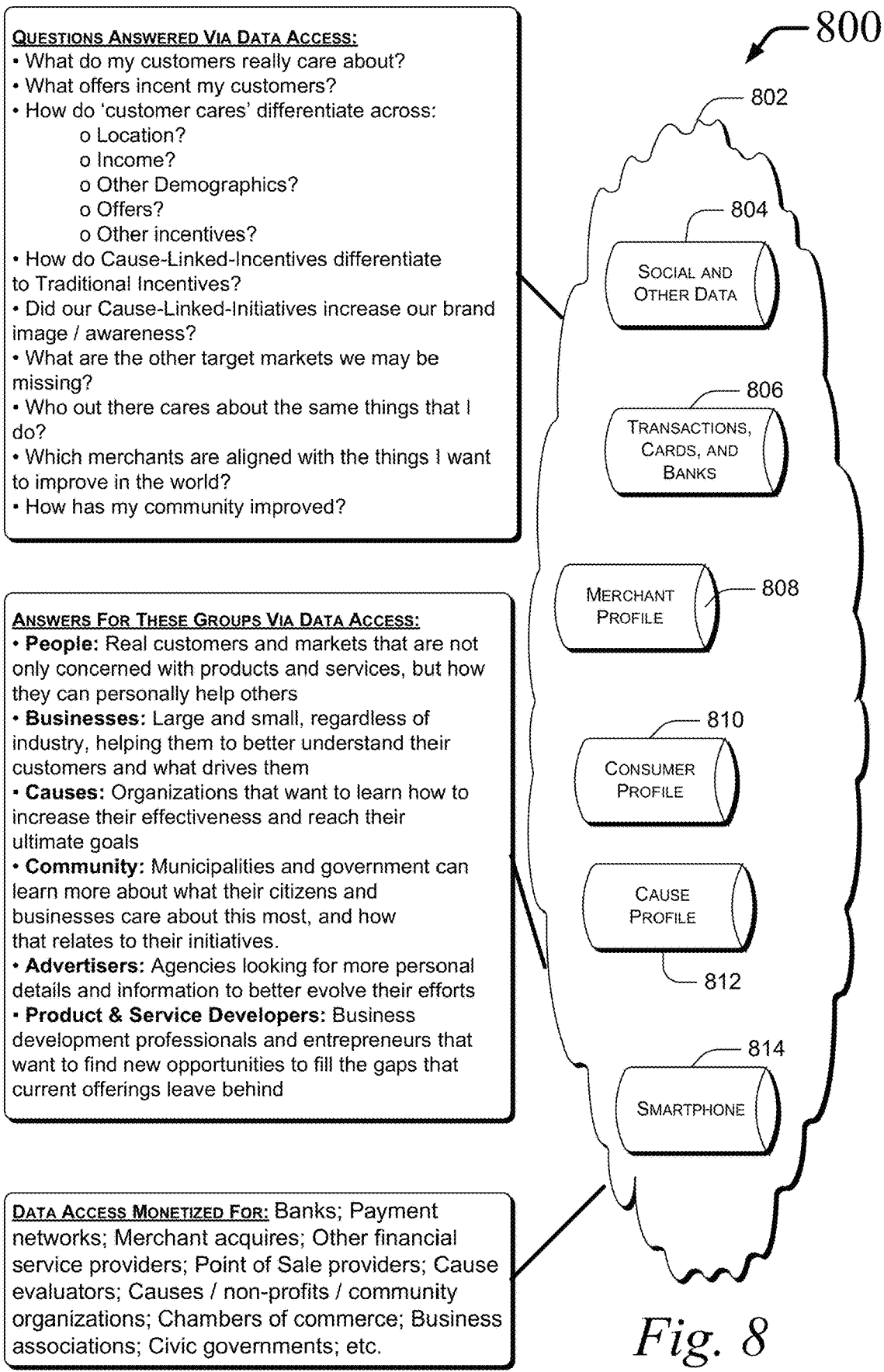
Figure 9:
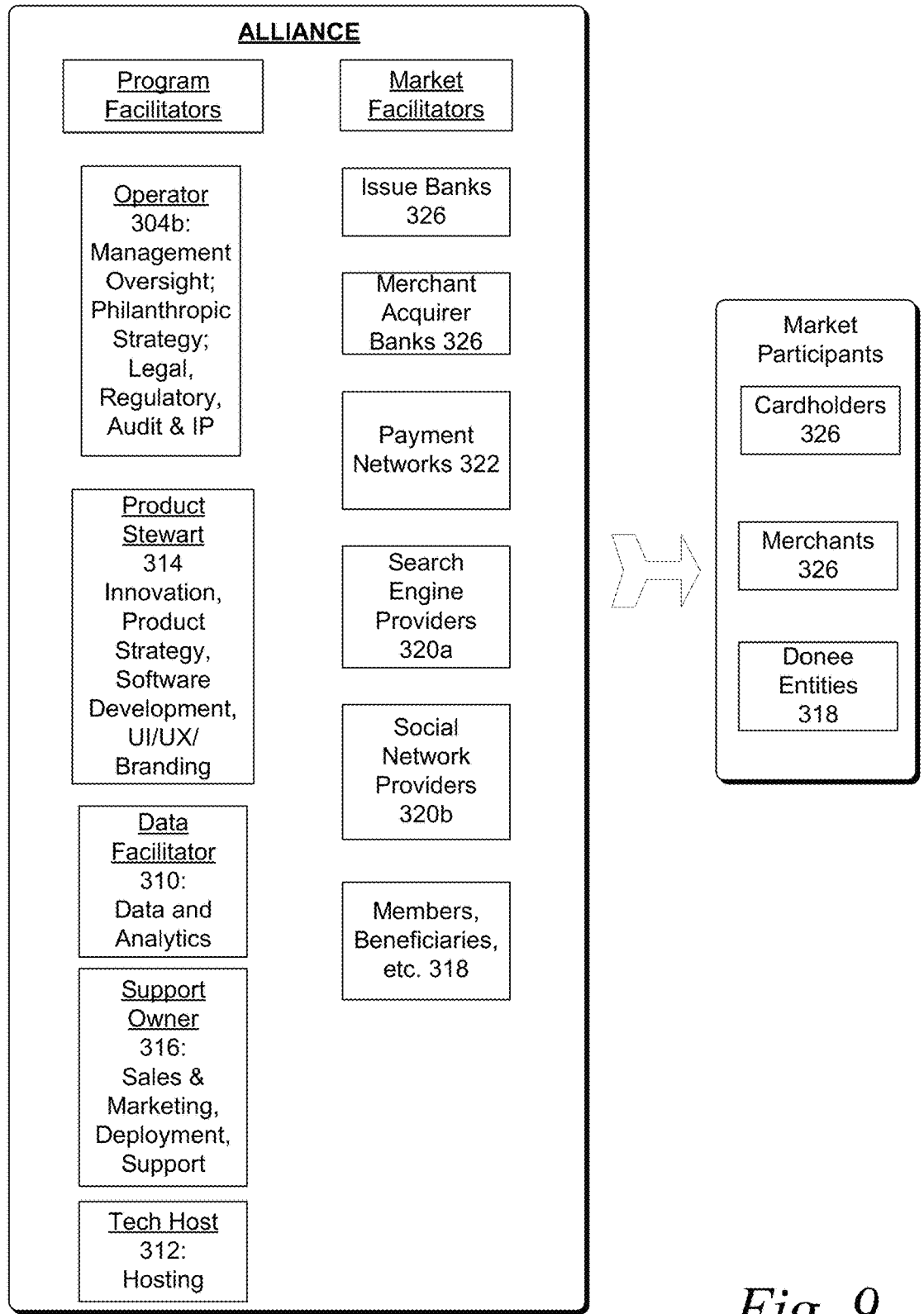
FIG. 9 illustrates an implementation of the alliance depicted in FIGS. 3-6, which includes alliance Program Facilitators, alliance Market Facilitators, and alliance Market Participants.

For the purposes of enabling implementations described herein for the ALLIANCE as depicted in FIGS. 3-6, various databases 702, 802, respectively seen in FIGS. 7-8, are input to, and/or accessed by, one or more ALLIANCE Program Facilitators, and ALLIANCE Market Facilitators as shown at reference numeral 900 in FIG. 9. By way of example, and not by way of limitation, and in reference to FIGS. 3-6, ALLIANCE Program Facilitators include ALLIANCE Operator Entity 304b, Product Stewart Entity 314, Data Facilitator Entity 310, Support Owner & Digital Marketing Assistant 316, and Technology Host Entity 312. By way of example, and not by way of limitation, and in reference to FIGS. 3-6, ALLIANCE Market Facilitators include Merchant Acquirer Banks 326, Merchants 326, Issuer Banks 326, Payment Network Entities 322, Search Engine Provider Entities 320a, Social Network Provider Entities 320b, and Additional Alliance Member/Beneficiary Entities 318.

Figure 10:
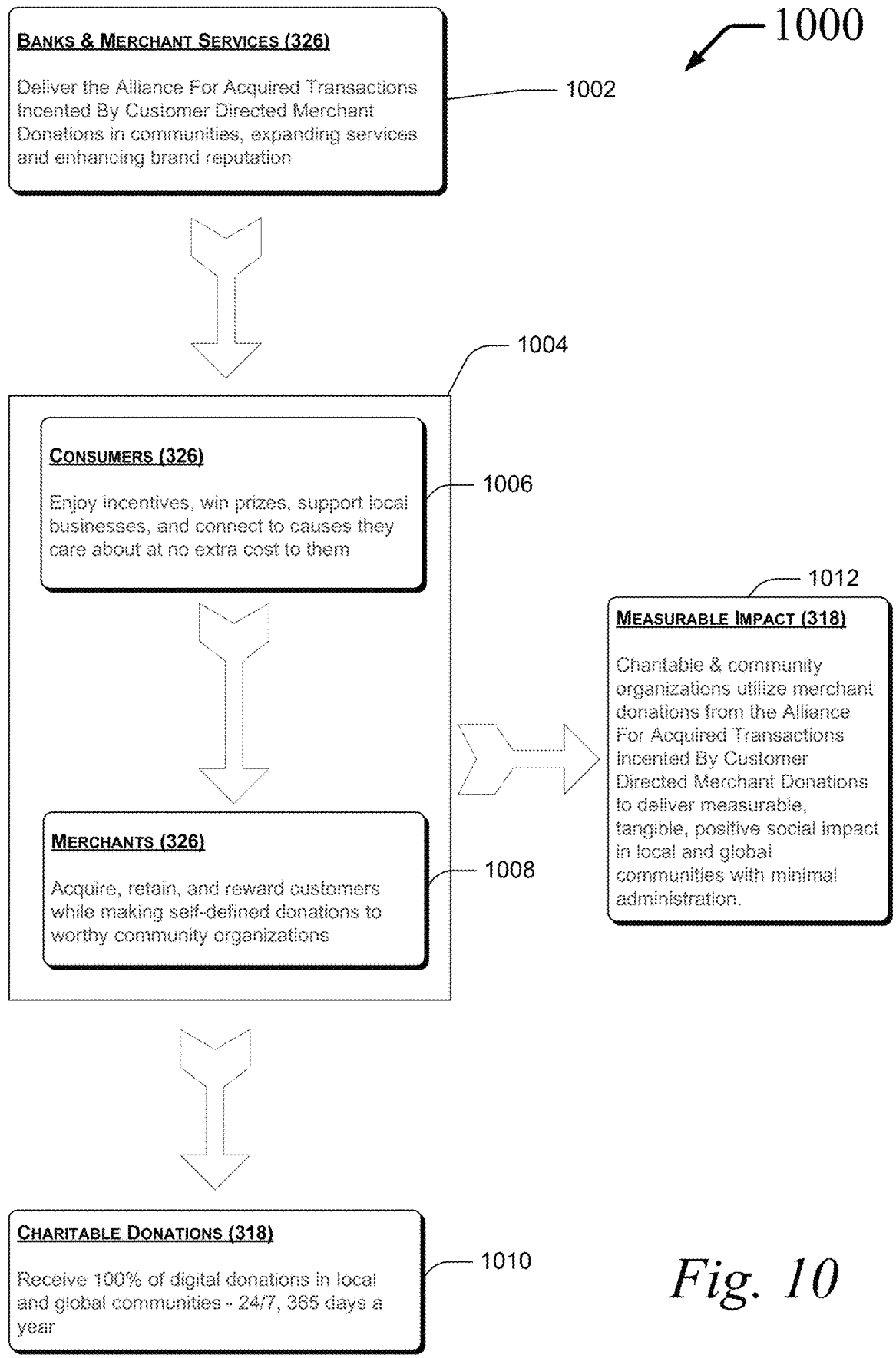
FIG. 10 illustrates an implementation of exemplary process conducted within the alliance depicted in FIGS. 3-6, where entities participating in the process include customers conducting acquired transacting with merchants, and banks providing services to the customers that are conducting the acquired transacting with the merchants, where each acquired transactions is incented by a customer directed merchant charitable donation, as depicted by the prior art processes seen in FIGS. 1-2, to effect a measurable impact.

The foregoing ALLIANCE Program Facilitators and ALLIANCE Market Facilitator, as shown in FIG. 9, provide mutual benefits and incentives for participation in the ALLIANCE to various Market Participants, including chard Consumers 326, Account Holders 326, Cardholders 326, Merchants 326, and Donee Entities or Additional Alliance Member/Beneficiary Entities 318. These mutual benefits of ALLIANCE participation are illustrated in process 1000 seen in FIG. 10, where Banks and Merchant Services mutual benefits are shown at step 1002, consumer mutual benefits are shown at step 1004, merchant mutual benefits are shown at step 1008, and Charitable Donations mutual benefits are shown at step 1010. From these mutual benefits, Measureable Impacts are shown at Step 1002.

The various databases 702, 802, respectively seen in FIGS. 7-8, which are input to, and/or accessed by, one or more ALLIANCE Program Facilitators, and ALLIANCE Market Facilitators, include one or more network accessible databases for a Social and Other Data 704, 804, Transactions, Card, and Bank Data 706, 806, Merchant Profile Data 708, 808, Consumer Profile Data 710, 810, Cause Profile Data 712, 812, and Smartphone Data (e.g., data derived from web-enabled mobile telecomputing devices) 714, 814. Note that FIG. 7 shows examples of the data in Social and Other Data 704, Transactions, Card, and Bank Data 706, Merchant Profile Data 708, Consumer Profile Data 710, Cause Profile Data 712, and Smartphone Data 714. Data from network assessable databases 702, 802, as illustrated by way of example and not by way of limitation in FIG. 8, provide answers to questions and data monetization uses.

Figure 11:
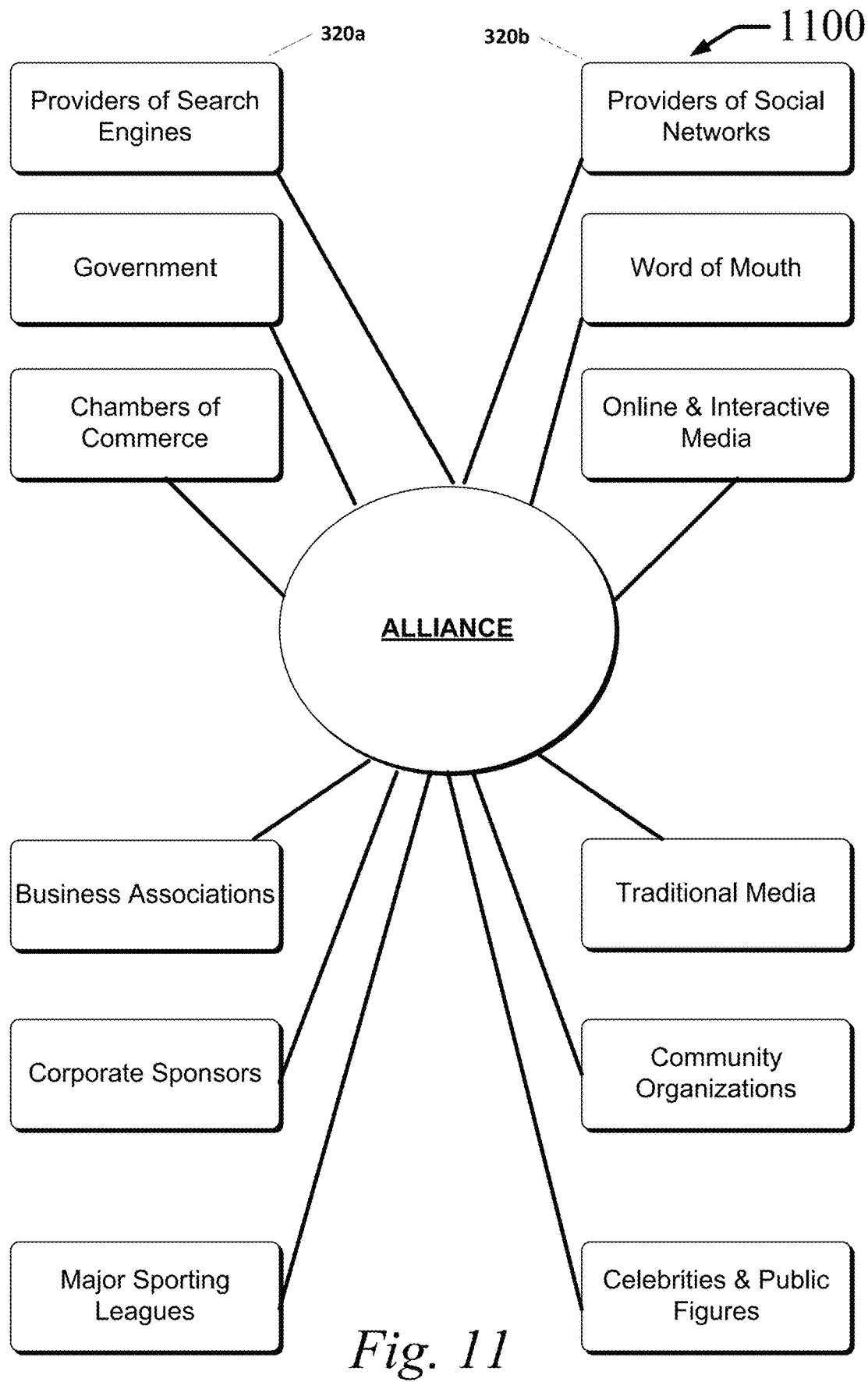
FIG. 11 is a block level diagram depicting relationships between implementations of the alliance shown in FIGS. 3-6 in which entities in the alliance are identified by exemplary functions they perform within the alliance as related to the facilitation of acquired transactions depicted by the prior art processes seen in FIGS. 1-2.

Cooperative entities in the ALLIANCE, as shown at reference numeral 900 in FIG. 9, are designated, by way of example and not by way of limitation, as Program Facilitators, Market Facilitators, and Market Participants. Still other examples of cooperative entities in the ALLIANCE are shown at reference numeral 1100 in FIG. 11, and include Providers of Search Engines, Providers of Social Networks, Government Entitles, Word of Mouth Providing Entities, Chambers of Commerce, Online & Interactive Media Entities, Business Associations, Traditional Media, Corporate Sponsors, Community Organizations, Major Sporting Leagues, and Celebrities & Public Figures.

In one computerized implementation, the ALLIANCE as depicted in FIGS. 3-6, can be operated in conjunction with a computerized implementation the Merchant Donor Technologies discussed above in reference to FIGS. 1-2, where merchant data is auto-populated to include an address, duration, and a rule obligating the merchant to donate to a donee. Information from an authorization response for a transaction conducted by the merchant on an account of an account holder is used to obtain a travel time of the account holder from its address to the auto-populated address. When the obtained travel time is within a predetermined threshold of the auto-populated duration, a donation that the merchant is obligated to make to the auto-populated donee is derived by using the auto-populated rule and a currency amount of the transaction.

In conjunction with the Merchant Donor Technologies, the ALLIANCE as depicted in FIGS. 3-6, can be operated in conjunction with another computerized implementation, there is obtained, from one or more databases, using information derived from a Globally Unique Identifier (GUID)

for a merchant, merchant data for the merchant. The merchant data for the merchant includes: (i) a geographic address for the merchant; (ii) a default affinity entity or donee; (iii) a default maximum travel time to the geographic address for the merchant; and; (iv) a default business rule obligating the merchant to make a donation to the affinity entity. The merchant data for the merchant, now auto-populated, is stored in one or more databases.

Information derived from an authorization response for a transaction conducted by the merchant on an account issued to an account holder is processed. This processing of the information includes (i): retrieving, using the identifier for the merchant, at least a portion of the stored merchant data for the merchant; (ii) accessing from one or more databases, using information derived from the identifier for the account holder, account holder data for the account holder that includes a geographic address for the account holder; (iii) inquiring, using the geographic addresses for the account holder and the merchant, the travel time from the geographic address of the account holder to the geographic address of the merchant; and (iv) if the retrieved travel time is within a predetermined tolerance of the default maximum travel time, deriving, using the default business rule and the currency amount of the transaction, the donation to be made by the merchant to the default affinity entity. Optionally, a message can be transmitted to a logical address of the merchant containing the donation to be made by the merchant to the default affinity entity.

In one computerized implementation, the ALLIANCE as depicted in FIGS. 3-6, can be operated in conjunction with the Merchant Donor Technologies discussed above in reference to FIGS. 1-2, where in an alternative implementation of the foregoing implementation, the obtaining and storing are repeated for a plurality of the merchants and the processing for each of a plurality of the transactions is also repeated. Optionally, the processing can include transmitting a message to a logical address of the merchant containing the donation to be made by the merchant to the default affinity entity. As a further option, the logical address to which the message and the determined difference are transmitted can be any or all or a logical address for the merchant, the account holder, the affinity entity, an agent for at least one of the merchant, the account holder and the affinity entity, and combination of these.

In one computerized implementation, the ALLIANCE as depicted in FIGS. 3-6, can be operated in conjunction with the Merchant Donor Technologies in a further implementation, where a predetermined time after the plurality of the transactions, a plurality of donation receipts can be received, each of which includes identifiers for the merchant and the default affinity entity, and a currency amount donated by the merchant to the default affinity entity. For each of the default affinity entities and for each of the merchants, a determination is made of the difference between the sum of the donations to be made by the merchant to the default affinity entity in the messages to the logical address of the merchant and the currency amount donated by the merchant to the default affinity entity in the donation receipts. The determined difference can then be transmitted to a logical address, for instance, which can be that of the logical address of the merchant, the account holder, the affinity entity, an agent for at least one of the merchant, the account holder and the affinity entity, and combination of these.

In one computerized implementation, the ALLIANCE as depicted in FIGS. 3-6, can be operated in conjunction with a yet further implementation of the Merchant Donor Technologies, where each of the transactions occurs in a payment processing system that includes a plurality of the merchants each conducting each of the transactions on a respective account issued to a respective account holder by a respective issuer. Each transaction on each said account is acquired for clearing and settlement by an acquirer for each said merchant through a transaction handler in communication with both the issuer of the account and the acquirer for the merchant. The issuer sends a corresponding authorization response for the transaction to the merchant through the transaction handler and the acquirer in response to an authorization request sent to the issuer from the merchant through the transaction handler and the acquirer.

Prior to repeating the processing step for each of a plurality of the transactions, replacement changes to be default terms, conditions, and values can be received, on behalf of one or more of the merchants. By way of examples, there can be received changes for a merchant that can replace at least one these: (i) the default affinity entity corresponding to the geographic address for the merchant; (ii) the default maximum travel time to the geographic address for the merchant; (iii) and/or the default business rule obligating the merchant to make a donation to the affinity entity. Also, there can be received for one or more account holders changes to the default affinity entity for the donation that is to be made by the merchant for each said transaction with said account holder, which default affinity entity that is replaced may have originally corresponded to, or be proximal of, the geographic address for the merchant.

After each transaction, in various alternative implementations, a message containing a question can be transmitted to a logical address of the account holder for the transaction. The message will contain one or more survey questions posed to the account holder or its agent.

After receiving, in response to the survey, an answer, and as an incentive to the account holder to answer the survey, an increment is made in one or more databases to a loyalty currency attributed to the account holder. As acknowledgement that the incentive was accorded, a message can be transmitted to the logical address of the account holder containing an acknowledgement of the increment to the loyalty currency. If the answer is received within a predetermined tolerance (e.g., quickly), the increment to the loyalty currency attributed to the account holder will be greater than the increment if the time lapse is not within the predetermined tolerance, which greater increment can be in the message that is transmitted to the logical address of the account holder.

Optionally, the survey answers by an account holder or its agent who transacted with a merchant can be sent, by batch or in real time, to a logical address of the merchant or its agent. As a still further option, a publication of a hyperlink can be made, or a facilitation of the network access can be made, to survey answers for the merchants and their account holders of all of a subset of the transactions. Third party requests can be received and responses thereto sent, by way of a user interface that provided third parties with a search engine to query and review survey answers for a particular merchant.

In one computerized implementation, the ALLIANCE as depicted in FIGS. 3-6, can be operated in conjunction with the Merchant Donor Technologies in a yet further implementation in which a process automatically populates one or more databases to allow information to be sent to account holders conveying that merchants will make contributions to an entity to which the account holders and/or the merchants have an affinity, where each contribution is a function of a currency amount of each transaction conducted between each merchant and each account holder on an account issued to the account holder by an issuer. The affinity, by way of example, can be based on an entity that is designated by the merchant, designated by the account holder, and/or designated by a third party. In another computerized implementation, a process automatically populates one or more databases to allow information to be received, from an issuer, as to a logical address of each account holder to whom the issuer issued an account having an account billing address in a geographic area. The process sends information to each logical address of each account holder conveying each merchant that will contribute to an entity in a geographic area as a function of a currency amount of each transaction conducted between the merchant and the account holder on the account issued by the issuer. Yet another implantation pertains to a system that includes a plurality of merchants conducting transactions on respective accounts issued to respective account holders by respective issuers, wherein the issuer sends an authorization response for the transaction to the merchant through a transaction handler and an acquirer for the merchant in response to an authorization request sent to the issuer from the merchant through the transaction handler and the acquirer. In a computerization of this implementation, a process receives, for each such merchant, information that includes a Merchant Acquirer Password (MAP). The method retrieves, using the MAP, a logical address for an acquirer for the merchant. A request that includes the MAP is sent to the logical address for the acquirer for the merchant. In response to the MAP request, there is received for a Merchant-Identifier (M-ID) for the merchant, a Merchant Logical Address (MLA) for the merchant, and a Merchant Geographic Address (MGA) for the merchant. Using the MGA, a Merchant Affinity-ID is retrieved. Using the Merchant Affinity-ID, there are retrieved a logical address for the Merchant Affinity-ID and an Affinity Donation Rule that includes a time range. A message derived at least in part from the Affinity Donation Rule is transmitted to a logical address of each such account holder associated with an account holder geographic address that corresponds to the MGA for the merchant. For each such transaction, information is received that is derived from the authorization response and includes an account holder ID, the Merchant-ID, a date and time, and a currency amount. Retrieval is made, using the Merchant-ID, of the Merchant Affinity-ID for the merchant and an Affinity Donation Rule for the merchant. Using the Affinity Donation Rule and the currency amount of the authorization response, a derivation is made of an Affinity Donation currency amount that is greater than a predetermined threshold when the date and time of the received information derived from the authorization response for the transaction is within the time range from the date and time that the message derived at least in part from the Affinity Donation Rule that was transmitted to the logical address of the account holder. When the Affinity Donation currency amount is greater than the predetermined threshold, a message is sent to the logical address for the Merchant Affinity-ID that includes the Affinity Donation currency amount and the Merchant-ID, and Affinity Donation Information is sent to the MLA that includes the Affinity Donation currency amount and the Merchant Affinity-ID. In some implementations, however, the merchant will not be responsible for paying the Affinity Donation currency amount unless: (i) that currency amount exceeds the predetermined threshold; and/or (ii) the message derived at least in part from the Affinity Donation Rule had been previously transmitted to the account holder on a date that is not more than the time range from the date of the transaction between that account and the merchant.

By way of non-limiting examples of participant entities that would be likely to enable and facilitate roles described above within the ALLIANCE shown FIGS. 3 through 6, the following presently existing entities are given:

| ALLIANCE Participant | Example Entities |
| --- | --- |
| Operator Entity 304b | The Clearing House Association, L.L.C.; Total System Services (TSYS) |
| Auditor Entity 304c | Deloitte Touche Tohmatsu Limited (Deloitte) |
| Data Facilitator Entity 310 | International Business Machines (IBM), Total System Services (TSYS) |
| Technology Host Entity 312 | Total System Services (TSYS) |
| Payment Network Entity 322 | Visa, Master Card, American Express, Discover Card; First Data |
| Advisory Committee 324 | The Financial Services Roundtable (FSR) |
| Product Stewart Entity 314 | Veriday, Total System Services (TSYS) |
| Additional Alliance Member/ Beneficiary Entity 318 | Blue Star Sports, Junior Achievement, United Way, The Nature Conservatory, The Financial Services Roundtable |
| Merchant Acquirer Bank 326, Issuer Bank 326 | Citi, Bank of America, Citizens Bank, Scotiabank |
| Support Owner & Digital Marketing Assistant 316 | Convergys Corporation, Total System Services (TSYS) |
| Search Engine Provider Entity 320a | Google, Microsoft, Bing |
| Social Network Provider Entity 320b | Facebook, LinkedIn; Google +, Tumblr, Pinterest, Twitter, Reddit, Flickr, Microsoft |

Merchants Care about Community Implementations

As disclosed in U.S. patent application Ser. No. 13/748,459, filed on Jan. 23, 2013, titled Authorized transaction incented by merchant donation, which is hereby incorporated by reference, in one computerized implementation, the ALLIANCE as depicted in FIGS. 3-6, can be operated in conjunction with a yet further implementation in which a merchant incentivizes an account holder to make an authorized transaction by terms and agreement to auditably donate to the account holder's affinity entity. To incent desirable commerce with locals, the merchant's terms may limit its donation by a derivation of navigation time between account holder and merchant, and/or by date and time of the transaction. The account holder can direct the donation to one of more affinity entities within their own community, and/or within a community where the transaction was physically conducted. An account holder can also donate at the time of transaction where the donation is paid by the account's issuer for reimbursement as a debit to the account holder's account statement. Other payment system participants may donate (the merchant's acquirer, issuer, and transaction handler for the issuer and acquirer), by way of favorable interchange rates, can also make auditable donations to account holder directed affinities entities.

One or more of the foregoing implementations relate to computer-implemented methods and server-implemented methods where, for each transaction between an account holder and a merchant, information is received that is derived from an authorization response for the transaction, where the information includes the date and the time, a currency amount, and an identifier for the merchant. For each transaction for which the date and time of the corresponding authorization response are within a predetermined time period, and for each identifier for the merchant, there is a deriving of the sum of the currency amounts by using the identifier for the merchant to access a database to retrieve (i) the logical address for the merchant, or its agent, corresponding to the identifier for the merchant and (ii) a business rule for making a donation corresponding to an identifier for an affinity entity or charity having a logical address, wherein in the currency amount of each donation is a function, at least in part, of the currency amount of each transaction. A transmission is made to the logical address for the merchant, or its agent, that includes the donation to the affinity entity or charity for the predetermined time-period. Within a predetermined audit time-period for and after the predetermined time-period, a plurality of donation receipts are received, each including (i) the respective identifiers for the affinity entity or charity and the merchant and (ii) a currency amount. For each identifier for the merchant, the sum of the currency amounts of the donation receipts for each identifier for the affinity entity or charity is derived.

After the predetermined audit time-period for the predetermined time, for each identifier for the merchant, and for each identifier corresponding to each affinity entity or charity to whom a donation was to be made as per the retrieved business rule, a determination is made of a difference between: (i) the donation for the predetermined time period that was transmitted to the logical address of the merchant, and (ii) the sum of the currency amounts of the donation receipts received for the affinity entity or charity for the predetermined time period. Then, the determined difference is transmitted to the logical address for the merchant, or its agent.

In several of the above implementations, an account issued by an issuer to an account holder can be a revolving credit account, a debit account, a charge account, an Automatic Teller Machine (AMT) account, a prepaid account, a gift account, etc. In various implementations, deposits to and withdrawals from each said account may be any and all forms of currency, including cash, crypto-currency (e.g., 'bitcoin'), frequent flyer miles, cellular telephone usage units (e.g., airtime, data transmission units), loyalty program points, etc.

In other of the above implementations, the affinity entities to which the merchant donates can be limited to those within the merchant's community, within the account holder's community, within both communities, or within neither community. In still further implementations, the account holders can designate those affinity entities to which the merchant is to make a donation, regardless of the location or charitable object or mission of the affinity entity. In yet other implementations, an acquirer for the merchant to a transaction can make the donation on the merchant's behalf incident to clearing and settling the transaction with the issuer that issued the account to the account holder, and where, optionally, the acquirer's donation can be in the form of an adjustment to exchange rate assessed to the merchant against the transaction amount for conducting the transaction on the account holder's account. Other participants in a payment processing system, including the issuer and the transaction handler, can similarly make donations as further incentives to the account holder to conduct a transaction on the account holder's account.

Instill further of the above implementations, in an open loop cashless payment system for making charitable donations, the merchant funds and makes direct payment of all donations to the merchant's designated affinity entities or charities according to a merchant designated business rule, wherein, in a variation thereof, the merchant funds and makes direct payment of all donations to merchant's designated affinity entities or charities that are located in, and/or provide services to, the merchant's neighborhood, which may be defined geographically or by other definitions.

In yet further implementations, in an open loop cashless payment system for making charitable donations, the merchant funds and the merchant's acquirer makes direct payment, incident to a process of closing and settlement, of all donations to all affinity entities or charities for those transaction conducted by account holders with the merchant on respective accounts issued to the account holder by respective issuers.

Instill further implementations, in an open loop cashless payment system for making charitable donations, the merchant funds the charitable donations and the merchant's acquirer makes direct payment, incident to a process of closing and settlement, of all donations to all charities for those transaction conducted by the account holders with the merchant on respective accounts issued to respective account holders by respective issuers, wherein, in a variation thereof, the donations are made to those affinity entities or charities having a physical location within the merchant's neighborhood, which may or may not be a geographically defined community.

In yet further implementations, the merchant funds and makes direct payment of donations to account holder-designated charities for those transactions conducted by the account holder with the merchant.

Instill further implementations, in an open loop cashless payment system for making charitable donations, the merchant funds and makes direct payment of all donations to all account holder designated charities for those transactions conducted by the account holder with the merchant on an account issued to the account holder by an issuer, wherein, in a variation thereof, the donations are made to those charities having a physical location within the merchant geographically defined community.

Instill further implementations, in an open loop cashless payment system for making charitable donations, both the merchant and its acquirer fund donations to charities, incident to a process of closing and settlement, of all donations to all account holder designated charities for those transaction conducted by the account holder with the merchant on an account issued to the account holder by an issuer, wherein, in a variation thereof, the donations are made to those charities designated by the account holder, which charities may have a physical location within a neighborhood where the account holder resides and the merchant's brick and mortar store is located. In a still further variation thereof, a downward adjustment is made to an exchange fee assessed to the merchant by the merchant's acquirer such that the merchant is able to pay a lower exchange fee to compensate for the merchant's charitable contribution, and, optionally, the acquirer for the transaction can also pay the same local charities a donation out of increased transaction volume due to the incentive.

In yet further implementations, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches at least a portion of the merchant's contribution to the affinity entity or charity by the account holder's issuer making direct payment to that affinity entity or charity incident to a process of closing and settlement such as by way of a charge for the account holder's charitable donation that is rendered as a statement debit on the account holder's periodic revolving credit account statement.

Variations on the foregoing implementations include allowing the customer to specify one or more affinity entities (e.g., charities) that provide goods and/or services in their local community to which donations are to made by merchants with whom the customer conducts transactions. In such implementations, each merchant is given notice of its total periodic obligatory donations. Such notice, however, is given without providing the merchant with any notice or knowledge as to the specific identity of those affinity entities that are to be its recipients. Such implementations leave the direction of merchant's donations fully within the discretion of the merchant's customers. In some implementations, the customer's discretion can be limited by the restriction that the customer can only select affinity entities from among those that serve the local community in common to both the merchant and the customer, while leaving the actual amount of the merchant's donation fully within the discretion of the merchant. Variations on such implementations include alternative definitions for the local community in common to both the merchant and the customer.

Still further variations on the foregoing implementations include deriving a donation to be made by the merchant to the affinity entity for a predetermined time-period by using a merchant donation business rule as well as a rule previously specified by the account holder who conducts the transaction with the merchant. By way of example, and not by way of limitation, the merchant's donation business rule might choose the amount of the donation, whereas the account holder's rule might choose the affinity entity that is not located in the same community or either the merchant or the account holder.

AllRewards Implementations

As disclosed in U.S. patent application Ser. No. 11/283,856, filed on Nov. 22, 2005, titled Method, system and computer program for providing a loyalty engine enabling dynamic administration of loyalty programs, which is hereby incorporated by reference, in one computerized implementation, the ALLIANCE as depicted in FIGS. 3-6, can be operated in conjunction with a yet further implementation in which there are provided methods, computer systems, and computer program products for encouraging customer loyalty. At least some of the methods include the steps of: (1) one or more partners defining a loyalty program, the loyalty program defining loyalty rewards, cross-promotional partner rewards and prizes associated with one or more activities; (2) registering one or more members with the loyalty program, whereby their registration includes the provision of registered form of payment data for one or more registered form of payment types of each of the one or more participants; (3) collecting financial data corresponding to transactions of the one or more members associated with the one or more partners, and providing said financial data to a loyalty engine; (4) providing access to the loyalty engine to the one or more members, the loyalty engine permitting the one or more partners: (a) to define the rules defining the loyalty program, including special partner rewards including cross-promotional rewards between partners, loyalty rewards, and chances to win prizes; (b) to monitor the effectiveness of the loyalty program; and (c) to modify the loyalty program to enhance its effectiveness. The computer system includes implementations of the loyalty engine. The computer program product consists of a server application that includes implementation of the loyalty engine. Partners access a number of software utilities linked to the loyalty engine to assess the effectiveness of the loyalty programs and customize the attributes of the loyalty programs to improve effectiveness. Members access the loyalty engine real time and use loyalty reward actions for prize opportunities.

One aspect of this implementation is a method of encouraging customer loyalty, including the steps of: (1) One or more merchants (e.g. partners) defining a loyalty program, the loyalty program defining loyalty rewards associated with one or more activities; (2) Registering one or more members with the loyalty program, whereby their registration includes the provision of registered form of payment data for one or more registered form of payments of each of the one or more members; (3) Collecting financial data corresponding to transactions of the one or more members associated with the one or more partners, and providing said financial data to a loyalty engine; (4) Providing access to the loyalty engine to the one or more partners, the loyalty engine permitting the one or more partners: (a) To define the rules defining the loyalty program, including accumulation of loyalty rewards, chances to win prizes, redemption of loyalty rewards from the partner and combined offers with other participating partners to cross promote products/services and provide rewards and/or discount offers to customer-selected benefit programs; (b) Monitoring the effectiveness of the loyalty program; and (c) Modifying the loyalty program to enhance its effectiveness.

Another aspect of this implementation is a computer system that includes the described loyalty engine. Another aspect is a computer program product consisting of the loyalty engine.

In a particular aspect of this implementation, the completion of a survey is linked to an opportunity to win prizes.

In yet another particular aspect of this implementation, members make a reservation for special partner rewards through the loyalty engine, and rewards are collected from the partner by the member presenting the member reward number at a location of the applicable partner.

In a still other aspect of this implementation, there are provided a method, computer system, and computer program product is provided that enables a plurality of partners to co-operate to provide loyalty benefits jointly, by operation of the loyalty engine.

Other Implementations of Merchants Care about Community

As disclosed in U.S. patent application Ser. No. 13/748,459, filed on Jan. 23, 2013, titled Authorized transaction incented by merchant donation, which is hereby incorporated by reference, in one computerized implementation, the ALLIANCE as depicted in FIGS. 3-6, can be operated in conjunction with a yet further implementation in which a merchant incentivizes an account holder to make an authorized transaction by terms and agreement to auditably donate to the account holder's affinity entity. To incent desirable commerce with locals, the merchant's terms may limit its donation by a derivation of navigation time between account holder and merchant, and/or by date and time of the transaction. The account holder can direct the donation to one of more affinity entities within their own community, and/or within a community where the transaction was physically conducted. An account holder can also donate at the time of transaction where the donation is paid by the account's issuer for reimbursement as a debit to the account holder's account statement. Other payment system participants may donate (the merchant's acquirer, issuer, and transaction handler for the issuer and acquirer), by way of favorable interchange rates, can also make auditable donations to account holder directed affinities entities.

One or more such implementations relate to computer-implemented methods and server-implemented methods where, for each transaction between an account holder and a merchant, information is received that is derived from an authorization response for the transaction, where the information includes the date and the time, a currency amount, and an identifier for the merchant. For each transaction for which the date and time of the corresponding authorization response are within a predetermined time period, and for each identifier for the merchant, there is a deriving of the sum of the currency amounts by using the identifier for the merchant to access a database to retrieve (i) the logical address for the merchant, or its agent, corresponding to the identifier for the merchant and (ii) a business rule for making a donation corresponding to an identifier for an affinity entity or charity having a logical address, wherein in the currency amount of each donation is a function, at least in part, of the currency amount of each transaction. A transmission is made to the logical address for the merchant, or its agent, that includes the donation to the affinity entity or charity for the predetermined time-period. Within a predetermined audit time-period for and after the predetermined time-period, a plurality of donation receipts are received, each including (i) the respective identifiers for the affinity entity or charity and the merchant and (ii) a currency amount. For each identifier for the merchant, the sum of the currency amounts of the donation receipts for each identifier for the affinity entity or charity is derived.

After the predetermined audit time-period for the predetermined time, for each identifier for the merchant, and for each identifier corresponding to each affinity entity or charity to whom a donation was to be made as per the retrieved business rule, a determination is made of a difference between: (i) the donation for the predetermined time period that was transmitted to the logical address of the merchant, and (ii) the sum of the currency amounts of the donation receipts received for the affinity entity or charity for the predetermined time period. Then, the determined difference is transmitted to the logical address for the merchant, or its agent.

In various implementations, an account issued by an issuer to an account holder can be a revolving credit account, a debit account, a charge account, an Automatic Teller Machine (AMT) account, a prepaid account, a gift account, etc. In various implementations, deposits to and withdrawals from each said account may be any and all forms of currency, including cash, crypto-currency (e.g., 'bitcoin'), frequent flyer miles, cellular telephone usage units (e.g., air time, data transmission units), loyalty program points, etc.

In other implementations, the affinity entities to which the merchant donates can be limited to those within the merchant's community, within the account holder's community, within both communities, or within neither community. In still further implementations, the account holders can designate those affinity entities to which the merchant is to make a donation, regardless of the location or charitable object or mission of the affinity entity. In yet other implementations, an acquirer for the merchant to a transaction can make the donation on the merchant's behalf incident to clearing and settling the transaction with the issuer that issued the account to the account holder, and where, optionally, the acquirer's donation can be in the form of an adjustment to exchange rate assessed to the merchant against the transaction amount for conducting the transaction on the account holder's account. Other participants in a payment processing system, including the issuer and the transaction handler, can similarly make donations as further incentives to the account holder to conduct a transaction on the account holder's account.

Instill further implementations, in an open loop cashless payment system for making charitable donations, the merchant funds and makes direct payment of all donations to the merchant's designated affinity entities or charities according to a merchant designated business rule, wherein, in a variation thereof, the merchant funds and makes direct payment of all donations to merchant's designated affinity entities or charities that are located in, and/or provide services to, the merchant's neighborhood, which may be defined geographically or by other definitions.

In yet further implementations, in an open loop cashless payment system for making charitable donations, the merchant funds and the merchant's acquirer makes direct payment, incident to a process of closing and settlement, of all donations to all affinity entities or charities for those transaction conducted by account holders with the merchant on respective accounts issued to the account holder by respective issuers.

Instill further implementations, in an open loop cashless payment system for making charitable donations, the merchant funds the charitable donations and the merchant's acquirer makes direct payment, incident to a process of closing and settlement, of all donations to all charities for those transaction conducted by the account holders with the merchant on respective accounts issued to respective account holders by respective issuers, wherein, in a variation thereof, the donations are made to those affinity entities or charities having a physical location within the merchant's neighborhood, which may or may not be a geographically defined community.

In yet further implementations, the merchant funds and makes direct payment of donations to account holder-designated charities for those transactions conducted by the account holder with the merchant.

Instill further implementations, in an open loop cashless payment system for making charitable donations, the merchant funds and makes direct payment of all donations to all account holder designated charities for those transactions conducted by the account holder with the merchant on an account issued to the account holder by an issuer, wherein, in a variation thereof, the donations are made to those charities having a physical location within the merchant geographically defined community.

Instill further implementations, in an open loop cashless payment system for making charitable donations, both the merchant and its acquirer fund donations to charities, incident to a process of closing and settlement, of all donations to all account holder designated charities for those transaction conducted by the account holder with the merchant on an account issued to the account holder by an issuer, wherein, in a variation thereof, the donations are made to those charities designated by the account holder, which charities may have a physical location within a neighborhood where the account holder resides and the merchant's brick and mortar store is located. In a still further variation thereof, a downward adjustment is made to an exchange fee assessed to the merchant by the merchant's acquirer such that the merchant is able to pay a lower exchange fee to compensate for the merchant's charitable contribution, and, optionally, the acquirer for the transaction can also pay the same local charities a donation out of increased transaction volume due to the incentive.

In yet further implementations, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches at least a portion of the merchant's contribution to the affinity entity or charity by the account holder's issuer making direct payment to that affinity entity or charity incident to a process of closing and settlement such as by way of a charge for the account holder's charitable donation that is rendered as a statement debit on the account holder's periodic revolving credit account statement.

Variations on the foregoing implementations include allowing the customer to specify one or more affinity entities (e.g., charities) that provide goods and/or services in their local community to which donations are to made by merchants with whom the customer conducts transactions. In such implementations, each merchant is given notice of its total periodic obligatory donations. Such notice, however, is given without providing the merchant with any notice or knowledge as to the specific identity of those affinity entities that are to be its recipients. Such implementations leave the direction of merchant's donations fully within the discretion of the merchant's customers. In some implementations, the customer's discretion can be limited by the restriction that the customer can only select affinity entities from among those that serve the local community in common to both the merchant and the customer, while leaving the actual amount of the merchant's donation fully within the discretion of the merchant. Variations on such implementations include alternative definitions for the local community in common to both the merchant and the customer.

Still further variations on the foregoing implementations include deriving a donation to be made by the merchant to the affinity entity for a predetermined time-period by using a merchant donation business rule as well as a rule previously specified by the account holder who conducts the transaction with the merchant. By way of example, and not by way of limitation, the merchant's donation business rule might choose the amount of the donation, whereas the account holder's rule might choose the affinity entity that is not located in the same community of either the merchant or the account holder.

Proximal Customer Transaction Implementations

As disclosed in U.S. patent application Ser. No. 13/834,984, filed on Jan. 15, 2013, titled Proximal customer transaction incented by donation of auto-boarded merchant, which is hereby incorporated by reference, in one computerized implementation, the ALLIANCE as depicted in FIGS. 3-6, can be operated in conjunction with a yet further implementation in which address, time, and rules obligating donee donations are auto-populated for merchants whose authorization responses for transactions conducted on accounts are used to obtain account holders' travel time to the merchant's location. When travel time is proximal to the auto-populated time, the rule and the transaction currency amount are used to calculate the merchant's donee donation, which donation can be messaged for auditing of donations paid and payable. A predetermined time after each such transaction, the merchant is sent a notice as to the difference between obligatory donee donations and the donee donations received. Auto-populated addresses, times, and rules are amendable by the merchant, and the donee amendable by the account holder, whereby the merchant selects the donation, and the account holder selects the donee. Answers to account holder surveys, upon receipt, caused an increment to currencies for the account holder or the donee with greater increments for answers that are returned before a predetermined time threshold (e.g., the account holder gives fast answers to a survey).

In a computerized implementation, merchant data is auto-populated to include an address, duration, and a rule obligating the merchant to donate to a donee. Information from an authorization response for a transaction conducted by the merchant on an account of an account holder is used to obtain a travel time of the account holder from its address to the auto-populated address. When the obtained travel time is within a predetermined threshold of the auto-populated duration, a donation that the merchant is obligated to make to the auto-populated donee is derived by using the auto-populated rule and a currency amount of the trans action.

In another computerized implementation, there is obtained, from one or more databases, using information derived from a Globally Unique Identifier (GUID) for a merchant, merchant data for the merchant. The merchant data for the merchant includes: (i) a geographic address for the merchant; (ii) a default affinity entity or donee; (iii) a default maximum travel time to the geographic address for the merchant; and; (iv) a default business rule obligating the merchant to donate to the affinity entity. The merchant data for the merchant, now auto-populated, is stored in one or more databases. Information derived from an authorization response for a transaction conducted by the merchant on an account issued to an account holder is processed. This processing of the information includes (i): retrieving, using the identifier for the merchant, at least a portion of the stored merchant data for the merchant; (ii) accessing from one or more databases, using information derived from the identifier for the account holder, account holder data for the account holder that includes a geographic address for the account holder; (iii) inquiring, using the geographic addresses for the account holder and the merchant, the travel time from the geographic address of the account holder to the geographic address of the merchant; and (iv) if the retrieved travel time is within a predetermined tolerance of the default maximum travel time, deriving, using the default business rule and the currency amount of the transaction, the donation to be made by the merchant to the default affinity entity. Optionally, a message can be transmitted to a logical address of the merchant containing the donation to be made by the merchant to the default affinity entity.

In an alternative implementation of the foregoing implementation, the obtaining and storing are repeated for a plurality of the merchants and the processing for each of a plurality of the transactions is also repeated. Optionally, the processing can include transmitting a message to a logical address of the merchant containing the donation to be made by the merchant to the default affinity entity. As a further option, the logical address to which the message and the determined difference are transmitted can be any or all or a logical address for the merchant, the account holder, the affinity entity, an agent for at least one of the merchant, the account holder and the affinity entity, and combination of these.

In a further implementation, a predetermined time after the plurality of the transactions, a plurality of donation receipts can be received, each of which includes identifiers for the merchant and the default affinity entity, and a currency amount donated by the merchant to the default affinity entity. For each of the default affinity entities and for each of the merchants, a determination is made of the difference between the sum of the donations to be made by the merchant to the default affinity entity in the messages to the logical address of the merchant and the currency amount donated by the merchant to the default affinity entity in the donation receipts. The determined difference can then be transmitted to a logical address, for instance, which can be that of the logical address of the merchant, the account holder, the affinity entity, an agent for at least one of the merchant, the account holder and the affinity entity, and combination of these.

In a yet further implementation, each of the transactions occurs in a payment processing system that includes a plurality of the merchants each conducting each of the transactions on a respective account issued to a respective account holder by a respective issuer.

Each transaction on each said account is acquired for clearing and settlement by an acquirer for each said merchant through a transaction handler in communication with both the issuer of the account and the acquirer for the merchant. The issuer sends a corresponding authorization response for the transaction to the merchant through the transaction handler and the acquirer in response to an authorization request sent to the issuer from the merchant through the transaction handler and the acquirer.

Prior to repeating the processing step for each of a plurality of the transactions, replacement changes to be default terms, conditions, and values can be received, on behalf of one or more of the merchants. By way of examples, there can be received changes for a merchant that can replace at least one these: (i) the default affinity entity corresponding to the geographic address for the merchant; (ii) the default maximum travel time to the geographic address for the merchant; (iii) and/or the default business rule obligating the merchant to make a donation to the affinity entity. Also, there can be received for one or more account holders changes to the default affinity entity for the donation that is to be made by the merchant for each said transaction with said account holder, which default affinity entity that is replaced may have originally corresponded to, or be proximal of, the geographic address for the merchant.

After each transaction, in various alternative implementations, a message containing a question can be transmitted to a logical address of the account holder for the transaction. The message will contain one or more survey questions posed to the account holder or its agent. After receiving, in response to the survey, an answer, and as an incentive to the account holder to answer the survey, an increment is made in one or more databases to a loyalty currency attributed to the account holder. As acknowledgement that the incentive was awarded, a message can be transmitted to the logical address of the account holder that contains an acknowledgement of the increment to the loyalty currency. If the answer is received within a predetermined tolerance (e.g., quickly), the increment to the loyalty currency attributed to the account holder will be greater than the increment if the time lapse is not within the predetermined tolerance, which greater increment can be in the message that is transmitted to the logical address of the account holder.

Optionally, the survey answers by an account holder or its agent who transacted with a merchant can be sent, by batch or in real time, to a logical address of the merchant or its agent. As a still further option, a publication of a hyperlink can be made, or a facilitation of the network access can be made, to survey answers for the merchants and their account holders of all of a subset of the transactions. Third party requests can be received and responses thereto sent, by way of a user interface that provided third parties with a search engine to query and review survey answers for a particular merchant.

Incenting Community Resident in-Store Purchases Implementations

As disclosed in U.S. patent application Ser. No. 14/408, 199, filed on Dec. 15, 2014, titled Systems and method for incenting consumers, which is hereby incorporated by reference, in one computerized implementation, the ALLIANCE as depicted in FIGS. 3-6 can be operated in conjunction with a yet further implementation in which an open loop cashless payment system incents a consumer account holder to transact in a physical store with a merchant who agrees to make an auditable donation to a charity when the transaction is conducted on an account issued to the consumer account holder. The consumer account holder may direct the donation to a specific charity within a predetermined geographically determined community where the transaction was physically conducted. The consumer account holder can register an obligation to make a donation matching that of the merchant, where the consumer account holder's donation is initially paid by the consumer account's issuer for reimbursement by the consumer account holder to the issuer after the consumer account holder receives their account statement. The merchant's acquirer, the issuer, and a transaction handler for the issuer and acquirer may also make donations as directed by the consumer account holder. Various donor and consumer account holder directed business rules may limit the total currency amount of donations over specific calendar periods.

In a first aspect, implementations provide a method for incenting consumers to conduct in-store transactions with merchants, wherein the method is implemented using a processor and a memory coupled to the processor and configured to store instructions executable by the processor to perform the method comprising: receiving, at the processor, authorization data for a transaction on an account of a consumer account holder, wherein the account is issued by an issuer, wherein the transaction is acquired for clearing and settlement by an acquirer for a merchant account holder through a transaction handler in communication with both the issuer and the acquirer, wherein the authorization data is derived from at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determining, using the authorization data and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

In accordance other implementations, the authorization data may indicate whether a portable electronic storage device storing an identifier for the account was physically present with the merchant account holder.

In accordance with still other implementations, the authorization data may indicate whether the identifier for the account was electronically read from the portable electronic storage device by a reader co-located with the merchant account holder.

In accordance other implementations, the reader is selected from the group consisting of a magnetic stripe reader, a contact chip reader, a Near Field Communication (NFC) reader, a contactless payment card reader, and a wireless communication reader.

In accordance with other implementations, the authorization data indicates whether the transaction is not a Card Not Present (CNP) transaction.

In accordance with embodiments described herein, the authorization data indicates whether a card verification value was used for the transaction.

In accordance with embodiments described herein, the authorization data indicates whether signature identification was used for cardholder identification data.

In accordance with other implementations, the authorization data indicates whether a Personal Identification Number (PIN) was entered for the transaction.

In accordance with embodiments described herein, the authorization data indicates whether address verification information for the account holder was received by the merchant account holder.

In accordance with other implementations, the method may further comprise: receiving transaction data comprising a date and a time of the transaction, and an identifier for the merchant account holder, wherein the transaction data is derived from the authorization response; determining whether the date and time is within a predetermined time period; upon determining that the date and time is within a predetermined time period, determining, using the identifier for the merchant account holder and the processor, a geographic location for the merchant account holder, wherein the geographic location is within a predetermined geographical community; and selecting the charity from a plurality of potential charities, wherein the charity services the predetermined geographical community.

In accordance with other implementations, the geographic location for the merchant is determined using a logical address for the merchant.

In accordance with other implementations, the donation amount is transmitted to the logical address for the merchant.

In accordance with other implementations, the predetermined time period corresponds to an offer provided by the merchant account holder to the consumer account holder.

In accordance with other implementations, the method may further comprise: receiving an identifier for the consumer account holder, wherein the identifier is derived from the authorization request; determining, using the identifier for the consumer account holder and the processor, a geographic location for the consumer account holder, wherein the geographic location is within a predetermined geographical community; and selecting the charity from a plurality of potential charities, wherein the charity services the predetermined geographical community.

In accordance with other implementations, the method may further comprise: receiving a currency amount for the transaction; determining, using the identifier for the merchant account holder and the processor, whether there are additional transactions for the merchant account holder during the predetermined time period; receiving an additional currency amount for the additional transactions; and deriving a total currency amount as the sum of the currency amount for the transaction and the additional currency amount for the additional transactions, wherein the donation amount determined using the total currency amount.

In accordance with other implementations, the method may further comprise determining a difference between the donation amount and the total currency amount and transmitting the difference to the merchant account holder.

In accordance with other implementations, the method may further comprise: receiving a donation receipt within a predetermined audit time period relating to the predetermined time period, wherein the donation receipt includes the identifier for the merchant account holder, an identifier for the charity, and the donation amount.

In another aspect, other implementations may provide a non-transitory computer-readable medium storing one or more sequences of instructions which, when executed by one or more processors, causes the one or more processors to perform methods described herein.

In a further aspect, other implementations may provide a system for incenting consumers to conduct in-store transactions with merchants: an issuer for issuing an account to a consumer account holder; an acquirer for a merchant account holder, wherein the acquirer performs clearing and settlement through a transaction handler in communication with both the issuer and the acquirer; and a donation services server comprising a processor and a memory coupled to the processor and configured to store instructions executable by the processor to configure the donation services server to: receive authorization data for a transaction on the account, wherein the authorization data comprises at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determine, using the authorization data, a probability that the consumer account holder or agent thereof was physically present with the merchant account holder when conducting the transaction; and transmit a donation amount to a charity when the determined probability exceeds a predetermined threshold, wherein the donation amount is determined using the transaction, the consumer account holder, and the merchant account holder.

In further aspect, other implementations may provide a method for incenting consumers to conduct in-store transactions with merchants, wherein the method is implemented using a processor and a memory coupled to the processor and configured to store instructions executable by the processor to perform the method comprising: receiving, at the processor, authorization data for a transaction on an account of a consumer account holder, wherein the account is issued by an issuer, wherein the transaction is acquired for clearing and settlement by an acquirer for a merchant account holder through a transaction handler in communication with both the issuer and the acquirer, wherein the authorization data is derived from at least one of an authorization request and an authorization response, wherein the authorization request is sent to the issuer from the merchant account holder through the transaction handler and the acquirer, wherein the authorization response is sent by the issuer to the merchant account holder through the transaction handler and the acquirer in response to the authorization request; determining, using the authorization data and the processor, whether the consumer account holder or agent thereof was physically present with the merchant account holder when conducting the transaction; and upon determining that the consumer account holder was physically present with the merchant account holder when conducting the transaction, transmitting a donation amount to a charity, wherein the donation amount is determined using the transaction, the consumer account holder, and the merchant account holder.

In accordance with other implementations, the authorization data may comprise one or more members of the group consisting of: data indicating whether a portable electronic storage device storing an identifier for the account was physically present with the merchant account holder, data indicating whether an identifier for the account was electronically read from a portable electronic storage device by a reader co-located with the merchant, data indicating whether the transaction is not a Card Not Present (CNP) transaction, data indicating whether a card verification value was present, data indicating whether signature identification was used for cardholder identification data, data indicating whether a Personal Identification Number (PIN) was entered, and data indicating whether address verification information for the account holder was received.

In accordance with other implementations, the method may further comprise: receiving an identifier for the merchant account holder, wherein the identifier is derived from the authorization response; determining, using the identifier for the merchant account holder, a geographic location, wherein the geographic location is within a predetermined geographical community; and selecting the charity from a plurality of potential charities, wherein the charity services the predetermined geographical community.

In accordance with other implementations, the method may further comprise: receiving an identifier for the consumer account holder, wherein the identifier is derived from the authorization request; determining, using the identifier for the consumer account holder, a geographic location, wherein the geographic location is within a predetermined geographical community; and selecting the charity from a plurality of potential charities, wherein the charity services the predetermined geographical community.

In a further aspect other implementations, a method can be provided for incenting consumers to conduct in-store transactions with merchants, wherein the method is implemented using a processor and a memory coupled to the processor and configured to store instructions executable by the processor to perform the method comprising: receiving, at the processor, a status that an authorization for a transaction on an account of a consumer account holder is taking place, wherein the account is issued by an issuer, wherein the transaction is acquired for clearing and settlement by an acquirer for a merchant account holder through a transaction handler in communication with both the issuer and the acquirer; receiving, at the processor, a signal geolocating a mobile device identified to the consumer account holder; determining, using the status, the signal, and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

Other implementations may provide a method for incenting consumers to conduct in-store transactions with merchants, wherein the method is implemented using a processor and a memory coupled to the processor and configured to store instructions executable by the processor to perform the method comprising: receiving, at the processor, interchange data for setting an interchange rate for transaction on an account of a consumer account holder, wherein the account is issued by an issuer, wherein the transaction is acquired for clearing and settlement by an acquirer for a merchant account holder through a transaction handler in communication with both the issuer and the acquirer; determining, using the interchange data and the processor, a probability that the consumer account holder or agent thereof was physically present with the merchant account holder when conducting the transaction; and transmitting a donation amount to a charity when the determined probability exceeds a predetermined threshold, wherein the donation amount is determined using the transaction, the consumer account holder, and the merchant account holder.

In other implementations, the method may further comprise determining whether the transaction is an in-store debit transaction or an in-store credit transaction using the interchange data and the processor, and wherein the donation amount is determined based on whether the transaction is the in-store debit transaction or the in-store credit transaction.

In another aspect of other implementations, there is provided a computer-implemented method where, for each transaction between a consumer account holder and a merchant, information may be received that is derived from an authorization request and/or an authorization response for the transaction, where the information may include the date and the time, a currency amount, and an identifier for the merchant. For each transaction, there may be received information derived from authorization data indicative that the account holder or agent thereof was physically present with the merchant. A determination may be made using the received information, whether the portable electronic storage device storing an identifier for the account was physically present with the merchant. For each transaction for which the determination is affirmative, and for each transaction for which the date and time of the corresponding authorization response are within a predetermined time period, and for each identifier for the merchant, there may be a deriving of the sum of the currency amounts by using the identifier for the merchant to access a database to retrieve: (i) the logical address for the merchant corresponding to the identifier for the merchant and (ii) a business rule for making a donation corresponding to an identifier for a charity having a logical address, wherein in the donation may be a function, at least in part, of the sum of the currency amounts. There may also be a deriving, using the business rule and the sum of the currency amounts, of the donation. A transmission may be made to the logical address for the merchant that includes the donation to the charity for the predetermined time period. Within a predetermined audit time period for and after the predetermined time period, a plurality of donation receipts are received, each including (i) the respective identifiers for the charity and the merchant and (ii) a currency amount. For each identifier for the merchant, the sum of the currency amounts of the donation receipts for each said identifier for the charity may be derived.

After the predetermined audit time period for the predetermined time, for each identifier for the merchant, and for each identifier corresponding to each charity to whom a donation was to be made as per the retrieved business rule, a determination may be made of a difference between: (i) the donation for the predetermined time period that was transmitted to the logical address of the merchant, and (ii) the sum of the currency amounts of the donation receipts received for the charity for the predetermined time period. Then, the determined difference is transmitted to the logical address for the merchant.

In various implementations, an account issued by an issuer to a consumer account holder can be a revolving credit account, a debit account, a checking account, a charge account, an Automatic Teller Machine (AMT) account, a stored value account, a prepaid account, a gift account, etc. In various implementations, deposits to and withdrawals from each said account may be any and all forms of currency, including cash, crypto-currency (e.g., 'bitcoin'), frequent flyer miles, cellular telephone usage units (e.g., air time, data transmission units), loyalty program points, etc. An identifier for the account may be digitally stored as electronically readable medium in storage associated with a credit card, a debit card, a gift card, a stored value card, a physical token having thereon an information bearing magnetic stripe, a physical token having therein a digital information storage device in electrical communication with an electrical conductor to communicate information stored therein, a physical token having therein a digital information storage device in electrical communication with an antennae to communicate information stored therein via a wireless communication technology, a cellular telephone, a smart phone, a web enabled portable electronic device having a wireless communication technology by which to communicate information stored therein, or a combination of the foregoing.

In other implementations, the charities to which the merchant donates can be limited to those within the merchant's or consumer's geographic community. In still further implementations, the consumer account holders can designate those charities to which the merchant is to make a donation. In yet other embodiments, an acquirer for the transaction between the merchant and the consumer account holder may make the donation on the merchant's behalf incident to clearing and settling the transaction with the issuer that issued the account to the consumer account holder.

Instill further implementations, in an open loop cashless payment system for making charitable donations, the merchant funds and makes direct payment of all donations to the consumer's designated charities according to a merchant designated business rule, wherein, in a variation thereof, the merchant funds and makes direct payment of all donations to consumer's designated charities in the merchant geographically defined community.

In yet further aspects of embodiments described herein, in an open loop cashless payment system for making charitable donations, the merchant funds and the merchant's acquirer makes direct payment, incident to a process of closing and settlement, of all donations to all account holder designated charities for those transaction conducted by the account holder with the merchant on an account issued to the account holder by an issuer.

In still further implementations, in an open loop cashless payment system for making charitable donations, the merchant funds and the merchant's acquirer makes direct payment, incident to a process of closing and settlement, of all donations to all consumer account holders designated charities for those transaction conducted by the account holder with the merchant on a consumer account issued to the account holder by an issuer, wherein, in a variation thereof, the donations are made to those charities having a physical location within the merchant geographically defined community.

In yet further implementations, in an open loop cashless payment system for making charitable donations, the merchant funds and makes direct payment of all donations to all consumer account holder designated charities for those transactions conducted by the consumer account holder with the merchant on an account issued to the consumer account holder by an issuer.

In still further implementations, in an open loop cashless payment system for making charitable donations, the merchant funds and makes direct payment of all donations to all consumer account holder designated charities for those transactions conducted by the consumer account holder with the merchant on an account issued to the consumer account holder by an issuer, wherein, in a variation thereof, the donations are made to those charities having a physical location within the merchant geographically defined community.

In still further implementations, an open loop cashless payment system for making charitable donations, both the merchant and its acquirer fund donations to charities, incident to a process of closing and settlement, of all donations to all consumer account holder designated charities for those transaction conducted by the consumer account holder with the merchant on an account issued to the consumer account holder by an issuer, wherein, in a variation thereof, the donations are made to those charities having a physical location within the merchant geographically defined community, and wherein, in a still further variation thereof, a downward adjustment is made to an exchange fee assessed to the merchant by the merchant's acquirer such that the merchant is able to pay a lower exchange fee to compensate for the merchant's charitable contribution to the different consumer account holder designated charities, and the acquirer for the transaction also pays the same local charities a donation from the likely increased transaction volume.

In yet further implementations, in an open loop cashless payment system for making charitable donations, the merchant funds and its acquirer makes direct payment, incident to a process of closing and settlement, of all donations to all account holder designated charities for those transactions conducted by the account holder with the merchant on an account issued to the account holder by an issuer, wherein the account holder matches the merchant's contribution to the charity by the account holder's issuer making direct payment to that charity incident to a process of closing and settlement such that the charge for the account holder's charitable donation is rendered as a statement debit on the account holder's periodic revolving credit account statement.

Cash Payments Implementations

As disclosed in U.S. patent application Ser. No. 14/646,235, filed on May 20, 2015, titled Systems, methods and devices for non-acquired account payment affinity donation, which is hereby incorporated by reference, in one computerized implementation, the ALLIANCE as depicted in FIGS. 3-6, can be operated in conjunction with a yet further implementation in which the transactions are not acquired transactions. Rather, a cash payment system incents a customer 326 to transact at a merchant's 326 brick and mortar store in the customer's local community by the merchant's agreement to make an auditable donation to a charity 318 serving the local community, where the charity is selected by the customer 326. Note here that, unlike other implementations of the ALLIANCE, neither an issuer bank 326, nor an acquirer bank, nor a payment network 322 are involved. Rather, various merchant business rules limit the merchant's donations over specific calendar periods, which donations can be made directly by the merchant 326 to the charity 318, or indirectly to the charity by way of a blind donation made by the merchant to a donation disbursement agency acting on the merchant's behalf to satisfy the merchant's commitment to donate.

Implementations of the foregoing relate to a computer-implemented systems and methods where, for each transaction there is received a transaction time stamp and respective merchant 326, account holder 326, and offer identifiers, as well as indicia that payment for the transaction paid for on an non-acquired account (e.g., paper currency, coins, check, etc.). In accordance with some embodiments, for each transaction, systems and methods may also receive indicia that the transaction occurred within the merchant's 326 physical store (instead of an e-commerce transaction).

In accordance with some implementation, computer-implemented systems and methods may use the respective merchant and account holder identifiers, to retrieve the respective merchant and account holder geographic locations. For each transaction, a determination is made, using the respective merchant and account holder geographic locations, whether the merchant and the account holder have a geographical location in common. A determination is also made as to whether the transaction is being conducted within a predetermined time period by use of the transaction time stamp and the offer identifier.

For each transaction for which the transaction is conducted within the predetermined time period and the merchant 326 and the account holder 326 have a geographical location in common, the merchant identifier is used to retrieve a merchant donation business rule for the merchant to make a donation to an affinity entity 318, where the affinity entity 318 has a geographical location in common with that of the respective merchant 326 and account holder 326 geographic locations and an affinity entity identifier. A donation to be made by the merchant 326 to the affinity entity 318 for the predetermined time period is derived using the merchant donation business rule, and a message containing the donation is sent to one or more of the merchant 326, account holder 326 and the affinity entity 318.

In accordance with some implementations, within a predetermined audit time period for the predetermined time period, donation receipts are received that each include a currency amount the respective merchant and affinity entity identifiers. For each identifier for the merchant, the sum of the currency amounts of the donation receipts for each affinity entity identifier is calculated to determine whether the merchant has satisfied its commitment to make all donations to all affinity entities.

Variations on the foregoing implementations may include allowing the customer to specify one or more affinity entities in their local community to which donations may be made by merchants with whom the customer conducts cash transaction. In such implementations, each merchant may be given notice of its total periodic donations. Such notice, however, may be given without providing the merchant with any notice or knowledge as to the specific identity of those affinity entities that are to be its recipients. Such implementations leave direction of merchant's donations fully within the discretion of the merchant's customers, limited only by the restriction that the customer can only select affinity entities from among those that serve the local community in common to both the merchant and the customer, while leaving the actual amount of the merchant's donation fully within the discretion of the merchant.

Still further variations on the foregoing implementations may include deriving a donation to be made by the merchant to the affinity entity for the predetermined time period by using the merchant donation business rule as well as donation rules previously specified by the account holder who conducts the cash transaction with the merchant. By way of example, and not by way of limitation, the merchant's donation business rule might choose the amount of the donation whereas the account holder's rule might choose the affinity entity in the community to which the merchant's donation is to be directed.

In yet further computer-implemented methods and computer-system implemented methods of the foregoing, a business process is applicable, without an issuer 326 or acquirer 326, to a registered member 326 who pays with cash and resides in a community or neighborhood where a registered merchant's 326 store is also located. The member receives the merchant's offer bearing an identifier which the member shows to the merchant when paying for a transaction in cash, cheque or other non-acquired account. The merchant's Point of Sale Terminal (POS) may execute software to acquire indicia identifying the member's cash payment and the identifier for the offer, which may include an identifier for the member. The POS may transmit a time stamp for the transaction with the offer identifier and the cash payment amount, for example. Upon receipt by a server in communication with a network with which the POS is also in communication, a verification may be made as to non-expiration of the merchant's offer, optionally, 'lift and shift' day-of-week and time-of-day terms of the merchant e-offer by comparison to the time stamp of the transaction; and identifiers for the of both merchant and member. Upon verification, the server electronically transmits a real time acknowledgement to the respective logical addresses of member and merchant; and the server commits the merchant to make a donation to an affinity entity providing charitable goods and/or service to the community where the registered member resides and the registered merchant's store is located. The server receives subsequent transmission from the affinity entity as to merchant donations received from which the server can ascertain the absence of noncompliance by the registered merchant as to required affinity entity donations.

Client Acquisition System Implementations

As disclosed in U.S. patent application Ser. No. 11/760,516, filed on Jun. 8, 2007, titled Method, system and computer program for client acquisition, now U.S. Pat. No. 7,857,210, which is hereby incorporated by reference, in one computerized implementation, the ALLIANCE as depicted in FIGS. 3-6, can be operated in conjunction with a yet further implementation in which there are provided method, system and computer program for enabling a loyalty program to be linked to one or more card issuers, and thereby their cardholders. A loyalty system is provided that is operable to enable the creation, implementation and management of one or more loyalty programs that provide benefits to members of the loyalty programs in connection with transactions between the members and one or more merchants associated with the loyalty system. The method includes registering on the loyalty system one or more card issuers; the operator of the loyalty system, the one or more card issuers, and the merchants establishing the rules for accrual and processing of benefits from the merchants to cardholders associated with the one or more card issuers in connection with transactions between the cardholders and the merchants with the loyalty system; registering on the loyalty system one or more merchant acquirers associated with the one or more card issuers; registering a plurality of the cardholders as members of the loyalty program; and applying the rules to accrue and process the benefits of cardholders in connection with the transactions between the cardholders and the merchants, by operation of the loyalty system. Implementations provide a method for increasing transactions within a loyalty system, as well as a method for card issuers and merchants to share the risk and costs associated with directing loyalty programs to cardholders. The method also involves connecting the loyalty system to systems associated with the card issuers and one or more associated merchant acquirers. On this basis, the method enables merchants to direct the loyalty programs or aspects thereof to specific cardholders based on BIN ranges, and based on geographic and/or time based parameters. System and computer programs for implementing the method are also provided.

In this implementation, a method is provided for enabling a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system, the method comprising the steps of: (a) Registering on the loyalty system one or more card issuers; (b) The operator of the loyalty system, the one or more card issuers, and the merchants establishing the rules for accrual and processing of benefits from the merchants to cardholders associated with the one or more card issuers in connection with transactions between the cardholders and the merchants with the loyalty system; (c) Registering on the loyalty system one or more merchant acquirers associated with the one or more card issuers; (d) Registering a plurality of the cardholders as members of the loyalty program; (e) Applying the rules to accrue and process the benefits of cardholders in connection with the transactions between the cardholders and the merchants, by operation of the loyalty system.

Other Client Acquisition System Implementations

As disclosed in U.S. patent application Ser. No. 12/663,533, filed on Jun. 8, 2008, titled Method, system and computer program for client acquisition and surveying, now U.S. Pat. No. 8,577,722, which is hereby incorporated by reference, in one computerized implementation, the ALLIANCE as depicted in FIGS. 3-6, can be operated in conjunction with a yet further implementation in which there are provided method, system and computer program for enabling a loyalty program to be linked to one or more card issuers, and thereby their cardholders. A loyalty system is provided that is operable to enable the creation, implementation and management of one or more loyalty programs that provide benefits to members of the loyalty programs in connection with transactions between the members and one or more merchants associated with the loyalty system. The method includes registering on the loyalty system one or more card issuers; the operator of the loyalty system, the one or more card issuers, and the merchants establishing the rules for accrual and processing of benefits from the merchants to cardholders associated with the one or more card issuers in connection with transactions between the cardholders and the merchants with the loyalty system; registering on the loyalty system one or more merchant acquirers associated with the one or more card issuers; registering a plurality of the cardholders as members of the loyalty program; and applying the rules to accrue and process the benefits of cardholders in connection with the transactions between the cardholders and the merchants, by operation of the loyalty system. Implementations provide a method for increasing transactions within a loyalty system, as well as a method for card issuers and merchants to share the risk and costs associated with directing loyalty programs to cardholders. The method also involves connecting the loyalty system to systems associated with the card issuers and one or more associated merchant acquirers. On this basis, the method enables merchants to direct the loyalty programs or aspects thereof to specific cardholders based on BIN ranges, and based on geographic and/or time based parameters. System and computer programs for implementing the method are also provided.

In this implementation, a method enables a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system, the method comprising the steps of (a) Registering on the loyalty system one or more card issuers; (b) The operator of the loyalty system, the one or more card issuers, and the merchants establishing the rules for accrual and processing of benefits from the merchants to cardholders associated with the one or more card issuers in connection with transactions between the cardholders and the merchants with the loyalty system; (c) Registering on the loyalty system one or more merchant acquirers associated with the one or more card issuers; (d) Registering a plurality of the cardholders as members of the loyalty program; (e) Applying the rules to accrue and process the benefits of cardholders in connection with the transactions between the cardholders and the merchants, by operation of the loyalty system.

Still Other Client Acquisition System Implementations

As disclosed in U.S. patent application Ser. No. 14/071,062, filed on Nov. 4, 2013, titled Method, system and computer program for client acquisition and surveying, which is hereby incorporated by reference, in one computerized implementation, the ALLIANCE as depicted in FIGS. 3-6, can be operated in conjunction with a yet further implementation in which there are provided a method, system and computer program for enabling a loyalty system to be linked to one or more card issuers, cardholders, merchants, and thereby their cardholders. A system operable to create, implement and manage one or more loyalty programs that provide benefits to members of the loyalty programs in connection with transactions between the members and one or more merchants associated with the loyalty system. The method includes registering on the loyalty system one or more card issuers; one or more merchant acquirers associated with the one or more card issuers; a plurality of cardholders as members of the loyalty program. Establishing and applying rules for accrual and processing of benefits from the merchants to cardholders associated with the one or more card issuers in connection with transactions between the cardholders and the merchants with the loyalty system. Defining a rule based survey utility operable to issue surveys to members of the loyalty system on a transaction and non-transaction basis.

An aspect of this implementation is a method for enabling a loyalty program to be linked to one or more card issuers, and thereby their cardholders, by operation of a loyalty system, the loyalty system being operable to enable the creation, implementation and management of one or more loyalty programs that provide benefits to members of the loyalty programs in connection with transactions between the members and one or more merchants associated with the loyalty system. The method comprises the steps of: registering on the loyalty system one or more card issuers; registering on the loyalty system one or more merchant acquirers associated with the one or more care issuers; registering a plurality of the cardholders as members of the loyalty program; the operator of the loyalty system, the one or more card issuers, and the merchants establishing the rules for accrual and processing of benefits from the merchants to cardholders associated with the one or more card issuers in connection with transaction between the cardholders and the merchants with the loyalty system; applying the rules to accrue and process the benefits of cardholders in connection with the transactions between the cardholders and the merchants, by operation of the loyalty system; and defining a survey utility function capable to issue surveys to members of the loyalty system.

A further aspect of this implementation involves a method enabling a loyalty program to provide a survey utility function that allows participating groups, including merchants, sponsors/manufacturers and financial institutions to prepare questions that may be posed to a member wherein the questions are compiled into a survey and the survey utility function further comprising: maintaining a database of members' answers to the survey questions for future retrieval wherein the answers are recorded in association with the member who gave the answer; and compiling reports for the merchants, sponsors/manufacturers and financial institutions based on their particular survey questions and the survey responses received by the members.

Charity Implementations

As disclosed in U.S. patent application Ser. No. 11/746,502, filed on May 9, 2007, titled Method, system and computer program for providing a loyalty engine for dynamic administration of charity donations, which is hereby incorporated by reference, in one computerized implementation, the ALLIANCE as depicted in FIGS. 3-6, can be operated in conjunction with a yet further implementation in which there are provided method, system and computer program for providing a loyalty engine enabling dynamic administration of charity donations. The method includes a merchant creating by operation of the loyalty engine a customized loyalty program defined by a plurality of rules for administering their loyalty program; the operator of the loyalty engine registers one or more charities on the loyalty engine; the merchant also defines on the loyalty engine the rules under which, as part of their loyalty program, they will make a donation to the one or more charities in connection with one or more transactions with a member that is associated to the loyalty program; the member optionally selects, as part of their participation in the loyalty program, the one or more charities to whom the merchant shall make a donation based on transactions between the member and merchant, and further based on the applicable rules defined by the merchant. The loyalty engine tracks applicable transactions, applies the donation rules, accrues the applicable donations. The loyalty engine can also be provided with a transaction utility that is operable to process donation payments between the merchants and the charities. A system is also provided that consists of the loyalty engine, including a charity utility that provides the functions of the method, linked to a server computer that is connected to the Internet. The computer program is a web application that enables the members, charities, and merchants to access various functions via a browser. A reporting facility is also described that allows merchants, charities and members to track their donation activity in connection with the operation of the loyalty engine.

In this implementation, a method, system and computer program is provided that enables a loyalty program to be linked to charitable donations, involving a loyalty program platform or loyalty engine or loyalty system. The loyalty program platform provides to a plurality of merchants tools to customize one or more loyalty programs made available to members of the loyalty program platform (customer and potential customers of the merchants). The operator of the loyalty program platform establishes relationships with one or more charities, such relationships determining certain rules under which the plurality of merchants may make donations to the one or more charities based on the activities of members in connection with the loyalty programs. By operation of the loyalty engine, the operator and each participating merchant establish rules for each participating merchant to make donations to the one or more charities, in conformity with the rules established between the operator and the one or more charities. The loyalty program platform operator in provides members the option of selecting one or more charities from a list of charities provided by the loyalty program platform. The loyalty system applies the aforementioned rules as they apply to each participating member so as to process donations based on their applicable transactions within the loyalty system. The loyalty program platform enables each of the merchants, members and charities to track the donation activity.

In one particular aspect of this implementation, there are provided a method, system and computer program for enabling a loyalty program linked to charitable donations, in which charitable donations are increased overall by enabling participating merchants to adjust the parameters of their charitable donations to their business objectives at the time by permitting the merchants to dynamically modify the rules of the loyalty program as they relate to charitable donations. More specifically, the method, system and computer program in accordance with this aspect enables merchants to customize their loyalty program dynamically, including as it relates to charitable donations, based on effectiveness and incremental cost. This generally results in enhanced donation levels to the participating charities.

In another aspect of this implementation, the method, system and computer program for providing a loyalty program linked to charitable donations provides transparency by enabling the tracking of donations made to the one or more charities of the consumer's choice, thereby encouraging charity and member participation.

In yet another aspect of this implementation, a method, system and computer program for providing a loyalty program linked to charitable donations is provided that permits a merchant to associate with a plurality of charities (including charities with similar purposes), and charities to associate loosely with a plurality of merchants, where the members, by selecting one or more charities and then by engaging in consumer behavior in connection with a loyalty program associated with a plurality of merchants, ultimately determine the donations flowing from the merchants to the charity.

In a still other aspect of this implementation, a method, system and computer program for providing a loyalty program linked to charitable donations is provided that is based on the method, system and computer program described in the Co-Pending Patent Application. Specifically, registration of members to the loyalty program platform involves members providing financial card data for one or more financial cards of each of the one or more participants, and financial data is collected corresponding to transactions between the members and merchants, said financial data being provided to a loyalty engine that is part of the loyalty program platform. The loyalty engine includes a charity utility that is operable to administer a charity account for each member who has selected one or more participating charities to receive donations from merchants. The charity utility is thereby operable to track transactions between members and merchants and credit the charity account with an applicable charitable donation credit, to the name of the applicable charity or charities. The operator of the loyalty program platform, or its agent, on a periodic basis processes donations from the applicable merchants to the applicable charities based on the information in the charity account.

In another method for providing a loyalty program linked to charitable donations for this implementation, there are included the steps of: each of a plurality of merchants creating a customized loyalty program defined by a plurality of rules for administering their loyalty program; a) linking one or more charities with the loyalty programs; b) the plurality of merchants defining the rules under which, as part of their loyalty program, they will make a donation to one or more charities in connection with one or more transactions with a member that is associated to the loyalty program (donation rules); c) the member optionally selecting one or more charities presented to the member that, as part of their participation in the loyalty program, the plurality of merchants shall make a donation to the selected charities in connection with transactions between the member and the plurality of merchants; and i) tracking the transactions subject to the member's selection, applying the donation rules, and ii) making the applicable donations available to the one or more charities.

In yet another implementation, a system provides a loyalty program that is presented by a plurality of merchants to a plurality of members registered with the loyalty program, the loyalty program being linked to charitable donations, the system including: a) a server computer connected to the Internet; and b) a web application linked to the server, the web application defining a loyalty engine that enables a plurality of merchants to create and manage customized loyalty programs defined by a plurality of rules defined by the loyalty engine for administering their loyalty programs; c) the loyalty engine including a charity utility, the charity utility being operable to enable the operator of the loyalty engine to register one or more charities thereon, the charity utility enabling the plurality of merchants to optionally define the rules under which, as part of their loyalty program, they will make a donation to one or more charities in connection with one or more transactions with a member that is associated with the loyalty program (donation rules); and d) based on a member optionally selecting one or more of the charities, the charity utility being further operable, based on such selection and the donation rules to: i) track transactions between the merchants and the member subject to member's selection for donations; ii) apply the donation rules; and iii) accrue donations to be made by the plurality of merchants to the applicable charities based on one or more transactions between the plurality of merchants and the member.

In another aspect of this implementation, a computer program comprises computer instructions which when loaded on a server computer connected to the Internet are operable to include: a) A web application defining a loyalty engine that enables a plurality of merchants to create and manage customized loyalty programs defined by a plurality of rules defined by the loyalty engine for administering their loyalty programs; b) the loyalty engine including a charity utility, the charity utility being operable to enable the operator of the loyalty engine to register one or more charities thereon, the charity utility enabling the plurality of merchants to optionally define the rules under which, as part of their loyalty program, they will make a donation to the one or more charities in connection with one or more transactions with a member that is associated with the loyalty program (donation rules); c) based on a member optionally selecting one or more of the charities, the charity utility being further operable, based on such selection and the donation rules to: i) track transactions between the merchants and the member subject to member's selection for donations; ii) apply the donation rules; and iii) accrue donations to be made by the plurality of merchants to the applicable charities based on one or more transactions between the plurality of merchants and the member.

Automated Cause Marketing Implementations

As disclosed in U.S. patent application Ser. No. 12/118,923, filed on May 12, 2008, titled Method, system, and computer program for providing a loyalty engine for automated cause management, which is hereby incorporated by reference, in one computerized implementation, the ALLIANCE as depicted in FIGS. 3-6, can be operated in conjunction with a yet further implementation in which there are provided method, system and computer program for providing a loyalty engine for automated cause marketing. The method includes a charity linking merchants and sponsors to the loyalty system. Members register with the loyalty engine through the loyalty system which is accessible via the Internet. Once the merchants and the sponsors are linked and the members are registered, by operation of the loyalty engine, the merchants can create a customized loyalty program defined by a plurality of merchant defined rules for administering their loyalty program. The merchant defined rules instruct the loyalty engine as to the level of donations in connection with one or more transactions by a member that is associated to the loyalty program. The loyalty system includes a reporting facility to allow the merchant to track transactions with members in a number of ways. A system is also provided that consists of a server computer including the loyalty engine and the charity utility. The charity utility provides the functions of the method and is linked to a server computer that is connected to the Internet. The computer program is a web application that enables the members, sponsors, merchants, and the charity to access various functions via a web browser.

In this implementation, a method for provides a loyalty program for promoting charitable donations that comprises the steps of: (a) an administrator establishing and administering the loyalty program; (b) linking each of a plurality of member purchasers to the loyalty program; (c) linking each of a plurality of merchants to the loyalty program; (d) linking one or more charities to the loyalty program, each creating one or more customized loyalty programs, each said customized loyalty program defined by rules for administering the customized loyalty program, including the rules under which each of the plurality of merchants will make donations of money, goods or services to the one or more charities, based on one or more purchases made by members from the plurality of merchants; (e) the loyalty program accumulating the donations of money, goods or services; and (f) the loyalty program directing the donations to the one or more charities based on associated rules defined by the loyalty program.

In an alternative of this implementation, a system provides a loyalty program linked to charitable donations presented by a plurality of merchants, a plurality of members, and one or more charities registered with the loyalty program. Here, the system comprises: (a) a server computer connected to the Internet; and (b) a web application linked to the server, the web application defining a loyalty engine that enables a plurality of merchants, one or more charities, and a plurality of members to create and manage customized loyalty programs defined by a plurality of rules interpreted by the loyalty engine for administering at least one loyalty program; wherein the loyalty engine includes a charity utility operable to enable the one or more charities to link the one or more charities, a plurality of merchants, one or more sponsors, and a plurality of members with the loyalty program, each said member being linked to the one or more charities by registering a financial transaction identification means using the charity utility; wherein the loyalty engine includes a merchant utility enabling the plurality of merchants to optionally define the rules under which as part of their loyalty program, they will make donations to the one or more charities based on one or more purchases made by members from the plurality of merchants; wherein the charity utility enables the loyalty program to keep track of the accumulating donations to the one or more charities based on one or more purchases made by members from the plurality of merchants; wherein the loyalty program includes a member utility enabling the plurality of members to keep track of the purchases made at the plurality of merchants; and wherein the loyalty program includes a sponsor utility enabling the plurality of sponsors to keep track of the purchases made by some of the plurality of members.

Other Automated Cause Marketing Implementations

As disclosed in U.S. patent application Ser. No. 13/756,120, filed on Jan. 31, 2013, titled Automated cause management, which is hereby incorporated by reference, in one computerized implementation, the ALLIANCE as depicted in FIGS. 3-6, can be operated in conjunction with a yet further implementation in which there are provided method, system and computer program for providing a loyalty engine for automated cause marketing. The method can include a charity linking merchants and sponsors to the loyalty system. Once the merchants and the sponsors are linked and the members are registered, merchant defined rules can instruct a loyalty engine as to the level of donations in connection with one or more transactions by a member that is associated to the loyalty program. The loyalty system can include a reporting facility to allow the merchant to track transactions with members in a number of ways. A system is also provided that can consist of a server including the loyalty engine and the charity utility. The charity utility can provide the functions of the method and can be linked to the networked server.

In one implementation, a method provides for: receiving, for each of a plurality of charities, charity information from a logical address of the charity, wherein the charity information includes a geographic address of the charity; receiving, for each of a plurality of merchants, merchant information from a logical address of the merchant, wherein the merchant information includes a geographic address of the merchant and a donation formula; receiving, for each of a plurality of sponsors, sponsor information from a logical address of the sponsor; receiving, for each of a plurality of members, member information from a logical address of the member, wherein the member information includes stored value card information corresponding to one said sponsor and a currency amount; and for each said merchant: receiving from the logical address of the merchant: the merchant information of the merchant; and the member information from one said member pertaining to the stored value card information corresponding to one said sponsor; and a currency amount of a sale by the merchant to the one said member; updating the currency amount for the stored value card in the member information for the one said member using: the current value of the currency amount for the stored value card; and the currency amount of the sale by the merchant to the one said member; and if the geographic address of one said charity is within a predetermined distance from the geographic address of the merchant, updating a donation currency amount of the merchant for the one said charity using: the currency amount of the sale by the merchant to the one said member; the donation formula in the merchant information for the merchant; and the current value of the donation currency amount for the merchant for the one said charity.

Still Other Automated Cause Marketing Implementations

As disclosed in U.S. patent application Ser. No. 12/525,326, filed on Feb. 1, 2008, titled Method, system and computer program for providing a loyalty engine for automated cause marketing, which is hereby incorporated by reference, in one computerized implementation, the ALLIANCE as depicted in FIGS. 3-6, can be operated in conjunction with a yet further implementation in which there are provided method, system and computer program for providing a loyalty engine for automated cause marketing. The method includes a loyalty program system administrator linking merchants and charities to the loyalty system. Members register with the loyalty engine through loyalty system which is accessible via the Internet. Once the merchants and the charities are linked and the members are registered, by operation of the loyalty engine, the merchants can create a customized loyalty program defined by a plurality of merchant defined rules for administering their loyalty program. The merchant defined rules instruct the loyalty engine as to which charities should receive in-kind donations in connection with one or more transactions by a member that is associated to the loyalty program. Once a loyalty system defined time period or donation threshold has been achieved, the loyalty system releases the donation in-kind to the specific charity. A system is also provided that consists of a server computer including the loyalty engine and the charity utility. The charity utility provides the functions of the method and is linked to a server computer that is connected to the Internet. The computer program is a web application that enables the members, charities, and merchants to access various functions via a web browser.

In this implementation, there is provided, a method for providing a loyalty program linked to charitable in-kind donations, the method characterized by: (a) linking one or more charities with the loyalty program; (b) linking one or more member purchasers with the loyalty program; (c) each of a plurality of merchants linked to the loyalty program creating a customized loyalty program defined by a plurality of rules for administering their loyalty program, including the rules under which each of the plurality of merchants will make in-kind donations of goods or services to the one or more charities based on one or more purchases made by members from the plurality of merchants; and (d) the loyalty program accumulating the in-kind donation of goods or services and providing means to the one or more charities to distribute the in-kind donations to one or more beneficiaries.

In another aspect of this implementation, there is provided a system for providing a loyalty program linked to charitable in-kind donations presented by a plurality of merchants, a plurality of members, and a plurality of charities registered with the loyalty program is provided, characterized in that the system comprises: (a) a server computer connected to the Internet; and (b) a web application linked to the server, the web application defining a loyalty engine that enables a plurality of merchants, of charities, of members and a loyalty system administrator to create and manage customized loyalty programs defined by a plurality of rules interpreted by the loyalty engine for administering at least one loyalty program; wherein the loyalty engine includes a charity utility being operable to enable the loyalty system administrator to link one or more charities, a plurality of merchants and one or more members with the loyalty program; wherein the loyalty engine includes a charity utility enabling the plurality of merchants to optionally define the rules under which as part of their loyalty program, they will make in-kind donations to one or more charities based on one or more purchases made by members from the plurality of merchants; wherein a charity utility enables the loyalty program to keep track of the accumulating in-kind donations to one or more charities based on one or more purchases made by members from the plurality of merchants; and wherein the loyalty program includes a programmed stored value card for redemption of goods and services of in-kind donations.

In yet another aspect of this implementation, a computer program is provided, the computer program characterized by: computer instructions which when loaded on a server computer connected to the Internet are operable to provide a web application defining a loyalty engine that enables a plurality of merchants, charities, members and loyalty system administrator to create and manage customized loyalty programs defined by a plurality of rules interpreted by the loyalty engine for administering their loyalty programs; wherein the loyalty engine includes a charity utility being operable to enable the loyalty system administrator of the loyalty engine to register one or more charities, a plurality of merchants and one or more members associated with the loyalty program; wherein the charity utility enables the plurality of merchants to optionally define the rules under which, as part of their loyalty program, they shall make an in-kind donation to the one or more charities in connection with one or more purchases made by members from the plurality of merchants; and wherein based on a member optionally selecting one or more of the charities, the charity utility being further operable, based on such selection and the donation rules to: (a) track transactions between the merchants and the member; (b) apply the donation rules; and (c) accrue donations to be made by the plurality of merchants to the applicable charities based on one or more transactions between the plurality of merchants and the member.

Other Automated Merchant Boarding Implementations

As disclosed in U.S. patent application Ser. No. 13/168,488, filed on Jun. 24, 2011, titled Program, system and method for linking community programs and merchants in a marketing program, now U.S. Pat. No. 9,105,050, which is hereby incorporated by reference, in one computerized implementation, the ALLIANCE as depicted in FIGS. 3-6, can be operated in conjunction with a yet further implementation in which there a provided a system, data access management utility and a method of generating links between local merchants and a marketing system such as is disclosed in PCT Patent Application No. PCT/CA2009/001605 which is hereby incorporated by reference. This implementation may be operable to register members, merchants, community programs, intermediaries and other entities with the marketing system. Implementations may be operable to quickly and efficiently register multiple members and/or multiple merchant store types virtually simultaneously to the marketing system. An automated registration and/or boarding process may be operated to undertake such registration and/or boarding of members, merchants, community programs, intermediaries and other entities with the marketing system, including automated boarding of merchants.

In this implementation, a marketing system is operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions occurring between the one or more merchants and the one or more members.

In another aspect of this implementation, a marketing program method comprises the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Next Generation Loyalty Implementations

As disclosed in U.S. patent application Ser. No. 13/508,084, filed on Nov. 6, 2009, titled Method, system, and computer program for attracting local and regional businesses to an automated cause marketing environment, now U.S. Pat. No. 8,756,102, which is hereby incorporated by reference, in one computerized implementation, the ALLIANCE as depicted in FIGS. 3-6, can be operated in conjunction with a yet further implementation in which there are provided system, method and computer program for enabling local or regional merchants to participate in an automated cause marketing (ACM) program. The ACM program that may provide benefits to several parties involved in fundraising for one or more supported organizations, including one or more supported organizations, advertising providers, merchants, and individuals. Merchants are able to access enhanced analytics regarding their transactions with members and non-members of the ACM program and can use these registration-enhanced analytics to realize an increased number of or revenue from transactions with members. Implementations also teach a system and method for enabling advertising providers to acquire and analyze data associated with consumers-merchant transactions. Implementations provide the above advantages optimally using a mobile device. Furthermore, implementations may enable a member to disseminate its charitable preferences to members of its electronic social networks.

This implementation provides a computer network implementable method for providing a loyalty program for promoting contributions to one or more supported organizations, the method characterized by: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling, or facilitating the enabling, by one or more computer processors, each of the one or more local or regional merchants to access analytic information relating to the plurality of transactions and to increase the number of or revenue from future transactions based on the analytic information.

This implementation also provides a system for providing a loyalty program for promoting contributions to supported organizations, the system characterized by: (a) a web server; (b) a loyalty engine linked to the web server, the loyalty engine established by an administrator; (c) one or more point of sale facilities for accepting payment, each linked to one or more merchants that are linked to the loyalty program; (d) a means for associating a plurality of transactions occurring at the one or more point of sale facilities with the loyalty engine; (e) a database enabling the recording of information for each of the plurality of transactions, the loyalty engine defining rules for making contributions to the one or more supported organizations based on the transactions and directing contributions to the one or more supported organizations based on the rules; and (f) an interface for enabling each of the one or more merchants to access analytic information relating to the plurality of transactions.

This implementation further provides a computer program comprising computer instructions which when loaded on a server computer connected to the Internet are operable to provide a web application defining a loyalty engine for promoting contributions to supported organizations, characterized in that the loyalty engine is operable to define a loyalty program by performing the steps of: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling each of the one or more local or regional merchants to access analytic information relating to the plurality of transactions and to increase the number of or revenue from future transactions based on the analytic information.

Other Next Generation Loyalty Implementations

As disclosed in U.S. patent application Ser. No. 14/283,632, filed on May 21, 2014, titled Method, system, and computer program for attracting local and regional businesses to an automated cause marketing environment, which is hereby incorporated by reference, in one computerized implementation, the ALLIANCE as depicted in FIGS. 3-6, can be operated in conjunction with a yet further implementation in which there are provided a system, method and computer program for enabling local or regional merchants to participate in an automated cause marketing (ACM) program. The ACM program that may provide benefits to several parties involved in fundraising for one or more supported organizations, including one or more supported organizations, advertising providers, merchants, and individuals. Merchants are able to access enhanced analytics regarding their transactions with members and non-members of the ACM program and can use these enhanced analytics to realize an increased number of or revenue from transactions with members. Implementations also teach a system and method for enabling advertising providers to acquire and analyze data associated with consumers-merchant transactions. Implementations provide the above advantages optimally using a mobile device. Furthermore, implementations may enable a member to disseminate its charitable preferences to members of its electronic social networks.

This implementation provides a computer network implementable method for providing a loyalty program for promoting contributions to one or more supported organizations, the method characterized by: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling, or facilitating the enabling, by one or more computer processors, each of the one or more local or regional merchants to access analytic information relating to the plurality of transactions and to increase the number of or revenue from future transactions based on the analytic information.

This implementation also provides a system for providing a loyalty program for promoting contributions to supported organizations, the system characterized by: (a) a web server; (b) a loyalty engine linked to the web server, the loyalty engine established by an administrator; (c) one or more point of sale facilities for accepting payment, each linked to one or more merchants that are linked to the loyalty program; (d) a means for associating a plurality of transactions occurring at the one or more point of sale facilities with the loyalty engine; (e) a database enabling the recording of information for each of the plurality of transactions, the loyalty engine defining rules for making contributions to the one or more supported organizations based on the transactions and directing contributions to the one or more supported organizations based on the rules; and (f) an interface for enabling each of the one or more merchants to access analytic information relating to the plurality of transactions.

This implementation further provides a computer program comprising computer instructions which when loaded on a server computer connected to the Internet are operable to provide a web application defining a loyalty engine for promoting contributions to supported organizations, characterized in that the loyalty engine is operable to define a loyalty program by performing the steps of: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling each of the one or more local or regional merchants to access analytic information relating to the plurality of transactions and to increase the number of or revenue from future transactions based on the analytic information.

Yet Other Next Generation Loyalty Implementations

As disclosed in U.S. patent application Ser. No. 14/672,756, filed on Mar. 30, 2015, titled Method, system, and computer program for automated cause marketing using mobile devices, which is hereby incorporated by reference, in one computerized implementation, the ALLIANCE as depicted in FIGS. 3-6, can be operated in conjunction with a yet further implementation in which there are provide a system, method and computer program for enabling local or regional merchants to participate in an automated cause marketing (ACM) program using mobile devices. The ACM program that may provide benefits to several parties involved in fundraising for one or more supported organizations, including one or more supported organizations, advertising providers, merchants, and individuals. Merchants are able to access enhanced analytics regarding their transactions with members and non-members of the ACM program and can use these enhanced analytics to realize an increased number of or revenue from transactions with members. Implementations also teach a system and method for enabling advertising providers to acquire and analyze data associated with consumers-merchant transactions. Implementations provide the above features optimally using mobile devices. Furthermore, implementations may enable a member to disseminate its charitable preferences and contribution notifications to members of its electronic social networks.

This implementation provides a computer network implementable method for providing a loyalty program for promoting contributions to one or more supported organizations, the method characterized by: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling, or facilitating the enabling, by one or more computer processors, each of the one or more local or regional merchants to access analytic information relating to the plurality of transactions and to increase the number of or revenue from future transactions based on the analytic information.

This implementation also provides a system for providing a loyalty program for promoting contributions to supported organizations, the system characterized by: (a) a web server; (b) a loyalty engine linked to the web server, the loyalty engine established by an administrator; (c) one or more point of sale facilities for accepting payment, each linked to one or more merchants that are linked to the loyalty program; (d) a means for associating a plurality of transactions occurring at the one or more point of sale facilities with the loyalty engine; (e) a database enabling the recording of information for each of the plurality of transactions, the loyalty engine defining rules for making contributions to the one or more supported organizations based on the transactions and directing contributions to the one or more supported organizations based on the rules; and (f) an interface for enabling each of the one or more merchants to access analytic information relating to the plurality of transactions.

This implementation further provides a computer program comprising computer instructions which when loaded on a server computer connected to the Internet are operable to provide a web application defining a loyalty engine for promoting contributions to supported organizations, characterized in that the loyalty engine is operable to define a loyalty program by performing the steps of: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling each of the one or more local or regional merchants to access analytic information relating to the plurality of transactions and to increase the number of or revenue from future transactions based on the analytic information.

In another aspect of this implementation, there is provided a system for providing a loyalty program, the system comprising: a loyalty engine comprising a data storage device and a processor for configuring a loyalty program, wherein the loyalty program generates one or more member profiles and one or more merchant profiles, wherein each of the one or more member profiles defines demographic data, financial card data, supported organization data, a member identification, and mobile device information, wherein each merchant profile defines a merchant identification and a location, wherein the loyalty engine creates rewards for members of the loyalty program using the demographic data, the supported organization data, and the locations associated with the merchants; a mobile device utility providing an interface between the loyalty engine and one or more mobile devices to enable optimal transacting between the loyalty engine and the one or more mobile devices, wherein the mobile device utility is configured to: interface with location tracking hardware of a mobile device of the one or more mobile devices to determine that the mobile device location is within a predefined distance of a location identified in a merchant profile of the one or more merchant profiles, wherein the mobile device is identified by mobile device information defined in a member profile of the one or more member profiles, wherein a member is identified by member identification in the member profile; transmit a reward of the rewards of the loyalty program to the mobile device at approximately a time when the mobile device is within the predefined distance of the location identified in a merchant profile, wherein the reward relates to a merchant identified by merchant identification in the merchant profile identifying the location, wherein the reward comprises a machine readable code, wherein the reward triggers contributions to the one or more supported organizations based on a transaction between the member and the merchant; wherein the loyalty engine: receives transaction data for a transaction between the member and the merchant, the transaction processing at a point of sale facility at the location, the transaction data indicating the merchant identification, a transaction amount, a date, a time, an indication that payment for the transaction involved the mobile device, and an indication of the reward; determines, using the transaction data, that the transaction involved redemption of the reward initiated via the machine readable code; and generates signals for directing a contribution amount for a contribution to the one or more supported organizations based on the reward redemption.

Still Other Automated Merchant Boarding Implementations

As disclosed in U.S. patent application Ser. No. 14/686,247, filed on Apr. 14, 2015, titled Systems and methods for loyalty programs, which is hereby incorporated by reference, in one computerized implementation, the ALLIANCE as depicted in FIGS. 3-6, can be operated in conjunction with a yet further implementation in which there are provided methods, devices and media for a pre-enrollment registration system. The method includes: receiving signals representing pre-enrollment data, the pre-enrollment data including profile information associated with at least one prospective member; generating, with the at least one processor, a registration identifier for each of the at least one prospective members; storing each of the registration identifiers in association with the respective prospective member profile information; receiving, at the at least one processor, signals representing a registration request including the registration identifier associated with a requesting prospective member; generating, with the at least one processor, signals for displaying an interface, the interface including a plurality of profile fields, wherein at least one of the profile fields are pre-populated with at least a portion of the profile information associated with the requesting prospective member; and receiving signals for modifying or confirming the pre-populated profile fields.

In accordance with one aspect of this implementation, there is provided a method for a pre-enrollment registration system. The method includes: receiving, at at least one processor, signals representing pre-enrollment data, the pre-enrollment data including profile information associated with at least one prospective member; generating, with the at least one processor, a registration identifier for each of the at least one prospective members; storing each of the registration identifiers in association with the respective prospective member profile information; receiving, at the at least one processor, signals representing a registration request including the registration identifier associated with a requesting prospective member; generating, with the at least one processor, signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

In accordance with another aspect of this implementation, there is provided a computing device for a pre-enrollment registration system. The computing device includes: at least one processor configured for: receiving signals representing pre-enrollment data, the pre-enrollment data including profile information associated with at least one prospective member; generating a registration identifier for each of the at least one prospective members; storing each of the registration identifiers in association with the respective prospective member profile information; receiving signals representing a registration request including the registration identifier associated with a requesting prospective member; generating signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

In accordance with another aspect of this implementation, there is provided a non-transitory computer-readable medium or media having instructions stored thereon. The instructions when executed by at least one processor, configure the at least one processor for: receiving signals representing pre-enrollment data, the pre-enrollment data including profile information associated with at least one prospective member; generating a registration identifier for each of the at least one prospective members; storing each of the registration identifiers in association with the respective prospective member profile information; receiving signals representing a registration request including the registration identifier associated with a requesting prospective member; generating signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

Golfing Card Implementations

As disclosed in U.S. patent application Ser. No. 10/855,327, filed on May 28, 2004, title Method, system and computer program for providing a loyalty engine enabling dynamic administration of loyalty programs, which is hereby incorporated by reference, in one computerized implementation, the ALLIANCE as depicted in FIGS. 3-6, can be operated in conjunction with a yet further implementation in which there are provided method, computer system, and computer program product for encouraging customer loyalty. The method includes the steps of: (1) one or more members defining a loyalty program, the loyalty program defining loyalty reward points associated with one or more activities; (2) registering one or more participants with the loyalty program, whereby their registration includes the provision of financial card data for one or more financial cards of each of the one or more participants; (3) collecting financial data corresponding to transactions of the one or more participants associated with the one or more members, and providing said financial data to a loyalty engine; (4) providing access to the loyalty engine to the one or more members, the loyalty engine permitting the one or more members: (a) to define the rules defining the loyalty program, including accumulation of loyalty reward points, and redemption of loyalty reward points; (b) monitoring the effectiveness of the loyalty program; and (c) modifying the loyalty program to enhance its effectiveness. The computer system includes the loyalty engine. The computer program product consists of a server application that includes the loyalty engine. Members access a number of software utilities linked to the loyalty engine to assess the effectiveness of the loyalty programs and customize the attributes of the loyalty programs on the fly to improve effectiveness. Participants access the loyalty engine to access a virtual real time loyalty reward point account, and redeem loyalty reward points for prizes.

One aspect of this implementation is a method of encouraging customer loyalty, including the steps of (1) One or more members defining a loyalty program, the loyalty program defining loyalty rewards associated with one or more activities; (2) Registering one or more participants with the loyalty program, whereby their registration includes the provision of financial card data for one or more financial cards of each of the one or more participants; (3) Collecting financial data corresponding to transactions of the one or more participants associated with the one or more members, and providing said financial data to a loyalty engine; (4) Providing access to the loyalty engine to the one or more members, the loyalty engine permitting the one or more members: (a) To define the rules defining the loyalty program, including accumulation of loyalty reward points, and redemption of loyalty reward points; (b) Monitoring the effectiveness of the loyalty program; and (c) Modifying the loyalty program to enhance its effectiveness.

Another aspect of this implementation is a computer system that includes the described loyalty engine. Another aspect is a computer program product consisting of the loyalty engine.

In a particular aspect of this implementation, the completion of a survey is linked to the accumulation of loyalty reward points.

In yet another particular aspect of this implementation, loyalty reward points are redeemed by the participant printing a coupon displayed by the loyalty engine, and presenting the coupon at a location of the applicable member.

In a still other aspect of this implementation, a method, computer system, and computer program product is provided that enables a plurality of members to co-operate to provide loyalty benefits jointly, by operation of the loyalty engine.

Click2Sale Implementations

As disclosed in U.S. patent application Ser. No. 12/944,474, filed on Nov. 11, 2010, titled Program, system and method for linking community programs and merchants in a marketing program, now U.S. Pat. No. 9,111,295, which is hereby incorporated by reference, in one computerized implementation, the ALLIANCE as depicted in FIGS. 3-6, can be operated in conjunction with a yet further implementation in which there are provided a system, data access management utility and a method of generating links between local merchants and community programs, whereby the merchant may provide incentives to customers in relation to community programs. Implementations may track community programs, as well as both online and offline customer transactions between participants that make use of the incentive. Implementations may include as participants, customers, merchants, community organizations, intermediaries, and other groups or individuals. Participants may have participant identifiers, which may be linked to a payment source. Data may be collected about all participants, either expressly, or from offline or online transactions between participants utilizing a participant identifier, and said data may be stored in a data storage area. All data in the data storage area may be utilized by a logic tool, which may provide information, such as details of consumer behavior and analytic reporting. Matches between transactions and members and/or member activities may be identified by the system, and a level of certainty that the match is accurate may be determined.

In this implementation, a marketing system is operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions, for example the number or value of the transactions, occurring between the one or more merchants and the one or more members.

In another aspect of this implementation, a marketing program method comprises the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Other Click2Sale Implementations

As disclosed in U.S. patent application Ser. No. 14/480,721, filed on Sep. 9, 2014, titled Program, system and method for linking community programs and merchants in a marketing program, which is hereby incorporated by reference, in one computerized implementation, the ALLIANCE as depicted in FIGS. 3-6, can be operated in conjunction with a yet further implementation in which there are provide a system, data access management utility and a method of generating links between local merchants and community programs, whereby the merchant may provide incentives to customers in relation to community programs. This implementation may track community programs, as well as both online and offline customer transactions between participants that make use of the incentive. This implementation may include as participants, customers, merchants, community organizations, intermediaries, and other groups or individuals. Participants may have participant identifiers, which may be linked to a payment source. Data may be collected about all participants, either expressly, or from offline or online transactions between participants utilizing a participant identifier, and said data may be stored in a data storage area. All data in the data storage area may be utilized by a logic tool, which may provide information, such as details of consumer behavior and analytic reporting. Matches between transactions and members and/or member activities may be identified by the system, and a level of certainty that the match is accurate may be determined.

In one aspect, this implementation relates to a marketing system operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions, for example the number or value of the transactions, occurring between the one or more merchants and the one or more members.

In another aspect of this implementation, a marketing program method comprises the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Still Other Click2Sale Implementations

As disclosed in U.S. patent application Ser. No. 14/755,444, filed on Jun. 30, 2015, titled Program, system and method for linking community programs and merchants in a marketing program, now U.S. Pat. No. 9,230,263, which is hereby incorporated by reference, in one computerized implementation, the ALLIANCE as depicted in FIGS. 3-6, can be operated in conjunction with a yet further implementation in which there are provided a system, a data access management utility, and a method of generating links between local merchants and community programs. In this implementation, the merchant may provide incentives to customers in relation to community programs. This implementation may track community programs, as well as both online and offline customer transactions between participants that make use of the incentive. This implementation may include as participants, customers, merchants, community organizations, intermediaries, and other groups or individuals. Participants may have participant identifiers, which may be linked to a payment source. Data may be collected about all participants, either expressly, or from offline or online transactions between participants utilizing a participant identifier, and said data may be stored in a data storage area. All data in the data storage area may be utilized by a logic tool, which may provide information, such as details of consumer behavior and analytic reporting. Matches between transactions and members and/or member activities may be identified by the system, and a level of certainty that the match is accurate may be determined.

In one aspect, this implementation relates to a marketing system operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions, for example the number or value of the transactions, occurring between the one or more merchants and the one or more members.

In another aspect, this implementation relates to a marketing program method comprising the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

Voice Ordered Rewards Implementations

As disclosed in U.S. patent application Ser. No. 14/647,119, filed on May 25, 2015, titled Customer voice order triggered mutual affinity merchant donation, which is hereby incorporated by reference, in one computerized implementation, the ALLIANCE as depicted in FIGS. 3-6, can be operated in conjunction with a yet further implementation in which a customer uses a mobile device to verbally request an offer that includes an incentive to transact at a merchant's brick and mortar store in the customer's local community in exchange for the merchant's agreement to make an auditable donation to a charity serving the local community. Business rules limit the merchant's charitable donations over calendar periods, which donations can be made directly by the merchant to the community charity, or indirectly to the charity by way of a blind donation made by the merchant to a donation disbursement agency acting on the merchant's behalf to satisfy the merchant's commitment to donate.

In this implementation, a consumer using a mobile application to verbally request offers, receive the requested offers, select an offer from among received offers, and confirm the selected offer, where the consumer is incented to the selected offer by terms and conditions that include the selected merchant in the customer's residential community making a donation to an entity to which both the merchant and the consumer have an affinity after the consumer conducts a timely transaction in the selected merchant's physical store.

Embodiments of this implementation relate to a computer-implemented method and server-implemented methods where there is received, from a transmitter, an account holder identifier and digitized audio data containing a request for an offer from a local merchant to local customers to make a purchase from the local merchant in exchange for the local merchant making a donation to a local charity. The request may be derived from the digitized audio data. The derived request may be used to access and retrieve offers each being from a local merchant to local customers to make a purchase from the local merchant in exchange for the local merchant making a donation to a local charity. The retrieved offers may be converted into a digitized audio file and transmitted back to the transmitter. In response, there may be received a digitized audio data containing a selection of one of the retrieved offers. The selected offer is derived from the digitized audio data. Upon receiving information derived from an authorization response for a transaction between the account holder and the local merchant making the selected offer, a message may be sent that contains the donation to be made to the local charity by the local merchant who made the selected offer. After several such message have been sent, each containing the donation to be made to the local charity by local merchant making the selected offer, a calculation may be made of the sum of the donations in the messages. Information may also be received from the local charity as to the total donations that have been made so far by the local merchant who made the selected offers. Any difference between what the local merchant making the selected offers was to donate to the local charity and the local merchant's actual donations may be transmitted for follow up. In some implementations, the donation to be made to the local charity by local merchant making the selected offer is a function, at least in part, of a currency amount of the transaction.

Variations on the foregoing implementations include allowing the customer to specify one or more affinity entities (e.g., charities) providing goods and/or services in their local community to which donations are to made by merchants with whom the customer conducts transactions. In such implementations, each merchant may be given notice of its total periodic obligatory donations. Such notice, however, may be given without providing the merchant with any notice or knowledge as to the specific identity of those affinity entities that are to be its recipients. Such implementations may leave direction of merchants donations fully within the discretion of the merchants customers, limited only by the restriction that the customer can only select affinity entities from among those that serve the local community in common to both the merchant and the customer, while leaving the actual amount of the merchants donation fully within the discretion of the merchant.

Still further variations on the foregoing implementations include deriving a donation to be made by the merchant to the affinity entity for a predetermined time period by using a merchant donation business rule as well as a rule previously specified by the account holder who conducts the transaction with the merchant. By way of example, and not by way of limitation, the merchant's donation business rule may choose the amount of the donation whereas the account holder's rule might choose the affinity entity in the community to which the merchant's donation is to be directed.

In still further implementations, a consumer uses a mobile application to verbally request offers, receive the requested offers, select an offer from among received offers, and confirm the selected offer, where the consumer is incented to the selected offer by terms and conditions that include the selected merchant in the customer's residential community making a donation to an entity to which both the merchant and the consumer have an affinity after the consumer conducts a timely transaction in the selected merchant's physical store.

Still further implementations relate to a computer-implemented method and server-implemented methods where there is received, from a transmitter, an account holder identifier and digitized audio data containing a request for an offer from a local merchant to local customers to make a purchase from the local merchant in exchange for the local merchant making a donation to a local charity. The request may be derived from the digitized audio data. The derived request may be used to access and retrieve offers each being from a local merchant to local customers to make a purchase from the local merchant in exchange for the local merchant making a donation to a local charity. The retrieved offers may be converted into a digitized audio file and transmitted back to the transmitter. In response, there may be received a digitized audio data containing a selection of one of the retrieved offers. The selected offer is derived from the digitized audio data. Upon receiving information derived from an authorization response for a transaction between the account holder and the local merchant making the selected offer, a message may be sent that contains the donation to be made to the local charity by the local merchant who made the selected offer. After several such message have been sent, each containing the donation to be made to the local charity by local merchant making the selected offer, a calculation may be made of the sum of the donations in the messages. Information may also be received from the local charity as to the total donations that have been made so far by the local merchant who made the selected offers. Any difference between what the local merchant making the selected offers was to donate to the local charity and the local merchant's actual donations may be transmitted for follow up. In some implementations, the donation to be made to the local charity by local merchant making the selected offer is a function, at least in part, of a currency amount of the transaction.

Variations on the foregoing implementations include allowing the customer to specify one or more affinity entities (e.g., charities) providing goods and/or services in their local community to which donations are to made by merchants with whom the customer conducts transactions. In such implementations, each merchant may be given notice of its total periodic obligatory donations. Such notice, however, may be given without providing the merchant with any notice or knowledge as to the specific identity of those affinity entities that are to be its recipients. Such implementations may leave direction of merchants donations fully within the discretion of the merchants customers, limited only by the restriction that the customer can only select affinity entities from among those that serve the local community in common to both the merchant and the customer, while leaving the actual amount of the merchants donation fully within the discretion of the merchant.

Still further variations on the foregoing implementations include deriving a donation to be made by the merchant to the affinity entity for a predetermined time period by using a merchant donation business rule as well as a rule previously specified by the account holder who conducts the transaction with the merchant. By way of example, and not by way of limitation, the merchant's donation business rule may choose the amount of the donation whereas the account holder's rule might choose the affinity entity in the community to which the merchant's donation is to be directed.

In yet other implementations, an offer may be provided as a token to customer device 48 for provision to merchant to redeem the offer. The transaction may be completed remotely using the customer device 48. The token may include one or more of a bar code, a QR code, a file, an identifier, the account identifier issued to the customer by the issuer bank so that the token is sufficient to complete the purchase with the merchant. Alternatively, a facial recognition database can be accessed in order to associate a captured image of the customer's face with the account identifier issued to the customer by the issuer bank so that the captured image of the customer's face is sufficient to complete the purchase with the merchant.

Loyalty Program Implementations

As disclosed in U.S. patent application Ser. No. 14/315, 641, filed on Jun. 26, 2014, titled Systems and methods for loyalty programs, which is hereby incorporated by reference, in one computerized implementation, the ALLIANCE as depicted in FIGS. 3-6, can be operated in conjunction with a yet further implementation in which there are provided methods and systems for generating alerts or recommend incentives for a loyalty program that provides incentives to cardholders in connection with transactions between the cardholders and merchants. A merchant is identified. Transaction data reflective of completed transactions are received by way of a network. The transaction data is processed to generate an alert notifying the identified merchant of an event or trend, or to generate a recommended incentive that defines a benefit to be provided by the identified merchant to a cardholder upon the occurrence of an anticipated transaction.

In an aspect of this implementation, there is provided a computer-implemented method of generating alerts for a loyalty program that provides incentives to cardholders in connection with transactions between the cardholders and merchants. The method includes: storing, in an electronic data store, a plurality of rules, each rule of the plurality of rules defining at least one condition for generating an alert; receiving, by way of a network, transaction data reflective of completed transactions; identifying a merchant; identifying an event or trend by applying at least one rule of the plurality of rules to the received transaction data; and generating an alert to notify the identified merchant of the identified event or trend.

In another aspect of this implementation, there is provided a system for generating alerts for a loyalty program that provides incentives to cardholders in connection with transactions between the cardholders and merchants. The system includes at least one processor; an electronic data store storing a plurality of rules, each rule of the plurality of rules defining at least one condition for generating an alert; a network interface; memory storing instructions executable at the at least one processor to cause the system to: receive, by way of the network interface, transaction data reflective of completed transactions; identify a merchant; identify an event or trend by applying at least one rule of the plurality of rules to the received transaction data; and generate an alert notifying the identified merchant of the identified event or trend.

In a further aspect of this implementation, there is provided a computer-implemented method of generating recommended incentives to cardholders in connection with transactions between the cardholders and merchants. The method includes: receiving, by way of a network, transaction data reflective of completed transactions; processing the received transaction data to identify at least one cardholder attribute; identifying a merchant; identifying at least one cardholder; identifying an anticipated transaction between the merchant and the at least one cardholder; and generating a recommended incentive for the identified at least one cardholder based on the at least one cardholder attribute, wherein the recommended incentive defines a benefit to be provided by the identified merchant to the identified at least one cardholder upon the occurrence of the anticipated transaction.

In yet another aspect, there is provided a system for generating recommended incentives to cardholders in connection with transactions between the cardholders and merchants. The system includes: at least one processor; a network interface; memory storing instructions executable at the at least one processor to cause the system to: receive, by way of the network interface, transaction data reflective of completed transactions; process the received transaction data to identify at least one cardholder attribute; identify a merchant; identify at least one cardholder; identify an anticipated transaction between the merchant and the at least one cardholder; and generate a recommended incentive for the identified at least one cardholder based on the at least one cardholder attribute, wherein the recommended incentive defines a benefit to be provided by the identified merchant to the identified at least one cardholder upon the occurrence of the anticipated transaction.

In a yet further aspect of this implementation, there is provided a computer-implemented method of providing charitable incentives. The method includes: identifying a charity and a plurality of donors associated with the charity, wherein the plurality of donors comprise cardholders or potential cardholders for a loyalty program; identifying a merchant; identifying an anticipated transaction between the merchant and a donor of the plurality of donors; and selecting an incentive based on the charity, attributes of the plurality of donors, the identified merchant, and the identified anticipated transaction, wherein the incentive defines a benefit to be provided by the merchant to the charity upon the occurrence of the anticipated transaction.

Transaction Verification Implementations

As disclosed in U.S. patent application Ser. No. 14/554,907, filed on Nov. 26, 2014, titled Systems and methods for transaction verification, which is hereby incorporated by reference, in one computerized implementation, the ALLIANCE as depicted in FIGS. 3-6, can be operated in conjunction with a yet further implementation in which there are provided methods, systems and device for verifying a transaction in a loyalty or advertising system. One such method includes: receiving, at least one processor, transaction data associated with a transaction between a customer and a merchant; determining, at the at least one processor, from the transaction data whether the customer and the merchant are associated with the loyalty or advertising system; and upon determining from the transaction data whether the transaction corresponds to a reward or advertisement, triggering the redemption of the reward or advertisement.

In accordance with one aspect of this implementation, there is provided a method for verifying a transaction in a loyalty or advertising system. The method includes: receiving, at least one processor, transaction data associated with a transaction between a customer and a merchant; determining, at the at least one processor, from the transaction data whether the customer and the merchant are associated with the loyalty or advertising system; and upon determining from the transaction data whether the transaction corresponds to a reward or advertisement, triggering the redemption of the reward or advertisement.

In accordance with another aspect of this implementation, there is provided a loyalty program device comprising at least one processor. The at least one processor is configured to: receive transaction data associated with a transaction between a customer and a merchant; determine, at the at least one processor, from the transaction data whether the customer and the merchant are associated with the loyalty or advertising system; and upon determining from the transaction data whether the transaction corresponds to a reward or advertisement, trigger the redemption of the reward or advertisement.

In accordance with another aspect of this implementation, there is provided a non-transitory, computer readable medium or media having stored thereon computer readable instructions. The instructions, when executed by at least one processor, configure the at least one processor to: receive transaction data associated with a transaction between a customer and a merchant; determine, at the at least one processor, from the transaction data whether the customer and the merchant are associated with the loyalty or advertising system; and upon determining from the transaction data whether the transaction corresponds to a reward or advertisement, trigger the redemption of the reward or advertisement.

Interchange Fees Implementations

As disclosed in U.S. patent application Ser. No. 14/612,823, filed on Feb. 3, 2015, titled Systems and methods for loyalty programs, which is hereby incorporated by reference, in one computerized implementation, the ALLIANCE as depicted in FIGS. 3-6, can be operated in conjunction with a yet further implementation in which there are provide systems, devices and methods for a loyalty system. A method includes receiving, at least one processor associated with a transaction processing system, transaction data associated with a transaction between a customer and a merchant; upon or concurrently with clearing the transaction, determining, with the at least one processor, a membership classification for the transaction; and generating, at the at least one processor, signals for accruing an interchange fee based on the membership classification and the transaction data.

In accordance with aspects of this implementation, there is provided a method for a loyalty system. The method includes: receiving, at least one processor associated with a transaction processing system, transaction data associated with a transaction between a customer and a merchant; upon or concurrently with clearing the transaction, determine, with the at least one processor, a membership classification for the transaction; and generating, at the at least one processor, signals for accruing an interchange fee based on the membership classification and the transaction data.

In accordance with aspects of this implementation, there is provided a transaction processing system comprising: a communication interface for communicating with a transaction initiating device; and at least one processor. The at least one processor is configured to: receive transaction data associated with a transaction between a customer and a merchant; upon or concurrently with clearing the transaction, determine a membership classification for the transaction; and generate signals for accruing an interchange fee based on the membership classification and the transaction data.

Personas Implementations

As disclosed in U.S. patent application Ser. No. 14/858,447, filed on Sep. 18, 2015, titled Systems and methods for loyalty programs, which is hereby incorporated by reference, in one computerized implementation, the ALLIANCE as depicted in FIGS. 3-6, can be operated in conjunction with a yet further implementation in which there are provided systems, methods, devices and computer-readable media for generating incentives for a loyalty system. A method includes: receiving, at at least one processor, data reflective of transactions conducted by a plurality of customers; processing, at the at least one processor, the data to determine a set of attributes for each of the plurality of customers; classifying, at the at least one processor, each of the plurality of customers according to at least one of a plurality of customer groups based on the determined set of attributes; and generating, at the at least one processor, an incentive targeting customers in at least one of the plurality of customer groups.

In accordance with one aspect of this implementation, there is provided a method for generating incentives for a loyalty system. The method includes: receiving, at at least one processor, data reflective of transactions conducted by a plurality of customers; processing, at the at least one processor, the data to determine a set of attributes for each of the plurality of customers; classifying, at the at least one processor, each of the plurality of customers according to at least one of a plurality of customer groups based on the determined set of attributes; and generating, at the at least one processor, an incentive targeting customers in at least one of the plurality of customer groups.

In accordance with another aspect of this implementation, there is provided a method of generating incentives for a loyalty system. The method includes: receiving, at at least one processor, data reflective of transactions conducted by a plurality of customers; processing, at the at least one processor, the data to generate an incentive targeting at least one of the plurality of customers; and presenting the generated incentive in an electronic financial card statement issued to the at least one of the plurality of customers.

In accordance with another aspect of this implementation, there is provided a method of generating incentives for a loyalty system. The method includes: defining a group of customers; generating an incentive targeting the group of customers, the incentive offering a reward when a number of customers responding to the incentive exceeds a pre-defined threshold; transmitting notification of said incentive to the group of customers; monitoring the number of customers who respond to the incentive; in response to the monitoring, providing the offered reward when the number of customers who respond to the incentive exceeds the pre-defined threshold.

In accordance with another aspect of this implementation, there is provided a method of generating incentives for a loyalty system. The method includes: receiving, at at least one processor associated with a transaction processing system, transaction data associated with a transaction between a customer and a merchant; upon or concurrently with clearing the transaction, determine, with the at least one processor, a membership classification for the transaction; generate, at the at least one processor, signals for accruing an interchange fee based on the membership classification and the transaction data.

Rescue, Relief, Recover Implementations

As disclosed in U.S. patent application Ser. No. 14/879,328, filed on Oct. 9, 2015, titled Systems and methods for changing operation modes in a loyalty program, which is hereby incorporated by reference, in one computerized implementation, the ALLIANCE as depicted in FIGS. 3-6, can be operated in conjunction with a yet further implementation in which a method is provided for changing operation modes includes receiving disaster information from trending data, a newsfeed, or an alert message; upon detecting at least one redirection trigger from the disaster information, configuring a loyalty system to operate in a redirection mode; receiving or accessing data associated with a transaction between a customer and a merchant; determining, from at least one of customer information and merchant information in the data associated with the transaction, a donation amount and a location associated with the transaction; when the loyalty system is configured to operate in a redirection mode, generating signals to cause accrual of at least a portion of the donation amount to a redirection account based on the location associated with the transaction; and generating signals to cause accrual of any remaining portion of the donation amount to one or more defined donation accounts based on charity catchment area parameters.

In accordance with one aspect of this implementation, there is provided a system for changing operation modes for a loyalty program. The system includes: at least one memory; and at least one processor. The at least one processor is configured to: receive disaster information from trending data, a newsfeed, or an alert message; upon detecting at least one redirection trigger from the disaster information, configure the system to operate in a redirection mode; receive or access data associated with a transaction between a customer and a merchant; determine, from at least one of customer information and merchant information in the data associated with the transaction, a donation amount and a location associated with the transaction; when the system is configured to operate in a redirection mode, generate signals to cause accrual of at least a portion of the donation amount to a redirection account based on the location associated with the transaction; and generate signals to cause accrual of any remaining portion of the donation amount to one or more defined donation accounts based on charity catchment area parameters.

In accordance with another aspect of this implementation, there is provided a method for changing operation modes in a loyalty system. The method includes: receiving disaster information from trending data, a newsfeed, or an alert message; upon detecting, by at least one processor, at least one redirection trigger from the disaster information, configuring the loyalty system to operate in a redirection mode; receiving or accessing data associated with a transaction between a customer and a merchant; determining, from at least one of customer information and merchant information in the data associated with the transaction, a donation amount and a location associated with the transaction; when the loyalty system is configured to operate in a redirection mode, generating signals to cause accrual of at least a portion of the donation amount to a redirection account based on the location associated with the transaction; and generating signals to cause accrual of any remaining portion of the donation amount to one or more defined donation accounts based on charity catchment area parameters.

In accordance with another aspect of this implementation, there is provided a computer-readable medium or media having stored thereon computer-readable instructions. When executed by at least one processor, the computer-readable instructions configure the at least one processor for: receiving disaster information from trending data, a newsfeed, or an alert message; upon detecting, by the at least one processor, at least one redirection trigger from the disaster information, configuring a loyalty system to operate in a redirection mode; receiving or accessing data associated with a transaction between a customer and a merchant; determining, from at least one of customer information and merchant information in the data associated with the transaction, a donation amount and a location associated with the transaction; when the loyalty system is configured to operate in a redirection mode, generating signals to cause accrual of at least a portion of the donation amount to a redirection account based on the location associated with the transaction; and generating signals to cause accrual of any remaining portion of the donation amount to one or more defined donation accounts based on charity catchment area parameters.

Siri-Surview Implementations

As disclosed in U.S. patent application Ser. No. 14/973,918, filed on Dec. 18, 2015, titled Devices, systems and methods for managing feedback in a network of computing resources, which is hereby incorporated by reference, in one computerized implementation, the ALLIANCE as depicted in FIGS. 3-6, can be operated in conjunction with a yet further implementation in which a network communication system is provided for exchanging feedback data between merchant systems and cardholder devices. Cardholder devices receive and process speech signals for feedback requests and generate speech signals for feedback responses. A feedback component has a text to speech processor for generating the speech signals for the feedback requests using feedback request data records, and a speech to text processor for generating feedback response data records by transforming the speech signals for feedback responses. A notification management processor manages transmissions of the speech signals for feedback requests by determining, for each feedback request, a respective delivery notification delay.

In accordance with one aspect of this implementation, there is provided a network communication system for feedback that has one or more merchant systems. Each merchant system has a transaction processing device for triggering transmission of a transaction notification alert, and a location device for generating and transmitting location data for the one or more merchant systems. The network communication system has a transaction notification system for collecting transaction notification alerts from the one or more merchant systems and transmitting a transaction notification data feed compiling the collected transaction notification alerts. The network communication system has one or more cardholder devices configured to receive and process speech signals for feedback requests and generate speech signals for feedback responses, wherein the cardholder devices comprise location detection hardware for generating location data for the one or more cardholder devices. The network communication system has a feedback component that has a text to speech processor for generating the speech signals for the feedback requests using feedback request data records. The feedback component has a speech to text processor for generating feedback response data records by transforming the speech signals for feedback responses received from the one or more cardholder's devices. The feedback component has notification management processor for managing transmissions of the speech signals for feedback requests by determining, for each feedback request, a respective delivery notification delay. The feedback component has a transceiver for transmitting and receiving the feedback request data records and the feedback response data records. The transceiver transmits a portion of the feedback request data records or the speech signals for feedback requests after expiration of the respective determined delivery delay in response to a location notification. The feedback component has a network interface for connecting to the one or more merchant systems, one or more cardholder devices and the transaction notification system for data exchange. The feedback component has location tracking hardware for correlating the location data for the one or more cardholder devices to the location data for the one or more merchant systems to generate the location notification to trigger the transmission of the speech signals for feedback requests. The feedback component has one or more data stores for storing feedback request data records and the feedback response data records.

In accordance with another aspect of this implementation, there is provided a method for managing feedback communications in a network of computing resources. The method includes: receiving, by at least one processor, at least one transaction communication, the at least one transaction communication including data associated with an electronic transaction involving a payment identifier associated with a customer profile; initiating signals to cause a trigger handler to establish a trigger condition for initiating a feedback acquisition based on the data associated with the electronic transaction; and upon detection of the trigger condition, initiating signals to cause a input device to receive feedback input.

In accordance with another aspect of this implementation, there is provided a non-transitory, computer readable medium or media having stored thereon computer-interpretable instructions. When executed by at least one processor, the computer-interpretable instructions configure the at least one processor for: receiving at least one transaction communication, the at least one transaction communication including data associated with an electronic transaction involving a payment identifier associated with a customer profile; initiating signals to cause a trigger handler to establish a trigger condition for initiating a feedback acquisition based on the data associated with the electronic transaction; and upon detection of the trigger condition, initiating signals to cause a input device to receive feedback input.

Emotional/Biometric Rewards Implementations

As disclosed in U.S. patent application Ser. No. 14/757,622 filed on Dec. 23, 2015, titled System and methods for dynamically generating loyalty program communications based on a monitored physiological state, which is hereby incorporated by reference, in one computerized implementation, the ALLIANCE as depicted in FIGS. 3-6, can be operated in conjunction with a yet further implementation in which a method is provided for dynamically generating a loyalty program communication based on a monitored physiological state. The method includes monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

In accordance with one aspect of this implementation, there is provided a method of dynamically generating loyalty program communications based on a monitored physiological state. The method includes: monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

In accordance with another aspect of this implementation, there is provided a system for dynamically generating loyalty program communications based on a monitored physiological state. The system includes at least one processor configured for: monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

In accordance with another aspect of this implementation, there is provided a non-transitory computer-readable medium or media having stored thereon computer interpretable instructions. When executed by at least one processor, the instructions configure the at least one processor for: monitoring, with at least one processor, input data detected with at least one sensor coupled to an electronic device associated with a member profile; based on the monitored input data, for one or more of the at least one sensor, generating a baseline sensor input level associated with a baseline physiological state for the member profile; upon detection of a deviation of the monitored input data for one or more of the at least one sensor from the baseline sensor input level, identifying a non-baseline physiological state for the member profile; and based on the identified non-baseline physiological state, generating signals for communicating a loyalty program communication to the electronic device associated with the member profile.

Colored Hearts and National Pride Implementations

As disclosed in U.S. patent application Ser. No. 15/437,221, filed on Feb. 20, 2017, titled Loyalty program incenting merchant transaction with consumer affinity, which is hereby incorporated by reference, in one computerized implementation, the ALLIANCE as depicted in FIGS. 3-6, can be operated in conjunction with a yet further implementation in which a method is provided for dynamically displaying visual identifiers. The method includes receiving transaction data associated with a transaction between a registered customer and a registered merchant; based on a customer identifying data in the transaction data, determine a heart group associated with a customer profile of the registered customer; update a heart group score for a merchant profile of the registered merchant based on the received transaction data; and controlling display of a visual identifier associated with the heart group at a display associated with the merchant based on the heart group score.

In accordance with one aspect of this implementation, there is provided a method of dynamically displaying a visual identifier on a device associated with a registered customer. The method includes receiving transaction data associated with a transaction between the registered customer and a registered merchant, determining, from identifying data in the transaction data, each of one or more affinities associated with a customer profile of the registered customer and a merchant profile of the registered merchant, when a request is received from the device associated with the registered customer for a display a web page having a display information associated with the registered merchant, and when one said affinity is determined to be associated with both the customer profile of the registered customer and the merchant profile of the registered merchant, sending, in response to the request, rendering information to enhance a rendering of the requested web page on the device associated with the registered customer, wherein the rendering information includes the visual identifier associated with the one said affinity.

Artificial Intelligence Implementations

As disclosed in U.S. patent application Ser. No. 15/924,611, filed on Mar. 19, 2018, titled "Artificial Intelligence Engine Incenting Merchant Transaction with Consumer Affinity", which is hereby incorporated by reference, in one computerized implementation, the ALLIANCE as depicted in FIGS. 3-6, can be operated in conjunction with a yet further implementation in which a loyalty program method incents a registered customer to conduct a transaction with a registered merchant. The method data mines transaction data between registered merchants and registered customers with an artificial intelligence engine operated by a supercomputer. The method predicts the likelihood that an offer having an incentive will be accepted by a registered customer by conducting a transaction with the registered merchant. The incentive can be a donation by the merchant to an entity with which the registered customer has an affinity in exchange for the registered customer by conducting a transaction with the registered merchant.

In this implementation, there is provided a method of using an artificial intelligence engine to predict an offer that is likely to incent a loyalty program member to conduct a transaction with a merchant on an account associated with a financial card registered with a loyalty program, where the predicted offer includes an incentive from the merchant to donate to an entity with which the loyalty program member is likely to have an affinity.

In accordance with another aspect of this implementation, there is provided a method of performing data mining with an artificial intelligence engine upon transaction data between merchants and loyalty program members to predict an offer that is likely to incent one or more such loyalty program members to conduct transactions with a merchant registered with a loyalty program on their respective accounts registered with the loyalty program, where the predicted offer include an incentive from the registered merchant to donate to an entity with which each such loyalty program member is likely to have an affinity.

In accordance with yet another aspect of this implementation, there is provided a loyalty program method for incenting a registered customer to conduct a transaction with a registered merchant, where the method performs data mining upon transaction data between registered merchants and registered customers with an artificial intelligence engine operated by a supercomputer, and where the method predicts the likelihood that an offer having an incentive will be accepted by a registered customer by conducting a transaction with the registered merchant.

In accordance with still another aspect of this implementation, there is provided a loyalty program method for incenting a registered customer to conduct a transaction with a registered merchant, where the method performs an artificial intelligence algorithm the purpose of which is to reduce fraud and the risk of fraud, wherein data mined from the artificial intelligence algorithm is shared with and among ALLIANCE members such as payment networks and issuers so that members can enhance their respective and/or collective data points for fraud analysis.

In accordance with yet another aspect of this implementation, there is provided a loyalty program method for incenting a registered customer to conduct a transaction with a registered merchant by the merchant's agreement to make donation to an affinity entity of the customer's choice. In this method, data mining is performed upon data collections regarding customers who, in the past, have been so incented to transact with merchants who agreed to make donation to an affinity entity of the customer's choice. The mined data is subjected to artificial intelligence algorithms the purpose of which is to identify new customers who are likely to be similarly incented. Examples of the types of data being mined include active and passively collected voice, facial recognition, and image capture data (e.g., internet-connected smart home appliance customer input-output data, internet-of-things (IOT) appliance customer input-output data, internet-connected Amazon Echo and Amazon Echo Camera data, geographic location data, social-economic demographics data, customer satisfaction survey data, customer input-output social network data, customer input-output search engine data, customer transaction data. In such implementations, measured results for such data that pertains to each such customer that participated in the ALLIANCE can be assessed in order to rate or grade each customer relative to that customers likelihood of influencing others to participate in begin or increase participation in the ALLIANCE. The effect of a customer achieving a high rating or grade can be that the customer will be issued an account by an issuer that has special benefits, or that the customer's future transactions in the ALLIANCE will result in increased merchant donations to the customer's charities of choice, or other such customer benefit. As more customers reach high ratings or grades, the overall increase in customer participation in the ALLIANCE will increase as those highly rated or graded customers influence others to participate in the ALLIANCE.

Blockchain Loyalty Program Implementation

As disclosed in U.S. Provisional Application Ser. No. 62/688,814, filed on Jun. 22, 2018, titled "Blockchain Tracking and Managing of A Transaction Incented By A Merchant Donation To A Consumer Affinity", which is incorporated by reference, in one computerized implementation, the ALLIANCE as depicted in FIGS. 3-6, can be operated in conjunction with a yet further implementation in which there is provided a loyalty program method for incenting a registered customer to conduct a transaction with a registered merchant by the merchant's agreement to make donation to an affinity entity of the customer's choice. In this method, a loyalty program is provided that allows processes for exchanging points via various systems and redemption options among loyalty program partners by way of blockchain technology that enables a ledger of transactions to be shared across a network of loyalty program participants. In various alternative of this implementation, a digital ledger is maintained in which transactions that are made in loyalty points, ALLIANCE issue currency coins, bitcoins, or another cryptocurrency, are recorded chronologically and publicly. When a new digital transaction occurs for which any of the foregoing loyalty currencies is generated (for example, a loyalty point is issued, redeemed, or exchanged), a unique algorithm-generated token is created and assigned to that transaction. Tokens are grouped into blocks (for example, every seven minutes) and distributed across the network, updating every ledger at once. New transaction blocks are validated and linked to older blocks, creating a strong, secure, and verifiable record of all transactions, without the need for intermediaries or centralized databases. As such, consumers, via the blockchain, are provided with instant redemption and exchange for multiple loyalty point currencies on a single platform. Each customer can then be allowed to deal with one (1) account for loyalty points for each of the loyalty program's options, limitations, and redemption rules.

Spot Credit Loyalty Program Implementation

In accordance an implementation, there is provided a loyalty program method for incenting a registered customer to conduct a transaction with a registered merchant by the merchant's agreement to make donation to an affinity entity of the customer's choice. In this method, a loyalty program is provided that allows for the issuance of a spot credit account by an ALLIANCE issuer to an ALLIANCE customer. By way of example, most issuers issue only revolving credit accounts to consumers, the token for which is typically a plastic magstripe or EMV credit card. An issuer bank can implement a system that facilitates on-the-fly issuance of spot credit as an alternative form of credit at the physical or virtual point of sale at which a customer is transacting with a merchant. An example of such a system is the "Margeta" system which is a payments platform that sets up new customer payment cards, configures multiple funding types, and defines how and where cards can be used in real time. For instance, if the card holder is already over the issuer's assigned credit limit but the customer still wants to make an addition credit purchase from the merchant, the issuer, during the authentication cycle as shown in FIGS. 1-3, issues, on-the-fly, a one-time-only 'spot credit' to the card holder. As such, the merchant makes the sale to the customer, the customer completes and takes delivery of the goods and/or services from the merchant, the issue and acquired banks realize interchange revenue, and the customer is not denied credit at the physical or virtual point of sale at which the customer is transacting with the merchant. Still further, this implementation alternative facilitates the merchant making a special, enhanced donation to the customer's charity of choice if the issuer issues 'spot credit' at the POS in order to authorize the purchase. Alternatives would include better donations if spot credit were issued during special calendar periods (e.g., Black Friday, Cyber Monday, slow sales periods).

View to Sale Implementations

As disclosed in U.S. Provisional Application Ser. No. 62/644,569, titled "Linking a Transaction Between a Merchant and a Resident of the Same Vicinity to the Resident Viewing the Merchant Broadcast Advertisement", filed on Mar. 18, 2018, which is incorporated by reference, there are provided a methods, systems, and non-transient computer program products which provide for a merchant's advertisement to be broadcast over a television broadcast network enabled for hyperlocal geo-targeting of merchant's advertisements. The broadcast of these advertisements is received and rendered by each of a corresponding group of television receivers. Each such television receiver that can receive the hyperlocal geo-targeted merchant advertisement will preferably correspond to respective viewers located in a vicinity. The hyperlocal geo-targeted advertisement is accomplished, this implementation, by operating a broadcast method that has an extensible mode of communication in an intelligent heterogeneous network. In an alternative of this implementation, a Next Generation Broadcast Platform (NGBP) Intelligent Heterogeneous network broadcasts content that is interleaved with an advertisement corresponding to a merchant and addressed for broadcast delivery exclusively to a logical address of a television receiver determined to be within the same vicinity as the merchant, where the logical address is coordinated with the local broadcaster so that the television receiver is able to receive and render the hyperlocal geo-targeted advertisement.

Implementations of the Next Generation Broadcast Platform (NGBP) are enabled via the Advanced Television Systems Committee (ATSC) 3.0 standard. ATSC 3.0 is aversion of the ATSC standards for television broadcasting created by the Advanced Television Systems Committee (ATSC). Its capabilities include hyperlocal targeted advertising (geotargeting). Stated otherwise, ATSC 3.0 allows advertisers to run targeted advertising. The targeted ads allow advertisers to track more directly viewer ratings, rather than indirectly by companies such as Nielsen ratings. Next Gen TV (ATSC 3.0) enables television broadcasters to collect data about consumer's viewing habits. That information gives broadcasters the ability to sell targeted advertising against their programming, to help broadcasters understand who is watching the programming, and from where. A used herein, geo-targeting refers to the practice of delivering different content or advertisements to a TV viewer based on his or her geographic location. Geo-targeting is an active response to Geo-location: Having identified the visitor's location according to the IP, and/or WiFi/GPS data (="geo-location"), content specific to that location is served (="geo-targeting").

In one alternative of this implementation, the broadcast method includes the steps of (i) using an extensibility tool to provide an extensible framing structure; (ii) combining a centralized radio access network topology with an intelligent IP core network to enable sharing of spectrum resources; (iii) providing a supplemental return channel to facilitate paging; (iv) gathering user data at the intelligent IP core network and enabling personalized services through paging based on the gathered user data where the personalized services are further enabled based on geographical awareness or geographical location; and (v) providing a hyperlocal service based on geographical awareness via functionality enabled by the intelligent heterogeneous network.

In another alternative of this implementation, there is employed a Next Generation Broadcast Platform (NGBP) that uses Orthogonal Frequency Division Multiplexing (OFDM). Such an alternative of this implementation is disclosed by the Applicant Sinclair Broadcast Group, Inc. of Hunt Valley, Md. as set forth in: (i) U.S. patent application Ser. No. 15/001,014, titled "Next Generation Broadcast Platform Radio Frame Extensibility Broadcast/Unicast TDD In Intelligent Heterogeneous Networks"; and in part in (ii) U.S. patent application Ser. No. 15/679,739, titled "Band Segmented Bootstraps and Partitioned Frames", filed on Mar. 9, 2016, each of which, both collectively and individually being referred to hereinafter as the "Broadcast Technology".

Figure 20:
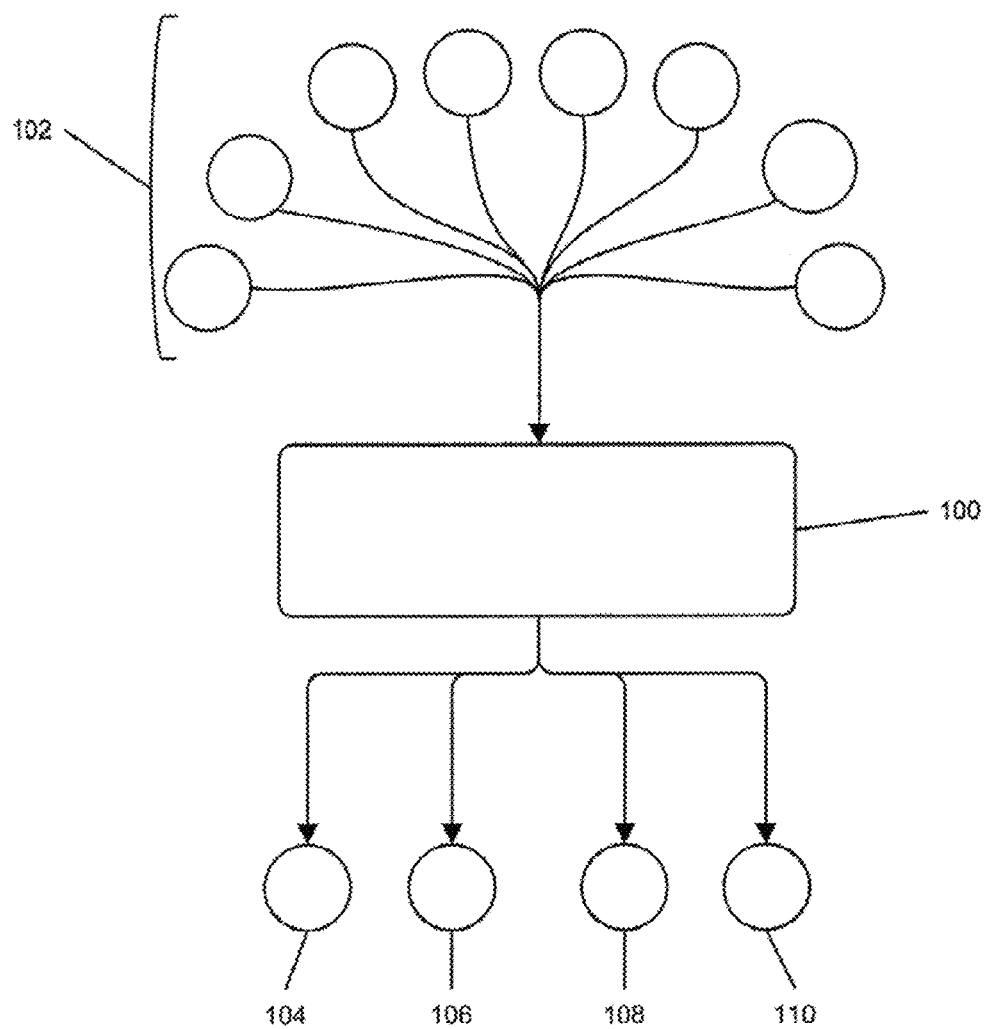
FIG. 20 is a system diagram showing the marketing system outputs that may be generated by the data mining tool, and sometimes the analytic mode, in various implementations.

Referring now to FIG. 20, an exemplary illustration is shown of an intelligent heterogeneous network 100. In particular, hyperlocal services 102, such as personal and geo-fenced merchant advertisements for example, are communicated via an intelligent heterogeneous network using Time Division Duplex (TDD) mode blended synergistically into a tall tower broadcast service 104.

Figure 23:
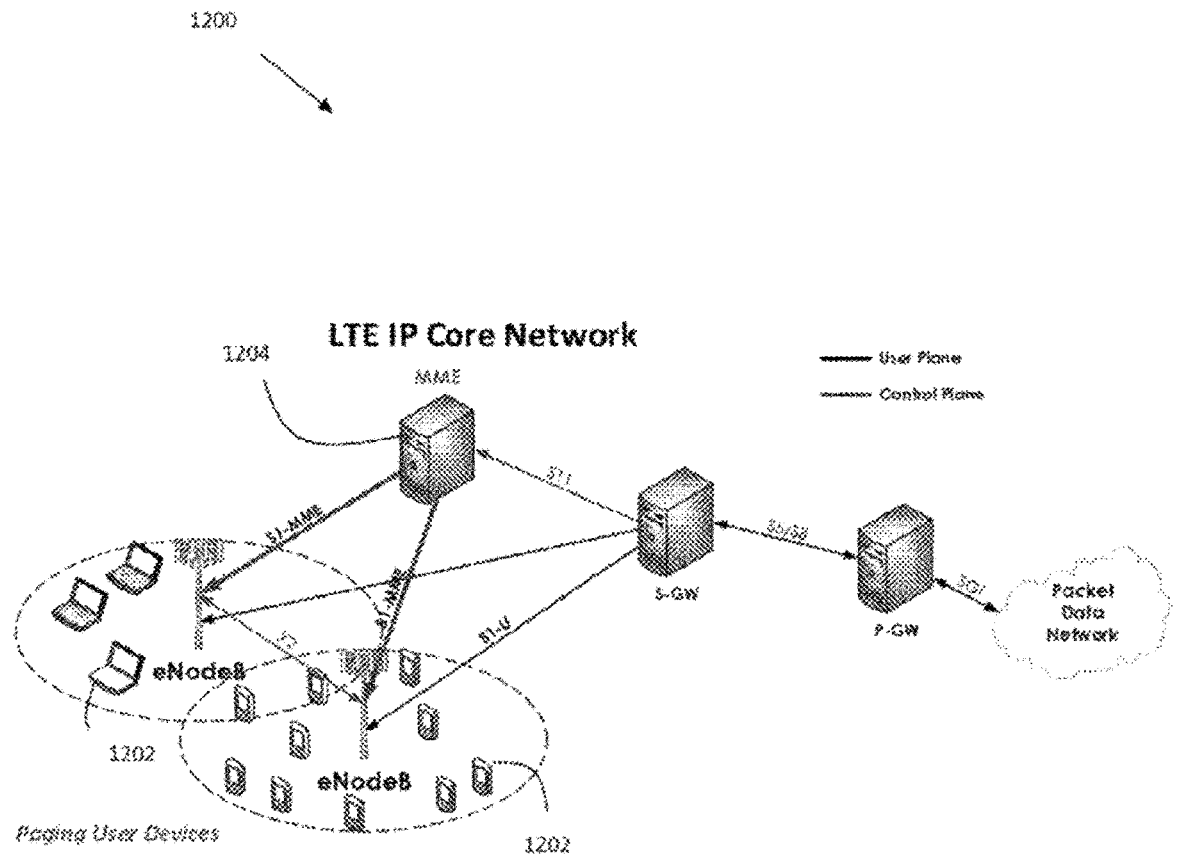
FIG. 23 illustrates an example Network using paging in the Advanced Long Term Evolution (LTE-A) standard.
Figure 24:
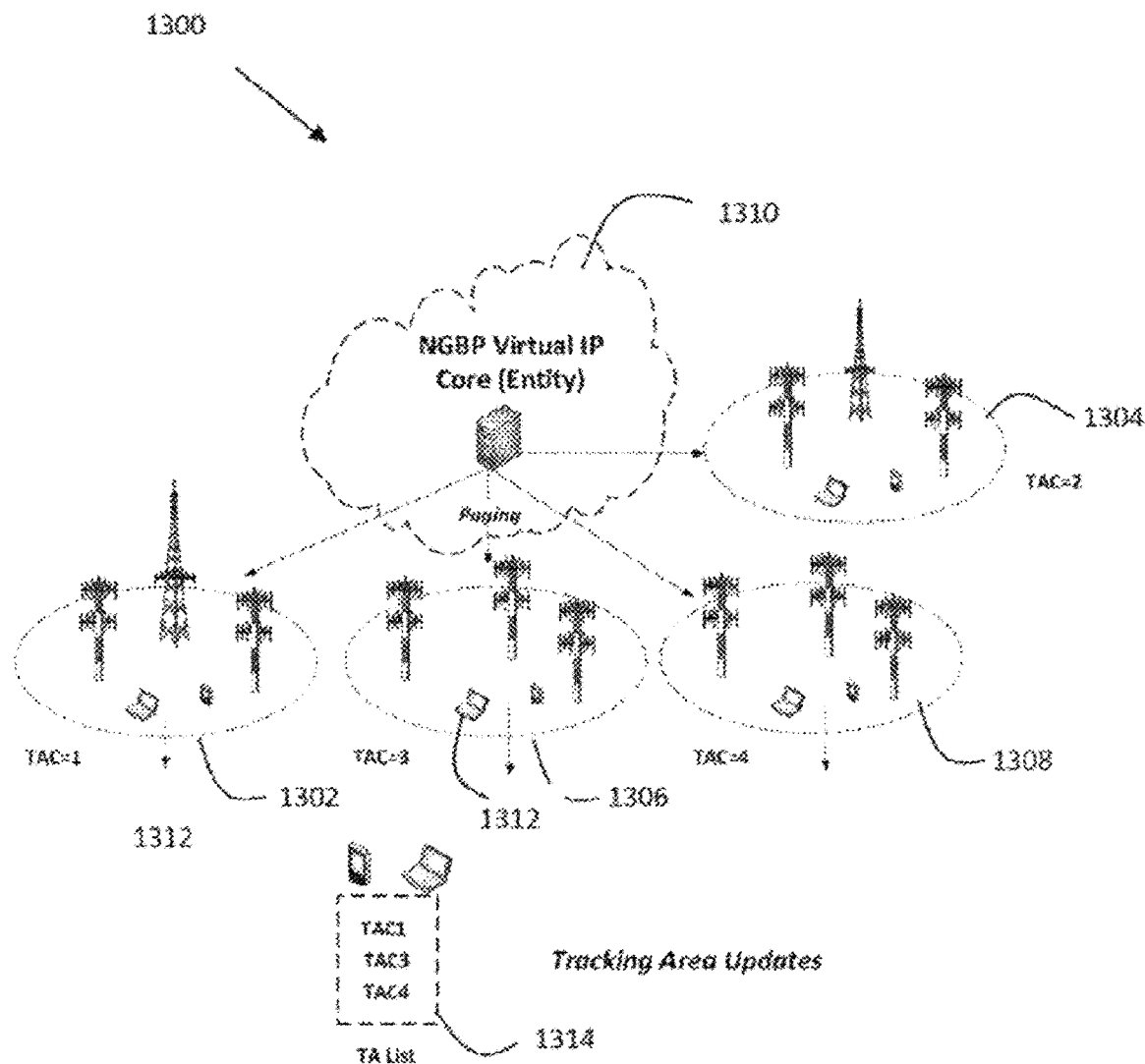
FIG. 24 illustrates an example Next Generation Broadcast Platform (NGBP) Intelligent Heterogeneous network.
Figure 25:
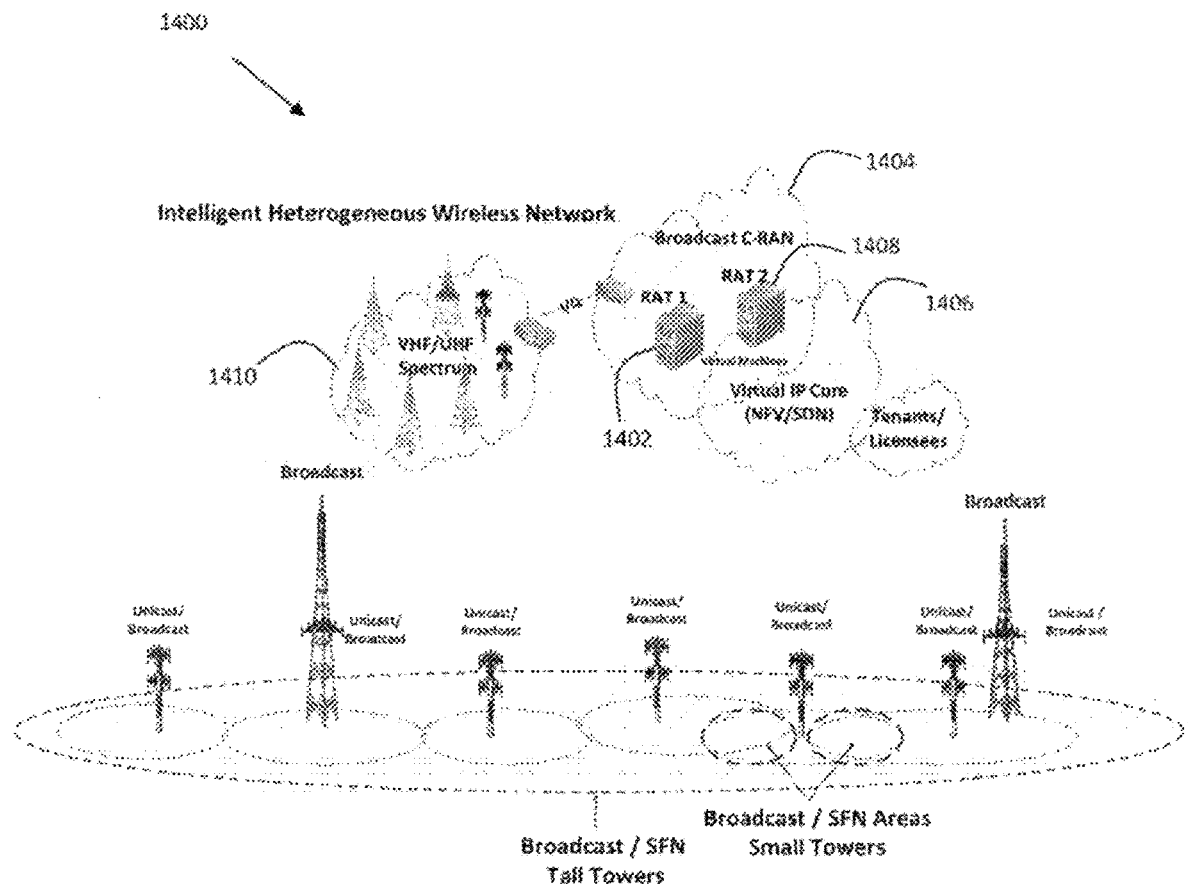
FIG. 25 illustrates an example NGBP Intelligent Heterogeneous network by which broadcast content is interleaved with an advertisement corresponding to a merchant and addressed for broadcast delivery exclusively to a logical address of a television receiver determined to be within the same vicinity as the merchant.

In a still further alternative of the exemplary NGBP implementation, such as is illustrated in FIG. 23-25, there is employed a LTE Paging/Location Area Updates that enable personalization and geo-targeting in a hyperlocal service in NGBP. This enables more value to a broadcaster, in addition to just returning data via a return channel to the Intelligent IP Core in hyperlocal services and other use cases. Such an intelligent IP Core construct in the broadcast architecture enables richer meta data collection on consumers (IP Core) than possible on public Wi-Fi, and can enable broadcast-like use cases.

FIG. 23 is an exemplary illustration of a Network 1200 using paging in LTE-A. In LTE paging, a message originates from an MME entity or an IP core 1204 to notify a terminal 1202 about incoming connection requests. This paging mechanism forms the genesis for an implementation of the NGBP to geo-targeted a merchant's advertisement that is broadcast over a television broadcast network that has been enabled for hyperlocal geo-targeting of merchant's advertisements to viewers located in a vicinity by operating a broadcast method that has an extensible mode of communication in an intelligent heterogeneous network. In this alternative implementation, by using paging on the schedule controlled by a broadcaster, the location of a customer will reside in the IP Core database along with other data specific to a registered user Referring now to FIG. 24, an exemplary illustration is shown of an example Network NGBP Intelligent Heterogeneous network 1300. In this embodiment, a data terminal 1312 is located in Tracking Area (TA) 1306. It should be appreciated that Tracking Areas 1302, 1304, 1306, and 1308 are planned by broadcasters. Next, the entity in NGBP IP Core network 1310, which is responsible for paging, considers that the Terminal 1312 is located in, say, TA 1306. When the network 1300 sends a wake-up signal to signify data is on the way, it sends a paging message to terminal 1312 in TA3 1306 via IP Core entity 1310 as shown. Data terminal 1312, which is in idle state, wakes up at certain periods, which may be defined by Broadcasters, in one example, to check for a paging message to see if there is any incoming data. If data terminal 1312 finds it has been paged by NGBP IP Core network 1310, it turns back to active state to receive the data. Otherwise, data terminal 1312 conserves energy usage in the idle mode.

As illustrated in FIG. 24, the NGBP network 1310 has updated location information about data terminals 1312 in the idle state to find out in which of TA 1302, 1304, 1306, and 1308 a particular data terminal 1312 is located. For this, the protocol is for the data terminal 1312 to notify the NGBP network 1310 of its current location by sending a TAU message every time it moves between defined Tracking Areas 1302, 1304, 1306, and 1308. The data terminal 1312 also maintains an active Tracking Area List 1314.

Referring now to FIG. 25, an exemplary illustration is shown of an example Intelligent Heterogeneous Wireless Network (NFV/SDN) 1400 for terrestrial broadcast topologies. The network 1400 is designed for "Service" and not just "Coverage", where the blending of terrestrial off-air and Internet-delivered video and media leveraging is enabled for both wireless and wireline (heterogeneous) networks. As such, TV Everywhere can be accommodated by network 1400.

TV service Everywhere implementations include "hyperlocal" implementations to enhance news and other programming by including within broadcasts the broadcast of a merchant's advertisement. In particular, the merchant's advertisement is broadcast over a television broadcast network that is enabled for hyperlocal geo-targeting of the merchant's advertisements to viewers located in a vicinity. The hyperlocal geo-targeting of the merchant's advertisements is accomplished by operating a broadcast method that has an extensible mode of communication in an intelligent heterogeneous network. Such Next Generation Broadcast Platform (NGBP) implementations advantageously allow broadcasters to increase advertising revenue by including local targeting down to a particular vicinity, such as at a neighborhood level. If a viewer residing in the neighborhood provides a personal profile that includes personal preferences, for example, and this is known in the IP Core network, then geo-targeted hyperlocal advertisements of merchants located in the neighborhood can be directed to the viewer directly to match the viewer's personal preferences. With the benefit of each viewer's personal preferences, a local TV station can enable a TV show that is being broadcast to include a merchant's advertisement so that it will be viewed by some, but not all, viewers that are located in the same vicinity, even though the viewers are watching the same broadcast content (e.g., the same TV show).

A still further implementation involves the use of the physical resources of the Intelligent Heterogeneous Wireless Network abstracted and under centralized NFV/SDN software control and orchestration and using, in part, the extensible tools described the Broadcast Technology. The Broadcast Technology enables a broadcast optimized network with supplemental unicast added to deliver the TV Everywhere experience regardless of the device and in specific geographic areas. As such, with the Intelligent Heterogeneous Wireless Network, hyperlocal or local services targeting specific geographic areas for entertainment are enabled so as to include the broadcast of a merchant's advertisement over a television broadcast network that is enabled for hyperlocal geo-targeting of merchant's advertisements to viewers located in a vicinity.

The Sinclair Broadcast Group Technology, as well as other implementors of the Next Gen TV (ATSC 3.0) technology standard and variations on and enhancements thereof, enable a local broadcaster (e.g., TV station) to targeting a specific hyperlocal advertisement to a local consumer via the Next Gen TV (ATSC 3.0) technology. Next Gen TV, among other things, enables the local broadcaster to collect data about a consumer's viewing habits—such as knowing who is watching a broadcast and when the broadcast is being watched.

The Next Gen TV technology enables hyperlocal geo-targeted advertisements to be placed on a broadcaster's internet webpage, where the advertisements feature local advertisers (e.g., a local merchant). Each such advertisement can correspond to an advertisement that is also to be broadcast over the broadcaster's television broadcast medium (e.g., a local TV show). A browser user (e.g. a consumer) can 'click on' that advertisement to follow up on an incentive in the advertisement from a merchant.

The Next Gen TV technology is particularly advantageous in its ability to coordinate with specific local broadcast television receivers. This coordination allows the television receivers to both receive and render the corresponding hyperlocal geo-targeted advertisement during its broadcast over the broadcaster's broadcast medium (e.g., during a local TV show). Note that a local merchant's hyperlocal geo-targeted advertisement, when broadcast by use of the Next Gen TV technology, will target the advertisement to each of particular coordinated group of television receivers (e.g., set top boxes, smart TVs, web enabled mobile computing devices, smart phones, etc.) As such, the local merchant can arrange for the broadcast of an advertisement that features an offer for which local consumers in the same vicinity as the merchant will have a propensity to transaction with the merchant. By geo-targeting the consumer's specific local broadcast receiver by way of a media broadcasting environment having the capability to target the specific local ad to the specific local broadcast receiver via the Advanced Television Systems Committee (ATSC) 3.0 standards, the merchant's advertising spend with the local broadcaster is made more efficient. Stated otherwise, the broadcaster's technology is such that it can validate that the consumer was likely to have watched the broadcast of the local merchant's ad. Thus, a measured result of the merchant's advertising spend on broadcasting hyperlocal geo-targeted advertisement can be derived by linking customers viewing the ad to sales to those customers by the merchant via the View-To-Sale technology disclosed and enabled in this Application.

Information about consumers that has been passively or actively acquired to identify each consumer can identify each consumer with a physical location that is a known distance from the physical location of the local advertiser. The consumer's residence and broadcast receiver (e.g., set top box) will preferable be located near the merchant's physical address such that each such identified local consumer will be likely to have a propensity to transact with the local merchant due to the close proximity of the merchant to the consumer.

The local and proximate consumer, within a predetermined time period, will conduct a debit or credit transaction with the local advertiser (e.g., a local merchant) after having viewed the merchant's hyperlocal geo-targeted advertisement in local broadcast that was received and rendered by the consumer's television receiver (e.g., set top box and/or web enabled mobile computing device. The transaction between the local consumer and advertiser is traceable to the viewing the merchant's ad by the consumer.

In alternative of the foregoing implementation, the cost that the broadcaster charges to the local advertiser can be inversely proportional to the distance between the physical location to which the merchant's ad was targeted and the physical location of the local merchant who was advertising in the broadcast. Stated otherwise, an ad will cost less to broadcast if it is geo-targeted physically farther way from the merchant's brick and mortar store, and an ad will cost more if it's geo-targeted physically closer to the merchant's brick and mortar store.

By tracking the merchant's transactions with a consumer to the television viewing of the merchant's advertisement by the consumer, a measured result of the effectiveness of the advertising spend with the local broadcaster can be derived. Thus, the local advertiser can compare (i) revenue derived from the transaction between the local consumer and advertiser that is traceable back to the viewing of one or more broadcasts of the corresponding geo-targeted local advertisement to the consumer's specific local broadcast receiver.

The hyperlocal geo-targeting of merchant's advertisements to viewers located in a vicinity may include advertisements for various community programs that pertain to a particular community or vicinity. As such, implementations include a system, data access management utility, and a method of generating links between local merchants and community programs, whereby the merchant may provide incentives to customers in relation to community programs. Implementations may track community programs, as well as customer transactions, including both online and offline transactions, that occur between participants and that make use of the incentive, as further detailed below. Implementations may include as participants: customers, merchants, community organizations, intermediaries, and other groups or individuals, including merchants, members and intermediaries of the marketing system. Participants may have participant identifiers. The participant identifiers may be generated by the marketing system or may be linked to a payment source. Data may be collected about all participants, either expressly, or from offline or online transactions between participants utilizing a participant identifier, and this data may be stored in a data storage area. All data in the data storage area may be accessed by a data mining tool, a transaction linking utility, and an analytic mode, which may provide results that include information, such as details of consumer behavior and analytic reporting. Matches between transactions and members may be identified by the transaction linking utility, and a level of certainty that the match is accurate may be determined.

For the purpose of this patent application, the term "community programs" may be understood to define an ongoing community program (such as a shelter in a community), a term community program (such as a charity funding drive), or a community event (such as a festival). The term "community programs" may further be understood to define a community program serving a specific area (such as a festival held in a local park), a community program serving a neighborhood (such as a neighborhood clothing drive), a community program serving a larger area (such as a city-wide hosting of a sporting event), or a community program serving a still wider area (such as a national literacy program, or an international development program).

For the purpose of this patent application, the term "vicinity" may be understood in various implementations to reference concepts of community, including but not limited to a region, a local community, a community group, a community shopping region, and a geo-fenced shopping community, and a geographic community. These referenced implementations of community and the like, as used herein, are defined, characterized, and enabled in U.S. patent application Ser. No. 13/748,459, titled "Authorized Transaction Incented By Merchant Donation," filed Jan. 23, 2013, and published May 15, 2014, as US Patent Application Publication No. US 2014/0136300A1, hereinafter the "Community Definition Reference", which is incorporated herein by reference.

By way of example of one such implementation in the Community Definition Reference, a community is defined, characterized, and enabled as those merchants and account holders with whom the merchants conduct transactions that have respective physical addresses. These physical addresses are used with a navigation time algorithm to determine the navigation time from the physical address of an account holder to the physical address of a merchant. The determined navigation time is within a predetermined input minimum and a predetermined maximum navigation time for one or more transportation nodes. The date and time of a transaction between the account holder and the merchant are determined to be within a time period as provided by the merchant. The merchant and the account holder are deemed to be within the same community if the determined navigation travel time does not exceed a predetermined threshold. Note that the physical address of the account holder is typically the as the physical address of a television receiver with which the account holder views the merchant's advertisement that is broadcast for rendering on the account holder's television receiver. Note also that, in TV Everywhere implementations discussed herein, the physical address of the account holder's television receiver will be that of the geo-located address of a web enabled mobile computing device (e.g., a smart phone) on which the account holder views the merchant's advertisement that is broadcast for rendering on the account holder's television receiver.

By way of other example implementations in the Community Definition Reference, the merchant and a customer will not be determined to be in the same local community unless the respective physical addresses of merchant and customer are in the same community or neighborhood according to a predetermined algorithm. Any such local community determination can be made in any of several different methods, or combinations thereof, according to the merchant's preference as to what algorithm is mostly likely to attract the most favorable foot traffic to the merchant's brick and mortar store. One such method is a political or legal division, that is, the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same or within a predetermined proximity as that of its customer's residence. Yet another such comparison can be whether the merchant's place of business and its customer's residence are physically proximate within a predetermined factor by any of a variety of measures or combinations thereof. For example, latitude and longitude coordinates might be known for both the merchant's place of business and the residence of its customer. These coordinates can be used to determine whether the linear distance there between is within a predetermined distance to ascertain whether or not the merchant and its customer share the same local community. In still another implementation, the merchant and customer will be deemed to be in the same local community if the customer provides an advertisement from the merchant, either electronically or on paper, showing a matrix code, that is a machine-readable optical label (e.g., barcode, Quick Response (QR) code, etc.), that contains information confirming that the advertisement is representative of the local community of the merchant, referred to hereinafter as the "Merchant Advertisement Matrix Code".

In some implementations, a merchant provides an incentive to a customer that the merchant will make a donation that will benefit the merchant's local community but only if the customer resides in that local community and conducts a transaction with the merchant. In such implementations, the obligation for the merchant to donate can be tested in a variety of ways. One test for the customer's residence can be made by calculating the duration of a trip to navigate from a geographic location associated with community resident to a geographic location associated with the merchant. This calculation can be made by using one of more navigation time estimation algorithms. Stated otherwise, the duration of a trip to navigate from a geographic location associated with an account holder to a geographic location associated with the merchant can be calculated by using one of more navigation time estimation algorithms. By way of example, and not by way of limitation, any of the following algorithms, either alone or in combination, can be used when calculating a navigation time between places respectively associated with customer and merchant: (i) Depth-First-Search (DFS); (ii) backtracking search; (iii) Dijkstra's algorithm; (iv) Krushkal's algorithm; (v) Prim's algorithm, (a.k.a. DJP algorithm); (vi) the Jarnik algorithm or the Prim-Jarnik algorithm; (vii) Reverse-Delete algorithm; (viii) Borvka's algorithm; (ix) a navigation algorithm now conceived; (x) a navigation algorithm both conceived and reduced to practice; and/or (xi) a navigation algorithm that is developed in the future.

Another way to calculate navigation time between places respectively associated with customer and merchant is to outsource calculations to a public or private web service by transmitting the respective geographic place identifiers to an online navigation service for calculation of navigation time and receive by the navigation time estimate. By way of example, the pair of places can be sent to an online service for subsequent return of a navigation time estimate as are provided by a Google® maps service, a Bing® maps service, a Garmin® maps service, a Delorme maps service, a TomTom® maps service, a Mapquest® maps service, etc. The navigation time estimate calculated, or received back from a web mapping service, can be a time that was calculated for one or more transportation modes, including walking, automobile or taxi, bicycling, mass transit, or a combination thereof.

A merchant can designate, for each of several different time periods during each calendar day, the navigation time under which the merchant will make a donation to one or more charities designated by a customer who transacts with the merchant, as well as the corresponding percentage of the transaction amount that the merchant will donate. As such, a merchant can input data corresponding to higher and lower incentives, such that a greater or lesser donation is made as depends up the time, the day, and the navigation time, by any of several different modes of transportation, between locations respectively associated with the merchant and the customer who transacts with the merchant.

In the case of a geographic area having a high-density population (e.g., a borough of a large city), a merchant may input small navigation times because local shoppers live close to the merchant's location. As such, the merchant is thereby committing to donate only those charities designed by customers who live close to the merchant's physical location—such as in 'walking distance'. Alternatively, in rural and sparsely populated areas, the merchant may input larger navigation times because local shoppers are likely to drive in an automobile as the most reasonable transportation mode to arrive at the merchant's store. As such, the merchant is thereby committing to donate only those charities designed by customers who live close enough to drive a reasonable distance to the merchant's store.

A merchant may choose not to make a donation to any customer who is identified with a residence or location that is too far from the merchant's location to represent potential frequent repeat business. As such, input by the merchant would be unfavorable towards any donation to the designated charities of a shopper who is unlikely to regularly shop at the merchant's business.

The navigation time input by the merchant might preferably be dependent upon the types of goods and services provided by the merchant. Merchants offering only commodity items, such as grocery stores, would be like to input shorter navigation times that merchants typically providing rare and hard-to-find items for which customers are more likely to be willing to make longer commutes in order to make purchases (e.g., a grand piano).

A merchant can input different navigation time thresholds for any of several different kinds of transportation modes, such as walking, driving, mass transit, and their combinations. For instance, if at least one of the navigation times from a customer's residence to the merchant's store for different transportation modes is less that an input threshold, then the merchant will make a donation to the customer's identified charities after the customer's transaction with the merchant has been authorized.

A merchant can input an identifier for one or more customers (e.g., an account or member number), where the merchant will donate to each such customer's identified charities. Note that, in this implementation and variations thereof, the merchant's obligation to donate is fixed regardless of any navigation time that may apply for the customer to travel from the customer's resident to the merchant's store, although other criteria may apply, such as a date and time parameter which must be satisfied by the date and time of the transaction. Alternatively, input can be made by the merchant such the merchant will donate to each identified customer's charities regardless of navigation time or time of day, though within the merchant's limits of donation.

Businesses in the marketing program are referred to as "merchants", while customers are referred to as "members". An entity granted limited participation in a marketing program, such as for a specific term, or only granted the ability to participate in specific activities, such as an advertising associate, may be referred to as an "intermediary". The term "participants" may reference any entity participating in a marketing program, including merchants, members, intermediaries, system administrator(s) and any other participant in the marketing system.

Implementations may involve an Internet, intranet or other networked environment. Therefore, any reference to any of Internet, intranet or other networked environment should be understood broadly to encompass not only the referenced term, but all of Internet, intranet or other networked environment. In the same manner terms indicating aspects of either the Internet, an intranet or another networked environment, such as a webpage in an Internet environment, should be understood broadly to include the equivalent available in the Internet, intranet or other networked environment.

The marketing system of the implementations may be particularly advantageous for local or regional participant merchants. These merchants typically do not have a significant, if any, online presence (e.g., they may be strictly a "brick and mortar store"). Implementations may enable such merchants to benefit from the broadcast of their advertisements so as to be geo-targeted for a hyperlocal viewing limited to viewers located in a particular community, as well as access to, and/or generation of, real-time analytic information relating to members, community programs, and other information that would not otherwise be available to them. For example, the transaction linking utility, and the data mining tool, sometimes with an analytic mode, may be used by a local participant merchant store to derive actual or projected customer behavior information, such a TV viewing habits, and other reporting. As an example of the function of the marketing system, such information or reports may be utilized to design future incentive programs to be implemented by merchants and to generate links between local merchants and community programs operating in a nearby location.

Such links may include, for example, incentive programs that provide a donation to a community program based upon a purchase between a customer, such as a member of the marketing system, and merchant of the marketing system, incentive programs that occur during a community program event, such as a festival, or other incentive programs that link community programs and merchants. The links may be formed because the activities of the community program and the merchant become intertwined and/or inter-reliant. Returning to the prior examples of incentive programs, the link between the merchant and the community program occurs in the former example because donations are provided to the community program upon a purchase from a merchant, and in the latter example because the merchant incentive is only offered during the time of a community program event. The activities of the community program and the merchant become inter-reliant. A skilled reader will recognize that a variety of other links may be formed between merchants and community programs through a variety of other means or other types of incentive programs as well.

Overview

In one implementation a system administrator of a marketing system may facilitate the collection of information regarding community programs. This may involve community programs providing information to the system administrator of their own volition and/or the system administrator searching for, and requesting, community program information. Such community programs may be occurring in the immediate, near or distant future. The information may be collected via an online search, a search of one or more community databases, from information sent by community programs to the administrator, or other means. Information regarding community programs may be stored in a data storage source, such as a database. Merchants, members and other groups or individuals may become participants in the marketing system. Each participant may have a participant identifier. Upon joining the marketing system, or after joining, the participants may provide information regarding themselves, including the location of the participant (e.g., a merchant's store(s) location(s), a customer's home and/or work address, etc.) to the marketing system. The marketing system may store the information as data in the storage area.

The data in the storage area may be mined by a data mining tool. The data mining tool may be utilized by any participant of the marketing system. For example, the data mining tool may be used to match a community program to a participant merchant in the area where the community program is to occur, or is occurring. The result may be that a local participant merchant may be made aware of an upcoming local festival. The participant merchant may devise a merchant incentive in relation to the community program, such as a discount, a donation to the community program, a giveaway, a sweepstakes entry, rewards (such as reward points) or any other incentive.

The data mining tool may also be utilized to identify members of the marketing system who are identified as existing near the participant merchant store location. For example, the data mining tool may identify participant members living and/or working in the area of the merchant store location and/or one or more community programs, in accordance with member profile information and other data stored in the data storage area and any linked data sources. The data mining tool may also be utilized to identify participant members who may be likely to visit the merchant store and/or make use of the incentive, in accordance with demographic information or preferences derived from data stored in the data storage area and any linked data sources. A skilled reader will recognize that other information regarding a member, for example, such as transactional behavior, may also be utilized to identify participant members who may be likely to visit the merchant store and make use of the incentive.

The merchant, or another marketing system participant working with the merchant, may advertise the merchant's one or more incentives and/or the community program to at least the members identified by the data mining tool. Such advertisements, which may include a Merchant Advertisement Matrix Code, may be communicated to an identified member and/or other potential customers by a variety of online and offline means, including a hyperlocal geo-targeted advertisement for a local merchant that is interleaved into television broadcast content, a webpage, an email, a communication sent to a mobile device, a print advertisement, a radio advertisement, etc.

In an implementation that involves cross-selling or cross-loyalty, as described in more detail below, implementations may facilitate consecutive, or simultaneous, communication of related incentives. For example, incentives of two merchants involved in a cross-selling program may be communicated either immediately one after the other, or together. The communication may further indicate a link or other connection between the incentives based upon the cross-selling program. A skilled reader will recognize that a variety of ways to indicate cross-selling or cross-loyalty incentives may be provided. In one alternative of this implementation, a member may view a display of incentives on a webpage when the member logs onto the marketing system website. The display may be immediately presented after login, or may be presented upon a selection by the member, such as the selection of a particular webpage, a link, or an incentive display option.

In another implementation, a merchant may have an option regarding setting the prominence of the communication of an incentive to a member or other participant. For example, a merchant may make a request, and may pay a fee, for a particular prominence of an incentive in a communication to a member, other participant or any third parties. A merchant may also be given the opportunity to bid for a more prominent communication or display of an incentive to a member, participant of the marketing system, or third party. A skilled reader will recognize that prominent communication or displays of an incentive may involve a variety of criteria, such as, for example: the time of day when a communication occurs via radio; the positioning of an incentive within a hyperlocal geo-targeted advertisement for a local merchant that is interleaved into television broadcast content, the positioning of the incentive on a webpage, printed page, or list showing one or more incentives; the typeface or graphics (e.g., bold, colored, etc.) of an incentive on a webpage or printed page; etc.

A participant and/or third party may redeem an incentive, through an online of offline transaction. Transaction details of transactions occurring between a merchant and a participant or third party, may be stored in the data storage area. At the time of the transaction a member, or other participant, may provide a marketing system participant identifier to a merchant.

Transaction details may be transferred to the marketing system for storage and mining by a variety of means and at a variety of times. For example, transaction details may be transferred to the marketing system in real-time (e.g., as a transaction occurs and concludes), near real-time (e.g., almost immediately after a transaction concludes), and/or after a time lapse (e.g., at the end of a time period, such as a set time(s) during a day, at the end of the day, at the end of a week, at month-end, or at any other time after a transaction is finished, information regarding one or more transactions may be provided to the marketing system). The data mining tool may be utilized collect data from the storage area, and possibly other data sources, to generate specific information, for example, such as information regarding consumer behavior data that may provide: one or more reports pertaining to a particular incentive (e.g., success of an incentive); information to be utilized to create a new incentive; suggestions of new incentives; or other information.

In particular, the data mining tool may be utilized to determine if a transaction occurred as a result of an incentive. For example, the data mining tool may be engaged (and optionally the analytic mode may also be engaged) to recognize particular pre-transaction behavior by a participant, for example, such as the participant viewing a broadcast containing a hyperlocal geo-targeted advertisement of a merchant, communication of an incentive to a participant, or other information. The pre-transaction behavior, if followed by a transaction with a particular period of time, may be assumed by the marketing system to indicate that the transaction occurred based upon the incentive—such as when the transaction occurred due to the viewing by the participant of a broadcast containing the merchant's advertisement. It is also possible for a post-transaction survey to be provided to the participant who engaged in the transaction, and data collected from the survey may establish that the transaction occurred due to the participant viewing a broadcast containing the merchant's advertisement and/or the incentive. Such data may be utilized by the marketing system, merchant, and/or other participants to make determinations about future incentives, success of past incentives, marketing strategies, and other decisions.

Implementations may include a transaction linking utility to access the data in the data storage area or data extracted or analyzed by the data mining tool and the analytic mode, and to utilize this data to identify links between a transaction and a member. For example, the transaction linking utility may analyze the data to recognize the existence of links or matches between transactions and other behavior or activities of members or users. As such, the transaction linking utility may be operable to identify a match between a hyperlocal geo-targeted advertisement, which may include a Merchant Advertisement Matrix Code, for a local merchant that is interleaved into television broadcast content that is viewed on a television receiver by a member and a later transaction when the member purchases a product or service at a merchant's store. The transaction linking utility may further determine a likelihood or level of certainty that a transaction resulted from the member viewing a broadcast containing the merchant's advertisement. This operability of the transaction linking utility is described in more detail below. A skilled reader will recognize that the transaction linking utility may utilize a wide variety of data to undertake its function and may link a transaction to a wide variety of behaviors or activities by a member, and may determine the link to be of varying degrees of likelihood or certainty. The transaction linking facility may also involve data such as member profile data, including a member's financial card information, or a member's identification, to determine a link between a member and a transaction.

Participants of the marketing system, other than the administrator, may not be provided with direct access to the data stored in the data storage area. Thus, any personal information regarding a participant stored in the data storage area will not be accessible by participants. Additional security measures may be included in the marketing system to ensure that personal information regarding a participant stored in the data storage area will not be disseminated to participants. Such security measure may further include means whereby the data mining tool, transaction linking utility and analytic mode may generate information in a manner so that such information is devoid of personal information regarding specific participants. In this manner, privacy of information, including personal information, may be maintained by the marketing system. Privacy of information of the marketing system may meet or exceed any regulations regarding private information in a specific location or wider area.

Benefits Over the Prior Art

Implementations may offer many benefits over prior art. For example, many local merchants lack the ability to access information sources that offer both: information regarding community programs local to a merchant store location; and customer participant information. The data and other information either stored in the data storage area of the marketing system, or in other data sources that are accessible by the marketing system, may be queried to identify members likely to make use of a merchant incentive. Implementations permits local merchants to become participants of the marketing system and to access this information. Implementations also offer a greater level of control to the merchant to create specific incentives related to community programs and to track the use participant members make of the incentives. Merchant store locations can be easily linked into community programs in the same locality.

Implementations provide an additional benefit, in that the tracking of participant customer transactions that make use of an incentive does not require a Point of Service (POS) terminal. The prior art generally utilizes a POS terminal to track transactions made by a customer having a rewards number or card at a store. POS terminals are expensive and may lack compatibilities with other point of sale systems utilized by other merchants. In various implementations, as tracking of transactions between merchants and members does not occur by way of the POS terminal, it is not necessary for a merchant to install an expensive point of sale system having tracking capabilities required by the prior art. Thus, implementations may provide a cost-effective means of tracking transactions as compared to expensive prior art systems. Additionally, implementations allow for transaction tracking to occur whether the transaction occurs online or offline. For example, a participant customer making a transaction in a brick and mortar location of a participant merchant may be trackable in accordance with the implementations. Moreover, any participant merchant incentive may be applied to a participant customer transaction that occurs either online or offline.

Still other benefits of implementations include the wide range of information that is collected in a common data storage area for use by the data mining tool, the transaction linking utility and the analytic mode, and the operability of the data mining tool, the transaction linking utility and the analytic mode to prevent dissemination of private and/or personal information.

Prior art does not involve the collection of the breadth of information into a single location that is accessible by a data mining tool, a transaction linking facility and an analytic mode, that the disclosed implementations achieve. Nor does prior art limit the accessibility of private and/or personal information as effectively as the disclosed implementations. Yet another benefit of the disclosed implementations over the prior art is the seamless linking to mobile devices. Consequently, an individual is not required to visit the marketing system's website necessarily to participate in activities of the marketing system. For example, advertisements of incentives, which may include a Merchant Advertisement Matrix Code, may be provided via TV Everywhere broadcasts to mobile devices, as may surveys, information entry, and other facilities.

Another benefit of the disclosed implementations over the prior art, is that, should the incentive involve a donation to a community program, the donation is reportable by the data mining tool in a clear manner. The result may be that the implementations offers accountability in its reporting of donations. This accountability may also be the standard for donations to community programs made by participants of the marketing system by other means than incentives. The donator can see that the donation amount has been passed by a payment source to the community program.

Still another benefit of the disclosed implementations over the prior art is that the implementations may have several results for participants not achieved by prior art inventions.

Implementations may increase revenues of merchants by increasing transactions of the merchants that are participants of the marketing system due to customer (including participants) interest in, or loyalty to, community programs.

Implementations may increase customer (including participant) awareness of a local participant merchant store by broadcasting a hyperlocal geo-targeted advertisement for the local participant merchant store that is interleaved into television broadcast content, communicating incentives from the merchant to members, mapping features showing merchant locations, and other features of the implementations.

Implementations may also increase merchant goodwill by promoting the merchant's support of one or more community programs. The implementations may increase support of community programs by making it easier for merchants to become cognizant of community programs occurring near merchant stores in the same locality as the community programs. The support of community programs by merchants may be financial, or may be by increasing participant consumer awareness of community programs occurring in a particular location.

Marketing System

Implementations may include a marketing system involving a web server accessible by an administrator, one or more merchants, and one or more members registered with the marketing system. The web server may also be accessible, by way of specified and possibly limited access, by one or more intermediaries registered with the marketing system and third parties. The web server may be linked to a data storage area. Data pertaining to the administrator, merchants, members and/or intermediaries may be stored in the data storage area. Some data pertaining to third parties may also be stored to the data storage area in some implementations. At least one participant identifier may be stored in the data storage area for each registered participant of the marketing system.

The web server may be operable so that a merchant may provide information to the web server regarding one or more transactions between a merchant and a customer. The customer may be a member of the marketing system. A skilled reader will recognize that data pertaining to a transaction between a merchant and a member, or other customer, may be transferred to the web server by a variety of means, for example, such as via manual entry, via another communication means, etc.

In one implementation, a POS terminal may also be utilized by the marketing system in some implementations. The POS terminal may be in communication with the web server, and may pass information regarding a transaction occurring between a merchant and a customer to the web server. The customer may be a member of the marketing system.

In another implementation, data, or other information, may be transferred regarding a member or other participant from a separate data source, such as a data base, to the marketing system. For example, a member may be a financial card holder, and all financial card holders may be given the option to become members of the marketing program. The financial card company may also become an intermediary of the marketing system. Once a financial card holder agrees to become a member of the marketing system, information and other data regarding the financial card holder, as gathered by the financial card company, may be either transferred to the marketing system, or may be made accessible by the marketing system.

A skilled reader will recognize that other groups may become members, such as, for example store card holders, members of a community group, such as a co-op, bank card holders, or any other group, and that the persons involved in the group may become members of the marketing system. The group may gather information independently from the marketing system and this information regarding persons who become members of the marketing system may be made available to the marketing system via a transfer, or via access to the data source of the group.

The persons involved in the group may be granted an identification, such as a numeric identification. This identification may be acknowledged by the marketing system, so that when a person involved in the group becomes a member of the marketing system, the marketing system stores the identification provided by the group. The identification may be stored in the marketing system as the participant identifier. In some implementations more than one participant identifier may be stored in the marketing system for a member, or a participant identifier may be stored and other identifications may also be stored. Any transaction that occurs and utilizes the identification may be recognized by the marketing system as a transaction involving the member whom the identification represents.

For example, a financial card holder may be granted a financial card number. The financial card holder may become a member of the marketing system. Upon becoming a member of the marketing system the financial card number of the member may be transferred, or otherwise provided, to the marketing system. The marketing system may utilize the financial card number as an identification for the member.

The one or more identifications, or one or more participant identifiers, identified as pertaining to a member of the marketing system may be utilized by the member during a transaction. For example, a member may utilize a financial card during the transaction and the financial card number may be an identification, or participant identifier, identified as pertaining to the member by the marketing system. The marketing system may therefore recognize that the transaction involves the member due to the use of the financial card number. A skilled reader will recognize that other identifications, or participant identifiers, may be utilized by a member, that such identifications may be stored by the marketing system, and that use of an identification, or participant identifier, during a transaction may provide a means of identifying a transaction as involving a particular member. As described above, the identification may be stored as a participant identifier by the marketing system.

Figure 12:
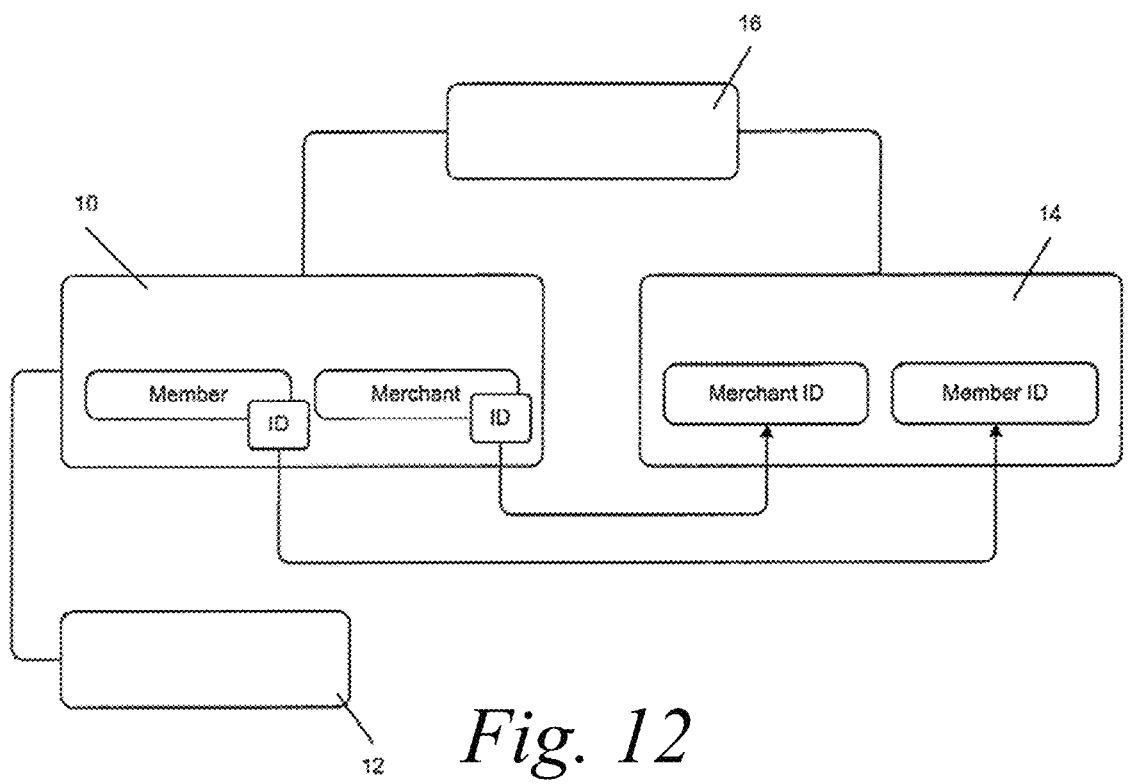
FIG. 12 is a systems view of a marketing program.

As shown in FIG. 12, the marketing system may be operable in accordance with a web-based computer program product that provides a loyalty engine 10, linked to the web server. The loyalty engine may provide a marketing system interface to enable specific features, for example, such as surveys, incentive communications, data mining and other features. Transactions occurring between members and merchants, including transactions utilizing a point of sale facility 12, may be recorded or otherwise linked to data storage means. For example, a data storage means may be a database that may be included in one or more servers. As another example, a server farm may be included in the system in various implementations and one or more linked databases may be included as a data storage area. A skilled reader will recognize that implementations may utilize a combination of stored data and real-time data (the real-time data may or may not be stored), and that both of these types of data may be utilized by the data mining tool. The data mining tool 14 may be operable by the loyalty engine, and may be utilized by members, merchants, the administrator, an intermediary, or any third party that is provided specific access to the data mining tool.

In one implementation, transaction linking utility 16 may be utilized to compare transaction details regarding a merchant and/or member with stored data, for example, such as a member or merchant profile. In this manner a transaction may be confirmed to be between a specific merchant and a specific member. Details of the transaction may be stored in the data storage area as corresponding to the merchant and/or member involved in the transaction. For example, details of the transaction may be stored in the member profile, merchant profile, as historical transaction and/or as preferences.

The transaction linking utility may also be utilized to identify a specific member that may be eligible for one or more merchant incentives based upon a transaction. For example, the transaction linking utility may utilize data representing the broadcasting a hyperlocal geo-targeted advertisement for a local merchant that is interleaved into television broadcast content, member information including other recent transactions between the merchant and the member (e.g., assume member is likely to engage in future transactions with the merchant), frequency of transactions between the merchant and the member (e.g., member may be eligible for an incentive, which may be an increased discount or other augmented incentive, based on either frequent transactions with a merchant, or a particular number of past transactions with the merchant), and the amount of money spent in any transaction between the member and the merchant (e.g., member may be eligible for an incentive, which may be an increased discount or other augmented incentive, based on an amount of money spent in a transaction with the merchant), as well as any other post-transaction comments. Such parameters may be incorporated into a rule and the transaction linking utility may function in partnership with an analytics mode to identify member eligibility for an incentive.

An incentive may be communicated to a member through a variety of means, including broadcasting a hyperlocal geo-targeted advertisement for the local participant merchant store that is interleaved into television broadcast content, a communication to a mobile device (e.g., a text, twitter, etc.), an email, a mailing, a telephone call, or any other means. The incentive, which may include a Merchant Advertisement Matrix Code, may also be in many different forms, a sweepstake entry, a discount, a donation to a charity, rewards points, a coupon, or any other incentive form or combination of incentive forms (e.g., a donation to a charity and a discount, etc.).

Figure 19:
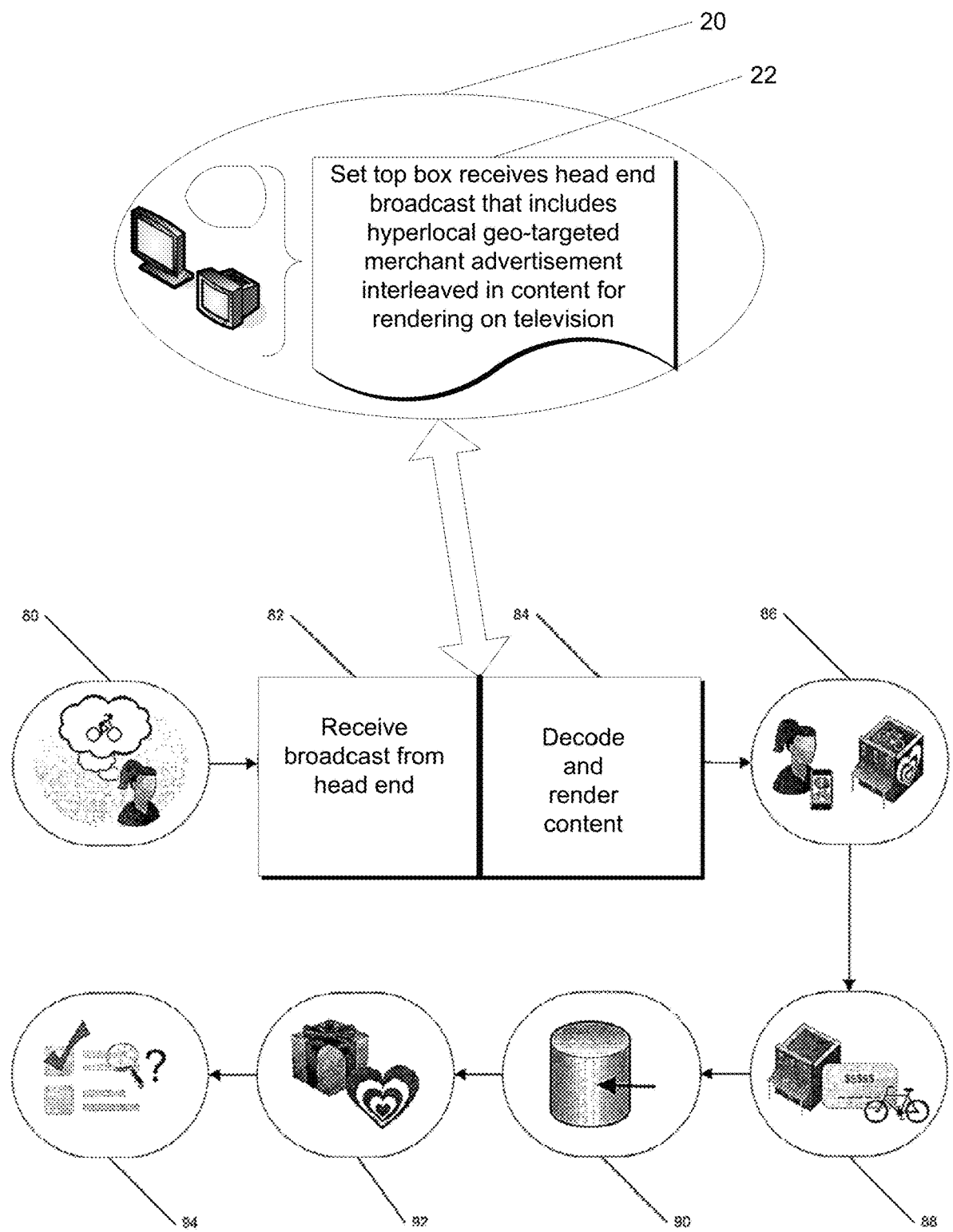
FIG. 19 is a flowchart showing the steps in one implementation for a transaction to occur between a merchant and a resident of the same vicinity after the resident has viewed an advertisement on a television receiver, where the advertisement is for the merchant's offer of an incentive to conduct the transaction at the merchant's bricks and mortar store location in the vicinity.

As shown in FIG. 19, in one implementation a television viewer 80, such as a member, receives at processes 82-84 a broadcast for display on a television 20. The broadcast includes a hyperlocal ad 22 that is rendered only to televisions located in a particular vicinity, where the advertisement is for a merchant who is located in the particular vicinity. An advertising cost is assessed by the broadcaster, such as a local TV station, to the merchant in the particular vicinity. In one implementation alternative, the advertising cost is inversely proportional to the navigation time from the location of the television in the particular vicinity (e.g., from the television viewer's physical or residential geographic address) to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

The merchant's advertisement may be for the merchant's local bicycle store that is located in a vicinity where the television viewer 60 is also located. The advertisement may include an incentive from the merchant. For example, the incentive may be a discount on the price of a bike and/or an agreement that the merchant will donation a certain percentage of the currency amount of the transaction to a charity in the vicinity if the television viewer 60 purchases a bicycle in a transaction at the merchant bicycle store. The television viewer 60 may accept the merchant's incentive by going to the merchant's bike store 86. The user may utilize the incentive and redeem it for a discount on a bike 88, and/or for the merchant's agreement to make donation to the charity in the vicinity by conducting the transaction at the merchant's bike store. Details regarding the transaction may be transferred to the marketing program 90. A further incentive may be triggered when the details regarding the transaction are received and processed by the marketing program. For example, the further incentive may be an incentive such as a prize entry (e.g., the customer wins), or a donation 92 to a community program (e.g., the community benefits). The marketing program may match the transaction details to the behavior of the user if the user is a member of the marketing program, where such behavior includes the user viewing a broadcast containing the merchant's advertisement. For example, based upon the transaction details that indicate that the member acquired an incentive that was communicated via the broadcast of a hyperlocal geo-targeted ad for the merchant's bike store, it can be assumed that the transaction resulted from the viewing of the broadcast of the merchant's bike store advertisement.

A post-transaction survey 94 may be generated and communicated to the user if the user is a member of the marketing program. For example, the survey may be communicated to the member the next time the member logs into the marketing program, such that the survey appears as a pop-up on the sign-in page after log-in, or the survey is accessible by a link shown on the sign-in page, or so that the survey is available to a member that is signed into the marketing program via some other means. Alternatively, communicated to a communication means belonging to the member or a user that is not a member, and be available to the user on that communication means, for example, such as a communication means indicated by the member in the member's profile or a communication means indicated by the user at another point, such as during the transaction, that is capable of accessing a communication, such as a blackberry message, an email, a text, or some other communication.

The post-transaction survey may be completed by the member and the information included in the survey may be processed by the marketing program. For example, the post-transaction survey information may be processed to indicate a link between the transaction and any earlier activity, such as the query by the user, or any other activity. The information in the post-transaction survey may be utilized to confirm the transaction behavior of a user. This information may be stored by the marketing program and may be provided to the merchant, or other participants of the marketing program, in a variety of forms upon a variety of events, for example, such as the generation of a report by the merchant. The merchant may use this information to develop effective incentive programs, to evaluate the success of incentive programs, or for other purposes.

In one implementation, the time elapsed between member having viewed a broadcast that interleaves a hyperlocal geo-targeted advertisement for a merchant, and a transaction between the member and the merchant may be evaluated by the transaction linking utility. A maximum time lapse between a user's having viewed a broadcast of the hyperlocal geo-targeted advertisement for the merchant and a subsequent transaction by the user at the merchant's store may be recognized by the marketing program. The maximum time lapse may be input by the merchant, or may be generated by the marketing program, or may be otherwise set in the marketing program. For example, the maximum time lapse may be generated by the marketing program in accordance with the merchant type, the item or merchant that was advertised in the hyperlocal geo-targeted merchant advertisement that was broadcast, the merchant preferences, or any combination of these. Other rules for matching a query or search to a transaction may be set, stored and utilized by the marketing program. Such rules may be modified at any time. In particular, the rules may be modified in accordance with the experience of a merchant. A merchant may also override the rules in specific circumstances.

The amount of time allowed for a maximum time lapse may further be member specific. For example, the marketing program may recognize that a longer period of time elapses between a member having viewed a broadcast of the hyperlocal geo-targeted merchant advertisement and a transaction for the merchant than the maximum time lapse allows. This extended period of time may indicate that a member has a reason which prohibits him or her from travelling to a store in a timely manner after viewing a broadcast of the hyperlocal geo-targeted merchant advertisement. For example, the member may be a professional who has a work-schedule that prohibits frequent shopping. If the marketing program determines that transaction occurs following the broadcast of the hyperlocal geo-targeted merchant advertisement outside of the maximum time lapse for such a member, the marketing program may determine that there is still a likelihood of a match between the member having viewed a broadcast of the hyperlocal geo-targeted merchant advertisement and the transaction in the case of this specific member based on past member behavior. Therefore, the marketing program may adjust the maximum time lapse to a longer period relative to the historical data relating to the particular member.

The location of a member in relation to the location of the merchant store may also be a factor that is considered when determining a reasonable time lapse between the member having viewed a broadcast of the hyperlocal geo-targeted merchant advertisement and the transaction. For example, if the store is identified by the marketing program as being a significant distance away from the location of the member, the maximum time lapse may be extended to recognize broadcast ad viewing and transactions occurring at periods in time more distant than the maximum time lapse as having a likelihood of matching.

The time and date that the member viewed a broadcast of the hyperlocal geo-targeted merchant advertisement in relation to a transaction may also be a factor that is considered when determining a reasonable time lapse between the broadcast ad viewing and the transaction, in accordance with historical data relating to broadcast merchant advertisements and transactions by a member. For example, a member's viewing of a broadcast of a hyperlocal geo-targeted merchant advertisement may take place on a Sunday night and a transaction occurring on the following Saturday, or at another day that is beyond the maximum time lapse, may be recognized as having a likelihood of being a match if the member transaction history shows the member only shops on alternate weekends, or in another such pattern of time.

The type of communication devices utilized for viewing a broadcast that interleaves a hyperlocal geo-targeted advertisement for a merchant prior to a transaction may also be a factor that is considered when determining whether there is the advertisement having been viewed and a transaction. For example, if the ad viewing occurs on a communication device that is portable, such as via a Television Everywhere broadcast model, where the device is a smart phone, a cell phone, a PDA, a tablet, or other types of portable communication means, this may indicate that the ad was viewed 'on-the-fly'. This may further indicate that the ad that was viewed is related to a need that is recognized while a user or member is travelling. Therefore, the use of the device may indicate an increased intent to purchase a product or service, or to shop at a particular merchant's store. For example, the ad may have been viewed when a user or member is already out shopping and has realized that they need another product or service. Therefore, the use of certain portable communication devices to a view a broadcast that interleaves a hyperlocal geo-targeted advertisement for a merchant may indicate a different level of purchase intent and may also indicate a different reasonable time lapse for a user or member to make a transaction based upon the ad that was viewed. Such an application of the marketing program may further recognize the distance between the user and/or member and the location of the merchant store that was advertised in the broadcast. If the distance is determined to be significant, then a longer period of time lapse between the viewing of the merchant's ad and a transaction may be deemed acceptable to indicate that the transaction is a result of the viewing of a broadcast of the merchant's hyperlocal geo-targeted advertisement.

A skilled reader will recognize that a variety of factors may be utilized to determine if a transaction is likely to have been the result of the viewing of a broadcast that interleaves a hyperlocal geo-targeted advertisement for a merchant. These factors may differ for specific members, based upon prior data collected by the marketing program and analysis of this data to indicate member behaviors. A skilled reader will also recognize the richness of rules and tools that the marketing program may utilize to undertake the analytics involved in matching transactions and the participant's viewing of a broadcast containing a merchant's advertisement and indicating likelihoods or certainties of relationships therebetween.

In implementations a transaction may occur online (e.g., via a website) or offline (e.g., at a brick and mortar store location, or at another physical location where the merchant is selling products or services such as, for example a kiosk, booth or other location). The tracked information may be utilized by the transaction linking utility to determine if the transaction represents a sale that occurred as a result of the viewing of a broadcast that interleaves a hyperlocal geo-targeted advertisement for a merchant by the member that resulted in the member transacting with the merchant at the merchant's brick and mortar store. A post-transaction survey may also be provided to verify that the transaction occurred as a result of the advertisement having been viewed. A skilled reader will recognize that a variety of variables may be utilized by the transaction linking utility to determine if a transaction occurs as result of a member's advertisement viewing, and that these variables may be governed by rules, or other means implemented by the marketing system.

In one implementation, the marketing program may utilize the transaction linking utility to estimate matches between a member's, or other user's, advertisement viewing and the member's or user's transactions at the merchant. Such an estimate of the matches may be undertaken to produce variable degrees of certainty for each match, or likelihood of a match between a transaction conducted by a member with a merchant and data confirming that the member viewed a broadcast containing the merchant's advertisement. Examples of the certainty that may be indicated by varieties of broadcasts that interleave hyperlocal geo-targeted advertisements for merchants, where such viewing is followed by a transaction at the merchant's store (either an online or offline store) and a post-transaction survey is not provided corresponding to the transaction may be considered to indicate a low level of certainty that the transaction occurred as the result of the ad viewing by the member or other information pertaining to that merchant or the merchant's products and/or services In one implementation, it may be possible for the marketing system to recognize that items purchased with a hyperlocal geo-targeted advertisement for a merchant that was broadcast. For example, a user or member saw a broadcast that interleaved a hyperlocal geo-targeted advertisement for a merchant in which ad was for a coat sold by the merchant. Later the user or member may purchase the coat through a transaction at the merchant's store. Other items may be purchased in the same transaction by the member or user. The other items purchased with the coat may be recognized by the marketing program to have occurred as a result of the broadcast ad for the coat. Tracking the purchase of the extra items besides the coat may provide a means of capturing information related to the purchasing behaviors of the user or member purchasing the coat and the other items. This information may be utilized for the purpose of other analyses conducted by the implementations.

In one implementation, an analytic mode may be engaged to function in connection with the transaction linking utility to produce reports, reviews or other feedback for participants interested in identifying instances where a transaction occurred as a result of a member viewing a broadcast containing a merchant's advertisement.

Figure 13:
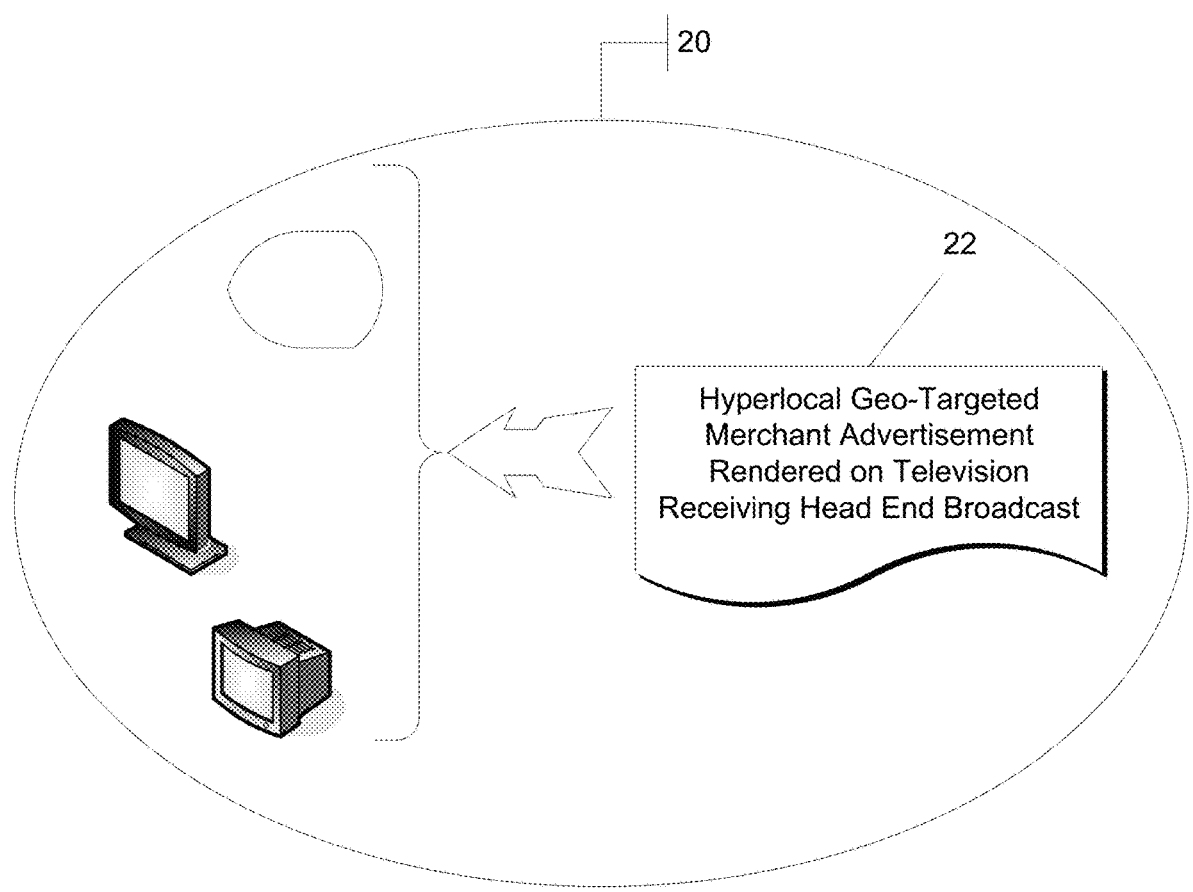
FIG. 13 is a view of a merchant incentive communicated to a television receiver.

As shown in FIG. 13, the system may be linked to a variety of communication means 20, for example, such as a television receiver, a smart phone, a cell phone, a PDA, a tablet, a laptop, or other type of communication means, whereby details of a merchant's advertised incentive may be viewed in a broadcast that is received and rendered for viewing. For example, the system may be linked to a smart phone belonging to a member, whereby incentives may be disseminated to the member via the smart phone. In this manner the merchant's hyperlocal geo-targeted advertisement 22 may be disseminated to a member and communicated by the loyalty engine to the member's smart phone. The advertisement may further include a Merchant Advertisement Matrix Code, a unique reward identifier, or other intelligent information.

Additionally, information entered into a communication means, such as a smart phone, may be transferred to the loyalty engine and ultimately stored in the data storage area. For example, a survey may be disseminated to a member whereby the survey is available to the member on the member's smart phone. Responses to the survey made by the member via the smart phone may be transferred to the loyalty engine and thereby stored in the data storage area. A skilled reader will recognize that data may be transferred to and from the loyalty engine, to merchants, members, intermediaries or any other third party.

Administrator Registration, Interface and Functionalities

In one implementation, the marketing program may be hosted by an administrator. The administrator may be an individual or an organization. Access to the marketing program, including access to some and/or all data may be provided to an administrator. Generally, the administrator access to the marketing system may differ from access provided to others: access to the marketing system, including access to anonymized data may be provided to merchants and members; and limited access to the marketing program may be provided to third parties and/or intermediaries. The marketing system may be operable to allow an administrator to input particular data, including data pertaining to community programs.

The administrator may undertake a search for community programs. This search may utilize information available via the Internet, other databases, telephone services (such as those provided by some municipalities, media outlets, etc.), and other data sources. The administrator may also be provided information regarding community programs by third parties.

All details relating to the community programs may be stored in the data storage area of the marketing program. The data mining tool may be utilized to provide reports or lists providing information related to the community programs, for example, such as a list of community programs in a specific location (e.g., a town, a city or a borough, etc.).

In one implementation, the administrator may utilize the administrator access facilities of the marketing system to provide information to a merchant regarding community programs occurring, or about to occur, in a location nearby to one or more of the merchant's stores, or information regarding members. A merchant may utilize this information to develop incentives relating to one or more of the merchant's stores. The incentive may be an opportunity for potential customers to save, win, and/or benefit community, for example by the incentive of a coupon, a sales discount, a give-away, a sweepstakes entry, the merchant's offer to make donation to a community program, or any other incentive. The incentive or information regarding the incentive may be disseminated to a member.

The marketing system may also be operable to allow the administrator to generate lists, reviews, reports or other information to be provided to prospective merchants, members and/or intermediaries to cause them to consider registering with the marketing program.

In some implementations, a fee may be charged for any request for information, lists, reviews, reports generated by an administrator. A skilled reader will recognize the variety of types of fees that could be charged, such as, for example a fee for each request, a fee per lines on a report, and other types of fees.

Merchant Registration, Interface, and Functionalities

A merchant may join the marketing program by registering. A merchant may be an online merchant, a merchant having one or more brick and mortar locations, or any other merchant. A merchant may identify the location of any bricks and mortar locations to the marketing system along with other merchant profile information. Merchant profile information may be provided to the marketing system at the time of registration as well as at points in time after the initial registration occurs.

A registration interface may be provided to the merchant via a web page, via a mobile device, or via any other means. The merchant information may include a variety of information, for example, such as a merchant participant identifier, the location of the merchant's store(s), the merchant's target clientele, etc. The merchant information may allow the marketing program to link a financial card or other billing system to the merchant.

Figure 14:
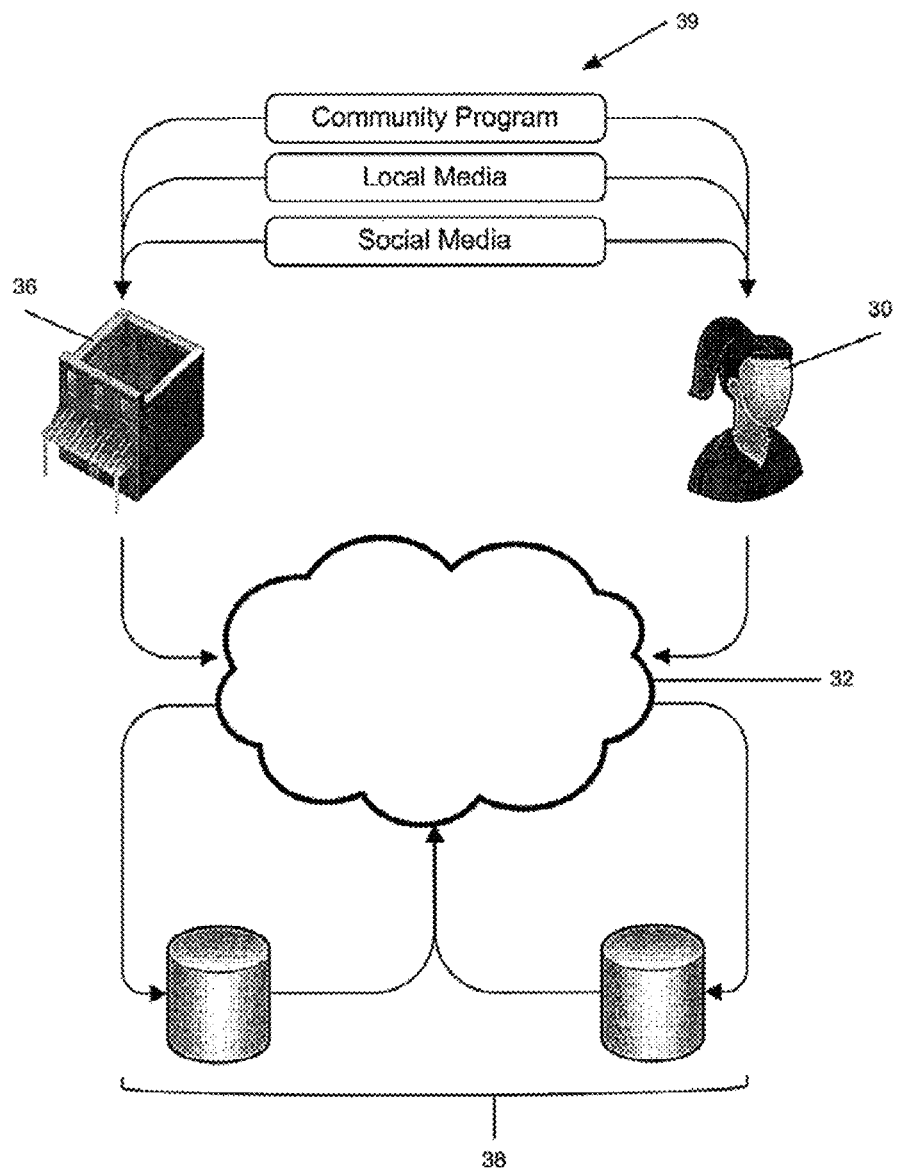
FIG. 14 is a systems view of a data transfer between a merchant, a member, the marketing system, and a data storage area.

As shown in FIG. 14, a merchant 36 may register with the marketing program of the implementations to become a participant. Registration may be facilitated by one or more registration means as described in more detail below. Registration may further occur through an interface 32, for example, such as a web page, etc. Information regarding the merchant, for example, such as the merchant's name, its store locations, its website and web page information, and other details may be provided by the merchant at registration, or at any later point, and stored in the data storage area 38. A merchant may develop merchant incentives, and may communicate these to members through a variety of means 39, including the marketing system web-pages, any merchant and/or intermediary web pages, social media (e.g., web pages, Facebook™, Twitter™, etc.), local media (e.g., radio advertisements, print media, television broadcasts, etc.) and through relationships with community programs (e.g., the community program promotes the merchant, for example, such as through a link from the community program website to the merchant's website, use of the merchant's logo or brand on community program materials, announcements of merchant incentives at a community program event, etc.). A skilled reader will recognize the variety of options that may be used to communicate an incentive to participants and/or third parties.

In one implementation, the marketing program may provide an automated online boarding means or a manual boarding means. For example, a merchant having an existing registered merchant identification with another pre-registered financial program may be provided with a registration interface by the present marketing program, for example, such as a web page. The interface may include a means whereby merchant transactional information and preferences may be imported from the pre-registered financial program to the marketing program. The imported information may be stored in the data storage area as part of the merchant profile.

As an example, the imported information may include the merchant identification (such as an identification number), credit card information, or automated clearing house billing information already linked to a database. Additionally, the one or more forms of payment used with the pre-registered financial program may also be linked to the marketing program as tokens. the tokens may be used to track transactions made with the associated forms of payment.

The information regarding the location of one or more bricks and mortar locations of the merchant may be utilized to determine relationships between one or more community programs and the merchant, in particular any merchant location in the vicinity of the community program. The data mining tool, and in some instances the analytic mode, of the implementations may be utilized to provide a list of community programs occurring in the same location as one or more of the merchant's locations. A merchant may request a more general list as well, showing all community programs in a city, province, country, or other information.

A merchant may also request a list of members, based on a variety of criteria, including proximity of the location of a member to one or more locations of a merchant, member preferences, member age, or other member information. A skilled reader will recognize the variety of criteria that may be applied to a member search undertaken by a merchant, such as, for example, demographic or preference information as reflected in the marketing system data stored in the data storage area. This information may be utilized to determine the members that an incentive will be communicated to. The information may also be used to create new incentives.

In some implementations, a fee may be charged for any request for information or search submitted to the marketing system and/or administrator by a merchant. A skilled reader will recognize the variety of types of fees that could be charged, such as, for example a fee for each request, a fee per lines on a report, and other types of fees.

In one implementation, the data mining tool, and in some instances the analytic mode, may be utilized to provide suggestions of possible new incentives to merchants. The transaction linking facility may be utilized to provide analysis or evaluations that may also be applied by the data mining tool or analytic mode to generate new incentives and suggestions of new incentives for merchants. This feature of the implementations may utilize any of the data and/or information in the data storage area, it may also: recognize incentives utilized by merchants in the past; recognize the success of some past incentives; evaluate the success of an incentive and the community program that the incentive is to be used with; and further incorporate other information and criteria. The result may be one or more suggestions of incentives that a merchant may utilize at a particular point in time. It may be at the discretion of the merchant to adopt and utilize one or more of the suggested incentives, or not to adopt or utilize any of the suggested incentives. For example, a merchant may allow automatic approval of system generated incentives, and whereby the marketing system undertakes the approval of system generated incentives. A skilled reader will recognize that a variety of criteria and information may be utilized by such a feature of the implementations.

The incentive may provide an inducement for the member, or other customers, to visit the merchant's store locations (or online website) where the incentive is offered and redeemable. The merchant may thereby increase the number of customers, the notoriety of the merchant's store, sales, goodwill, etc. The incentive may also produce a benefit for the community program if it is linked to a community program by, increasing awareness of the community program, increasing attendance at a community program, increasing donations to the community program, etc. Specific benefits accruing to any of a community program, merchant, member and/or any intermediary may be recognized by a report, review, results, list, etc., provided by the data mining tool, or the transaction linking utility in some instances.

Incentives may be created to be redeemed upon a variety of events and/or activities. For example, an incentive may be provided to a member and/or an intermediary based upon a transaction. In this example, the incentive may be provided upon a transaction occurring, or may be provided to attempt to cause a transaction to occur. Such an incentive may be an opportunity for potential customers to save, win, and/or benefit community, for example by the incentive of a discount on a purchase price of a product or service to a member, a give-away to a member, a sweepstakes entry and/or a donation to a community program.

In one implementation, it may be possible for the incentive that is provided to a participant based upon a transaction to be different depending on various circumstances. For example, the incentive may be different for a participant who has had frequent transactions and/or recent transactions (e.g., frequent and/or recent transactions with a merchant, or group of merchants, or frequent transactions as a marketing program participant), then the incentive provided to a participant who is making a first transaction, makes infrequent transactions, or has not made a recent transaction. It may also be possible for a different incentive to be provided to participants based upon the total amount of the transaction (e.g., the money spent in the course of the transaction). Yet another possibility may be that a different incentive may be provided to a participant based upon the time of day when a participant makes a transaction. Basing an incentive on the time of day may help a merchant with products or services near the end of the business day to encourage the purchase of those products or services by participants. A different, augmented incentive may also be offered based upon other criteria, such as, for example volunteer hours with a community program, etc. A skilled reader will recognize that a variety of other events or activities may cause different incentives to be communicated to a participant.

As another example, incentives may also be provided based upon the completion of a survey by a participant. Such an incentive may be: a coupon that is electronically, or otherwise, provided to a participant after a survey is completed; a donation that is made to a community program upon the completion of a survey; and/or entry in a sweepstakes. It may be possible that more than one incentive may be provided to one or more participants upon the completion of a survey. It may also be possible for particular post-transaction surveys to even result in different incentives being provided to one or more participants in accordance with the answers provided in the survey. For example, the response to an experience rating question (e.g., a request to rate an experience as excellent, satisfactory or poor) could result in a participant responding that his or her experience was poor may receive a different incentive than a participant responding that his or her experience was excellent. In particular, a participant who has ranked his or her experience as poor on several post-transaction surveys (as may be recognized by use of the data mining tool of the implementations searching for data in historical surveys) may receive a different, augmented incentive. A skilled reader will recognize that a variety of other incentives may be provided to participants upon the completion of a survey.

As yet another example, incentives may be provided based upon a member having being geo-located, such as by a communication with the member's smart phone), as having entered and situated within a specific geographical location and/or zone. Such an incentive may be provided to one or more participants upon a member entering the parking lot of a shopping center, or any other geographical location and/or zone. The incentive may be related to the geographical location and/or zone, such as, for example a coupon for a merchant near to the zone, or a donation to a community program near the location. When this incentive from a particular merchant located within the zone is coupled with data indicating that the participant recently viewed a broadcast of a hyperlocal geo-target advertisement of the merchant, the certainty is increased that there is a link between the ad viewing by the participate and the participant conducing a transaction with the merchant in the zone. A skilled reader will recognize that a variety of other incentives may be provided upon a member entering a specific geographical location and/or zone. A skilled reader will further recognize that incentives may be provided to one or more participants based upon other events or activities as well.

The marketing system of the implementations may be operable by the merchant to generate incentives, to track transactions, and to provide other information relating to participants and community programs. The marketing system of the implementations may further be operable by the merchant to generate analytic information providing an evaluation of the success of past incentives and other activities of the merchant.

Intermediary Registration, Interface, and Functionalities

In one implementation, one or more intermediaries may register with the marketing system and thereby become participants. In one implementation, a participant, and particularly an intermediary, may be a search provider, financial card provider, one or more advertising associates, one or more charities, one or more public or private interest groups, marketing specialists, one or more community programs, or other groups or individuals.

Particular participants may offer unique and specific means of communicating an incentive to participants and/or third parties. Intermediaries may either work with such participants, or may provide unique and specific means of communicating an incentive to participants and/or third parties themselves.

In one implementation, particular marketing program access may be configured to benefit one or more intermediaries. The access provided to intermediaries, or groups of intermediaries, may differ. For example, an advertising associate may be granted access to parts of the marketing program that are necessary for the advertising associate to work with a merchant to produce an incentive. As another example, a marketing program interface may be configured to provide access to a charity to part of the marketing program. That interface may enable a member, or other participant, to select one or more charities and allocate contributions or donations to a charity, for example, such as in percentages or contribution tiers (where the first X dollars benefit supported organization A, the next Y dollars benefit supported organization Y, etc.), or a combination thereof, to one or more charities. A skilled reader will recognize that Implementations may involve a variety of other contribution priority schemes and/or a variety of marketing program interfaces to provide specific access to particular intermediaries.

In an implementation, one or more intermediaries may also disseminate intermediary affiliate information to the marketing program, or information regarding the marketing program and/or any merchant incentive to its affiliates. For example, an intermediary may send direct mail to its affiliates, which may represent its existing contributor base if the intermediary is a charity, or financial card holders if the intermediary is a financial card provider. A skilled reader will recognize that the affiliates of an intermediary may be different groups in accordance with the type of intermediary. The direct mail may contain a website address and a participant identifier which may be generated for and associated with the intermediary by the marketing program when the intermediary registers with the marketing program. Upon receipt of the direct mail, an affiliate may navigate to the website address, which may be a portal to the marketing program. The affiliate may thereby be granted temporary, and possibly limited access to the marketing system for a specific purpose.

The direct mailing from the intermediary may also provide the affiliate with the opportunity to register as a member of the marketing system. During the registration process, the affiliate may enter the participant identifier. The act of entering the participant identifier may cause the marketing program to automatically configure the new member's preferences in accordance with rules created to cause specific operations upon the entry of the participant identifier. For example, entry of the participant identifier may cause the member's preferences to include information to provide for specific interaction between the intermediary and the new member, the new member and a merchant, the new member and a community program, or any other interaction. The interaction may include a contribution by the member of certain benefits to the intermediary, or to another participant, at a specific period in time, or upon a specific event. The entry of the participant identifier may further have the result that it signals to the marketing program that new member's personal information may be transferred via an electronic link to information regarding the new member available from another data source. The transferred information may be stored as part of the new member's profile in the data storage area.

In one implementation, at the point of registration with the marketing program, a member may identify a relationship to the intermediary. In another implementation, the intermediary may post a list of validated people affiliated with its organization and the marketing system may match any registering member to an intermediary list.

Members Registration, Interface, and Functionalities

Individuals may register with the marketing program to become members. Registration could be facilitated by one or more registration means. For example, the individual may already be associated with a pre-registered program, such as, for example a financial program or a program of an intermediary whereby the individual is an affiliate of the intermediary. The pre-registered program may have one or more pieces of personal (identification) or demographic information associated with the individual available in a data source. A registration interface may be provided, this may include a page, for example, such as a web page, a page sent to an individual's mobile device (e.g., such as a smart phone, etc.), etc., whereby the individual approves joining the marketing program of the implementations. The registration interface may include a means for importing all personal or demographic information and preferences from the pre-registered program to the marketing program of the implementations.

In one implementation, if the pre-registered program involves one or more identifications the one or more identifications may also be transferred to the marketing program. For example, if the pre-registered program is a financial program one or more forms of payment linked to the pre-registered financial program could also be linked with the marketing program of the implementations to enable the marketing program to track transactions made with those forms of payment. In this manner the one or more forms of payment, or other identifications, may provide one or more participant identifiers linked to the new member for use by the marketing program. All registration data, including the one or more participant identifiers, may be stored in the data storage area, and may be accessible by the data mining tool.

As shown in FIG. 14, in another implementation, an individual 30 may register with the marketing program of the implementations by providing, through an interface 32, for example, such as a web page, a page provided on an individual's mobile device (e.g., such as a smart phone, etc.), or other interface, the individual's personal or demographic information. This information may include the individual's gender, the individual's age, the individual's location (e.g., home, workplace, or other location), as well as other demographic or personal information. The information may be stored in the data storage area and may be stored as a member profile. The marketing program may generate a participant identifier number for the new member. All registration data, including the participant identifier, may be stored in the data storage area 38 of the implementations, and may be accessible by the data mining tool.

In one implementation, a participant identifier card may be sent to the new member bearing the participant identifier number. A skilled reader will recognize that the participant identifier card need not be a physical card, but could be any form of payment device, including for example an RFID chip, a mobile phone, etc. depending on, for example, the supporting infrastructure of merchants.

The marketing program of the implementations may be operable to receive information from the member, at the point of registration, as well as at any other point while the member is a member of the marketing program of the implementations. Profile data may be collected by way of a variety of means, for example, such as a web page, a mobile device, a survey, transactions between members and merchants, or any other means. the profile data may include a set of rich data including information that is additional information to that which is gathered at the point of initial registration. the rich data may include a variety of information, for example, such as a list of the social networks the member is linked to, authentication information for those social networks (e.g. member names, passwords, etc.), preferred supported organizations and merchants (as described more fully below), transaction details for transactions undertaken by the member, survey data, any reviews generated by the member (e.g., merchant reviews, product reviews, or other reviews), updated location data, broadcasts that interleave hyperlocal geo-targeted advertisements for merchants that are viewed by the member, or other information. The information may be relevant to enabling optimal usage of the marketing program.

In one implementation, the data mining tool may be operable to identify members who may be inclined to utilize incentives defined by merchants. For example, the data mining tool may identify members who are likely to respond to sweepstakes (e.g., a merchant's offer for the member to win), who are likely to respond to discounts (e.g., a merchant's offer for the member to save), and/or who are likely to response to a merchant offer to make a donation to a charity located in the member's vicinity (e.g., a merchant's offer to benefit the local vicinity). This identification process may occur in accordance with the rules of the marketing program and/or the analytic mode, and may be based on administrative criteria, for example, such as demographic targeting of incentives.

The loyalty engine of the implementations may be operable to communicate the merchant incentive to the identified members.

A skilled reader will recognize that the architecture of the marketing program may enable shielding of the personal information of all members from individual merchants. Shielding may be the result of the application of a security system linked to or otherwise integrated with the architecture of the marketing program and in particular with the transaction linking facility, the data mining tool and the data storage area. The marketing program administrator may be in control of the personal information and may be the sole party having direct access to such personal information. The personal information of a member may be accessed by the data mining tool, but any review, report, list, results or other data generated by the transaction linking facility, data mining tool or analytic mode, may be devoid of identifiable personal information, for example, any results of the data mining tool may be anonymized.

The loyalty engine of the implementations may be operable to permit a member to create a review of a merchant or product. The loyalty engine may further be operable to permit other participants to create reviews as well. The reviews may be created based upon a template, or in response to rules of the loyalty engine, so that the member views a template, or a set of questions and merely responds to the template or questions. The template or questions may be accompanied by an option for free-form creation of a review, such as a space where the member may type a review, or portion of a review. Reviews may be available through the marketing program so that other participants may access the reviews. For example, reviews may be available on an electronic bulletin-board, via specific webpages, via a search, or through any other means. In some implementations a member may be provided with an incentive or other reward by the marketing system upon the creation of a review.

In one implementation, one or more questions on a survey may be dynamic and may be generated to be specific to a member. For example, one or more survey questions to be included on a survey to be provided to a specific member may be generated based on data relating to that specific member stored in, or accessible by, the marketing program. As an another example, one or more survey questions to be included on a survey to be provided to a group, class or category of members (for example, such as a group of boarded members, or other groups, classes or categories of member) may be generated based on data relating to the specific group, class or category of member stored in, or accessible by, the marketing program. In still another example, one or more survey questions may be generated to gather information regarding behavior of users or members and may be used as a source of information that provides a richer underpinning to consumer behavior analytics of the marketing program, in particular behavior relating to a transaction that may facilitate the analysis of the likelihood of a link between behavior of a member or a user, such as the member's broadcast ad viewing activity, and a transaction. A skilled reader will recognize the other uses of survey questions directed to extract information that may be analyzed to produce behavioral data relating to a member or a user.

Yet another example of specifically generated survey questions may include questions relating to a member's broadcast ad viewing activity that the marketing program matches to the transaction with a low, moderate, high or other level of certainty, as described above. As another example of specifically generated survey questions these may include questions generated after a member provides negative review regarding a merchant. A survey generated upon a subsequent transaction involving the member and the merchant may include questions that are devised to indicate whether the experience of the member during the transaction with the merchant improved during the subsequent transaction as compared to the transaction for which the member provided a negative review.

In implementations, the marketing program may be operable to support contribution priority schemes. The following represent examples of possible contribution priority schemes that may be provided in implementations. As one example, the marketing program interface may be operable to allow a member to modify his or her contribution preferences either at any time, or after particular periods of time. Another example is that the marketing program interface may be operable so that a community program, a foundation or other disseminating entity may register as an intermediary of the implementations. A member may provide a benefit (e.g., a donation or other benefit) to one or more intermediaries (e.g., the community program, the foundation or other disseminating entity), either directly, or through a merchant.

Figure 15:
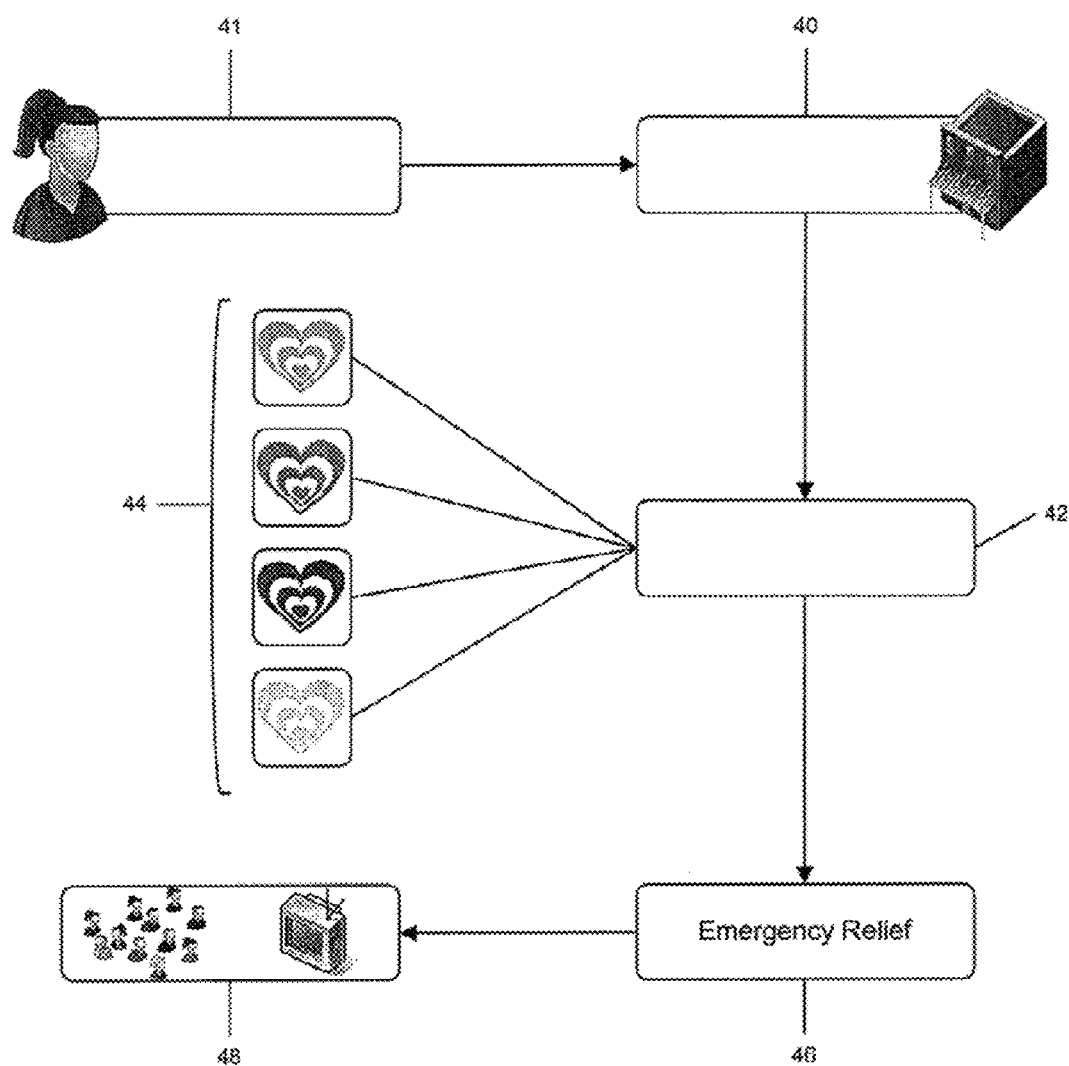
FIG. 15 is a systems view of a transfer of donations by the marketing system.

For example, as shown in FIG. 15, the benefit may be generated based upon a transaction between a member 41 and a merchant 40 in accordance with a merchant incentive, such as an incentive that provides a donation to an intermediary based upon a transaction. Once the benefit is received by the intermediary 42 (e.g., the community program, the foundation or other disseminating entity) the intermediary may either accept the benefit, for example if the intermediary is a community program. Or, if the intermediary is not a community program or other group that is to receive any benefit, then the intermediary may disseminate portions of, or the whole of, the benefit to one or more organizations 44, for example, such as charities, community programs, etc. The intermediary may also determine in some instances to redirect portions of, or the whole of, the benefit to an organization such as an emergency relief organization. The decision to redirect the benefit, or portions thereof, in this manner may be due to an emergency (e.g., such as the Haiti earthquake). Information outlets 48, for example, such as the media and social networks, etc., may disseminate information about the support for the organization 46 and build goodwill for the merchant.

In another implementation, a member may choose to match one or more donations that are generated based upon transactions with merchant stores. For example, the member may indicate to the marketing program that: all donations based upon transactions involving the member should be automatically matched by the member through the operation of the marketing program; that donations based upon transactions involving the member pertaining to one or more specific community programs, to one or more specific merchants, or to all community programs and/or merchants, during a specific period of time (such as during a period of emergency, during a particular campaign of a community program, or during any other period of time) should be matched automatically by the member through the operation of the marketing program; or that donations based on transactions between the member and one or more specific merchants should be automatically matched by the member through the operation of the marketing program. A skilled reader will recognize that other options for a member provide a matching donation through the operation of the marketing program may also be possible.

In yet another implementation, an intermediary may choose to match donations generated in one or more regions. For example, the intermediary may indicate to the marketing program that: all donations based upon transactions involving all merchants should be automatically matched by the intermediary through the operation of the marketing program; that donations based upon transactions pertaining to one or more specific community programs, to one or more specific merchants, or to all community programs and/or merchants, during a specific period of time (such as during a period of emergency, during a particular campaign of a community program, or during any other period of time) should be matched automatically by the intermediary through the operation of the marketing program; or that donations based on transactions involving one or more specific merchants should be automatically matched by the intermediary through the operation of the marketing program. A skilled reader will recognize that other options for an intermediary to provide a matching donation through the operation of the marketing program may also be possible.

As yet another example, the marketing program interface may provide to the member one or more intermediary codes that, when entered by the member into the interface, could automatically configure particular dissemination rules whereby one or more specific benefits may accrue to one or more intermediaries, charities, community programs, etc. The dissemination rules may be recognized by the loyalty engine.

A skilled reader will recognize that these examples are not exhaustive, and other possible contribution priority schemes and specific interfaces for particular intermediaries may be provided. The contribution priority schemes of the implementations may be operable to produce a transparent, accountable transfer of donations or other benefits.

Survey, Review, List, Report, etc. Generator

To aid in the collection of data stored in the data storage area, and the generation of reviews, reports, lists, results and other data generated by the transaction linking utility, data mining tool or analytic mode, the loyalty engine may generate surveys to be completed by members or other participants of the marketing program of the implementations. Such surveys may provide questions specifically created to derive information directed to the function of the marketing system, to particular transactions or transactions generally, to any merchant, intermediary or community programs, or to any other information relevant to the marketing system. Such surveys may be provided when a participant registers with the marketing system, or at any other point in time, such as after a transaction, following a merchant incentive offering, etc. Surveys may be provided to participants by a variety of means, including through web-pages, upon logging into the marketing program, via a mobile device, as a printed survey at the merchant location, or via any other means.

In one implementation, a post-transaction survey may be provided to a member involved in a transaction. The post-transaction survey may include a variety of questions, but may particularly include questions regarding the influences that led to the transactions. For example, was the transaction influenced by any incentive offered by the merchant by way of having viewed a broadcast of a hyperlocal geo-targeted advertisement for the merchant's brick and mortar store. A skilled reader will recognize the variety of questions that may be included in a post-transaction survey.

Reviews, reports, lists, results, etc., based on the surveys can be generated for merchants. For example, survey results that indicate particularly good or bad service by a specific merchant, or particularly good or bad quality of a product, or any other information, may be identified by the data mining tool and the information may be summarized, or consolidated into a review of the merchant, product, or other element to be reviewed. In this manner reviews may be automatically generated by the marketing system, alternatively reviews may be generated upon request by a participant or third party. Reviews may also be created by participants, based upon a template or in a free-form manner. Another example of a use of such information is that when other members are searching for a merchant these members may access or be provided with a copy of a review regarding a particular merchant. A skilled reader will recognize that the use of reviews, reports, lists, results, and other documents may be wide and varied.

Local, Regional, and/or National Applications

In some implementations, the marketing programs may operate to produce local benefits, regional benefits and/or national benefits to the participants. For example, the implementations may be operable to permit a member to participate in the marketing program in one location, region, nation, etc. Yet the implementations may further permit a member who is travelling, relocating, or is otherwise interested in another location, to participate, automatically, or upon request, in the marketing program in another location, region, nation, etc. Merchants that have an international, national, multi-regional, or multi-locational presence may be associated with the marketing program. Specific store locations associated with a merchant may be recognized as existing within a specific location, so that in the locational, or regional operation of the marketing program the stores locations may be associated with the corresponding community programs of the marketing program.

For example, an incentive may be applicable to one or more store locations of the merchant. An international incentive may be applicable to a community program that is international, such as Right to Play™, and the international incentive may be honored by all of the merchant's store locations in the world. A national incentive may be applicable to a national community program, such as the Canadian Olympic Torch Relay™, and the national incentive may be honored at all of the merchant's store locations within a particular nation (e.g., all Canadian store locations of The Bay™). A regional incentive may be applicable to a regional community program, such as the Vancouver Olympic Games™, and the regional incentive may be honored at all of the merchant's store locations within a particular region (e.g., all store locations of The Bay™ in the City of Vancouver, British Columbia, etc.). Smaller locational incentives may also be provided that are applicable to a more localized location, such as a festival held in a park, and the localized incentives may be honored at all of the merchant's store locations within the specified location (e.g., store locations bordering the park where the festival is held, store locations on a street where a street festival is held, etc.).

A skilled reader will recognize that merchants of various sizes may participate in the marketing program of the implementations. The marketing program may be operable to permit a community program and/or specific merchant store(s) to associate with the marketing program and receive benefits. Neither the community program nor the merchant need have a national presence. Merchants and community programs that do not have a national presence may enjoy lower national public recognition. This lower public recognition may have resulted in reduced benefits to the community program and/or local merchant store(s), since neither may be recognized beyond a small location and therefore a small number of donators/contributors/attendees/consumers/etc. Participation in the marketing program of the implementations may provide participants with the benefit that members gain awareness of community programs and/or merchant store(s) occurring in their local area. This awareness may augment the notoriety of the community program and/or the merchant store(s). The awareness may further have other benefits, described herein, including increased attendance at a community program and/or increased sales at a merchant's store.

As described in this patent application, the implementations may have a variety of implementations, one such embodiment may involve a merchant committing to donate a portion of its revenue from transactions at one or more store locations involving members to a community program, the community program being local to the merchant store(s) where the transactions take place. The donation portion of the revenue amount may be based on various parameters. These parameters may be tracked by the marketing program. The marketing program may operate so as to utilize the tracked transaction information to calculate the amount a merchant is to pay to a community program in accordance with the promised donation. The donation amounts may additionally be trackable and reportable in a clear manner upon request, so that the transfer of the donation amount is obvious and is possibly unencumbered by transfer fees. In this manner this implementation may enable community programs and merchants to participate in the marketing program in a manner that is cost effective to all parties of the marketing program.

In another implementation, the marketing program may be operable to permit a merchant to offer different contributions to designated community programs. This may involve a merchant providing multiple incentives at one or more store locations to members, and at least two of the multiple incentives being associated with different community programs. The marketing program may be operable to track the multiple incentives and/or the different contributions by merchants to designated community programs. The factors that may be tracked by the marketing program, the factors may determine the type of contribution to be made by the merchant to a community program and/or the merchant incentive to be applied to a transaction, may include one or more of the following: the time of day when a transaction occurs; the day of the week when the transaction occurs; any member demographics; any transaction history; any incentive details, for example, such as a coupon, provided at the time of the transaction; and the community program details. A skilled reader will recognize that other factors may be utilized by the marketing program to define and track contributions by merchants to community programs and/or merchant incentives.

Boarding Means

In one implementation, to facilitate batch customer acquisition a boarding means may be provided to operate to allow a third party and/or intermediary to associate itself with the marketing program. The intermediary may be, for example, an online retailer having a customer base with user accounts, an online payment provider also having a customer base with user accounts, an online advertiser and/or search provider, a cable or satellite broadcast subscription service having a customer base with subscriber user accounts that include viewing habits, demographics, and personal preferences of each subscriber household and of each individual within the subscriber household, or any other online presence having a customer base with user accounts. The intermediary could also be a company and the members to be acquired by the marketing program could be the employees of the company. The marketing program may make the boarding means accessible to the intermediary by, for example, a user interface for creating the association. The intermediary may desire to associate with the marketing program for a plurality of purposes, including: increasing its own customer base to include the marketing program's members; altruistic purposes; to increase its own charitable giving for tax purposes; or to appeal to consumers and generate marketplace goodwill.

In one implementation, the boarding process may operate so that once the intermediary associates with the marketing program, the user accounts of the intermediary may automatically become associated with the marketing program. Once the user accounts are associated with the marketing program each of the users is recognized as a new member of the marketing program. The marketing program may then be operable to provide a user interface for these new members, whereby the new members may complete their profiles. The provision of this user interface may occur in any of the manners described above, for example, such as through the provision of a survey, through the provision of a particular web page, or other means. A skilled reader will recognize that It this boarding process, and the acceptance of new members generally into the marketing program, may increase the awareness of the marketing program and may significantly increase its member base. As described above, this may produce benefits for the merchants, community groups, and other intermediaries participating in the marketing program.

Participant Location Facilitator and Mapping Function

All members of the marketing program may be identified by the loyalty engine of the implementations as existing in a particular location. This location may be recognized as being in the vicinity of areas associated with particular community programs. In accordance with the scope of the community programs this area may have a perimeter that encompasses a wide or narrow territory. For example, the member may be recognized as existing in a location that is within an area that is a neighborhood, or an area that is a country. In implementations, it may be possible for the marketing program to recognize a member as existing in a single location (e.g., a home address), or multiple locations (e.g., a home address, a work address and/or other addresses, such as a cottage address).

In one implementation, a mapping means may be operable to allow a member or other participant to request a map showing merchants that are participants of the marketing program located in, or near to, an area that encompasses a location of the member. The marketing program may utilize the data mining tool to identify a location of the member from the member profile (e.g., the home address of a member), the marketing program may ask the member to choose a location if multiple locations are in the member profile (e.g., choose a home address or a work address of the member), or the marketing program may accept a location inputted by the member as the location of the member. The area of the map may be adjustable to show various sized areas. The marketing program may also be operable to allow a member to specify categories or types of merchants to be shown on the map (e.g., restaurants, clothing stores, hardware stores, etc.). A skilled reader will recognize that other parameters may be included in the requested query.

The implementations may generate a map based upon the member map query. The data mining tool may be utilized to identify any merchants and/or community programs located within the area of the map.

Figure 16:
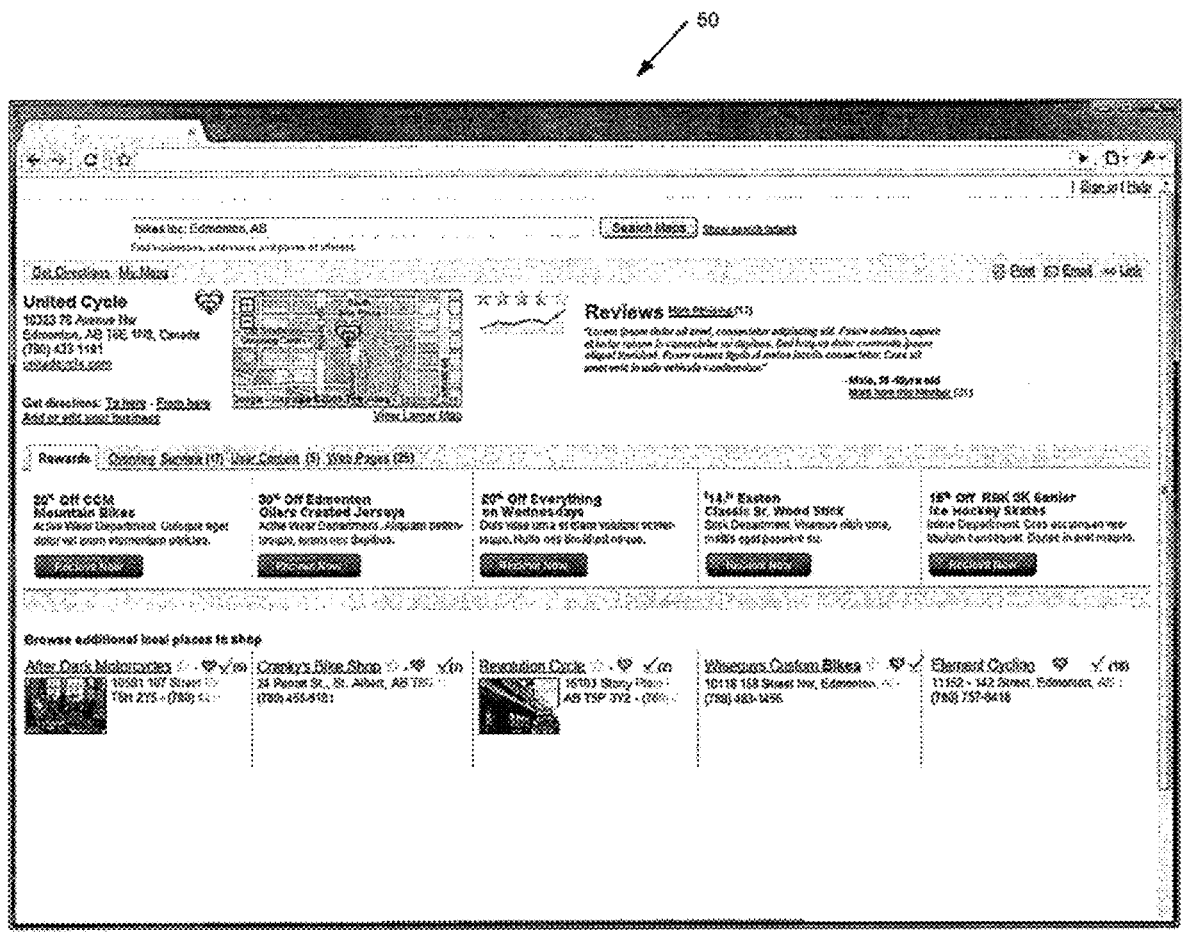
FIG. 16 is a screen view of a merchant information web page.

An example of a map 50 of the implementations showing merchant information is shown in FIG. 16. This is just one example of possible maps that may be generated by the implementations, and a skilled reader will recognize that other map displays or other map outputs may be possible.

Maps generated by the implementations may show the merchant store(s) existing in, or near to, a location or area. The map may additionally show the location of any community programs occurring at the time when the query is sent (e.g., such as a street festival in the area, or a clothing drop-off located on a street). The map may have other facilities as well. For example, the map may indicate, may be by way of a symbol or color indicator, that particular merchants are offering merchant incentives.

The map may also permit information regarding merchants, community programs and/or merchant incentives to be accessed by a participant, for example, such as by a display that appears when a mouse is held over where the merchant and/or community program is shown on the map, or by a clickable access to information (e.g., clicking the merchant location accesses the merchant web page or a summary of merchant information, etc.), or other information access and/or display means. The displayed or accessed information may include the location of a merchant store and/or a community program, the dates when a community program is occurring, the date(s) for a merchant incentive, and any other information. The displayed or accessed information may be provided in accordance with rules of the marketing program. A skilled reader will recognize that Implementations may include other options of visually displaying or accessing information regarding merchants, community programs and merchant incentives in a specific location.

Still other implementations may be operable to recognize the location of a member at a point of time. For example, a GPS system on a mobile device in the possession of a member or other participant, such as may have a TV Everywhere app for viewing a broadcast of a hyperlocal geo-targeted merchant advertisement, may send location information to the marketing program. In this embodiment the marketing program may provide a member with information regarding merchant incentives pertaining to the location of the member at a point in time. (For example, a member who travels on vacation to New York City may be recognized by the marketing program as existing in New York City because the marketing program can read the location of the member based on a GPS feature or application linked to the smart phone in the possession of the member. The member may then submit a query to the marketing program requesting information about merchant restaurants local to the location of the member in New York City at the time of submitting the request. The marketing program may generate a map showing merchant restaurants in the vicinity of the location of the member submitting the request in New York City. The function and capabilities of the map may be as are described above.)

Data Storage Area and Data Mining Tool

The data mining tool of the implementations may be utilized to generate a wide variety of reports, reviews, lists, results, search displays and other data from the data stored in the data storage area. In some implementations, in order to produce certain outputs, the data mining tool may also engage the transaction linking utility to generate some information to be provided as part of the output.

The data stored in the data storage area may include information pertaining to past, present and/or future community programs. This information may be gathered by the administrator, as described above. The community program information may link a community program to a specific area or location, and may include details of the community program (e.g., dates, times, location(s), events, summary of community program, etc.).

The data may also include information regarding participants in the marketing program (e.g., merchants, members and intermediaries). This participant information may include information generated at the point of registration, as well as information collected at later points in time, for example, such as through surveys, tracking of participants that viewed a broadcast containing a merchant's advertisement, etc.

The data may further include details of transactions between members and merchants. Such transaction details may include any merchant incentive that was applied to the transaction. If an incentive was applied the community program that the incentive was applicable to may also be included in the data.

In one implementation, a link may be produced between the transaction data and the community program information already existing in the data storage area. The data mining tool may be operable to limit information appearing on any report, review, list, results, etc., so that such information cannot include any personal information pertaining to any participant of the marketing program. Alternatively, the data mining tool may generate reports, reviews, lists, results, search displays, etc., in accordance with rules whereby the data mining tool anonymizes any personal information utilized to generate the reports, reviews, lists, results, etc. A skilled reader will recognize that other methods and means may be utilized to ensure that personal information is not disseminated in any report, review, list, results, etc. Additionally, a skilled reader will recognize that the rules for limiting the dissemination of personal information may be in accordance with privacy legislation pertaining to a particular jurisdiction, may provide limitations representing several levels of security, or may be set to a standard that is stricter than privacy legislation. The standard of privacy imposed on the information may be chosen and applied at the discretion of the administrator.

A skilled reader will recognize that other information regarding the transactions, participants, merchant incentives, donations, and community programs relating to the merchant program may be collected by the loyalty engine and stored in the data storage area.

In one implementation, a data access management utility may be utilized to organize the collection of data, the storage of data in the data storage area, and the access of data in the data storage area. The data access management utility may be operable to restrict direct access to the data to the administrator, for the purpose of protecting data integrity and privacy of personal information. The data access management utility may further restrict access to particular data by the data mining tool for particular types of information generation and/or for specific participants. In particular, the data access management utility may recognize that intermediaries have limited participation in the marketing program and therefore that any query or request for information instigated by an intermediary may not access, even for reporting purposes, particular data stored in the data storage area.

In one implementation all of the information existing in the data storage area may be accessible by the data mining tool for the purpose of generating reports, reviews, lists, results, summaries, overviews, and any other information. The reports, reviews, lists, results, search displays, summaries, overviews, and other information may be generated in accordance with rules of the loyalty system. For example, rules may be created whereby a merchant transaction report is generated at a regular interval (e.g., monthly, etc.) for each merchant showing the transactions between merchants and members during a specified period of time.

Rules may also be created to be used for the generation of reports, reviews, lists, results, summaries, overviews, and other information upon request. For example, rules may be created whereby a merchant may request a list of members existing in the vicinity of a merchant's store location.

In some implementations, free-form queries may also be undertaken by the data mining tool, whereby specific information may be gathered for a particular purpose or application. For example, after a merchant incentive is completed a free-form query may be created to generate information pertaining to the merchant incentive. This information may be reviewed to glean important understanding of the success of the merchant incentive. A report, review, result, etc. may be further utilized to develop new merchant incentives.

Figure 17:
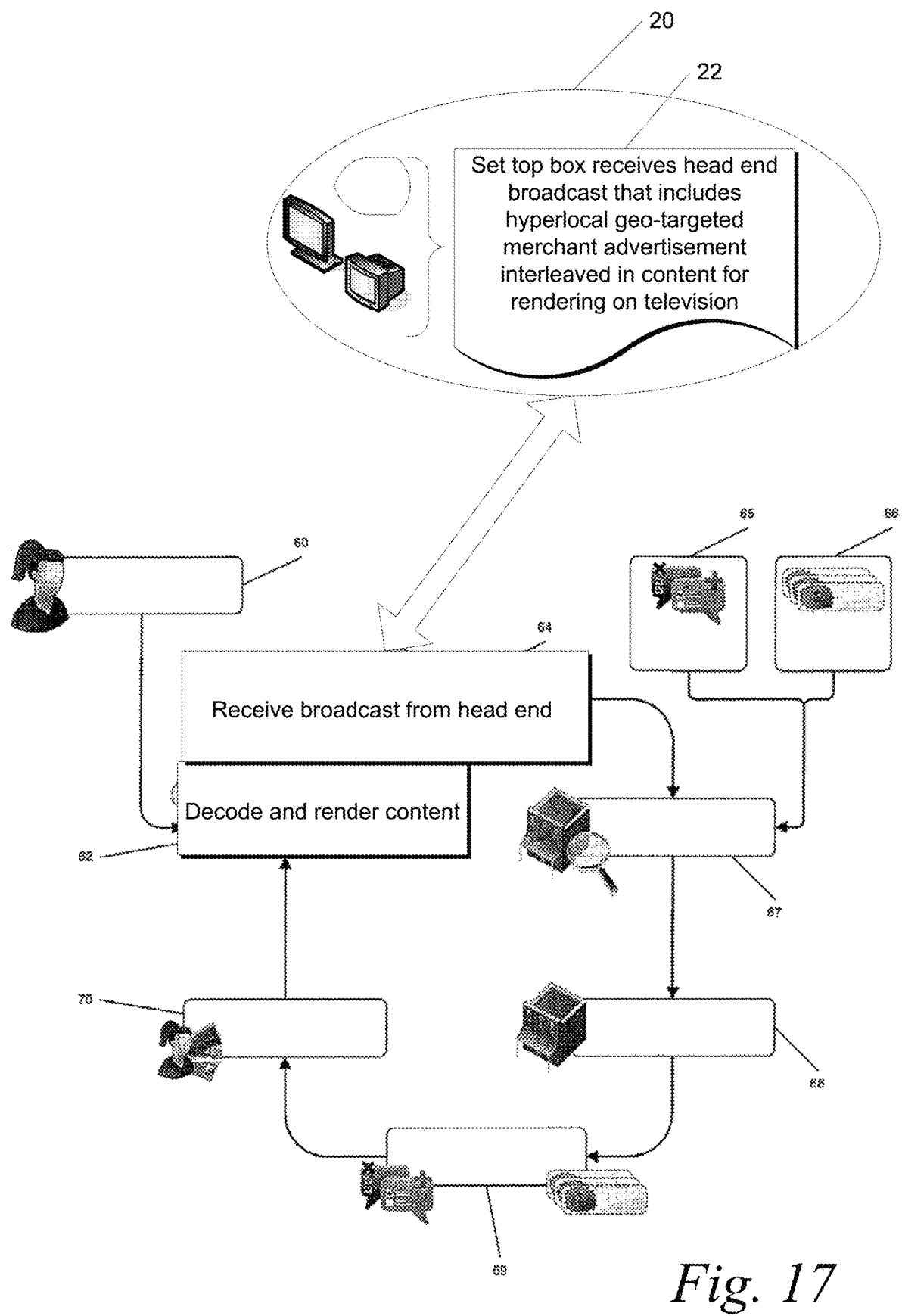
FIG. 17 is a systems view of a process to link a transaction between a merchant and a resident of the same vicinity to the resident's viewing of the merchant's broadcast advertisement on a television receiver.

For example, as shown in FIG. 17, a participant 60 views at processes 62-64 a broadcast for display on a television 20. The broadcast includes a hyperlocal geo-targeted advertisement 22 that is rendered only to televisions located in a particular vicinity. The advertisement is for a merchant who is located in the particular vicinity. In one implementation, an advertising cost is assessed by the broadcaster, such as a local TV station, to the merchant in the particular vicinity. In one alternative of this implementation, the advertising cost is inversely proportional to the navigation time from the location of the television in the particular vicinity to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

It may be possible for a participant to conduct a transaction 70 with the merchant, such as a transaction whereby a participant purchases an item from a merchant, and the transaction may involve a merchant incentive. A skilled reader will recognize that this is just one example of how the request for information or data query may function and that other functions are possible.

Analytic Mode

In one embodiment the data mining tool may include an analytic mode. The analytic mode may be operable to cause the data mining tool to perform an analysis based upon the data that the data mining tool accesses. The analytic mode may incorporate rules of the marketing system, or may be distinct from rules of the marketing system.

The analytics may cause the data mining tool to produce information that provides more than a display of a subset of the data stored in the data storage area. The analytic mode may access and incorporate any of the information collected and gathered by the marketing program and stored in the data storage area. The analytic mode may therefore be utilized to reflect information: in response to a particular advertisement, merchant incentive or other aspect of the marketing program; providing behavioral data relating to member transactions; and/or pointing to member interests which may be the basis for directing particular advertisements or merchant incentives to individual members or member groups. The analytic mode may be utilized to provide information to be used to develop new merchant incentives, marketing and philanthropic strategies for the marketing program participants and/or the wider community. Analytic mode results may reflect results for a particular area, which may be a city block, a neighborhood, a city, a street, a region, a county, a province or state, a nation, etc., to reflect results for widening ranges of participants and locations.

For example, the data mining tool may produce a list of members existing in a particular location based upon a query, the query being either a free-form query or a rule(s)-based query, if the analytic mode is not engaged for the data mining tool. If the analytic mode is engaged the data mining tool may analyze or otherwise filter, re-represent, consolidate or manipulate prior to presenting the generated data in a report, review, list, overview, summary, result, etc. A skilled reader will recognize that the analytic mode can undertake a variety of data analysis techniques, including algorithms, calculations, reviews, filters, consolidation, manipulation, re-representations. The analytic mode may further involve one or more rules of the marketing program. Additionally, the analytic mode may be utilized to produce reports, reviews, lists, overviews, summaries, results, etc. on a regular basis, or upon demand, as described for the data mining tool generally above.

The benefit of the analytic mode may be to generate particular data, provided in a specific format, that may be utilized for a precise purpose. For example, the analytic mode may generate information that provides customer demographics for a particular merchant incentive. The customer demographics may be utilized to develop new types of targeted merchant incentives. A skilled reader will recognize that variety of types of information may be generated by an analytic mode and that a variety of uses may be made of such generated information in the context of the marketing program.

The data mining tool, with or without the analytic mode engaged, may be utilized to provide information to participants of the implementations that may aid in creating links between merchants, customer programs and/or specific customer demographics. For example, the data mining tool may be utilized to generate a list of members who may make use of a particular merchant incentive offered in one or more specific merchant store locations. Such a list may be utilized to provide instructions to the loyalty engine to disseminate a communication (e.g., via email, to a smart phone, etc.) to the members included in the list regarding a merchant incentive. Alternatively, the loyalty engine may recommend that the incentive be disseminated in a broadcast of a hyperlocal geo-targeted advertisement that is likely to be viewed on television receivers by a select from of member in a particular vicinity.

As another example, the data mining tool may be utilized to generate a list of members and/or merchants existing in a particular location who may be interested in attending a specific community program event. Such a list may be utilized by a community event to produce a guest list to whom invites may be disseminated (e.g., via email, to a smart phone, via the regular post, etc.) to the member invitees. Alternatively, the data mining tool may produce a result that suggests that information pertaining to the specific community program event be disseminated in a broadcast of a hyperlocal geo-targeted advertisement that is likely to be viewed on television receivers by a select from of member in a particular vicinity.

As yet another example, the data mining tool may generate a display of a set of reviews of a particular merchant to a third party considering becoming a member of the marketing program. Such a list may be utilized by the third party to decide whether to become a member of the marketing program or not, or whether to visit a particular merchant or not.

A skilled reader will recognize that a variety of information may be generated by the data mining tool, with or without the analytic mode engaged, and that the breadth of the information generated may be directly affected by the depth of information stored in the data storage area. Storing a wide variety of information in the storage data area, which may be portioned for storage purposes, but wholly accessible by the data mining tool, provides data having significant depth for the data mining tool to utilize. The implementations is therefore operable to provide not only a wide variety of information, but also detailed information and specific targeted information to be utilized for many purposes.

Transaction Linking Utility

A transaction linking utility may be operable to determine links between a transaction with a merchant and a member or user viewing of a broadcast that interleaves a hyperlocal geo-targeted advertisement for the merchant. In some implementations, the merchant's advertisement may a Merchant Advertisement Matrix Code. The determination of links may be qualified, to indicate a level of likelihood or certainty of a match between the member or user TV viewing and a transaction. For example, the transaction linking utility may be operable to determine that the merchant's ad for a product that was viewed by a member via a broadcast may have resulted in a particular transaction occurring. In this manner the transaction linking utility identifies a link or a match between the ad viewing and the transaction by the member. The match may not be wholly certain in each case and therefore the transaction linking utility may further be operable to indicate a level of certainty or likelihood that the match or link between the ad viewing and the transaction is accurate. Many factors can be utilized to determine the level of certainty or likelihood. A skilled reader will recognize that a variety of member or user behaviors or attributes may further be factors in the determination of the transaction linking utility.

The transaction linking utility may be operable in some implementations to generate behavioral data regarding activities or behaviors of members or users in relation to transactions. The transaction linking utility may be utilized in conjunction with the data mining tool and in some cases the analytic mode to generate specific data for a variety of purposes relating to transactions.

Method

A skilled reader will recognize that a variety of methods may be applied in the implementations. The description below provides some possible examples of methods of the implementations.

Registration of Participants and Data/Information Collection

The method of Implementations may involve an administrator collecting information regarding community programs. The administrator may utilize automated search means and/or manual search means to locate community programs. Information regarding the community programs, for example, such as the dates, times, events, purpose of the community program, may be stored in the data storage area. The information collected regarding each community program may include details necessary for an individual to attend a community program, as well as details regarding the purpose, history or aims of the community program. All community program information may be stored in the data storage area. The information collected and stored for each community program may include details regarding the location where the community program operates or events relating to the community program are held.

The community program information may be displayed in a variety of means, such as in a list of community programs, a calendar showing the dates of community program events, or in any other means.

Members and merchants may register with the marketing program of the implementations. The process of registration may involve the members and/or merchants providing certain information to the marketing program. This information may be saved in a profile for each member and/or merchant. The profile information may include a variety of types of details, but may also include a participant identifier. The participant identifier may be retrieved from organizations or programs the merchant and/or member is previously involved in, for example, such as a BIN number, a financial card number, an identifier for a set top box or like component by which a participant receives and views television content that is broadcast from a cable or satellite head end, or a transaction number. Alternatively, the participant identifier may be randomly generated and applied to the profile by the marketing program. Additional information may be collected regarding participants due to activities (e.g., transactions, broadcasts of interleaved hyperlocal geo-targeted advertisements for merchants that were viewed by members, reviews, etc.), and/or the provision of additional information by participants (e.g., by direct input, survey responses, etc.).

Some members may be automatically boarded (i.e., auto-boarded) into the system, so that such members are not required to individually enter initial profile information. Profiles information may be transferred to the marketing program for members that have previously been involved with other organizations or programs form the organizations or programs. If boarding occurs the individual member will be required to activate the profile in order to register with the marketing program.

Figure 18:
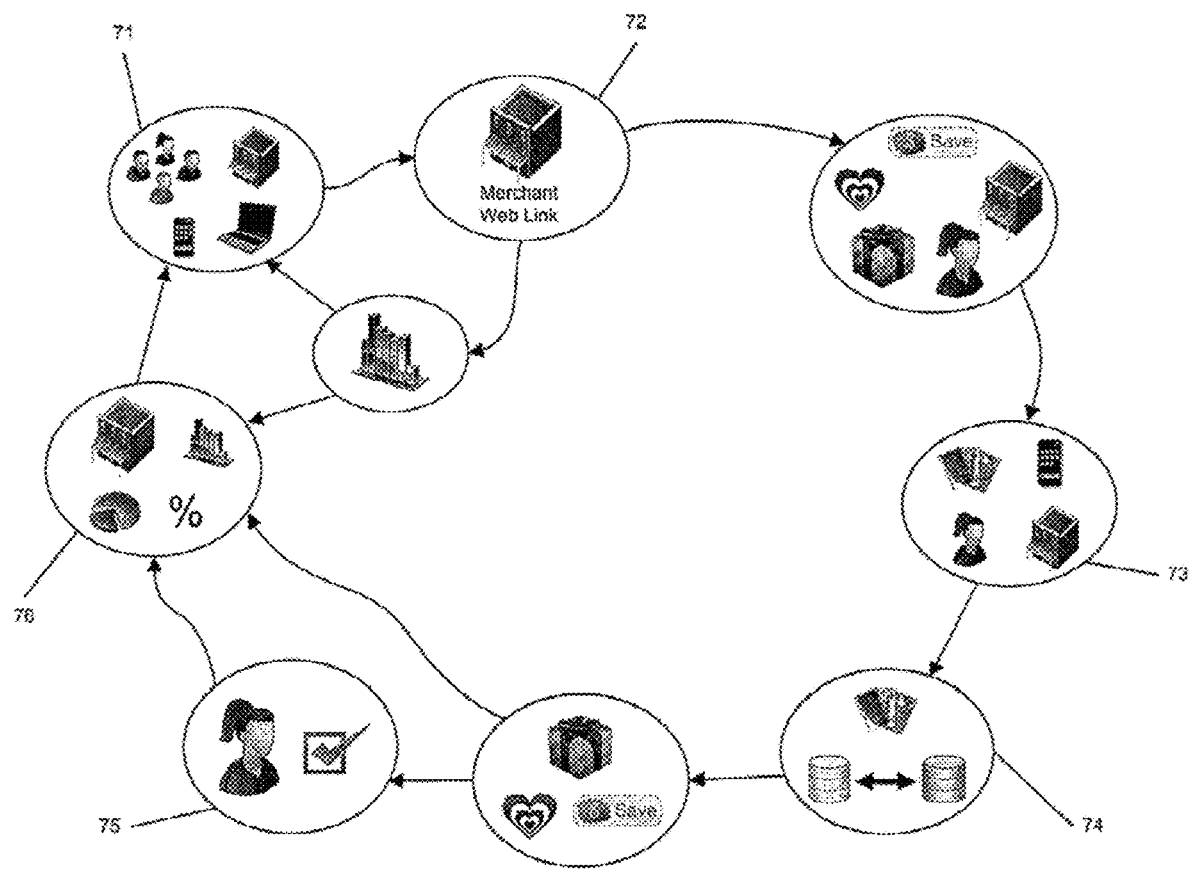
FIG. 18 is a view of the flow of one embodiment of the marketing program generating members through a boarding process.

A boarding process, such as is shown in FIG. 18, may be utilized for example for employees of a company or a financial card provider. In this example, the company or financial card provider may decide to join the marketing program, for example, the company or financial card provider may join as an intermediary and thereby have partial participation in the marketing program. The company or financial card provider may make available information regarding all of its employees or financial card holders for boarding purposes. The employees or financial card holders may be provided with a registration activation code. Once the employee or financial card holder provides the registration activation code to the marketing program the member registration is complete for the employee or financial card holder who then becomes a member 71 of the marketing program. In this example, the participant identifier for the members could be an employee number or a financial card number. This information would be transferred in the boarding process. Alternatively, an employee or financial card holder may be required to watch an informational video regarding the marketing program, or view other information prior to becoming registered as a member. A skilled reader will recognize the variety of means of registration that may be utilized to register a boarded member with the marketing program.

After registration members may access merchant information 72 regarding one or more merchants through the marketing program, as described in this specification. The member may request and access specific information regarding a merchant, for example, such as information regarding merchant products, services and/or incentives. The member may also review information pertaining to the member, such as any amount of rewards (such as reward points) accumulated by the member, member profile information, etc. The member may engage in transactions with the merchant 73, as a result of accessing information regarding a merchant or for other reasons, and the transactions may occur online or offline. Information regarding the transaction may be transferred to the marketing program 74, and the transaction linking utility may be utilized to confirm that a member is eligible for a merchant incentive. The matching may utilize details of the transaction or other member details stored in the data storage area in conjunction with the transaction details, for example, such as merchant incentive information, the identification of a member, financial card information, or other information, to identify when a member is eligible for a merchant incentive.

The transfer of information from a merchant to the marketing program for an online transaction may occur in a variety of ways. For example, the information may be transferred via an information link existing between the marketing program and the online site where the transaction occurred. If the online site where the transaction occurred is accessed through the marketing program website, or through a search engine linked to the marketing program, an information link may automatically transfer the information regarding the transaction to the marketing program. In other instances, the marketing system may be capable of searching the merchant online transaction information stored in the merchant's server to identify transactions involving members of the marketing program or any merchant incentive. In one embodiment, upon a merchant transaction a notification may be sent to the marketing system to search the merchant's transaction information, or the search may occur at any interval or time after the transaction. It may also be possible for the merchant site to transfer information to marketing system at regular intervals when there is relevant transaction information reflecting transactions involving either members or merchant incentives. Any transfer of transaction information or search of transaction information may occur either in real-time in relation to the transaction, or at any time after the transaction occurs. A skilled reader will recognize that a variety of other means and/or methods of transferring transaction details to the marketing program during or after an online transaction occurs may be applied in the implementations.

The transfer of information from a merchant to the marketing program for an offline transaction may occur in a variety of ways. A POS terminal in a brick and mortar store of the merchant may be operable to transfer transaction details to the marketing program, either during a sale, for example in real time, or after one or more sales as an upload. Alternatively, the merchant may have a system whereby an electronic report of the transactions is generated and transferred to the marketing program either automatically or upon a specific activity of the merchant. As yet another option, the marketing system may provide a screen whereby a merchant may fill-in transaction details and thereby provide the transaction details to the marketing system. A skilled reader will recognize that a variety of other means and/or methods of transferring transaction details to the marketing program during or after an offline transaction occurs may be applied in the implementations.

Implementations may involve other means of transferring online and/or offline transaction information to the marketing program. For example, a transfer means may be integrated with a POS terminal used in the transaction, whereby the information is captured by the POS terminal and transferred to the marketing program by the POS terminal. As another example, data feeds may be generated by one or more merchant acquirer or payment processor (for example, such as Moneris™) and the merchant acquirer or payment processor may transfer the data feeds to the marketing program. As yet another example, data feeds may be generated by one or more card issuers (for example, such as the Royal Bank of Canada™, Toronto Dominion Bank™, etc.) and the card issuer may transfer the data feeds to the marketing program. As still another example, data feeds may be generated by one or more card associations (for example, such as Visa™, MasterCard™, etc.) and the card association may transfer the data feeds to the marketing program. As yet another example, data feeds may be generated by one or more data aggregators and the data aggregator may transfer the data feeds to the marketing program. A skilled reader will recognize that other options may be available for transfer of information to the marketing program, including any combination of any of the examples provided above.

As the capture and storage of transaction details, for both online and offline transactions, may be critical to the effectiveness of the implementations, the marketing program may incorporate a means of obligating and/or otherwise requiring merchants to provide transaction details to the marketing program. For example, the provision of full and complete transaction details to the marketing program may be written as an obligation in any contract whereby the merchant becomes a participant of the marketing program. The administrator may check whether a merchant is meeting this obligation, for example by checking incentives against the transactions, or by any other checking means. A skilled reader will recognize that other means of requiring merchants to provide transaction details may also be applied.

Moreover, a merchant may consider itself to be obligated to provide transaction details due to a recognition that the marketing program is significantly more effective when robust transaction details are provided by all participating merchants, as the transaction details can be utilized to assist merchants to derive information regarding consumer behaviors, and other information. As is described herein, the information of the marketing program may be utilized for a number of purposes, including attracting a larger clientele, creating new incentive programs and other uses. These uses can create significant benefits for merchants, and for this reason, or to meet other obligations or requirements, the merchants may be inclined to assist by providing transaction details to the marketing program.

In one embodiment, a member may decide after accessing information regarding a merchant, a product, or receiving one or more incentives to undertake a transaction. As described in this application, the information may be accessed by way of a member viewing a hyperlocal geo-targeted broadcast containing the merchant's advertisement. Such an ad viewing and a transaction occurring after the ad viewing may be assumed to have occurred as a result of the ad viewing, in accordance with criteria of the marketing system, such as the time-lapse between the ad viewing and the transaction. If the viewing of the merchant's advertisement in a broadcast causes an incentive to be communicated to the member that is redeemable based upon a transaction, the transaction may also be assumed by the marketing system to be based upon the incentive.

In another implementation, a member may not have seen a broadcast that interleaves a hyperlocal geo-targeted advertisement for a merchant, but may be assumed by the marketing system to have engaged in a transaction due to an incentive if: the incentive is advertised in the merchant location (e.g., a balloon is provided as an incentive with every purchase); the member acknowledges in a post-transaction survey that the transaction occurred due to the incentive; the member receives a communication about an incentive through electronic communication directed to a personal information area belonging to a member (e.g., a text, an email); the member attends an event (e.g., a community program event, or other event) where the incentive is communicated and the attendance of the member at the event is made known to the marketing system and this information stored in the data storage area; and/or other communication means that is trackable by the marketing system so that the marketing system can evaluate the time between the communication of the incentive to the member and the transaction. In such cases, the marketing system can provide helpful information to the merchant by taking into account that a broadcast of the merchant's hyperlocal geo-targeted advertisement was not linked to the transaction with the member.

After the transaction is completed the transaction data may be processed. This may involve accruing a donation to a community program, if a donation was incorporated into a merchant incentive generated by the transaction.

In one implementation, a post-transaction survey 75, as seen in FIG. 18, may be generated and disseminated to the member. The member may respond, and in particular may confirm whether the transaction occurred as a result of the member reviewing the merchant information through the marketing program.

At any point it may be possible for participants to request information from the marketing program 76, as a report, result, review, search display, etc. This request for information or other data query may engage the analytic mode in some circumstances. A skilled reader will recognize that the results of the request for information or other data query may be utilized for a variety of purposes, including for example, identifying transactions occurring in a manner that indicates the transaction occurred as a result of the member receiving information regarding the merchant through the marketing program.

Intermediaries may register with the marketing program of the implementations and thereby gain limited access to the program functions and the marketing program data. For example, an intermediary may be a community group interested in limited access for the purpose of looking at the merchant incentives offered pertaining to the community group event. Or the community group may be interested in limited access for the purpose of generating lists of merchants and/or members that may be invited to attend a community program event (such as a fund-raising dinner). The list may include local merchants and/or members, or merchants and/or members who have characteristics in their profile that suggest they may be interested in supporting the community program. As another example, an intermediary may be a marketing associate who is working with one or merchants to create merchant incentives relating to community programs. The marketing associate may be granted limited access to some of the data and a certain activities of the data mining tool, to generate information to aid the marketing associate in creating a feasible merchant incentive relating to a community program. As yet another example, an intermediary may be an organization, such as a company or a financial card provider. The organization's participation in the marketing program as an intermediary may provide a link whereby the organizations its associates direct involvement in the marketing program as merchants and/or members.

After the point of registration additional information pertaining to participants in the marketing program may be gathered through a variety of means. For example, a survey may be provided to a participant and completing the survey may generate data that is transferred and stored in the data storage area. Other means of entering information into the marketing program may also be provided to a participant, such as a web page. Surveys and other data input means may be provided to a participant through a variety of means, for example, such as a mobile device, a web page, or other means.

Possible Data Mining

After registration, a merchant may consider possible incentives to implement at a merchant location and/or online. This decision may involve considerations of relevant community programs, possible incentives, cross-loyalty and/or cross-selling groups.

The marketing program may provide query and/or searching assistance whereby a merchant may use a template search query, and the search query may include drop down menus showing search options, to derive information from the marketing system. The template may be utilized by the data mining tool and/or analytic mode to generate a particular result, such as a report, list, incentive suggestion, community program link suggestion, cross-selling suggestion, cross-loyalty suggestion, or other results. A skilled reader will recognize the variety of results that may be derived from the data and/or information in the data storage area, as well as the variety of search query templates that may be provided to a merchant by the marketing system. The results may be utilized by the merchant to make decisions, such as, for example choosing incentives to implement, choosing to form cross-selling groups, choosing to form cross-loyalty groups, choosing community programs to link with, choosing incentives to be broadcast in a hyperlocal geo-targeted advertisement for viewing by a select group of members who are likely to conduct a transaction due having been made aware of the incentive via the ad, etc.

Information and other data collected by the implementations may be stored in a manner whereby the information is easily mineable by a variety of participants and/or third parties, including local businesses. The data mining tool, and optionally the analytic mode, may be utilized to generate or otherwise derive results that may be utilized by merchants or other business owners to determine indicators of successful incentives and other business generators in a specific geographic area. For example, the results of the implementations may indicate why one merchant location may get more business than another merchant location or other business location, such as the type of incentive offered (e.g., balloons are offered as an incentive at one merchant location and since these appeal to kids the mothers shopping with their kids will frequent that merchant location which is significant because mothers represent the majority of shoppers in that geographical area; or people living in a particular area may be likely to leave on extended vacations to their cottages during the summer months and on weekends during the rest of the year and therefore may be unlikely to visit some types of merchants during these times; etc.). A skilled reader will recognize the many uses that may be made of the information and data collected by the implementations and the fact that such information is generally available for data mining and analytic uses.

In one implementation, the data mining tool may access information and/or data in the data storage area, and may also access information and/or data from other data sources, which may be outside the marketing system, such as data sources (e.g., databases, hard disks, etc.) controlled by intermediaries, other participants, or third parties. Access to these other data sources may be recognized by the template, by the analytic mode, or by other rules utilized by the marketing system.

A merchant may utilize the data mining tool to identify community programs occurring or to occur in the future, in the vicinity of one or more merchant store locations. The merchant may then devise and develop a merchant incentive for the one or more stores that are local to the community program, the merchant incentive being created to specifically relate to the community program. For example, the relation between the community program and the merchant incentive may function so that upon a transaction between a merchant and a member, a donation may be made to the community program. The transaction between a merchant and a member may be the point at which a merchant incentive is honored, which may involve providing a tangible benefit to a member (such as a prize, sweepstakes entry, or a discount), transferring a benefit to a community program (such as a donation), or another activity. The transaction information may be transferred by the merchant, for example, such as by the merchant's POS terminal, to the marketing program, and a transaction linking utility may be utilized to confirm that the merchant and member are participants of the marketing program, and that the member qualifies for one or more merchant incentives. A skilled reader will recognize that the merchant incentive may be of various types, a coupon, a discount, entry in a sweepstakes, a prize, a donation to a community program, and that a variety of other merchant incentives are possible.

The merchant incentive may be tailored to reflect the specific relationship between a community program and a merchant, aspects of either the merchant or the community program, demographics of local members, etc. Information generated by the data mining tool may assist with the tailoring of a merchant incentive.

A variety of links may exist between participants of the marketing program and these links may be recognized in the data storage area. The links may also develop relationships between participants. Additionally, the links and/or relationships may guide and direct the experience of participants of the marketing program. Links may further be created whereby a merchant may be linked to the marketing program brand. Another possibility is that links are created between the merchant program and social media (e.g., Facebook, Twitter, etc.), whereby social media may be utilized to promote merchants, merchant incentives, community programs and/or the marketing program.

In one implementation, to allow participants to access information regarding the marketing program, the marketing program functions, and to generate queries and/or requests for information, the marketing program may be presented as a website, having a main page and several pages attached thereto. The pages may reflect particular functions of the program, such as reward look-ups, maps of merchants and/or community programs, calendar pages showing community events and/or merchant incentives, links to merchants and/or community programs, access to merchant incentives available to a member, etc. The web pages may facilitate presentations viewable by participants and/or non-participants of the marketing program.

In one implementation, certain triggers may be set to initiate particular activities of the marketing program. For example, triggered activities may include: data mining in accordance with set rules; sweepstakes processing; donation distribution to community programs or other intermediaries (e.g., such as charities); post-sale feedback; and enhanced analytic mode of the data mining tool. Additionally, particular reports may be produced at regular, specified intervals. Any activity of the marketing program may be initiated upon request, whether a trigger or a specified interval is set for that activity or not.

As shown in FIG. 20, in one implementation, a variety of inputs and outputs may be provided to and generated by the data mining tool. The inputs and outputs may also be affected by whether the data mining tool engages the analytic mode. For example, the data mining tool, and possibly the analytic mode, may access data or other information that is either stored in the data storage area of the marketing system 100, or may access information from other data sources 102, such as remote databases of intermediaries, merchants or other third parties that the marketing system is permitted to access. The data mining tool, and possibly the analytic mode as well, both of which are elements of the marketing system, may be operable to provide an output 104 that provides suggestions of incentives to a merchant, or group of merchants. The data mining tool, and possibly the analytic mode as well, may also provide other types of reports 106 or other documents as an output. The data mining tool, and possibly the analytic mode as well, may further be operable to generate one or more survey questions 108 as an output to be directed to members. Such survey questions may be dynamic questions. For example, a dynamic question could include the following or any other question: a question asking a member if the member had viewed a broadcast containing the merchant's advertisement prior to a transaction influenced the transaction if the marketing system identifies a suspected correlation between the viewing and a transaction; or a questions that are different depending on whether the transaction occurred on a weekend or a weekday.

A skilled reader will recognize that other results 110 shown in FIG. 20 may be generated by the data mining tool, and that these other results may be any of a wide-variety of results.

The data mining tool may access and utilize a variety of information in the course of it processing, such as any of the following, or any combinations of the following: transaction details; member demographics; member broadcast ad viewing activities that are linked to the marketing system or that are not linked to the marketing system, but that provide data to the marketing system; post-transaction survey responses; responses from any other survey provided by the marketing system, for example, such as market research surveys, etc.; merchant details, including any merchant preferences, merchant store geographical locations, merchant capacity, merchant inventory, merchant target markets, or any other merchant information; seasonal behaviors of any participants of the marketing program, or any other users that data is collected for and transferred to the marketing system; weather trends of forecast information provided to, or accessed by, the marketing system; and any other information or data. A skilled reader will recognize that a variety of other data or information may also be available from the marketing system data storage area and may be utilized by the data mining tool, and in some instances by the analytic mode as well.

The information and data may be processed by the marketing system, and in particular by the transaction linking utility, the data mining tool, and in some instances by the analytic mode as well, to provide specific outputs. For example, the outputs may be any of the following: feedback regarding any success and/or failures of incentives associated with a merchant; feedback regarding any success and/or failures of incentives associated with similar merchants in non-competing geographical areas, if sufficient information regarding similar merchants is provided to, or accessed by, the marketing system; comparisons of incentives associated with a merchant and incentives associated with similar merchants in non-competing geographical areas, if sufficient information regarding similar merchants is provided to, or accessed by, the marketing system; feedback regarding success rates and trends from associated platforms, such as broadcast advertisers, traditional media (e.g., print, radio, etc.), if sufficient information regarding such associated platforms are provided to, or accessed by, the marketing system; and feedback regarding consumer behavior or members or users. A skilled reader will recognize that a data or information may also be provided to, or accessed by, the marketing system and utilized by the transaction linking utility, the data mining tool, and in some cases the analytic mode as well, to provide a variety of other outputs as well.

Analysis of data to predict behavioral data relating to members or users may be a particular output of implementations. The behavioral data may indicate consumer behavior of members or merchants specifically. Such behavioral data may be derived through a variety of analysis means undertaken by the transaction linking utility, the data mining too and in some cases the analytic mode. The analysis behavioral data output may be utilized in conjunction with specific rules to formulate determinations for a variety of purposes by the marketing program and the participants. For example, the behavioral data may be applied to rules or formula, such as rules based on a determinant outcome, for example, rules having the following structure: if x then y. For example, if a consumer exhibits x behavior then y is the outcome. As a further example, one rule may be that if a member or user views a broadcast of a hyperlocal geo-targeted merchant advertisement on a mobile communication device then that member or user is exhibiting interest in a transaction in the near future. Therefore, the time lapse between the viewing of the merchant's advertisement and the transaction with the merchant may be expected to be a shorter time period than is expected between other broadcast ad viewings and transactions to indicate a likely relationship between the transaction and the viewing of the merchant's advertisement. The basis for this rule may be that the viewing of a merchant's advertisement on a mobile device may be more likely to occur while a member or user is already shopping.

This is an example of one rule that may be used to evaluate or analyze behavioral data. Rules may be further narrowed to factor in certain demographics or attributes of members, such as age groups, genders, parenting responsibilities, etc. which may affect transactions undertaken by members. A skilled reader will recognize that a variety of other rules and factors within rules may be utilized for other evaluations and analysis of behavioral data. A skilled reader will also recognize that extraction of behavioral data, and the analysis and evaluation of such data may expand the member demographic and attribute data of the implementations. This expanded data may be used for many purposes, including generating specific incentives to increase purchases made at merchant stores (either online or bricks and mortar stores) and the good will ascribed to merchants.

A skilled reader will recognize that a variety of reports or other documents may be generated by the data mining tool and in some instances the analytic mode as well. For example, such as incentives statistics or incentive trends, to provide details of incentives communicated, incentives redeemed, incentive effectiveness on a cost/return basis, and incentive effectiveness on a traction basis. As another example, success of associated platforms that may include broadcast advertisers, traditional media (e.g., print or radio) may be provided if information or data regarding associated platforms is provided to, or accessed by, the marketing system. Still another example is output that provides analysis and behavioral data relating to consumer activities of members or users. As yet another example, survey statistics, trends and conclusions may be generated, so that the marketing system may provide comprehensive reporting of survey data acquired and any correlations that can be made from external factors provided to, or accessed by, the marketing program. Such a correlation may be for example, that a golf course has fewer transactions on cold days. The marketing system may be operable to generate suggestions of activities that may address the correlations, generally in the form of incentive suggestions. For example, the marketing system may suggest that an incentive be offered on golfing costs when the weather is below seasonal averages. A skilled reader will recognize that a variety of reports containing a variety of information, correlations and suggestions may be generated by the implementations.

Figure 21:
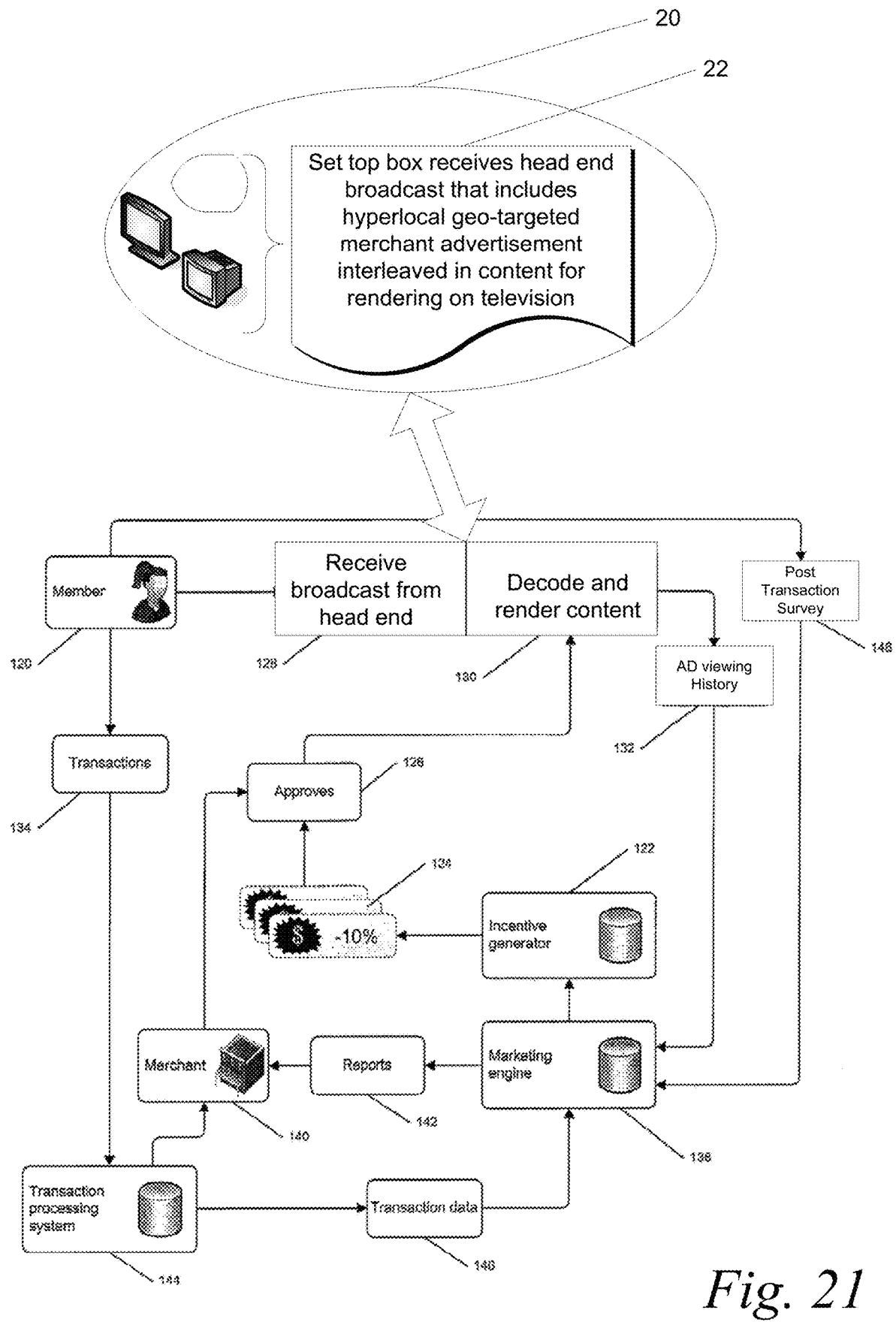
FIG. 21 is a flowchart showing the options for member interaction with the marketing program in one implementation.

As shown in FIG. 21, in one implementation, a television viewer 120, such as a member, receives at processes 128-130 a broadcast for display on a television 20. The broadcast includes a hyperlocal geo-targeted advertisement 22 that is rendered only to televisions located in a particular vicinity, where the advertisement is for a merchant who is located in the particular vicinity. In one implementation an advertising cost is assessed by the broadcaster, such as a local TV station, to the merchant in the particular vicinity. In an alternative version of this implementation, the advertising cost that is assessed to the merchant by the broadcaster (e.g., a local affiliate of a national broadcasting system) is inversely proportional to the navigation time from the location of the receiving television in the particular vicinity to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

The merchant's advertisement may be for the merchant's local bicycle store in located in a vicinity where the television viewer 120 is also located. The advertisement may include an incentive from the merchant. For example, the incentive may be a discount on the price of a bike and/or an agreement that the merchant will donate a certain percentage of the currency transaction amount to a charity in the vicinity if the television viewer 120 purchases a bicycle in a transaction at the merchant bicycle store 140. The television viewer 130 may accept the merchant's offer of the incentive by going to the merchant's bike store 140. The television viewer 130 may utilize the incentive and redeem it for a discount on a bike by conducting the transaction at the merchant's bike store, and/or for the merchant's agreement to make donation to the charity in the vicinity by conducting the transaction at the merchant's bike store. The television viewer 120's advertisement viewing history 132 may be provided to, or accessed by, the marketing system 136. The marketing system may use the television viewer 120's advertisement viewing history 132, in conjunction with other information to generate one or more reports 142 which may be provided to one or more merchants 140. The television viewer 120's advertisement viewing history 132 may also be utilized with other information to generate incentive suggestions 122, which may lead to the generation of a merchant incentive 124, such as a discount, that may be approved 126 by a merchant. The TV advertisement may include information that can be used by the member to obtain an approved incentive.

A member 120 may further engage in one or more transactions 134 with a merchant. Details of each transaction may be provided to a transaction processing system 144, such as the merchant's 140 POS terminal, or any other means. The transaction details may be provided by the transaction processing system to the merchant 140. The transaction processing system may generate transaction data record 146, which may be provided to the marketing system and utilized by the transaction linking facility in particular.

A member 120, may also complete a post-transaction survey 148. The survey itself, or the survey data may be provided to the marketing system. All of the data provided to the marketing system, including the survey details, the transaction details, and details about merchant's 140 advertisements that were viewed by members in broadcasts, may be utilized by the marketing system to generate reports, or other information, or certain activities, such as sales reports, suggestions for incentives, or incentive generation activities, as just a few examples of possible outputs of the marketing system.

Some implementations may be operable to generate incentives on an automatic basis. The marketing system may utilize information and data stored in the data storage area to perform particular analysis, including analysis of the effectiveness of prior incentives, as well as market trends, such as periods when sales are higher or lower. The marketing system may utilize the analysis results and other data to generate one or more new incentives. These incentives may be automatically generated and may be communicated by the marketing system pending merchant approval. Merchant approval may be manual or automatic approval. Upon approval the incentive may be auto-loaded to various media including any of the following: search engines, newspapers, brochures, flyers, specialty advertising (e.g., Val Pak™ etc.) or any other media.

A variety of information or data may be utilized by the marketing system to automatically generate one or more incentives. For example, any of the following data or information may be utilized: merchant type (e.g. merchant category, services and/or products provided, service vs. product based merchant, etc.); location of merchant stores and geographical location; history of a merchant's experience with past and present incentives (customer acceptance, feedback about the incentives, contribution margin, etc.), for example incentives that generate the most interest, as indicated by the incentives being rated highest by users and members in post-transaction surveys, or as indicated by a comparison of incremental sales data following the incentive being posted; successful incentives in areas that are non-competing geographical areas; indications of identified member's interest in an incentive; and member demographics tied to transaction history and trends.

Automated incentive generation may be based on a variety of criteria, for example it may be based on specific customer segments. Such customer segments may include as an example: targeted local neighborhoods; customer demographics (e.g., gender, age, etc.); financial card Bank Identification Number (BIN) range, as this may determine if the card is a regular card, gold card, platinum card, etc., and the type of card may provide details regarding the card holder and the likely transactions to be conducted by the card holder; buying history of users, members, or other customers; the TV viewing behavior of particular users, such as frequent exposures to broadcasts containing advertisement for a particular merchant undertaken by a user or a member.

The incentives that are automatically generated may be related to several elements and/or factors. As an example, automatically generated incentives may be related to any of the following: a season; one or more days of the week, or of the month; special events, including holiday seasons (e.g., the Christmas season, etc.) and celebrations (e.g., parades, a community event such a run for a cause, etc.); or local events (e.g., little league finals, town street festivals, etc.). The success or effectiveness of an incentive may be determined based on any of the following: the statistics regarding whether an incentive is redeemed; post transaction feedback regarding the incentive, such as feedback derived from a post-transaction survey; and increased sales from a group of consumers targeted by an incentive, or during a period of time that is targeted by an incentive.

Transactions

Transactions between merchants and members may occur online or offline. A transaction will be recognized as occurring between a merchant and a member because the member will utilize at least one of the identifications recognized as belonging to the member by the marketing program. The merchant may also utilize at least one of the participant identifiers recognized as belonging to the merchant by the marketing program.

As an example of an online transaction, such a transaction may occur in a website environment, whereby a member purchases an item or service from a merchant through a series of clicks, or other online means of purchasing an item or service. The website will transfer the transaction information to the marketing program. In some instances the information may be transferred to the marketing program by a third party. The marketing program will recognize the transaction as occurring between a member and a merchant due to the use of the participant identifiers.

As an example of an offline transaction, a member may visit a merchant's store location and may undertake a transaction to purchase an item or service from the merchant. The transaction may involve a POS terminal that will transfer information regarding the transaction, including the participant identifiers to the marketing program. A transaction that does not involve a POS terminal may be recorded by another means and the transaction details, including the participant identifiers, may be transferred or manually entered into the marketing program. The transaction details may be transferred to the marketing system by a third party in some instances.

Depending upon the form of transaction, the transaction may be recognized by the marketing program in real-time, near-real time or after a time lapse. Transaction details may be matched to a member profile by the data mining tool or other element of the loyalty engine, and the transaction details may be stored to the member profile in the data storage area.

Following a transaction, a post-transaction survey may be communicated to a member. In one implementation, the post-transaction survey may be communicated to a member who in turn completes the survey and returns the completed survey using broadcast-like services that provide of a feedback channel. By way of example of the feedback channel, a supplemental return channel that facilitates paging is provided by implementations of the Next Generation Broadcast Platform (NGBP) Intelligent Heterogeneous network as illustrated in FIG. 24. As such the customer-completed survey can be received as input from the customer via a user device in network communication with the NGBP Intelligent Heterogeneous network. The content of the completed survey is from the customer who responded to an incentive from a merchant that was contained in a geo-targeted advertisement by the merchant. In this case, the merchant's advertisement was broadcast over a television broadcast network that has been enabled for hyperlocal geo-targeting of the merchant's advertisements to viewers located in a vicinity by operating a broadcast method that has an extensible mode of communication in an intelligent heterogeneous network. The feedback channel is thus used to track delivery of the broadcast hyperlocal geo-targeted advertisements as well as to receive the completed survey from the member who was a selected broadcast media consumer residing or otherwise located in a specific vicinity (e.g., within 1 to 100 km) after having transacted with a merchant after viewing the merchant's hyperlocal geo-targeted advertisement.

In other implementations, the post-transaction survey may be communicated to a member, for example, via a web page, via email, via a mobile device, etc. The post-transaction survey may gather feedback from the member. In some implementations the post-transaction survey may be anonymous, and the information collected from the survey may be stored in a manner linked to the merchant in the data storage area. This data may be utilized by the data mining tool and the analytics mode. Post-transaction survey results may be generated by the data mining tool and may be provided to participants of the marketing program.

A merchant may utilize information generated by the data mining tool and possibly the transaction linking utility, both of which utilize the data stored in the data storage area, to devise, define and develop a merchant incentive. In one implementation, an intermediary, such as a marketing associate, may be involved in developing or communicating a merchant incentive. Either or both of the merchant and the intermediary may access information generated by the data mining tool for the purpose of creating the marketing incentive, or analyzing the effectiveness of a marketing incentive once it is completed. A group of merchant incentives may further be analyzed for the purpose of creating more effective merchant incentives in the future.

Information may be collected pertaining to participants in the marketing program upon the event of transactions between a merchant and a member. Such information may be transaction details, and may further include details regarding any related merchant incentive. As described above a merchant incentive may be related to a community program and therefore may be available at one or more merchant stores that are within the vicinity of the community program. (The vicinity may be of various sizes, a community park area, a neighborhood, a city, a county, a province or state, a country, etc.) The merchant incentive, or information about the merchant incentive, may be communicated to a member, or a group of identified members, in a variety of means, including via a web page, via a mobile device, via an email or text, etc. A merchant incentive, or information about the merchant incentive, may include a Merchant Advertisement Matrix Code and may be communicated to a mixture of members and third parties by a variety of means, including broadcast of a merchant's incentive in a hyperlocal geo-targeted advertisement for rending on a member's television, print media, radio broadcasts, web pages, billboards, emails, text, mobile devices, etc.

The communication of the merchant incentive to third parties may introduce the third parties to the one or more merchant stores, the community program that the merchant incentive pertains to and/or the marketing program. In one implementation, transactions between third parties and merchants during a merchant incentive or a community program may be tracked and data regarding such transactions may be stored in the data storage area. the data may be utilized by the data mining tool and the analytics mode to produce analysis of the transactions to aid in the participation of the merchant in the marketing program, for example, such as to create new effective merchant incentives.

In one implementation, transactions may include transactions that do not occur at a physical (bricks and mortar) store location, but may include transactions occurring in a digital environment, such as via a website.

Example Method

A skilled reader will recognize that the marketing system and method of the implementations may function in a variety of ways. As an example of one implementation, a system administrator may cause a local community program to be stored in the marketing system, for example, such as Caribana, a festival celebrating Caribbean culture held in cities such as Toronto, Canada. One or more merchants registered with the marketing program may recognize that one or more Caribana events will occur near a store location. The one or more merchants may develop one or more merchant incentives related to Caribana. The one or more merchant incentives related to Caribana may be communicated to participants, for example, to members that are located near to one or more Caribana events, or to members that are located near to the one or more merchants offering Caribana related incentives. The one or more merchant incentives may also be communicated to third parties, and information regarding the marketing system may also be communicated to third parties so that third parties can know how to become a participant of the marketing system.

Transaction details regarding transactions with the one or more merchants whereby the one or more merchant incentives are redeemed may be transferred to the marketing system and stored in the marketing system. A skilled reader will recognize that the means of transferring transaction details to the marketing system may be varied and that the options may differ for online and offline transactions. Some of the possible means of transferring transaction details for online and offline transactions are discussed above, although a skilled reader will recognize that the discussion does not provide a complete list of all of the possible transfer options it merely provides some examples of transfer options.

A post-transaction survey may also be provided to participants and/or third parties redeeming merchant incentives to gather information relevant to the transaction and the participants and/or third parties undertaking the transaction.

The transactions may involve registered members of the marketing program. A member may be identified as a member during the transaction by using one or more participant identifiers and/or other identifications recognized by the marketing program as associated with the member. For example, the member may use a participant identifier or other identification that is a financial card, a number generated by the marketing system, or any other identification.

The data mining tool, and in some instances the analytic mode, may be utilized to search the transaction details and other marketing system data to provide results. The results may indicate success measurements for promotions and the results may also indicate information that may be applied to the creation of other incentives in the future. For example, the results may indicate demographic information regarding the persons redeeming incentives, including participants and third parties. In the case of an incentive created by a merchant in relation to a Caribana event, the results may indicate that participants and/or third parties wanting to redeem an incentive may not be local to the merchant location, but may have travelled from a specific area, for example, such as a specific town in the province, or a specific neighborhood in the city that is distant from the merchant location. In this manner the implementations may be utilized to draw assumptions regarding the relationships between transactions at a merchant location and a particular incentive offered at that merchant location. A skilled reader will recognize the variety of results that may be provided by the implementations and the ways that such results may be utilized by participants and/or third parties.

The data mining tool, and in some instances the analytic mode and/or the transaction linking utility, may also recognize that the activities of a participant may cause that participant to be eligible for specific incentives. For example, the frequency of transactions with a merchant, the time of day of a transaction with a merchant, the creation of a review, or other activities may cause a participant to be eligible for an incentive. The data mining tool may automatically apply the incentive, such as a donation to a community group, may automatically communicate the incentive to the participant, such as a coupon for a future purchase, or may apply or communicate the incentive based upon instructions by the administrator or merchant.

Cross-Sell

In another implementation, cross-selling relationships and programs may be created. A cross-sell involves at least two merchants, or at least two merchant stores, that are generally non-competing. A cross-sell occurs when a member completes transactions at each of the two (or more) merchants involved in a cross-sell relationship. A cross-sell may be required to include the transactions with the merchants involved in a cross-sell relationship occurring within a specified period of time. Events of cross-selling may be validated by a query sent to the transaction linking utility in accordance with particular rules that cause the transaction linking utility to identify valid cross-sells by members. For example, a transaction with one of two cross-sell merchants followed within the specified period of time with a transaction with the other cross-sell merchant may be recognized as a cross-sell.

As yet another example, a cross-sell may be refined based on the terms of the cross-sell incentive. Such terms may include specific times, specific day(s) of the week, minimum purchase restrictions, or other terms. So that if a transaction occurred at each of two cross-sell merchants and the transactions meet specific terms, for example, such as occurring on a Tuesday between 5:00 PM and 8:00 PM, then this may be recognized as a cross-sell. A skilled reader will recognize that other criteria may be utilized to define cross-sells.

Upon the completion of, or recognition of, a cross-sell a reward may be generated and communicated or distributed to the member. In one implementation, a member may be required to login to the marketing program to accept or otherwise obtain the reward. Specific steps may be required to accept the reward, or alternatively the reward may be transferred to the member's profile and be visible when the member accesses his or her profile information. Other means of accepting or obtaining the reward may be utilized with the implementations as well. The reward, which may include a Merchant Advertisement Matrix Code, may be of a variety of types, such as a coupon, bonus offer, prize, sweepstakes entry, etc. A reward may therefore be redeemed in accordance with the nature of the reward.

A cross-sell relationship could be created amongst merchants, or merchant stores for a variety of reasons. For example, a merchant that includes two or more stores could create a cross-sell relationship whereby a member would have to visit all the merchant stores before receiving a prize (e.g., such as a treasure hunt). As another example, a merchant having a single store may provide a reward after multiple visits (e.g. after nine transactions, a fifty percent (50%) discount will be applied to the next transaction).

As yet another example, a group of merchants could unite to provide a benefit to members that undertake transactions at all, or some, of the associated merchants. It may be possible for the benefit to increase as the member undertakes transactions with an increasing number of merchants. It may be possible the marketing program may define the group of merchants, for example, such as a group that includes merchants from the same category (e.g., sports stores) or from complimentary categories (e.g., clothing stores and shoe stores). It may be possible for the reward to involve a merchant outside the group of cross-sell merchants (e.g., transactions with a cross-sell group of three golf course merchants will generate a reward for a member that is a coupon for a free dinner at a restaurant merchant).

In one implementation chain cross-selling may occur between three or more merchants. Chain cross-selling may involve three or more merchants, generally non-competing merchants, deciding to create a chain cross-sell group. The chain cross-sell group may involve three or more merchants with related products and/or services that may offer incentives based upon a member frequenting three or more of the chain cross-sell group. A member in a chain cross-sell group may be outside of the marketing system. In a chain cross-sell group it may be possible for the incentive offered to a member or other participant to increase as more of the cross-sell group products and/or services are purchased. The member, or other participant, may be recognized by the provision of an identification that is stored in the marketing system, whereby the member is identified as a member of the marketing system, such as a participant identifier.

For example, a cross-sell group may include a hotel, golf course, restaurant, sports store and hiking guide in a particular location, such as Banff, Alberta, during a particular event, such as the summer golf months. A member, or other participant, who stays in the hotel and plays golf at the golf course in the cross-sell group may receive a ten percent (10%) discount or other incentive. Whereas, if a member books a hotel room, a round of golf and dinner at the restaurant that are part of the cross-sell group a twenty percent (20%) discount may be applied. And as the member purchases products and/or services from even more of the cross-sell group the incentives continue to increase. A member staying at the hotel, who golfed at the golf course and ate dinner at the restaurant, and who also purchases a product at the sports store may receive forty percent (40%) off the product purchased at the sports store. Should that member also book a hike with the hiking guide of the cross-sell group then the hike may be provided at a fifty percent (50%) discount and a donation may be given to the Banff National Park, or another community group. A skilled reader will recognize that a variety of cross-sell groups may be formed and that a variety of incentive options may be provided based upon the cross-sell groups.

Cross-selling incentives may be evaluated to determine the success of the cross-sell incentives. it may be possible for the cross-sell incentives to be evaluated as individual incentives, and as a group of cross-sell incentives. In this manner the marketing system may evaluate whether a particular incentive was successful on its own, and whether a group of incentives were popular. In this manner it may be possible to identify where cross-selling led to transactions frequently, including transactions that may not have otherwise occurred without the cross-sell incentive being offered. For example, did the offer of a hiking guide lead to more use of this service by members staying at a hotel, eating at restaurant and golfing at a golf club that are part of a cross-sell group than would have occurred if the hiking guide was not included in the cross-sell. A skilled reader will recognize the variety of evaluations that may be undertaken of the individual and collective incentives involved in a cross-sell.

Figure 22:
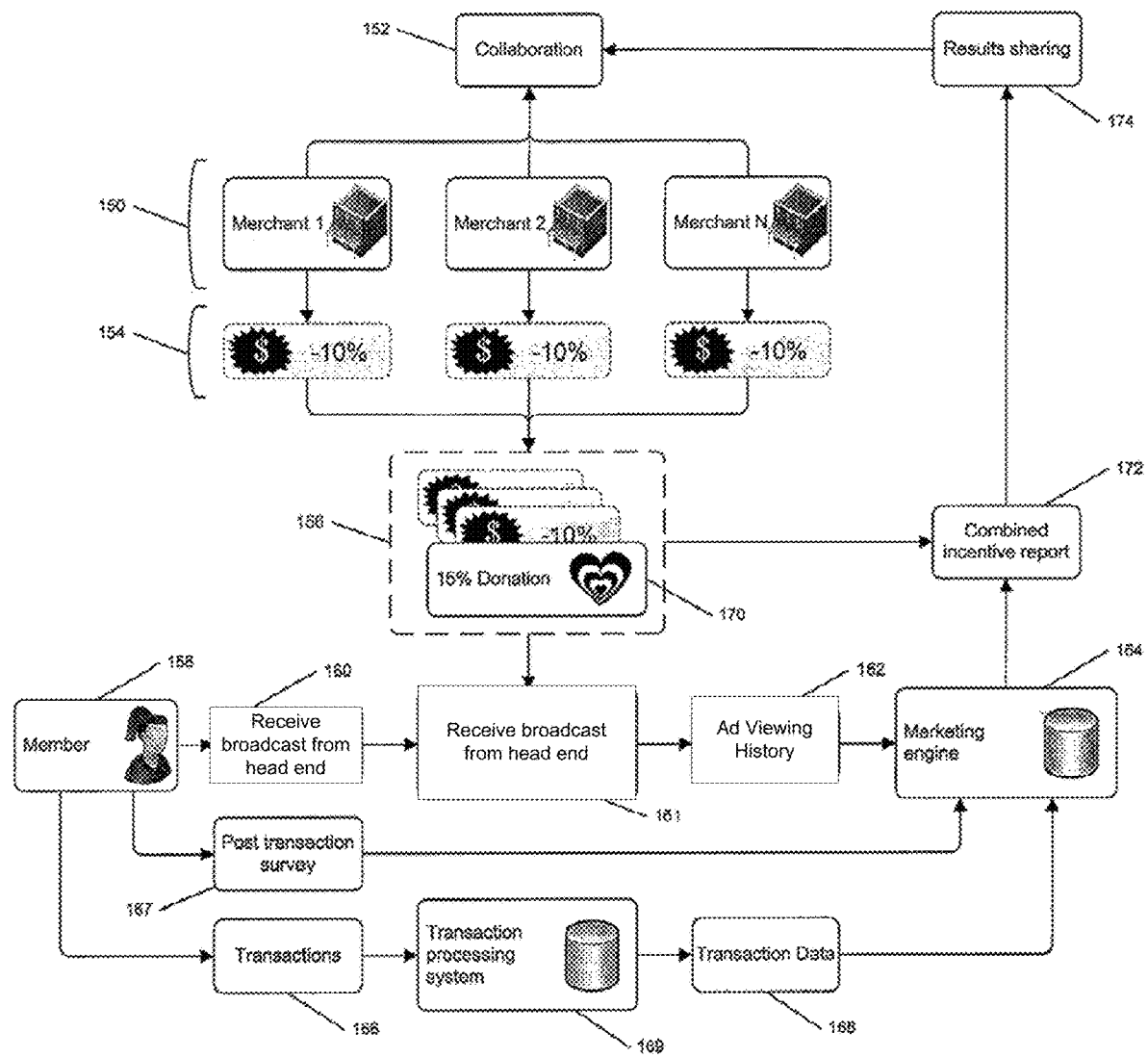
FIG. 22 is a flowchart showing the options for an implementation involving cross-selling.

In one implementation, as shown in FIG. 22, two or more merchants 150 may collaborate to produce one or more cross-sell collaborations 152. The collaboration may involve one or more incentives 154 provided by each merchant. The incentives of each merchant may be combined into a linked incentive 156. The linked incentive may include a further incentive 170, that is honored when transactions with each of the collaborator merchants are undertaken by a single member.

A member 158 may be a television viewer who receives at processes 160-161 a broadcast for display on a television. The broadcast includes a hyperlocal geo-targeted ad that is rendered only to televisions located in a particular vicinity, where the advertisement is for a merchant who is located in the particular vicinity. In an alternative of this implementation, an advertising cost is assessed by the broadcaster, such as a local TV station, to the merchant in the particular vicinity. The advertising cost is inversely proportional to the navigation time from the location of the television in the particular vicinity to the merchant location in the particular vicinity. As such, the advertising cost assessed to the merchant is lower for residents less likely to transact with the merchant due to the longer travel time from the resident's location in the vicinity to the merchant's store in the vicinity, and the advertising cost assessed to the merchant is higher for residents more likely to transact with the merchant due to shorter travel time from the resident's location in the vicinity to the merchant's store in the vicinity.

The merchant's advertisement may be for the merchant's local bicycle store in located in a vicinity where the television viewer 158 is also located. The advertisement may include an incentive from the merchant. For example, the incentive may be a discount on the price of a bike and/or an agreement that the merchant will donation a certain percentage of the currency transaction amount to a charity in the vicinity if the television viewer 158 purchases a bicycle in a transaction at the merchant bicycle store.

The television viewer 158 who saw the merchant's advertisement on their television may undertake a transaction 166 with the merchant. The television viewer 158 may utilize the incentive and redeem it for a discount on a bike by conducting the transaction at the merchant's bike store, and/or for the merchant's agreement to make donation to the charity in the vicinity by conducting the transaction at the merchant's bike store. The television viewer 158 ad viewing history 162 may be provided to the marketing system 164.

Transaction details 168 for each of the transactions may be transferred a transaction processing system 169 that may generate transaction data 168, and the transaction data may be transferred to the marketing system 164. The marketing system may process the transaction details and any post-transaction survey 167 results provided by the member. The marketing system may generate a combined incentive report 172. For example, the generation of the combined incentive report may occur when a merchant undertakes transactions with all of the collaborative members and triggers the additional incentive, or at any other time. Results for sharing 174 may be generated from the combined incentive report so that results of each of the incentives in the linked incentive are shared with all collaborative merchants, so that each merchant receives results relating to its particular incentive and the additional incentive, results may be produced to share some of the results of two or more collaborative members, or results may be produced in any other configuration. Results may be compared to the collaboration, so that conditions of the collaboration, such as the additional incentive, may be evaluated. In particular the comparison may consider whether the conditions were fulfilled. In some implementations the marketing program may auto-generate suggestions for cross-sell incentives or auto-generate cross-sell incentives for approval by collaborating merchants.

Cross-Loyalty

The marketing program of the implementations may further involve cross-loyalty programs or cross-marketing programs. Such cross-marketing program may function in a manner as described in U.S. patent application Ser. No. 11/283,856, titled "Method, system and computer program for providing a loyalty engine enabling dynamic administration of loyalty programs," which is incorporated herein by reference. The cross-marketing programs of the implementations may further involve a variety of merchants and intermediaries, such as community programs. In this implementation the community program may work with the merchant to develop a cross-loyalty program. To aid a merchant in creating cross-loyalty and/or cross-sell relationships, the data mining tool may be utilized by the merchant to access information regarding other merchants and/or intermediaries (or groups of merchants and/or intermediaries) that are participants in the marketing program.

Implementations discussed above with respect to FIGS. 12-25, in which there are provided methods, systems, and non-transient computer program products for a merchant's advertisement to be broadcast over a television broadcast network enabled for hyperlocal geo-targeting of merchant's advertisements, can be operated in combination with yet further implementations with respect to the ALLIANCE as depicted in FIGS. 3-6.

Sale to Click Implementation

As disclosed in U.S. Provisional Application Ser. No. 62/688,799, filed on Jun. 22, 2018, titled "Incenting A Consumer To View An Online Advertisement Of A Merchant With Whom The Consumer Was Unlikely To Have Multiple Prior Transactions", which is incorporated by reference, in one computerized implementation, the ALLIANCE as depicted in FIGS. 3-6, can be operated in conjunction with a yet further implementation in which there is provided a marketing system operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, where the one or more transactions occur between the one or more merchants and the one or more members; a transaction linking utility operable to process and analyze the transaction details and the data of the data collection server to determine the likelihood that one of the one or more transactions was conducted in person by one of the one or more members who had not previously transacted online with one of the one or more merchants; and a data mining tool operable to analyze by operation of the one or more computer processors of the data collection server, the transaction details and the data regarding the one or more members and the one or more merchants, where the data mining tool is further operable, if the likelihood is above a predetermined threshold, to generate and send an incentive to a logical address of a communication device of the one of the one or more members that includes a link, unique to the one of the one or more members, which, when followed, provides access to the incentive.

Permutations of Foregoing Implementations

It is intended that one or more members of the ALLIANCE as described above with respect to FIGS. 3-6 can perform one or more of the "Implementation Permutations" as described below. Each such Implementation Permutation is a variation of the implementations described above, or a set or number of such implementations, and can be performed by one or more members of the ALLIANCE as described above with respect to FIGS. 3-6. These Implementation Permutations, are respectively described above, can be performed both alone and in any combination, and include but are not limited to the following Implementation Permutations: (i) the Automated Merchant Boarding Implementations; (ii) the Merchants Care About Community Implementations; (iii) the AllRewards Implementations; (iv) the Other Implementations of Merchants Care About Community; (v) the Proximal Customer Transaction Implementations; (vi) the Incenting Community Resident In-Store Purchases Implementations; (vii) the Cash Payments Implementations; (viii) the Client Acquisition System Implementations; (ix) the Other Client Acquisition System Implementations; (x) the Still Other Client Acquisition System Implementations; (xi) the Charity Implementations; (xii) the Automated Cause Marketing Implementations; (xiii) the Other Automated Cause Marketing Implementations; (xiv)

the Still Other Automated Cause Marketing Implementations; (xv) the Other Automated Merchant Boarding Implementations; (xvi) the Next Generation Loyalty Implementations; (xvii) the Other Next Generation Loyalty Implementations; (xviii) the Yet Other Next Generation Loyalty Implementations; (xix) the Still Other Automated Merchant Boarding Implementations; (xx) the Golfing Card Implementations; (xxi) the Click2Sale Implementations; (xxii) the Other Click2Sale Implementations; (xxiii) the Still Other Click2Sale Implementations; (xxiv) the Voice Ordered Rewards Implementations; (xxv) the Loyalty Program Implementations; (xxvi) the Transaction Verification Implementations; (xxvii) the Interchange Fees Implementations; (xxviii) the Personas Implementations; (xxix) the Rescue, Relief, Recover Implementations; (xxx) the Siri-Surview Implementations; (xxxi) the Emotional/Biometric Rewards Implementations; (xxxii) the Colored Hearts and National Pride Implementations; (xxxiii) the Artificial Intelligence Implementations; (xxxiv) the Blockchain Loyalty Program Implementation; (xxxv) the Spot Credit Loyalty Program Implementation; (xxxvi) the View To Sale Implementation; and (xxxvii) the Sale To Click Implementation.

In at least some of the Implementation Permutations, the system may include Internet Server hardware and/or one or more processors (e.g., digital signal processors, microprocessors, etc.), each being adapted to execute instructions to perform at least some of the methods, operations, and processes described herein with respect to the figures. Such instructions may be stored or held in storage media as instructions. Moreover, a non-transient computer readable medium can include such software as instructions executed by hardware to perform steps of methods described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described databases for storage media may comprise primary, secondary, and/or tertiary storage media. Primary storage media may include memory such as random access memory and/or read-only memory, for example. Secondary storage media may include a mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some of the Implementation Permutations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in non-transitory computer readable medium that can be loaded onto a general-purpose computer, a special purpose computer, or other programmable apparatus.

In the preceding detailed description, numerous specific details have been set forth to provide a thorough understanding of claimed subject matter. However, it will be understood by those skilled in the art that claimed subject matter may be practiced without these specific details. In other instances, methods and systems that would be known by one of ordinary skill have not been described in detail so as not to obscure claimed subject matter.

What is claimed is:

1. A method comprising, for each of a plurality of members, operating an extensible mode of communication in an intelligent heterogeneous network by:
    gathering member data for the member over the intelligent heterogeneous network to enable personalized services for the member, based on geographical awareness, through paging based on the gathered member data, wherein the member user data for the member includes a physical address corresponding to a television receiver and a member profile that includes a participant identifier;
    providing a hyper local service for the member based on the geographical awareness via functionality enabled by the intelligent heterogeneous network;
    broadcasting, over the intelligent heterogeneous network, content interleaved with an advertisement corresponding to a merchant having a physical address, wherein:
        the advertisement interleaved within the broadcast content is addressed for broadcast delivery exclusively to a logical address of the television receiver;
        the merchant has a corresponding merchant profile that includes a physical address; and
        the respective physical addresses of the merchant and the television receiver are determined to be within the same vicinity as the merchant;
    receiving or accessing data associated with a transaction;
    determining the participant identifier of the member from the data associated with the transaction;
    determining a length of elapsed time between:
        the time of the transaction; and
        the time of the broadcast of the advertisement interleaved within the broadcast content; and
    triggering, as a result of detecting the occurrence of the transaction associated with the participant identifier, a determination of whether:
        the transaction is linked to the broadcast of the advertisement interleaved within the broadcast content; and
        the respective physical addresses of the merchant and the television receiver are in the same vicinity.

2. The method as defined in claim 1, wherein:
    if the transaction is linked to the broadcast of the advertisement interleaved within the broadcast content; and
    if the respective physical addresses of the merchant and the television receiver are in the same vicinity,
    then:
        determining with a level of certainty whether the transaction is linked to the broadcast of the advertisement within interleaved the broadcast content, wherein the determined level of certainty varies based on:
            the length of the elapsed time;
            the data related to the broadcast of the advertisement interleaved within broadcast content; and
            the data associated with the transaction; and
        based on the determined level of certainty and the data related to the broadcast of the advertisement interleaved within the broadcast content, generating one or more incentives.

3. The method as defined in claim 2, wherein the merchant and television receiver corresponding to the participant identifier of the member are determined to be within the same vicinity whenever their respective physical addresses are within the same geographic entity selected from the group consisting of a political division, a legal division, a province, a state, a county, a prefecture, a city, a city-state, and a borough.

4. The method as defined in claim 2, wherein the merchant and television receiver corresponding to the participant identifier of the member are determined to be within the same vicinity whenever their respective physical addresses have a navigation time therebetween, as determined by a navigation algorithm, that is, for at least one predetermined transportation mode, within a predetermined minimum time and a predetermined maximum time.

5. The method as defined in claim 4, wherein the navigation time is determined by the navigation algorithm from the physical address of television receiver corresponding to the participant identifier of the member to the physical address of the merchant.

6. The method as defined in claim 4, wherein the navigation algorithm is a real time algorithm that accesses real time traffic information, for the at least one predetermined transportation mode, in determining the navigation time.

7. The method as defined in claim 6, further comprising generating an assessment of an advertising fee for each said advertisement, wherein the currency amount of the advertisement fee is inversely proportional to the navigation time from the physical address of the television receiver to the physical address of the merchant.

8. The method as defined in claim 1, wherein the television receiver is a web-enabled mobile computing device executing a mobile application to access the advertisement interleaved within the broadcast content through internet-based services.

9. The method as defined in claim 1, wherein the television receiver is selected from the group consisting of a smart phone, a tablet, a phablet, and a lap top.

10. A non-transient computer-readable medium having encoded thereon software which, when executed by hardware, performs the method of claim 1.

11. A method comprising, for each of a plurality of members, operating an extensible mode of communication in an intelligent heterogeneous network by:
- gathering member data for the member over the intelligent heterogeneous network to enable personalized services for the member, based on geographical awareness, through paging based on the gathered member data, wherein the member user data for the member includes a physical address corresponding to a television receiver and a member profile that includes a participant identifier;
- providing a hyper local service for the member based on the geographical awareness via functionality enabled by the intelligent heterogeneous network;
- broadcasting, over the intelligent heterogeneous network, content interleaved with an advertisement corresponding to a merchant having a physical address, wherein:
  - the advertisement interleaved within the broadcast content is addressed for broadcast delivery exclusively to a logical address of a television receiver;
  - the merchant has a corresponding merchant profile that includes a physical address;
  - the respective physical addresses of the merchant and the television receiver are determined to be within the same vicinity as the merchant;
- receiving or accessing data associated with a transaction;
- determining the participant identifier of the member from the data associated with the transaction;
- determining a length of elapsed time between:
  - the time of the transaction; and
  - the time of the broadcast of the advertisement interleaved within the broadcast content; and
- triggering, as a result of detecting the occurrence of the transaction associated with the participant identifier, a determination of whether:
  - the transaction is linked to the broadcast of the advertisement interleaved within the broadcast content; and
  - the respective physical addresses of the merchant and the television receiver are in the same vicinity, wherein:
    - if the transaction is linked to the broadcast of the advertisement interleaved within the broadcast content; and
    - if the respective physical addresses of the merchant and the television receiver are in the same vicinity, then:
      - determining with a level of certainty whether the transaction is linked to the broadcast of the advertisement within interleaved the broadcast content,
      - wherein the determined level of certainty varies based on:
        - the length of the elapsed time;
        - the data related to the broadcast of the advertisement interleaved within broadcast content; and
        - the data associated with the transaction; and
      - based on the determined level of certainty and the data related to the broadcast of the advertisement interleaved within the broadcast content, generating one or more incentives;
      - generating and communicating a post-transaction survey to the member after the detection of the transaction with the merchant;
      - receiving, via the supplemental return channel, a completed survey from the member containing an evaluation of the transaction with the merchant; and
      - using the result of the post-transaction survey to compute the determined level of certainty.

12. The method as defined in claim 11, wherein the television receiver is a web-enabled mobile computing device executing a mobile application to access the advertisement interleaved within the broadcast content through internet-based services.

13. The method as defined in claim 11, wherein the television receiver is selected from the group consisting of a smart phone, a tablet, a phablet, and a lap top.

14. A non-transient computer-readable medium having encoded thereon software which, when executed by hardware, performs the method of claim 11.

15. In a system including a plurality of merchants conducting transactions on respective accounts issued to respective consumer account holders by respective issuers, wherein each transaction on each said account is acquired for clearing and settlement by an acquirer for the merchant through a transaction handler in communication with both the issuer of the account and the acquirer for the merchant, and wherein the issuer sends an authorization response for the transaction to the merchant through the transaction handler and the acquirer in response to an authorization request sent to the issuer from the merchant through the transaction handler and the acquirer for the merchant, a method comprising, for each of a plurality of members, operating an extensible mode of communication in an intelligent heterogeneous network by:
- gathering member data for the member over the intelligent heterogeneous network to enable personalized services for the member, based on geographical awareness, through paging based on the gathered member data, wherein the member user data for the member includes a physical address corresponding to a television receiver and a member profile that includes a participant identifier and one said account corresponding to one said consumer account holder;
- providing a hyper local service for the member based on the geographical awareness via functionality enabled by the intelligent heterogeneous network;
- broadcasting, over the intelligent heterogeneous network, content interleaved with an advertisement corresponding to a merchant having a physical address, wherein:
  - the advertisement interleaved within the broadcast content is addressed for broadcast delivery exclusively to a logical address of a television receiver;
  - the merchant has a corresponding merchant profile that includes a physical address; and
  - the respective physical addresses of the merchant and the television receiver are determined to be within the same vicinity as the merchant;
- receiving or accessing data associated with a transaction;
- determining the participant identifier of the member from the data associated with the transaction;
- determining a length of elapsed time between:
  - the time of the transaction; and
  - the time of the broadcast of the advertisement interleaved within the broadcast content; and
- triggering, as a result of detecting the occurrence of the transaction associated with the participant identifier, a determination of whether:

the transaction is linked to the broadcast of the advertisement interleaved within the broadcast content; and the respective physical addresses of the merchant and the television receiver are in the same vicinity, wherein:
   if the transaction is linked to the broadcast of the advertisement interleaved within the broadcast content; and
   if the respective physical addresses of the merchant and the television receiver are in the same vicinity, then:
      determining with a level of certainty whether the transaction is linked to the broadcast of the advertisement within interleaved the broadcast content,
   wherein the determined level of certainty varies based on:
      the length of the elapsed time;
      the data related to the broadcast of the advertisement interleaved within broadcast content; and
      the data associated with the transaction; and
   based on the determined level of certainty and the data related to the broadcast of the advertisement interleaved within the broadcast content, generating one or more incentives;
   generating and communicating a post-transaction survey to the member after the detection of the transaction with the merchant;
   receiving, via the supplemental return channel, a completed survey from the member containing an evaluation of the transaction with the merchant; and
   using the result of the post-transaction survey to compute the determined level of certainty.

16. The method as defined in claim 15, wherein the merchant and television receiver corresponding to the participant identifier of the member are determined to be within the same vicinity whenever their respective physical addresses are within the same geographic entity selected from the group consisting of a political division, a legal division, a province, a state, a county, a prefecture, a city, a city-state, and a borough.

17. The method as defined in claim 15, wherein:
   the merchant and television receiver corresponding to the participant identifier of the member are determined to be within the same vicinity whenever their respective physical addresses have a navigation time therebetween, as determined by a navigation algorithm, that is, for at least one predetermined transportation mode, within a predetermined minimum time and a predetermined maximum time;
   the navigation time is determined by the navigation algorithm from the physical address of television receiver corresponding to the participant identifier of the member to the physical address of the merchant; and
   the navigation algorithm is a real time algorithm that accesses real time traffic information, for the at least one predetermined transportation mode, in determining the navigation time.

18. A non-transient computer-readable medium having encoded thereon software which, when executed by the Internet server hardware system, performs the method of claim 15.

* * * * *